US012620228B2

(12) United States Patent
Maung et al.

(10) Patent No.: US 12,620,228 B2
(45) Date of Patent: May 5, 2026

(54) SYSTEM AND METHOD FOR SPACE SEARCH REDUCTION IN IDENTIFYING ITEMS FROM IMAGES VIA ITEM HEIGHT

(71) Applicant: 7-Eleven, Inc., Irving, TX (US)

(72) Inventors: Crystal Maung, Dallas, TX (US); Sailesh Bharathwaaj Krishnamurthy, Irving, TX (US); Nithya Thyagarajan, Flower Mound, TX (US); Hiranya Garbha Kumar, Frisco, TX (US)

(73) Assignee: 7-Eleven, Inc., Irving, TX (US)

( * ) Notice: Subject to any disclaimer, the term of this patent is extended or adjusted under 35 U.S.C. 154(b) by 403 days.

(21) Appl. No.: 18/476,541

(22) Filed: Sep. 28, 2023

(65) Prior Publication Data

US 2024/0020978 A1 Jan. 18, 2024

Related U.S. Application Data

(63) Continuation-in-part of application No. 18/366,155, filed on Aug. 7, 2023, which is a continuation-in-part
(Continued)

(51) Int. Cl.
*G06V 20/50* (2022.01)
*G06Q 30/0601* (2023.01)
(Continued)

(52) U.S. Cl.
CPC ......... *G06V 20/50* (2022.01); *G06Q 30/0633* (2013.01); *G06T 7/60* (2013.01);
(Continued)

(58) Field of Classification Search
CPC ...... G06V 20/50; G06V 10/12; G06V 10/751; G06V 20/68; G06V 20/52; G06Q 30/0633;
(Continued)

(56) References Cited

U.S. PATENT DOCUMENTS

2013/0223673 A1 8/2013 Davis et al.
2013/0248593 A1 9/2013 Bonner et al.
(Continued)

FOREIGN PATENT DOCUMENTS

CN 112052835 A * 12/2020 ............. G06N 3/044
KR 101350387 B1 1/2014
KR 20180074976 A 7/2018

OTHER PUBLICATIONS

PCT International Search Report and Written Opinion of the Intl. Searching Authority, or the Declaration for International Application No. PCT/US2024/048094, date of mailing Dec. 24, 2024 (Dec. 24, 2024), 11 pages.
(Continued)

*Primary Examiner* — Mia M Thomas
(74) *Attorney, Agent, or Firm* — Baker Botts L.L.P.

(57) ABSTRACT

A device detects a triggering event that corresponds to a placement of a first item on a platform. In response, the device captures an image of the first item and generates a first encoded vector for the image. The first encoded vector describes one or more attributes of the first item. The device determines a height of the first item. The device identifies one or more items in an encoded vector library that are associated with average heights within a threshold range from the determined height of the first item. The device compares the first encoded vector with a second encoded vector associated with a second item from among the one or more items. The device determines that the first encoded vector corresponds to the second encoded vector. In response, the device determines that the first item corresponds to the second item.

20 Claims, 64 Drawing Sheets

Related U.S. Application Data of application No. 17/455,903, filed on Nov. 19, 2021, now Pat. No. 12,217,441, which is a continuation-in-part of application No. 17/362,261, filed on Jun. 29, 2021, now Pat. No. 11,887,332.

(51) Int. Cl.
| | |
|---|---|
| *G06T 7/60* | (2017.01) |
| *G06V 10/12* | (2022.01) |
| *G06V 10/75* | (2022.01) |
| *G06V 20/68* | (2022.01) |

(52) U.S. Cl.
CPC ............ *G06V 10/12* (2022.01); *G06V 10/751* (2022.01); *G06V 20/68* (2022.01)

(58) Field of Classification Search
CPC . G06T 7/60; G06T 2207/10028; G06T 7/246; G06N 3/02; H04N 7/181; H04N 7/188
See application file for complete search history.

(56) References Cited

U.S. PATENT DOCUMENTS

| | | | | |
|---|---|---|---|---|
| 2016/0065856 | A1 | 3/2016 | Sohn et al. | |
| 2018/0197223 | A1* | 7/2018 | Grossman ............ | G06V 30/142 |
| 2019/0108396 | A1 | 4/2019 | Dal Mutto et al. | |
| 2020/0090007 | A1* | 3/2020 | Joseph ................. | G06V 10/757 |
| 2021/0303939 | A1* | 9/2021 | Hu ......................... | G06F 18/256 |
| 2024/0020333 | A1* | 1/2024 | Krishnamurthy .... | G06V 10/467 |
| 2024/0020857 | A1* | 1/2024 | Datar ................... | G06V 10/761 |
| 2024/0020858 | A1* | 1/2024 | Datar ..................... | G06V 10/26 |
| 2024/0020859 | A1* | 1/2024 | Krishnamurthy ...... | H04N 7/181 |
| 2024/0020978 | A1* | 1/2024 | Maung ................... | G06V 20/68 |
| 2024/0020993 | A1* | 1/2024 | Krishnamurthy ..... | G06T 7/0008 |
| 2024/0029274 | A1 | 1/2024 | Wang et al. | |
| 2024/0029275 | A1* | 1/2024 | Krishnamurthy ...... | G06V 20/62 |
| 2024/0029276 | A1* | 1/2024 | Wang ................... | G06V 10/751 |
| 2024/0029284 | A1* | 1/2024 | Datar ..................... | G06T 7/292 |
| 2024/0029405 | A1* | 1/2024 | Datar ..................... | G06V 20/52 |

OTHER PUBLICATIONS

Krishnamurthy, S. B. et al., "Hand Detection Trigger for Item Identification," U.S. Appl. No. 17/455,902, filed Nov. 19, 2021, 108 pages.

Datar, S. V. et al., "Item Identification Using Multiple Cameras," U.S. Appl. No. 17/455,905, filed Nov. 19, 2021, 107 pages.

Krishnamurthy, S. B. et al., "Reducing a Search Space for Item Identification Using Machine Learning," U.S. Appl. No. 17/455,906, filed Nov. 19, 2021, 106 pages.

Krishnamurthy, S. B. et al., "Image Cropping Using Depth Information," U.S. Appl. No. 17/455,907, filed Nov. 19, 2021, 108 pages.

Maung, C. et al., "Determining Dimensions of an Item Using Point Cloud Information," U.S. Appl. No. 17/455,908, filed Nov. 19, 2021, 107 pages.

Partial Search Report for PCT Patent Application No. PCT/US2022/072832, mailed Oct. 6, 2022; 12 pages.

Xinan Wang, System and method for detecting a trigger event for identification of an item, U.S. Appl. No. 18/476,425, filed Sep. 28, 2023.

Sailesh B. Krishnamurthy, System and method for selecting an item from a plurality of identified items based on a similarity value, U.S. Appl. No. 18/476,429, filed Sep. 28, 2023.

Sailesh B. Krishnamurthy, System and method for camera re-calibration based on an updated homography, U.S. Appl. No. 18/476,468, filed Sep. 28, 2023.

Sailesh B. Rishnamurthy, System and method for identifying unmoved items on a platform during item identification, U.S. Appl. No. 18/476,436, filed Sep. 28, 2023.

Xinan Wang, System and method for identifying moved items on a platform during item identification, U.S. Appl. No. 18/476,445, filed Sep. 28, 2023.

Sailesh Bharathwaaj Krishnamurthy, System and method for item identification using container-based classification, U.S. Appl. No. 18/476,497, filed Sep. 28, 2023.

Sumedh Vilas Datar, System and method for selecting an item from a plurality of identified items by filtering out back images of the items, U.S. Appl. No. 18/476,479, filed Sep. 28, 2023.

Sailesh B. Krishnamurthy, System and method for identifying an item based on interaction history of a user, U.S. Appl. No. 18/476,512, filed Sep. 28, 2023.

Sumedh V. Datar, System and method for confirming the identity of an item based on item height, U.S. Appl. No. 18/476,432, filed Sep. 28, 2023.

Sumedh V. Datar, System and method for search space reduction for identifying an item, U.S. Appl. No. 18/476,511, filed Sep. 28, 2023.

Sumedh V. Datar, System and method for identifying an item based on an amount of image information in an image of the item, U.S. Appl. No. 18/476,555, filed Sep. 28, 2023.

* cited by examiner

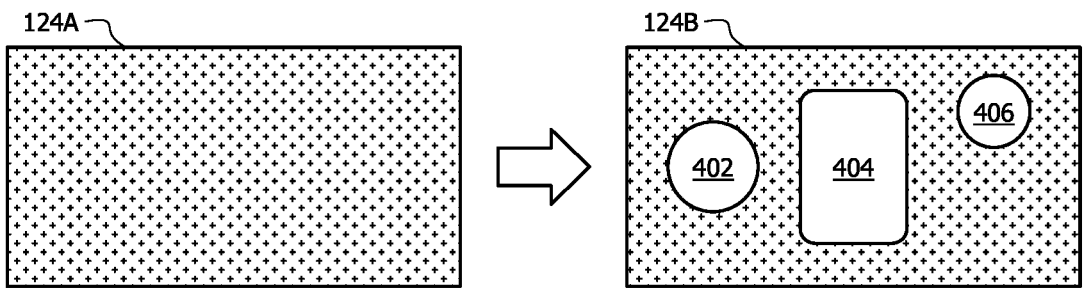
*FIG. 4*
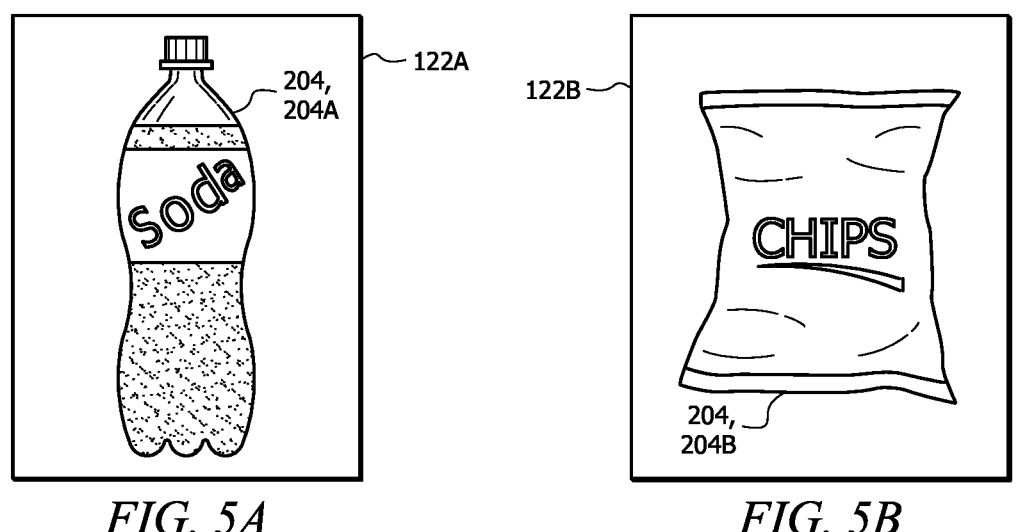
*FIG. 5A*             *FIG. 5B*
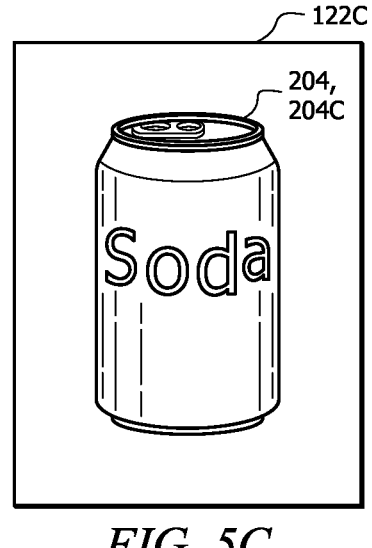
*FIG. 5C*

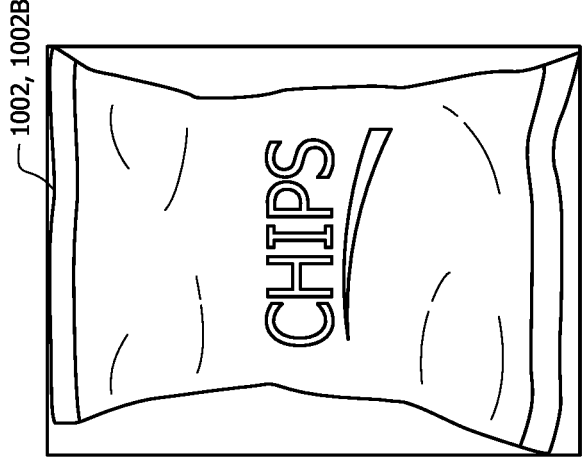
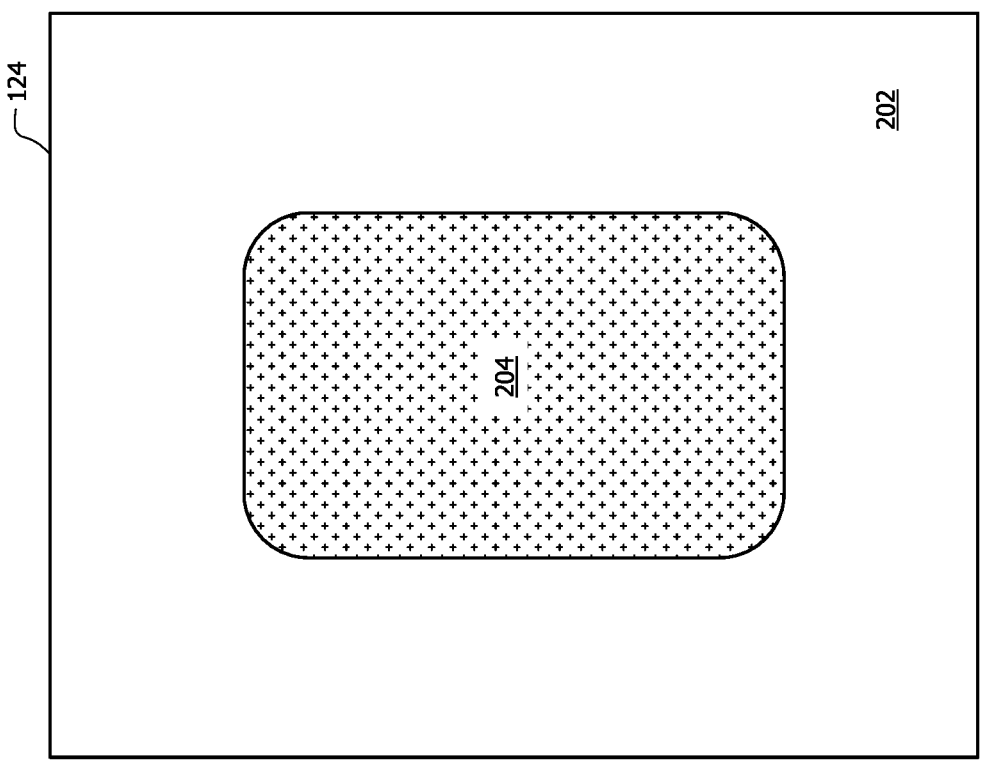
*FIG. 10C*

124

1002, 1002B

CHIPS

204

202

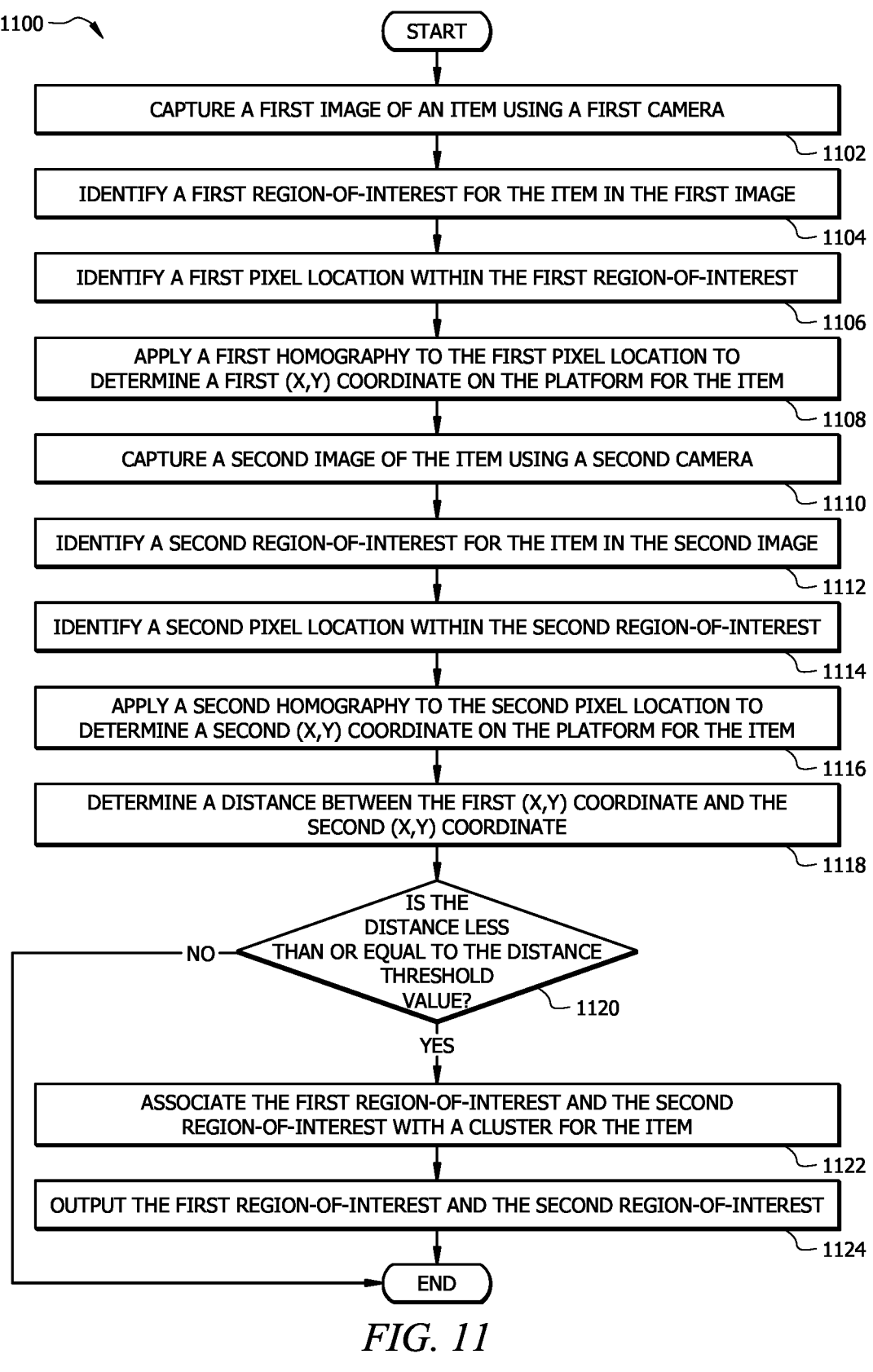

1100

START

CAPTURE A FIRST IMAGE OF AN ITEM USING A FIRST CAMERA
1102

IDENTIFY A FIRST REGION-OF-INTEREST FOR THE ITEM IN THE FIRST IMAGE
1104

IDENTIFY A FIRST PIXEL LOCATION WITHIN THE FIRST REGION-OF-INTEREST
1106

APPLY A FIRST HOMOGRAPHY TO THE FIRST PIXEL LOCATION TO DETERMINE A FIRST (X,Y) COORDINATE ON THE PLATFORM FOR THE ITEM
1108

CAPTURE A SECOND IMAGE OF THE ITEM USING A SECOND CAMERA
1110

IDENTIFY A SECOND REGION-OF-INTEREST FOR THE ITEM IN THE SECOND IMAGE
1112

IDENTIFY A SECOND PIXEL LOCATION WITHIN THE SECOND REGION-OF-INTEREST
1114

APPLY A SECOND HOMOGRAPHY TO THE SECOND PIXEL LOCATION TO DETERMINE A SECOND (X,Y) COORDINATE ON THE PLATFORM FOR THE ITEM
1116

DETERMINE A DISTANCE BETWEEN THE FIRST (X,Y) COORDINATE AND THE SECOND (X,Y) COORDINATE
1118

IS THE DISTANCE LESS THAN OR EQUAL TO THE DISTANCE THRESHOLD VALUE?
1120

NO

YES

ASSOCIATE THE FIRST REGION-OF-INTEREST AND THE SECOND REGION-OF-INTEREST WITH A CLUSTER FOR THE ITEM
1122

OUTPUT THE FIRST REGION-OF-INTEREST AND THE SECOND REGION-OF-INTEREST
1124

END

*FIG. 11*

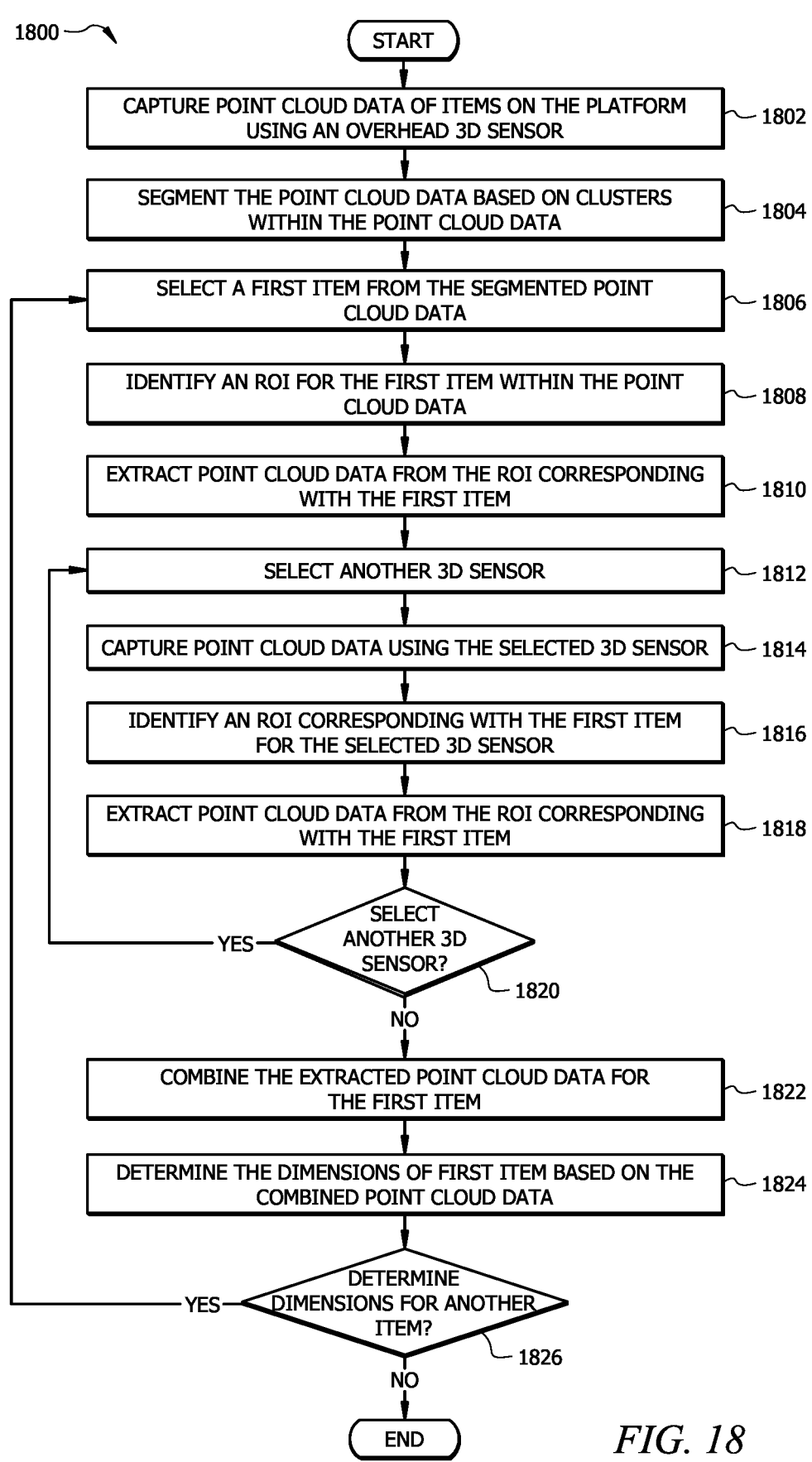

1800

START

CAPTURE POINT CLOUD DATA OF ITEMS ON THE PLATFORM USING AN OVERHEAD 3D SENSOR — 1802

SEGMENT THE POINT CLOUD DATA BASED ON CLUSTERS WITHIN THE POINT CLOUD DATA — 1804

SELECT A FIRST ITEM FROM THE SEGMENTED POINT CLOUD DATA — 1806

IDENTIFY AN ROI FOR THE FIRST ITEM WITHIN THE POINT CLOUD DATA — 1808

EXTRACT POINT CLOUD DATA FROM THE ROI CORRESPONDING WITH THE FIRST ITEM — 1810

SELECT ANOTHER 3D SENSOR — 1812

CAPTURE POINT CLOUD DATA USING THE SELECTED 3D SENSOR — 1814

IDENTIFY AN ROI CORRESPONDING WITH THE FIRST ITEM FOR THE SELECTED 3D SENSOR — 1816

EXTRACT POINT CLOUD DATA FROM THE ROI CORRESPONDING WITH THE FIRST ITEM — 1818

SELECT ANOTHER 3D SENSOR? — 1820

YES

NO

COMBINE THE EXTRACTED POINT CLOUD DATA FOR THE FIRST ITEM — 1822

DETERMINE THE DIMENSIONS OF FIRST ITEM BASED ON THE COMBINED POINT CLOUD DATA — 1824

DETERMINE DIMENSIONS FOR ANOTHER ITEM? — 1826

YES

NO

END

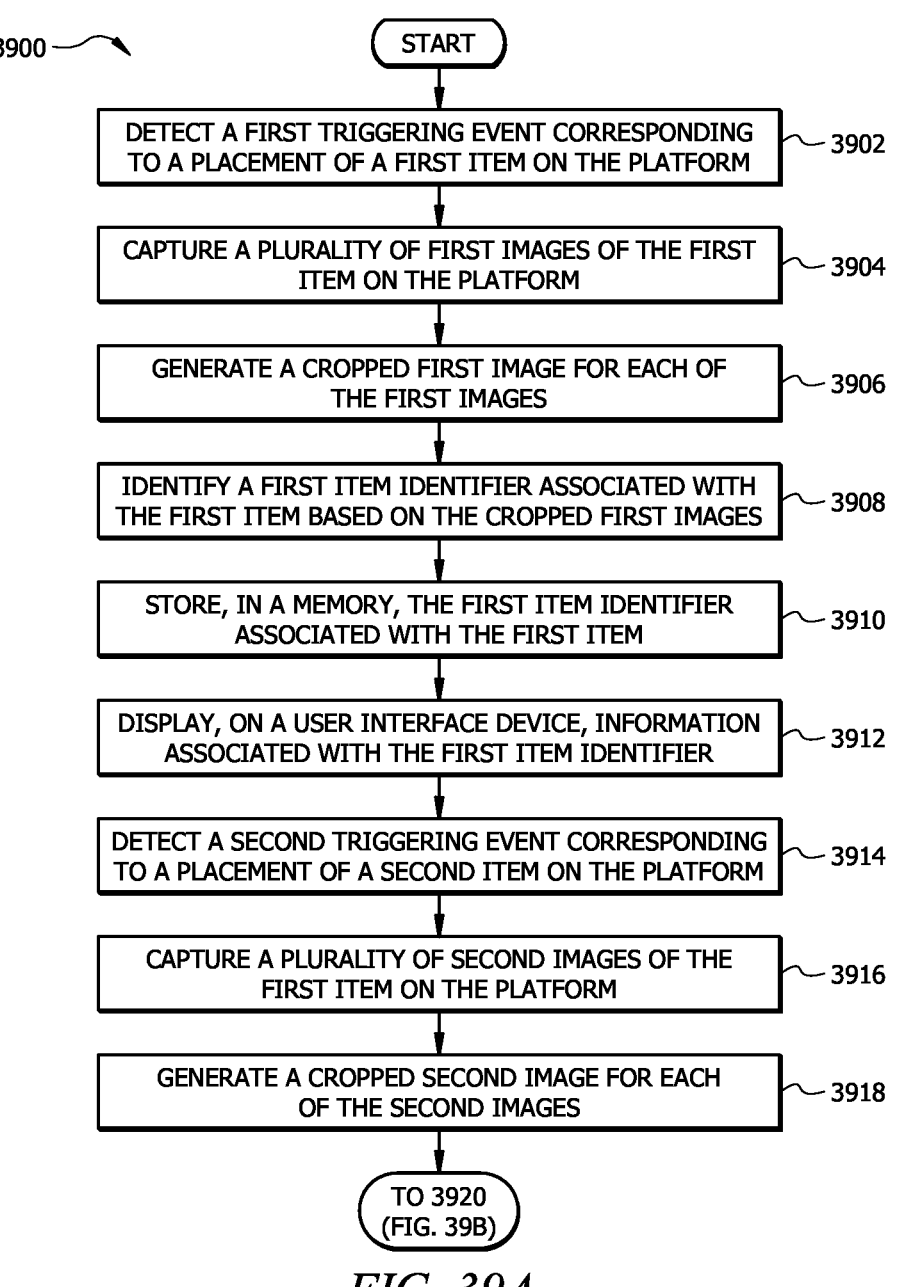

START

DETECT A FIRST TRIGGERING EVENT CORRESPONDING TO A PLACEMENT OF A FIRST ITEM ON THE PLATFORM — 3902

CAPTURE A PLURALITY OF FIRST IMAGES OF THE FIRST ITEM ON THE PLATFORM — 3904

GENERATE A CROPPED FIRST IMAGE FOR EACH OF THE FIRST IMAGES — 3906

IDENTIFY A FIRST ITEM IDENTIFIER ASSOCIATED WITH THE FIRST ITEM BASED ON THE CROPPED FIRST IMAGES — 3908

STORE, IN A MEMORY, THE FIRST ITEM IDENTIFIER ASSOCIATED WITH THE FIRST ITEM — 3910

DISPLAY, ON A USER INTERFACE DEVICE, INFORMATION ASSOCIATED WITH THE FIRST ITEM IDENTIFIER — 3912

DETECT A SECOND TRIGGERING EVENT CORRESPONDING TO A PLACEMENT OF A SECOND ITEM ON THE PLATFORM — 3914

CAPTURE A PLURALITY OF SECOND IMAGES OF THE FIRST ITEM ON THE PLATFORM — 3916

GENERATE A CROPPED SECOND IMAGE FOR EACH OF THE SECOND IMAGES — 3918

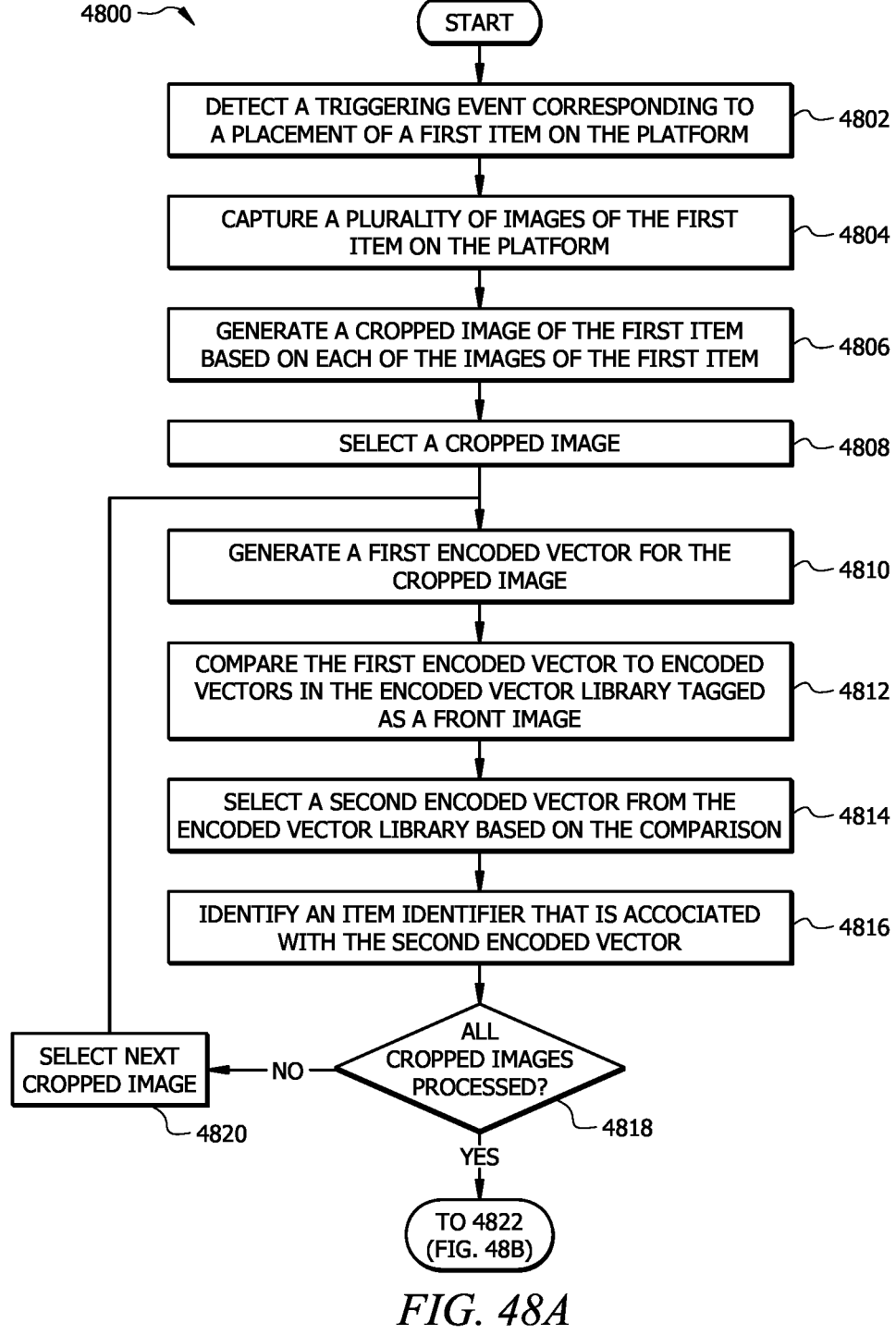

4800

START

DETECT A TRIGGERING EVENT CORRESPONDING TO A PLACEMENT OF A FIRST ITEM ON THE PLATFORM — 4802

CAPTURE A PLURALITY OF IMAGES OF THE FIRST ITEM ON THE PLATFORM — 4804

GENERATE A CROPPED IMAGE OF THE FIRST ITEM BASED ON EACH OF THE IMAGES OF THE FIRST ITEM — 4806

SELECT A CROPPED IMAGE — 4808

GENERATE A FIRST ENCODED VECTOR FOR THE CROPPED IMAGE — 4810

COMPARE THE FIRST ENCODED VECTOR TO ENCODED VECTORS IN THE ENCODED VECTOR LIBRARY TAGGED AS A FRONT IMAGE — 4812

SELECT A SECOND ENCODED VECTOR FROM THE ENCODED VECTOR LIBRARY BASED ON THE COMPARISON — 4814

IDENTIFY AN ITEM IDENTIFIER THAT IS ACCOCIATED WITH THE SECOND ENCODED VECTOR — 4816

SELECT NEXT CROPPED IMAGE — NO — ALL CROPPED IMAGES PROCESSED?

4820

4818

YES

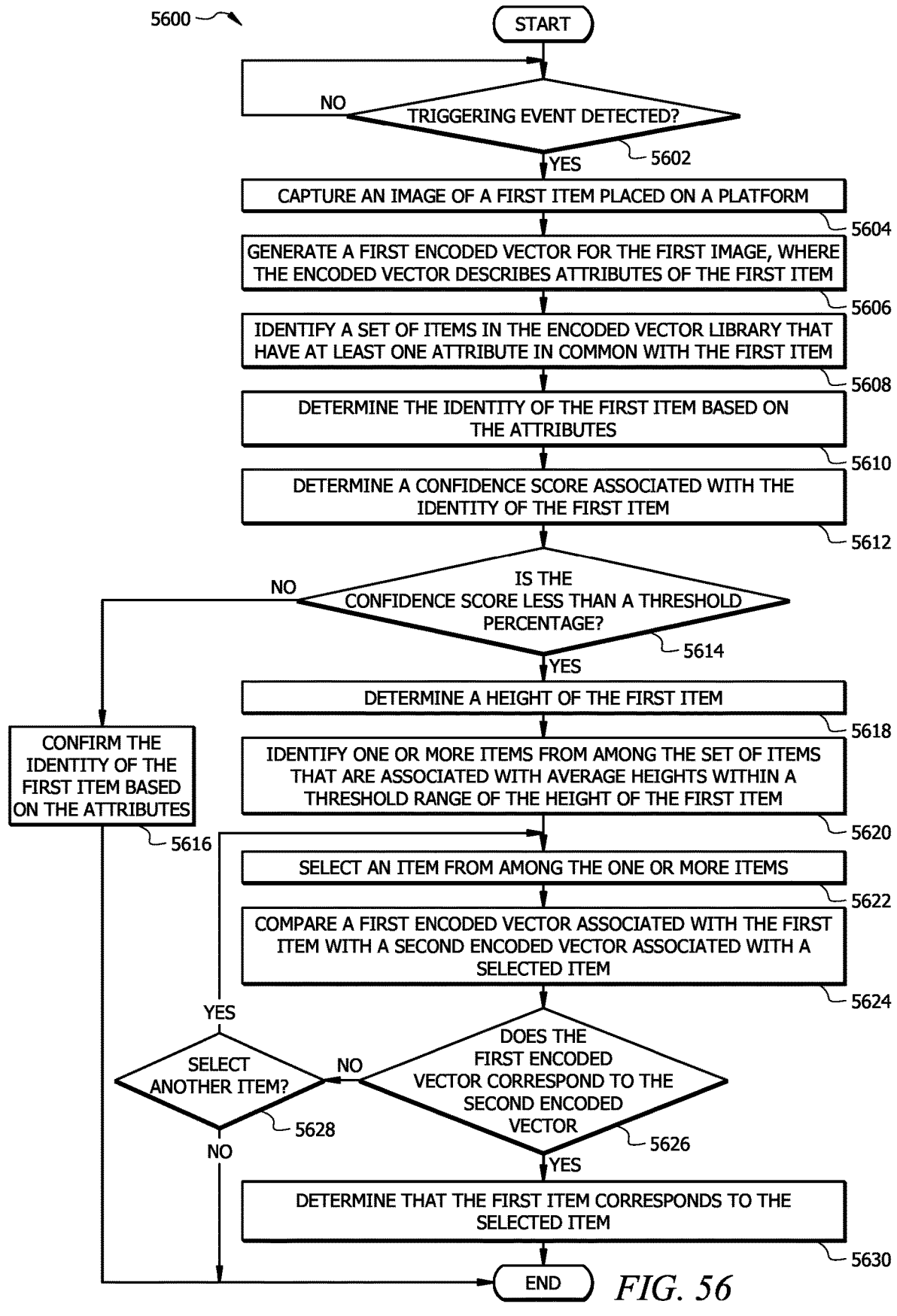

5600

START

NO ← TRIGGERING EVENT DETECTED? — 5602

YES

CAPTURE AN IMAGE OF A FIRST ITEM PLACED ON A PLATFORM — 5604

GENERATE A FIRST ENCODED VECTOR FOR THE FIRST IMAGE, WHERE THE ENCODED VECTOR DESCRIBES ATTRIBUTES OF THE FIRST ITEM — 5606

IDENTIFY A SET OF ITEMS IN THE ENCODED VECTOR LIBRARY THAT HAVE AT LEAST ONE ATTRIBUTE IN COMMON WITH THE FIRST ITEM — 5608

DETERMINE THE IDENTITY OF THE FIRST ITEM BASED ON THE ATTRIBUTES — 5610

DETERMINE A CONFIDENCE SCORE ASSOCIATED WITH THE IDENTITY OF THE FIRST ITEM — 5612

IS THE CONFIDENCE SCORE LESS THAN A THRESHOLD PERCENTAGE? — 5614

NO

YES

DETERMINE A HEIGHT OF THE FIRST ITEM — 5618

CONFIRM THE IDENTITY OF THE FIRST ITEM BASED ON THE ATTRIBUTES — 5616

IDENTIFY ONE OR MORE ITEMS FROM AMONG THE SET OF ITEMS THAT ARE ASSOCIATED WITH AVERAGE HEIGHTS WITHIN A THRESHOLD RANGE OF THE HEIGHT OF THE FIRST ITEM — 5620

SELECT AN ITEM FROM AMONG THE ONE OR MORE ITEMS — 5622

COMPARE A FIRST ENCODED VECTOR ASSOCIATED WITH THE FIRST ITEM WITH A SECOND ENCODED VECTOR ASSOCIATED WITH A SELECTED ITEM — 5624

YES

SELECT ANOTHER ITEM? — 5628

NO

DOES THE FIRST ENCODED VECTOR CORRESPOND TO THE SECOND ENCODED VECTOR — 5626

NO

YES

DETERMINE THAT THE FIRST ITEM CORRESPONDS TO THE SELECTED ITEM — 5630

END

FIG. 56

SYSTEM AND METHOD FOR SPACE SEARCH REDUCTION IN IDENTIFYING ITEMS FROM IMAGES VIA ITEM HEIGHT

CROSS-REFERENCE TO RELATED APPLICATIONS

This application is a continuation-in-part of U.S. patent application Ser. No. 18/366,155 filed on Aug. 7, 2023, entitled "SYSTEM AND METHOD FOR IDENTIFYING A SECOND ITEM BASED ON AN ASSOCIATION WITH A FIRST ITEM", which is a continuation-in-part of U.S. patent application Ser. No. 17/455,903 filed on Nov. 19, 2021, entitled "ITEM LOCATION DETECTION USING HOMOGRAPHIES," which is a continuation-in-part of U.S. patent application Ser. No. 17/362,261 filed Jun. 29, 2021, entitled "ITEM IDENTIFICATION USING DIGITAL IMAGE PROCESSING," which are all incorporated herein by reference.

TECHNICAL FIELD

The present disclosure relates generally to digital image processing, and more specifically to a system and method for space search reduction in identifying items from images via item height.

BACKGROUND

Identifying and tracking objects within a space poses several technical challenges. For example, identifying different features of an item that can be used to later identify the item in an image is computationally intensive when the image includes several items. This process may involve identifying an individual item within the image and then comparing the features for an item against every item in a database that may contain thousands of items. In addition to being computationally intensive, this process requires a significant amount of time which means that this process is not compatible with real-time applications. This problem becomes intractable when trying to simultaneously identify and track multiple items.

SUMMARY

The system disclosed in the present application provides a technical solution to the technical problems discussed above by using a combination of cameras and three-dimensional (3D) sensors to identify and track items that are placed on a platform. The disclosed system provides several practical applications and technical advantages which include a process for selecting a combination of cameras on an imaging device to capture images of items that are placed on a platform, identifying the items that are placed on the platform, and assigning the items to a user. Requiring a user to scan or manually identify items creates a bottleneck in the system's ability to quickly identify items. In contrast, the disclosed process is able to identify items from images of the items and assign the items to a user without requiring the user to scan or otherwise identify the items. This process provides a practical application of image detection and tracking by improving the system's ability to quickly identify multiple items. These practical applications not only improve the system's ability to identify items but also improve the underlying network and the devices within the network. For example, this disclosed process allows the system to service a larger number of users by reducing the amount of time that it takes to identify items and assign items to a user, while improving the throughput of image detection processing. In other words, this process improves hardware utilization without requiring additional hardware resources which increases the number of hardware resources that are available for other processes and increases the throughput of the system. Additionally, these technical improvements allow for scaling of the item identification and tracking functionality described herein.

In one embodiment, the item tracking system comprises an item tracking device that is configured to detect a triggering event at a platform of an imaging device. The triggering event may correspond with when a user approaches or interacts with the imaging device by placing items on the platform. The item tracking device is configured to capture a depth image of items on the platform using a 3D sensor and to determine an object pose for each item on the platform based on the depth image. The pose corresponds with the location and the orientation of an item with respect to the platform. The item tracking device is further configured to identify one or more cameras from among a plurality of cameras on the imaging device based on the object pose for each item on the platform. This process allows the item tracking device to select the cameras with the best views of the items on the platform which reduces the number of images that are processed to identify the items. The item tracking device is further configured to capture images of the items on the platform using the identified cameras and to identify the items within the images based on features of the items. The item tracking device is further configured to identify a user associated with the identified items on the platform, to identify an account that is associated with the user, and to add the items to the account that is associated with the user.

In another embodiment, the item tracking system comprises an item tracking device that is configured to capture a first overhead depth image of the platform using a 3D sensor at a first time instance and a second overhead depth image of a first object using the 3D sensor at a second time instance. The item tracking device is further configured to determine that a first portion of the first object is within a region-of-interest and a second portion of the first object is outside the region-of-interest in the second overhead depth image. The item tracking device is further configured to capture a third overhead depth image of a second object placed on the platform using the 3D sensor at a third time instance. The item tracking device is further configured to capture a first image of the second object using a camera in response to determining that the first object is outside of the region-of-interest and the second object is within the region-of-interest for the platform.

In another embodiment, the item tracking system comprises an item tracking device that is configured to identify a first pixel location within a first plurality of pixels corresponding with an item in a first image and to apply a first homography to the first pixel location to determine a first (x,y) coordinate. The item tracking device is further configured to identify a second pixel location within a second plurality of pixels corresponding with the item in a second image and to apply a second homography to the second pixel location to determine a second (x,y) coordinate. The item tracking device is further configured to determine that the distance between the first (x,y) coordinate and the second (x,y) coordinate is less than or equal to the distance threshold value, to associate the first plurality of pixels and the second plurality of pixels with a cluster for the item, and to output the first plurality of pixels and the second plurality of pixels.

In another embodiment, the item tracking system comprises an item tracking device that is configured to detect a triggering event corresponding with a user placing a first item on the platform, to capture a first image of the first item on the platform using a camera, and to input the first image into a machine learning model that is configured to output a first encoded vector based on features of the first item that are present in the first image. The item tracking device is further configured to identify a second encoded vector in an encoded vector library that most closely matches the first encoded vector and to identify a first item identifier in the encoded vector library that is associated with the second encoded vector. The item tracking device is further configured to identify the user, to identify an account that is associated with the user, and to associate the first item identifier with the account of the user.

In another embodiment, the item tracking system comprises an item tracking device that is configured to receive a first encoded vector and receive one or more feature descriptors for a first object. The item tracking device is further configured to remove one or more encoded vectors from an encoded vector library that are not associated with the one or more feature descriptors and to identify a second encoded vector in the encoded vector library that most closely matches the first encoded vector based on the numerical values within the first encoded vector. The item tracking device is further configured to identify a first item identifier in the encoded vector library that is associated with the second encoded vector and to output the first item identifier.

In another embodiment, the item tracking system comprises an item tracking device that is configured to capture a first image of an item on a platform using a camera and to determine a first number of pixels in the first image that corresponds with the item. The item tracking device is further configured to capture a first depth image of an item on the platform using a three-dimensional (3D) sensor and to determine a second number of pixels within the first depth image that corresponds with the item. The item tracking device is further configured to determine that the difference between the first number of pixels in the first image and the second number of pixels in the first depth image is less than the difference threshold value, to extract the plurality of pixels corresponding with the item in the first image from the first image to generate a second image, and to output the second image.

In another embodiment, the item tracking system comprises an item tracking device that is configured to receive a first point cloud data for a first item, to identify a first plurality of data points for the first object within the first point cloud data, and to extract the first plurality of data points from the first point cloud data. The item tracking device is further configured to receive a second point cloud data for the first item, to identify a second plurality of data points for the first object within the second point cloud data, and to extract a second plurality of data points from the second point cloud data. The item tracking device is further configured to merge the first plurality of data points and the second plurality of data points to generate combined point cloud data and to determine dimensions for the first object based on the combined point cloud data.

System and Method for Camera Re-Calibration Based on an Updated Homography

The disclosed system further contemplates an unconventional system and method for camera re-calibration based on an updated homography. More specifically, the disclosed system provides the practical application and technical improvements to the item identification and tracking techniques by detecting that an initial homography is no longer accurate, and in response, generate a new homography and re-calibrate the cameras and/or 3D sensors using the new homography.

In current approaches, when cameras and 3D sensors are deployed on an imaging device, the cameras and 3D sensors may be calibrated during an initial calibration process so pixel locations in an image captured by a given camera/3D sensor is mapped to respective physical location on the platform in the global plane. For example, during the initial calibration of cameras, a paper printed with unique patterns of checkboards may be placed on the platform. Each camera may capture an image of the paper and transmit to the item tracking device. The item tracking device may generate the homography that maps pixel locations of each unique pattern on the paper shown in the image to corresponding physical locations of unique pattern on the paper that is placed on the platform. Similar operations may be performed with respect to depth images captured by the 3D sensor.

After the initial camera calibration process, the item tracking engine may determine the physical location of any item placed on the platform by applying the homography to the pixel locations of the item shown in an image of the item. In some cases, a camera, 3D sensor, and/or the platform may move or be shifted from its initial location due to any number of reasons, such as an impact from a person when the person places an item on the platform, and the like. Because the initial homograph is determined based on the initial locations of the camera, 3D sensor, and the platform, a change in the initial location of one or more of the camera, 3D sensor, and the platform may lead to the homography becoming inaccurate. As a result, applying the homography to subsequent pixel locations of items shown in images or depth images may not lead to the actual physical location of the items on the platform.

In practice, it is very difficult, if not impossible, to know if a camera, 3D sensor, and/or the platform is shifted in position if no one witnessed it or it is captured on a camera facing the imaging device. One potential solution to this problem of a camera, 3D sensor and/or platform being shifted resulting in an inaccurate homography is to provide a routine maintenance to the cameras, 3D sensor, and platform to ensure that they are not shifted from their respective original locations. However, this potential solution is not feasible given that the imaging device may be deployed in a store and routine maintenance of the cameras, 3D sensor, and platform will interrupt the item check-out process. Besides, routine maintenance is labor-intensive and requires precise measurement of locations of the cameras, 3D sensor, and platform, which makes it an error-prone process.

The present disclosure provides a solution to this and other technical problems that are currently arising in the realm of item identification and tracking technology. For example, the present system is configured to detect if there is shift in location of any of the camera, 3D sensor, and/or platform, and in response to detecting the shift in location of any of the camera, 3D sensor, and platform, generate a new homography, and re-calibrate the camera, 3D sensor using the new homography. In this manner, the disclosed system improves the item identifying and tracking techniques. For example, the disclosed system increases the accuracy in item tracking and identification techniques, specifically, in cases where a camera, a 3D sensor, and/or platform has moved from its initial position when the initial homography was generated and determined. Accordingly, the disclosed system provides the practical application and technical improvements to the item identification and tracking techniques. For example, the disclosed system offers technical improvements in the field of item identification and tracking technology by addressing the inherent challenge of maintaining accuracy in a dynamic environment. For example, the disclosed system continuously or periodically (e.g., every second, every milliseconds, etc.) may monitor the positions of cameras, 3D sensors, and the platform. When the disclosed system detects any shift in the location of any of these components, the disclosed system generates a new homography and recalibrates the cameras and 3D sensors accordingly. Therefore, the pixel-to-physical location mapping remains precise (or within an acceptable precision threshold), even in scenarios where the system components have been moved or shifted. Furthermore, the disclosed system increases reliability by proactively addressing challenges of shifts in locations of cameras, 3D sensors, and the platform and maintains high accuracy even in changing conditions. In this manner, the disclosed system provides additional practical applications and technical improvements to the item identification and tracking technology. Accordingly, this represents an improvement to the efficiency, throughput, and productivity of computer systems implemented to perform the described operations.

In some embodiments, an object tracking system comprises a plurality of cameras, a memory, and a processor. Each camera is configured to capture images of at least a portion of a platform. The memory is configured to store a first homography that is configured to translate between pixel locations in an image and physical (x,y) coordinates in a global plane. The memory is further configured to store a reference location array comprising a first set of physical (x,y) locations of a set of points located on a calibration board in the global plane. Each of the first set of physical (x,y) locations is associated with a point from the set of points. The calibration board is positioned on the platform. The reference location array is determined by the first homography. The processor is communicatively coupled with the plurality of cameras and the memory. The processor is configured to receive a first image from a first camera, wherein the first image shows at least a portion of the set of points on the calibration board. The processor is further configured to determine a first pixel location array that comprise a first set of pixel locations associated with the set of points in the first image. The processor is further configured to determine, by applying the first homography to the first pixel location array, a first calculated location array identifying a first set of calculated physical (x,y) location coordinates of the set of points in the global plane. The processor is further configured to compare the reference location array with the first calculated location array. The processor is further configured to determine a difference between the reference location array and the first calculated location array. The processor is further configured to determine that the difference between the reference location array and the first calculated location array is more than a threshold value. In response to determining that the difference between the reference location array and the first calculated location array is more than the threshold value, the processor is further configured to determine that the first camera and/or the platform has moved from a respective initial location when the first homography was determined. The processor is further configured to determine a second homography by multiplying an inverse of the first pixel location array with by the reference location array. The processor is further configured to calibrate the first camera using the second homography.

Detecting a Trigger Event for Identification of an Item

Certain embodiments of the present disclosure describe techniques for detecting a triggering event corresponding to a placement of an item on a platform of an imaging device. An overhead camera positioned above the platform and having a top view of the platform is configured to take pictures of the platform (e.g., periodically or continually). Each particular pixel of an image captured by the overhead camera is associated with a depth value indicative of a distance between the overhead camera and a surface depicted by the particular pixel. A reference image of an empty platform is captured and an average reference depth value associated with all pixels in the reference image is calculated. Thereafter, for each subsequent image captured by the overhead camera, a real-time average depth associated with all pixels of the subsequent image is calculated and subtracted from the reference depth calculated for the empty platform. When the difference between the reference depth and real-time depth stays constant above zero across several images of the platform, it means that an item has been placed on the platform and is ready for identification. In response, a triggering event is determined to have been detected.

The system and method described in these embodiments of the present disclosure provide a practical application of intelligently detecting a triggering event corresponding to placement of an item on the platform of the imaging device. As described with reference to FIGS. 32A-B, 33A-D, and 34, an item tracking device detects whether an item has been placed on the platform by comparing a reference overhead image of an empty platform with a plurality of subsequently captured overhead images of the platform. By calculating a difference in the average depth values associated with pixels of the reference image and the plurality of subsequent images, the item tracking device determines, for example, that a user's hand holding an item entered the platform, placed the first item on the platform, and exited the platform. This technique for detecting a triggering event avoids false detection of triggering events as well as avoids missed detection of triggering events, thus improving accuracy associated with detecting triggering events at the platform. Further, by avoiding false detection of triggering events, the disclosed system and method saves computing resources (e.g., processing and memory resources associated with the item tracking device) which would otherwise be used to perform one or more processing steps that follow the detection of a triggering event such as capturing images using cameras of the imaging device to identify items placed on the platform. This, for example, improves the processing efficiency associated with the processor of the item tracking device. Thus, the disclosed system and method generally improve the technology associated with automatic detection of items.

Identifying Unmoved Items on the Platform During Item Identification

Certain embodiments of the present disclosure describe techniques for detecting an item that was placed on a platform of an imaging device in a previous interaction and assigning to the item an item identifier that was identified in the previous interaction. The disclosed techniques determine whether an item has moved on the platform between interactions associated with a particular transaction. Upon determining that the item has not moved between interactions, the item is assigned an item identifier that was identified as part of a previous interaction. For example, when a first item is placed on the platform for the first time as part of an interaction, a first image of the first item is captured using an overhead camera positioned above the platform. An item identifier is determined for the first item and stored in a memory. Subsequently, when a second item is placed on the platform as part of a subsequent interaction, a second image of the first item is captured using the overhead camera. The second image of the first item is compared with the first image of the first item. When an overlap between the first and second images of the first item equals or exceeds a threshold, it is determined that the first item has not moved from its position on the platform between the first and second interactions. In response to determining that the first item has not moved between the two interactions, the first item is assigned the item identifier that was identified as part of the first interaction.

The system and method described in these embodiments of the present disclosure provide a practical application of intelligently determining whether an item has moved on the platform between interactions and assigning a previously identified item identifier to the item in response to determining that the item has not moved on the platform between interactions. As described with reference to FIGS. 35A-B, 36A-B, and 37, an item tracking device determines whether an item has moved between two interactions by comparing overhead images of the item captured during the two interactions. When an overlap between the overhead images equals or exceeds a threshold, the item tracking device determines that the item has not moved on the platform between the two interactions, and in response, assigns an item identifier to the item that was identified in a previous interaction. These techniques save computing resources (e.g., processing and memory resources associated with the item tracking device) that would otherwise be used to re-run item identification algorithms for items that were already identified as part of a previous interaction. This, for example, improves the processing efficiency associated with the processor of the item tracking device. Thus, the disclosed system and method generally improve the technology associated with automatic detection of items.

Identifying Moved Items on the Platform During Item Identification

Certain embodiments of the present disclosure describe techniques for detecting an item that was placed on a platform of an imaging device in a previous interaction and assigning to the item an item identifier that was identified in the previous interaction. The disclosed techniques may detect an item that has moved on the platform between interactions associated with a transaction. Upon detecting an item from a previous interaction that may have moved on the platform between interactions, the item is assigned an item identifier that was identified as part of a previous interaction. For example, when a first item is placed on the platform for the first time as part of an interaction, a plurality of first images of the first item are captured using a plurality of cameras associated with the imaging device. The item is identified based on the plurality of first images of the first item. Subsequently, when a second item is placed on the platform as part of a subsequent interaction, a plurality of second images of the first item are captured using the same cameras. Each first image of the first item captured using a particular camera is compared with a second image of the first item captured using the same camera. When a majority of the first images match with the corresponding second images of the first item, it is determined that the second images correspond to the first item and, in response, the first item is assigned the item identifier that was identified as part of the first interaction.

The system and method described these embodiments of the present disclosure provide a practical application of intelligently identifying an item that was placed on the platform of the imaging device as part of a previous interaction and assigning the item an item identifier that was identified for the item in the previous interaction. As described with reference to FIGS. 38A-B, and 39A-B, in response to detecting that the first item has been placed on the platform as part of the first interaction, an item tracking device captures a plurality of first images of the first item, generates a plurality of cropped first images of the first item based on the first images, identifies the first item based on the cropped first images, and stores a first item identifier associated with the first item in a memory. In response to detecting that a second item has been added on the platform as part of a second interaction, item tracking device captures a plurality of second images of the first item and generates a plurality of cropped second images of the first item based on the second images. Item tracking device compares the cropped first images with the cropped second images. When item tracking device determines that the cropped first images match with the cropped second images, item tracking device determines that the cropped second images are associated with (e.g., depict) the first item that was identified as part of the first interaction. In response, item tracking device accesses the first item identifier from the memory and assigns the first item identifier to the first item. These techniques save computing resources (e.g., processing and memory resources associated with the item tracking device) that would otherwise be used to re-run item identification algorithms for items that were already identified as part of a previous interaction. This, for example, improves the processing efficiency associated with the processor of the item tracking device. Thus, the disclosed system and method generally improve the technology associated with automatic detection of items.

System and Method for Item Identification Using Container-Based Classification

The disclosed system further contemplates an unconventional system and method for item identification using container-based classification. More specifically, the disclosed system provides practical applications and technical improvements to the item identification and tracking techniques by reducing the search set to a subset of items that are associated with a container category of an item in question.

In some cases, the same container, such as a cup, a box, a bottle, and the like, may be used for multiple items. For example, in some cases, a user may pour an item (e.g., tea, soda) into a container that is designated for another item (e.g., in a coffee cup) and place the container on the platform. In such cases, it is challenging to recognize what item is actually placed inside the container and it would require a large amount of computing resources and training data to recognize the item.

The present disclosure provides a solution to this and other technical problems that are currently arising in the realm of item identification and tracking technology. For example, the disclosed system is configured to associate each item with one or more container categories that have been used by users to place the item into. Thus, the disclosed system generates groups of container categories and classifies each item into an appropriate container category.

During the item identification process for an item, the disclosed system determines a container category associated with the item, identifies items that belong to the same class of container category as the item, and present the identified items in a list of item options on a graphical user interface (GUI) for the user to choose from. The user may select an item from the list on the GUI. The disclosed system uses the user selection as feedback in the item identification process. In this manner, the disclosed system improves the item identifying and tracking techniques. For example, the disclosed system may reduce the search space dataset from among the encoded vector library that includes encoded feature vectors representing all the items available at the physical location (e.g., store) to a subset of entries that are associated with the particular container category that is associated with the item in question.

By reducing the search space dataset to a subset that is associated with the particular container category as the item in question, the item tracking device does not have to consider the rest of the items that are not associated with the particular container category. Therefore, the disclosed system provides a practical application of reducing search space in the item identification process, which in turn, reduces the search time and the computational complexity in the item identification process, and processing and memory resources needed for the item identification process. Furthermore, this leads to improving the accuracy of the item identification process. For example, the user feedback may be used as additional and external information to further refine the machine learning model and increase the accuracy of the machine learning model for subsequent item identification operations. Accordingly, this represents an improvement to the efficiency, throughput, and productivity of computer systems implemented to perform the described operations.

In some embodiments, a system comprises a plurality of cameras, a memory, and a processor. Each camera is configured to capture images of at least a portion of a platform. The memory is configured to store an encoded vector library comprising a plurality of encoded vectors. Each encoded vector describes one or more attributes of a respective item. Each encoded vector is associated with a respective container category for the respective item. The processor is communicatively coupled to the plurality of cameras and the memory. The processor is configured to detect a triggering event at the platform, wherein the triggering event corresponds to a placement of an item on the platform. The processor is further configured to capture an image of the item using at least one camera from among the plurality of cameras in response to detecting the triggering event. The processor is further configured to generate a first encoded vector for the image, wherein the first encoded vector describes one or more attributes of the item. The processor is further configured to determine that the item is associated with a first container category based at least in part upon the one or more attributes of the item. The processor is further configured to identify one or more items that have been identified as having been placed inside a container associated with the first container category. The processor is further configured to display on a graphical user interface (GUI) a list of item options that comprises the one or more items. The processor is further configured to receive a selection of a first item from among the list of item options. The processor is further configured to identify the first item as being placed inside the container.

Selecting an Item from a Plurality of Identified Items Based on a Similarity Value Certain embodiments of the present disclosure describe improved techniques for identifying an item placed on a platform of an imaging device. In response to detecting a placement of an item on the platform, a plurality of item identifiers are selected for the item from an encoded vector library, based on a plurality of images of the item. Each item identifier selected from the encoded vector library based on a corresponding image of the item is associated with a similarity value that is indicative of a degree of confidence that the item identifier correctly identifies the item depicted in the image. A particular item identifier is selected from the plurality of item identifiers based on the similarity values associated with the plurality of item identifiers. For example, all item identifiers that are associated with a similarity value that is less than a threshold are discarded. Among the remaining item identifiers, two item identifiers are selected that are associated with the highest and the next highest similarity values. When the difference between the highest similarity value and the next highest similarity value exceeds another threshold, the item identifier associated with the highest similarity value is assigned to the item.

The system and method described in these embodiments of the present disclosure provide a practical application of intelligently selecting a particular item identifier for an unidentified item from a plurality of item identifiers identified for the item. As described with reference to FIGS. 42 and 43, in response to detecting a triggering event corresponding to a placement of a first item on the platform of the imaging device, item tracking device captures a plurality of images of the first item, generates a plurality of cropped images of the first item based on the images, and identifies a plurality of item identifier for the first item based on the plurality of cropped images. Each item identifier that was selected based on a respective cropped image is associated with a similarity value (S) that is indicative of a degree of confidence that the item identifier correctly identifies the item depicted in the cropped image. In response to detecting that a same item identifier was not identified for a majority of the cropped images, item tracking device selects two item identifiers that are associated with the highest and the next highest similarity values. When the difference between the highest similarity value and the next highest similarity value exceeds a threshold, the item tracking device assigns the item identifier associated with the highest similarity value to the first item. This allows the item tracking device to achieve a higher accuracy in identifying an item placed on the platform, and thus, saves computing resources (e.g., processing and memory resources associated with the item tracking device) that would otherwise be used to re-identify an item that was identified incorrectly. This, for example, improves the processing efficiency associated with the processor of the item tracking device. Thus, the disclosed system and method generally improve the technology associated with automatic detection of items.

Selecting an Item from a Plurality of Identified Items by Filtering Out Back Images of the Items Certain embodiments of the present disclosure describe improved techniques for identifying an item placed on a platform of an imaging device. In response to detecting a triggering event corresponding to a placement of an item on a platform of an imaging device, a plurality of images of the item are captured. Each image of the item is tagged as a front image or a back image of the item. In this context, a front image of an item refers to an image of the item that includes sufficient item information to reliably identify the item. On the other hand, a back image of an item is an image of the item that includes insufficient item information to reliably identify the item. All images of the item that are tagged as back images are discarded and an item identifier is identified for the item based only on those images that are tagged as front images.

The system and method described in these embodiments of the present disclosure provide a practical application of intelligently identifying an item based on a plurality of images of the item. As described with reference to FIGS. 44, 45 and 46, in response to detecting a triggering event corresponding to a placement of a first item on the platform of the imaging device, item tracking device captures a plurality of images of the first item and generates a plurality of cropped images of the first item based on the images. Item tracking device tags each cropped image as a front image of the first item or a back image of the item. Subsequently, item tracking device discards some, but potentially all, cropped images of the first item 204A that are tagged as a back image of the first item and identifies an item identifier for the first item based primarily, if not only, on those cropped images that are tagged as front images of the item Eliminating some or all back images of the item that do not contain unique identifiable information that can be used to reliably identify the item, before identifying the item, improves the accuracy of identification as the item is identified based primarily, if not only, on front images that include unique identifiable information of the item. This saves computing resources (e.g., processing and memory resources associated with the item tracking device) that would otherwise be used to re-identify an item that was identified incorrectly. Further, eliminating some or all back images of the item from consideration means that the item tracking device needs to process fewer images to identify the item, thus saving processing resources and time that would otherwise be used to process all cropped images of the item. This improves the processing efficiency associated with the processor of item tracking device and improves the overall user experience. Thus, the disclosed system and method generally improve the technology associated with automatic detection of items. Search Space Reduction for Identifying an Item Certain embodiments of the present disclosure describe improved techniques for identifying an item placed on a platform of an imaging device. In response to detecting a placement of an item on a platform of an imaging device, a plurality of images of the item are captured. An encoded vector is generated for each image of the item based on attributes of the item depicted in the image. An encoded vector library lists a plurality of encoded vectors of known items. Each encoded vector from the library is tagged as corresponding to a front image of an item or a back image of an item. Each encoded vector generated for the item is compared to only those encoded vectors from the library that are tagged as front images of items. An item identifier is identified for each image of the item based on the comparison. A particular item identifier identified for a particular image is then selected and associated with the item.

The system and method described in these embodiments of the present disclosure provide a practical application of intelligently identifying an item based on a plurality of images of the item. As described with reference to FIGS. 47A, 47B and 48, in response to detecting a placement of a first item on the platform, item tracking device captures a plurality of images of the item, generates a plurality of cropped images of the item based on the images, and identifies an item identifier for each cropped image by comparing an encoded vector generated for the cropped image with primarily, if not only, those encoded vectors from the encoded vector library that are associated with a "Front" tag. This improves the overall accuracy of identifying items placed on the platform as the items are identified based primarily, if not only, on those encoded vectors from the encoded vector library that are associated with unique identifiable information relating to known items. This saves computing resources (e.g., processing and memory resources associated with the item tracking device) that would otherwise be used to re-identify an item that was identified incorrectly. Additionally, comparing encoded vectors generated based on images of an unidentified item with generally only a portion of the encoded vectors from the encoded vector library that are associated with a "Front" tag saves computing resources that would overwise be used to compare an encoded vector with all encoded vectors in the encoded vector library regardless of whether they represent front images or back images of items. This improves the processing efficiency associated with the processor of item tracking device and improves the overall user experience. Thus, the disclosed system and method generally improve the technology associated with automatic detection of items. Identifying an Item Based on an Amount of Image Information in an Image of the Item Certain embodiments of the present disclosure describe improved techniques for identifying an item placed on a platform of an imaging device. In response to detecting that an item has been placed on a platform of an imaging device, a plurality of images of the item are captured. All images of the item that do not include at least a threshold amount of image information associated with the item are discarded and the item is identified based only on the remaining images of the item that include at least a minimum amount (e.g., threshold amount) of image information related to the item.

The system and method described in these embodiments of the present disclosure provide a practical application of intelligently identifying an item based on a plurality of images of the item. As described with reference to FIGS. 49, 50A and 50B, in response to detecting a triggering event corresponding to a placement of a first item on the platform of the imaging device, item tracking device captures a plurality of images of the first item and generates a plurality of cropped images of the first item based on the images. For each cropped image of the unidentified first item, the item tracking device determines whether the cropped image includes at least a minimum threshold image information associated with the first item. Item tracking device discards at least some, but potentially all cropped images in which the unidentified first item does not occupy at least a minimum threshold area and identifies the first item based on the remaining cropped images. Thus, item tracking device identifies an item based primarily, if not only, on those cropped images that include sufficient image information to reliably identify the item. This improves the overall accuracy associated with identifying items placed on the platform. This saves computing resources (e.g., processing and memory resources associated with the item tracking device) that would otherwise be used to re-identify an item that was identified incorrectly. Additionally, discarding images of an item that does not include sufficient image information associated with the item means that the item tracking device needs to process fewer images to identify the item, thus saving processing resources and time that would otherwise be used to process all cropped images of the item. This improves the processing efficiency associated with the processor of item tracking device. Thus, the disclosed system and method generally improve the technology associated with automatic detection of items.

Identifying an Item Based on an Interaction History Associated with a User

Certain embodiments of the present disclosure describe improved techniques for identifying an item placed on a platform of an imaging device. A second unidentified item that is placed on the platform is identified based on an association of the second item with an identified first item placed on the platform, wherein the association between the first item and the second item is based on a transaction history associated with a user who placed the first and second items on the platform. For example, the user may have placed the first item and the second item on the platform as part of one or more previous transactions. Based on the previous transactions, an association between the first item and the second item may be recorded as part of the user's transaction history. In a subsequent transaction, when the user places the first item and the second item on the platform, and the first item has been successfully identified, the second item is identified based on the recorded association with the first item.

The system and method described in these embodiments of the present disclosure provide a practical application of intelligently identifying an item based on a transaction history associated with a user. As described with reference to FIGS. 51, 52A and 52B, based on monitoring transactions performed by a user over a pre-configured time period, item tracking device identifies an association between a first item and a second item. The item tracking device 104 stores (e.g., as part of an encoded vector library) this user behavior identified over multiple transactions as an association between the item identifier (I1) associated with the first item and the item identifier (I2) associated with the second item. In a subsequent transaction conducted by the same user, when the item tracking device successfully identifies the first item associated with item identifier (I1) but is unable to identify the second item, the item tracking device identifies the second item as associated with item identifier (I2) based on the association between the item identifiers (I1) and (I2) stored as part of the transaction history of the user. This technique improves the overall accuracy associated with identifying items and saves computing resources (e.g., processing and memory resources associated with the item tracking device) that would otherwise be used to re-identify an item that was identified incorrectly. This improves the processing efficiency associated with the processor of item tracking device. Thus, the disclosed system and method generally improve the technology associated with automatic detection of items.

System and Method for Space Search Reduction in Identifying Items from Images Via Item Height The disclosed system further contemplates an unconventional system and method for item identification using item height. More specifically, the disclosed system provides the practical application and technical improvements to the item identification and tracking techniques by reducing the search set and filtering the items based on the height of the item in question that is required to be identified.

In cases where there is a large number of items in the encoded vector library that are subject to evaluation to filter out items that do not have one or more attributes in common with the item in question, the operation to evaluate each item and filter out items is computationally complex and extensive. This leads to consuming a lot of processing and memory resources to evaluate each item. The disclosed system is configured to reduce the search space in the item identification process by filtering out items that do not have heights within a threshold range of the height of the item in question.

By narrowing down the search set and filtering out irrelevant items, the search time to identify the item is reduced and the amount of processing and memory resources required to identify the item is also reduced. Therefore, the disclosed system provides the practical application of search space reduction, time search reduction, and increasing the allocation of processing and memory resources that would otherwise be spent on evaluating irrelevant items in a larger search space from the encoded vector library. Furthermore, the disclosed system provides an additional practical application for improving the item identification techniques, and therefore, item tracking techniques. Accordingly, this represents an improvement to the efficiency, throughput, and productivity of computer systems implemented to perform the described operations.

In some embodiments, a system comprises a plurality of cameras, a memory, and a processor. Each camera is configured to capture images of at least a portion of a platform. The memory is configured to store an encoded vector library comprising a plurality of encoded vectors. Each encoded vector describes one or more attributes of a respective item. Each encoded vector is associated with a respective average height and a standard deviation from the respective average height associated with the respective item. The processor is communicatively coupled with the plurality of cameras and the memory. The processor is configured to detect a triggering event at the platform, wherein the triggering event corresponds to a placement of a first item on the platform. The processor is further configured to capture an image of the first item using a camera from among the plurality of cameras in response to detecting the triggering event. The processor is further configured to generate a first encoded vector for the image, wherein the first encoded vector describes one or more attributes of the first item. The processor is further configured to determine a height associated with the first item. The processor is further configured to identify one or more items in the encoded vector library that are associated with average heights within a threshold range from the determined height of the first item. The processor is further configured to compare the first encoded vector with a second encoded vector associated with a second item from among the one or more items. The processor is further configured to determine that the first encoded vector corresponds to the second encoded vector. The processor is further configured to determine that the first item corresponds to the second item in response to determining that the first encoded vector corresponds to the second encoded vector.

System and Method for Confirming the Identity of an Item Based on Item Height

The disclosed system further contemplates an unconventional system and method for confirming the identity of an item based on item height. More specifically, the disclosed system provides the practical application and technical improvements to the item identification and tracking techniques by using the height of an item to increase the accuracy in the item identification and tracking techniques.

In an example scenario, assume that attributes of the item are used to narrow down the search set to a subset of items that may resemble or correspond to the item in question. However, a confidence score in identifying the identity of the item using the attributes of the item may be low or less than a desired value. For example, in case of using the flavor attribute of the item to filter items, the flavor of the item is usually indicated on a cover or container of the item. The machine learning algorithm processes an image of the item to detect the flavor information displayed on the cover or container of the item. However, the flavor information (e.g., shown in text) may be small in size on the container of the item. Therefore, it is challenging to detect the flavor information from an image. Similarly, various sizes of the item may appear the same or similar to each other in images of the item. For example, the image of the item may be cropped to show the item and remove side and background areas where the item is not shown. Because the image of the item is cropped, it may be difficult to differentiate between the size variations of the item, such as 8 ounce (oz), 16 oz, etc. Furthermore, similar to detecting the flavor information, detecting the size information of the item as indicated on the cover or container of the item may be challenging due to the small size of the size information. Therefore, in the examples of using flavor and size attributes to identify the item, the confidence score in determining the identity of the item may be low, e.g., less than a threshold.

The present disclosure provides a solution to this and other technical problems that are currently arising in the realm of item identification and tracking technology. For example, the disclosed system is configured to use the height of the item to confirm the identity of the item. For example, after the brand, flavor, and size attributes of the item are used to infer the identity of the item, the disclosed system may determine the confidence score associated with the identity of the item. If the confidence score is less than a threshold percentage, the system may use the height of the item to determine and confirm the identity of the item. Therefore, the disclosed system provides the practical application of improving the accuracy in the item identification techniques by leveraging the height of the item. This, in turn, reduces the search time and the computational complexity in item identification process, and processing and memory resource needed for the item identification process that would otherwise be spent in evaluating irrelevant items. Accordingly, this represents an improvement to the efficiency, throughput, and productivity of computer systems implemented to perform the described operations.

In some embodiments, a system comprises a plurality of cameras, a memory, and a processor. Each camera is configured to capture images of at least a portion of a platform. The memory is configured to store an encoded vector library comprising a plurality of encoded vectors. Each encoded vector describes one or more attributes of a respective item. Each encoded vector is associated with a respective average height and a standard deviation from the respective average height associated with the respective item. The standard deviation is a statistical measurement that quantifies an amount of dispersion or variation within a set of height values whose average is the average height. The processor is communicatively coupled with the plurality of cameras and the memory. The processor is configured to detect a triggering event at the platform, wherein the triggering event corresponds to a placement of a first item on the platform. The processor is further configured to capture an image of the first item using a camera from among the plurality of cameras in response to detecting the triggering event. The processor is further configured to generate a first encoded vector for the image, wherein the first encoded vector describes a plurality of attributes of the first item. The processor is further configured to identify a set of items in the encoded vector library that have at least one attribute in common with the first item. The processor is further configured to determine an identity of the first item based at least in part upon the plurality of attributes of the first item and the at least one attribute. The processor is further configured to determine a confidence score associated with the identity of the first item, wherein the confidence score indicates an accuracy of the identity of the first item. The processor is further configured to determine that the confidence score is less than a threshold percentage. In response to determining that the confidence score is less than the threshold percentage, the processor is further configured to determine, from the image, a height of the first item. The processor is further configured to identify one or more items from among the set of items that are associated with average heights within a threshold range from the determined height of the first item. The processor is further configured to compare the first encoded vector with a second encoded vector associated with a second item from among the one or more items. The processor is further configured to determine that the first encoded vector corresponds to the second encoded vector. The processor is further configured to determine that the first item corresponds to the second item in response to determining that the first encoded vector corresponds to the second encoded vector.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is an example of a comparison of depth images of a platform of the imaging device before and after placing items on the platform;

FIGS. 5A-5C are examples of images of items;

FIG. 10C is another example of a depth image of an item on the platform of the imaging device and a region-of-interest from an image capturing the item;

FIG. 11 is a flowchart of an embodiment of an item location detection process;

FIG. 18 is a flowchart of an embodiment of item dimensioning process using point cloud information;

FIGS. 39A and 39B illustrate a flowchart of an example method for identifying items that have moved on a platform between interactions, in accordance with one or more embodiments of the present disclosure;

FIGS. 48A and 48B illustrate a flow chart of an example method for identifying an item, in accordance with one or more embodiments of the present disclosure;

FIG. 56 illustrates an example flowchart of a method for confirming the identity of an item based item height.

DETAILED DESCRIPTION

System Overview

Figure 1:
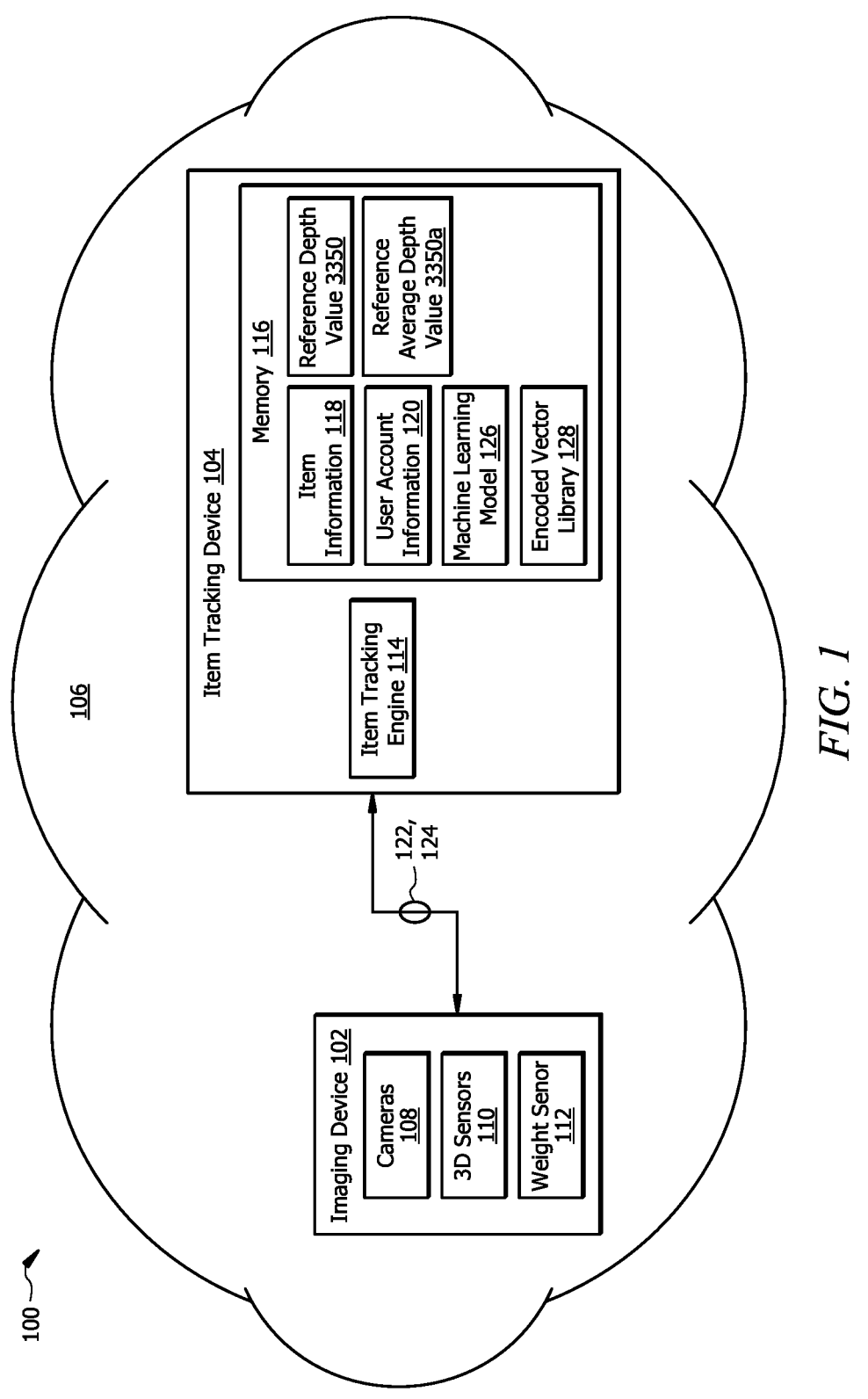
FIG. 1 is a schematic diagram of an embodiment of an item tracking system that is configured to employ digital image processing.

FIG. 1 is a schematic diagram of an embodiment of an item tracking system 100 that is configured to employ digital image processing. The item tracking system 100 may employ digital image processing to identify items 204 that are placed on a platform 202 of an imaging device 102 and to assign the items 204 to a particular user. This process allows the user to obtain items 204 from a space without requiring the user to scan or otherwise manually identify the items 204 they would like to take. In one embodiment, the item tracking system 100 may be installed in a space (e.g., a store) so that shoppers need not engage in the conventional checkout process. Although the example of a store is used in this disclosure, this disclosure contemplates that the item tracking system 100 may be installed and used in any type of physical space (e.g., a room, an office, an outdoor stand, a mall, a supermarket, a convenience store, a pop-up store, a warehouse, a storage center, an amusement park, an airport, an office building, etc.). As an example, the space may be a store that comprises a plurality of items 204 that are available for purchase. The item tracking system 100 may be installed in the store so that shoppers need not engage in the conventional checkout process to purchase items from the store. In this example, the store may be a convenience store or a grocery store. In other examples, the store may not be a physical building, but a physical space or environment where shoppers may shop. For example, the store may be a "grab-and-go" pantry at an airport, a kiosk in an office building, an outdoor market at a park, etc. As another example, the space may be a warehouse or supply room that comprises a plurality of items 204 that are available for a user to use or borrow. In this example, the item tracking system 100 may be installed to allow users to checkout parts or supplies by themselves. In other examples, the item tracking system 100 may be employed for any other suitable application.

In one embodiment, the item tracking system 100 comprises one or more imaging devices 102 and an item tracking device 104 that are in signal communication with each other over a network 106. The network 106 allows communication between and amongst the various components of the item tracking system 100. This disclosure contemplates the network 106 being any suitable network operable to facilitate communication between the components of the item tracking system 100. The network 106 may include any interconnecting system capable of transmitting audio, video, signals, data, messages, or any combination of the preceding. The network 106 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Imaging Devices

The imaging device 102 is generally configured to capture images 122 and depth images 124 of items 204 that are placed on a platform 202 of the imaging device 102. In one embodiment, the imaging device 102 comprises one or more cameras 108, one or more three-dimensional (3D) sensors 110, and one or more weight sensors 112. Additional information about the hardware configuration of the imaging device 102 is described in FIGS. 2A-2C.

The cameras 108 and the 3D sensors 110 are each configured to capture images 122 and depth images 124 respectively of at least a portion of the platform 202. The cameras 108 are configured to capture images 122 (e.g., RGB images) of items 204. Examples of cameras 108 include, but are not limited to, cameras, video cameras, web cameras, and printed circuit board (PCB) cameras. The 3D sensors 110 are configured to capture depth images 124 such as depth maps or point cloud data for items 204. A depth image 124 comprises a plurality of pixels. Each pixel in the depth image 124 comprises depth information identifying a distance between the 3D sensor 110 and a surface in the depth image 124. Examples of 3D sensors 110 include, but are not limited to, depth-sensing cameras, time-of-flight sensors, LiDARs, structured light cameras, or any other suitable type of depth sensing device. In some embodiments, a camera 108 and a 3D sensor 110 may be integrated within a single device. In other embodiments, a camera 108 and a 3D sensor 110 may be distinct devices.

The weight sensors 112 are configured to measure the weight of items 204 that are placed on the platform 202 of the imaging device 102. For example, a weight sensor 112 may comprise a transducer that converts an input mechanical force (e.g., weight, tension, compression, pressure, or torque) into an output electrical signal (e.g., current or voltage). As the input force increases, the output electrical signal may increase proportionally. The item tracking device 104 is configured to analyze the output electrical signal to determine an overall weight for the items 204 on the weight sensor 112. Examples of weight sensors 112 include, but are not limited to, a piezoelectric load cell or a pressure sensor. For example, a weight sensor 112 may comprise one or more load cells that are configured to communicate electrical signals that indicate a weight experienced by the load cells. For instance, the load cells may produce an electrical current that varies depending on the weight or force experienced by the load cells. The load cells are configured to communicate the produced electrical signals to item tracking device 104 for processing.

Item Tracking Device

Examples of the item tracking device 104 include, but are not limited to, a server, a computer, a laptop, a tablet, or any other suitable type of device. In FIG. 1, the imaging device 102 and the item tracking device 104 are shown as two devices. In some embodiments, the imaging device 102 and the item tracking device 104 may be integrated within a single device. In one embodiment, the item tracking device 104 comprises an item tracking engine 114 and a memory 116. Additional details about the hardware configuration of the item tracking device 104 are described in FIG. 6. The memory 116 is configured to store item information 118, user account information 120, a machine learning model 126, an encoded vector library 128, and/or any other suitable type of data.

In one embodiment, the item tracking engine 114 is generally configured to process images 122 and depth images 124 to identify items 204 that are placed on the platform 202 of the imaging device 102 and to associate the identified items 204 with a user. An example of the item tracking engine 114 in operation is described in more detail below in FIGS. 3 and 7-26.

The item information 118 generally comprises information that is associated with a plurality of items. Examples of item information 118 include, but are not limited to, prices, weights, barcodes, item identifiers, item numbers, features of items, or any other suitable information that is associated with an item 204. Examples of features of an item include, but are not limited to, text, logos, branding, colors, barcodes, patterns, a shape, or any other suitable type of attributes of an item 204. The user account information 120 comprises information for one or more accounts that are associated with a user. Examples of accounts include, but are not limited to, a customer account, an employee account, a school account, a business account, a financial account, a digital cart, or any other suitable type of account. The user account information 120 may be configured to associate user information with accounts that are associated with a user. Examples of user information include, but are not limited to, a name, a phone number, an email address, an identification number, an employee number, an alphanumeric code, reward membership information, or any other suitable type of information that is associated with the user. In some embodiments, the item information 118 and/or the user account information 120 may be stored in a device (e.g. a cloud server) that is external from the item tracking device 104.

Examples of machine learning models 126 include, but are not limited to, a multi-layer perceptron, a recurrent neural network (RNN), an RNN long short-term memory (LSTM), a convolution neural network (CNN), a transformer, or any other suitable type of neural network model. In one embodiment, the machine learning model 126 is generally configured to receive an image 122 as an input and to output an item identifier based on the provided image 122. The machine learning model 126 is trained using supervised learning training data that comprises different images 122 of items 204 with their corresponding labels (e.g., item identifiers). During the training process, the machine learning model 126 determines weights and bias values that allow the machine learning model 126 to map images 122 of items 204 to different item identifiers. Through this process, the machine learning model 126 is able to identify items 204 within an image 122. The item tracking engine 114 may be configured to train the machine learning models 126 using any suitable technique as would be appreciated by one of ordinary skill in the art. In some embodiments, the machine learning model 126 may be stored and/or trained by a device that is external from the item tracking device 104.

Figure 16:
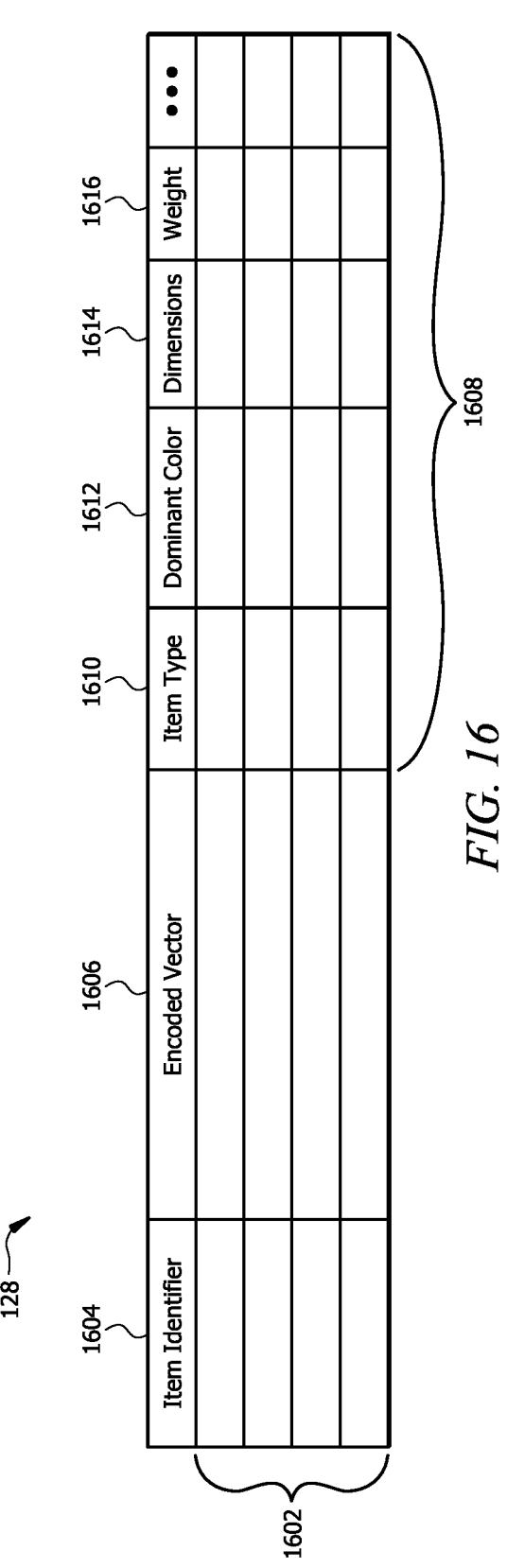
FIG. 16 is an example of an encoded vector library.

The encoded vector library 128 generally comprises information for items 204 that can be identified by the item tracking device 104. An example of an encoded vector library 128 is shown in FIG. 16. In one embodiment, the encoded vector library 128 comprises a plurality of entries 1602. Each entry 1602 corresponds with a different item 204 that can be identified by the item tracking device 104. Referring to FIG. 16 as an example, each entry 1602 may comprise an encoded vector 1606 that is linked with an item identifier 1604 and a plurality of feature descriptors 1608. An encoded vector 1606 comprises an array of numerical values. Each numerical value corresponds with and describes a physical attribute (e.g., item type, size, shape, color, etc.) of an item 204. An encoded vector 1606 may be any suitable length. For example, an encoded vector 1606 may have a size of 1×256, 1×512, 1×1024, or any other suitable length. The item identifier 1604 uniquely identifies an item 204. Examples of item identifiers 1604 include, but are not limited to, a product name, a stock-keeping unit (SKU) number, an alphanumeric code, a graphical code (e.g., a barcode), or any other suitable type of identifier. Each of the feature descriptors 1608 describes a physical characteristic of an item 204. Examples of feature descriptors 1608 include, but are not limited to, an item type 1610, a dominant color 1612, dimensions 1614, weight 1616, or any other suitable type of descriptor that describes physical attributes of an item 204. An item type 1610 identifies a classification for the item 204. For instance, an item type 1610 may indicate whether an item 204 is a can, a bottle, a box, a fruit, a bag, etc. A dominant color 1612 identifies one or more colors that appear on the surface (e.g., packaging) of an item 204. The dimensions 1614 may identify the length, width, and height of an item 204. In some embodiments, the dimensions 1614 may be listed in ascending order. The weight 1616 identifies the weight of an item 204. The weight 1616 may be shown in pounds, ounces, litters, or any other suitable units.

Hardware Configuration for the Imaging Device

Figure 2A:
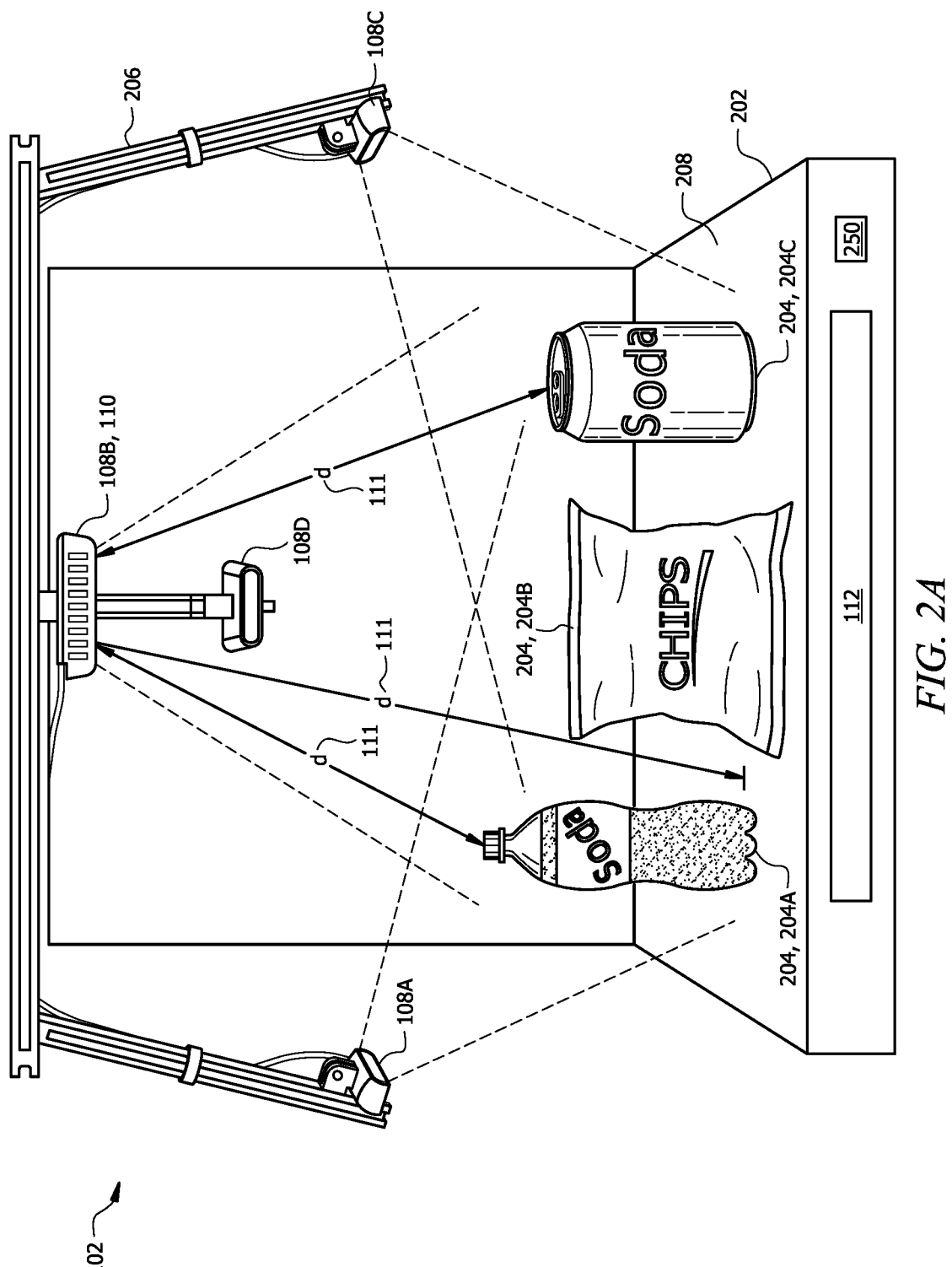
FIG. 2A is a perspective view of an embodiment of an imaging device.

FIG. 2A is a perspective view of an embodiment of an imaging device 102. In this example, the imaging device 102 comprises a platform 202, a frame structure 206, a plurality of cameras 108, a plurality of 3D sensors 110, and a weight sensor 112. The imaging device 102 may be configured as shown in FIG. 2A or in any other suitable configuration. In some embodiments, the imaging device 102 may further comprise additional components including, but not limited to, light, displays, and graphical user interfaces.

The platform 202 comprises a surface 208 that is configured to hold a plurality of items 204. In some embodiments, the platform 202 may be integrated with the weight sensor 112. For example, the platform 202 may be positioned on the weight sensor 112 which allows the weight sensor 112 to measure the weight of items 204 that are placed on the platform 202. As another example, the weight sensor 112 may be disposed within the platform 202 to measure the weight of items 204 that are placed on the platform 202. In some embodiments, at least a portion of the surface 208 may be transparent. In this case, a camera 108 or scanner (e.g., a barcode scanner) may be disposed below the surface 208 of the platform 202 and configured to capture images 122 or scan the bottoms of items 204 placed on the platform 202. For instance, a camera 108 or scanner may be configured to identify and read product labels and/or barcodes (e.g., SKUs) of items 204 through the transparent surface 208 of the platform 202. The platform 202 may be formed of aluminum, metal, wood, plastic, glass, or any other suitable material.

The frame structure 206 is generally configured to support and position cameras 108 and 3D sensors 110. In FIG. 2A, the frame structure 206 is configured to position a first camera 108A and a second camera 108C on the sides of the imaging device 102 with a perspective view of the items 204 on the platform 202. The frame structure 206 is further configured to position a third camera 108D on the back side of the imaging device 102 with a perspective view of the items 204 on the platform 202. In some embodiments, the frame structure 206 may further comprise a fourth camera 108 (not shown) on the front side of the imaging device 102 with a perspective view of items 204 on the platform 202. The frame structure 206 may be configured to use any number and combination of the side cameras 108A and 108C, the back side camera 108D, and the front side camera 108. For example, one or more of the identified cameras 108 may be optional and omitted. A perspective image 122 or depth image 124 is configured to capture the side-facing surfaces of items 204 placed on the platform 202. The frame structure 206 is further configured to position a third camera 108B and a 3D sensor 110 with a top view or overhead view of the items 204 on the platform 202. An overhead image 122 or depth image 124 is configured to capture upward-facing surfaces of items 204 placed on the platform 202. In other examples, the frame structure 206 may be configured to support and position any other suitable number and combination of cameras 108 and 3D sensors 110. The frame structure 206 may be formed of aluminum, metal, wood, plastic, or any other suitable material.

Figure 2B:
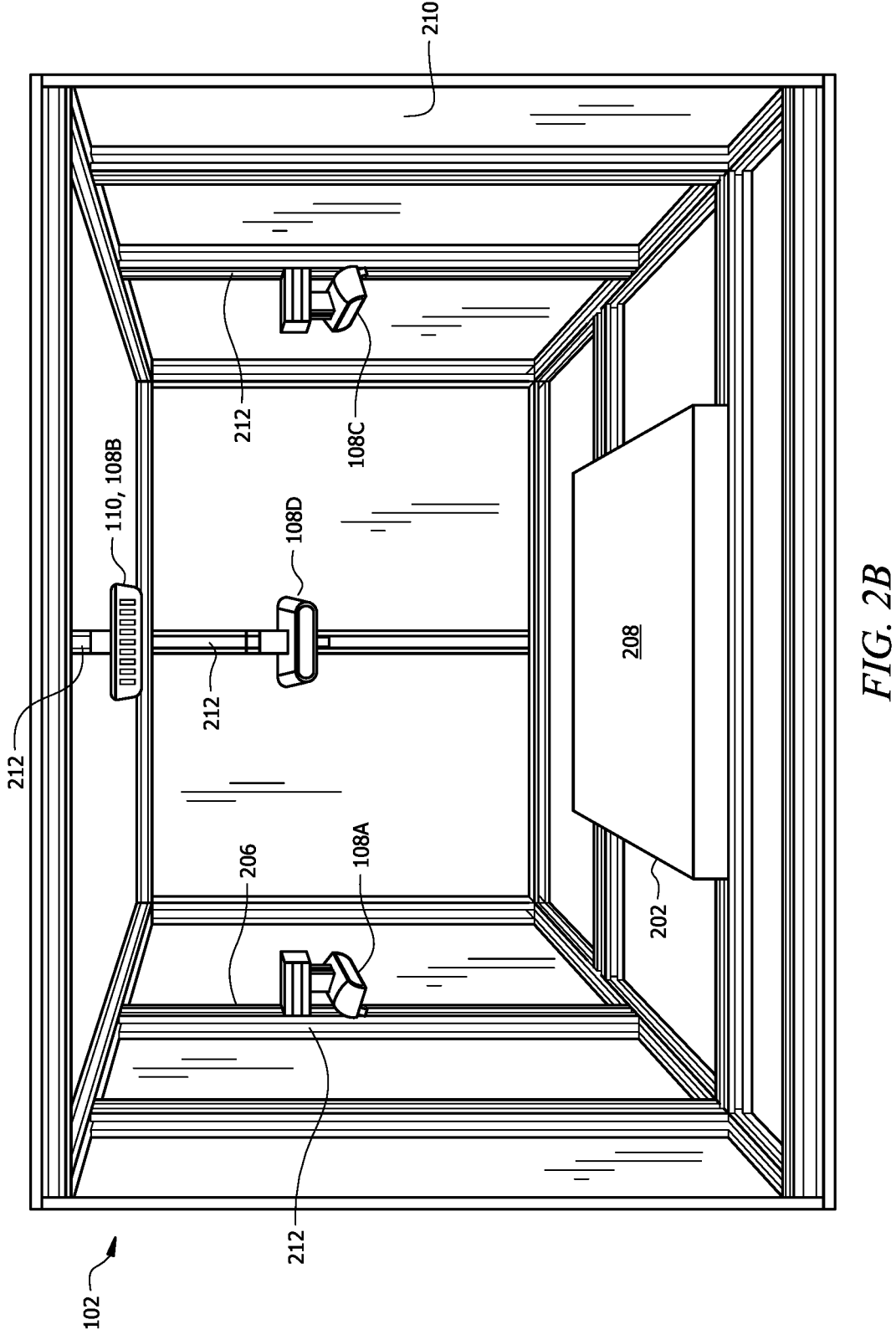
FIG. 2B is a perspective view of another embodiment of an imaging device with an enclosure.

FIG. 2B is a perspective view of another embodiment of an imaging device 102 with an enclosure 210. In this configuration, the enclosure 210 is configured to at least partially encapsulate the frame structure 206, the cameras 108, the 3D sensors 110, and the platform 202 of the imaging device 102. The frame structure 206, the cameras 108, the 3D sensors 110, and the platform 202 may be configured similar to as described in FIG. 2A. In one embodiment, the frame structure 206 may further comprise tracks or rails 212 that are configured to allow the cameras 108 and the 3D sensors 110 to be repositionable within the enclosure 210. For example, the cameras 108A, 108C, and 108D may be repositionable along a vertical axis with respect to the platform 202 using the rails 212. Similarly, camera 108B and 3D sensor 110 may be repositionable along a horizontal axis with respect to the platform 202 using the rails 212.

Figure 2C:
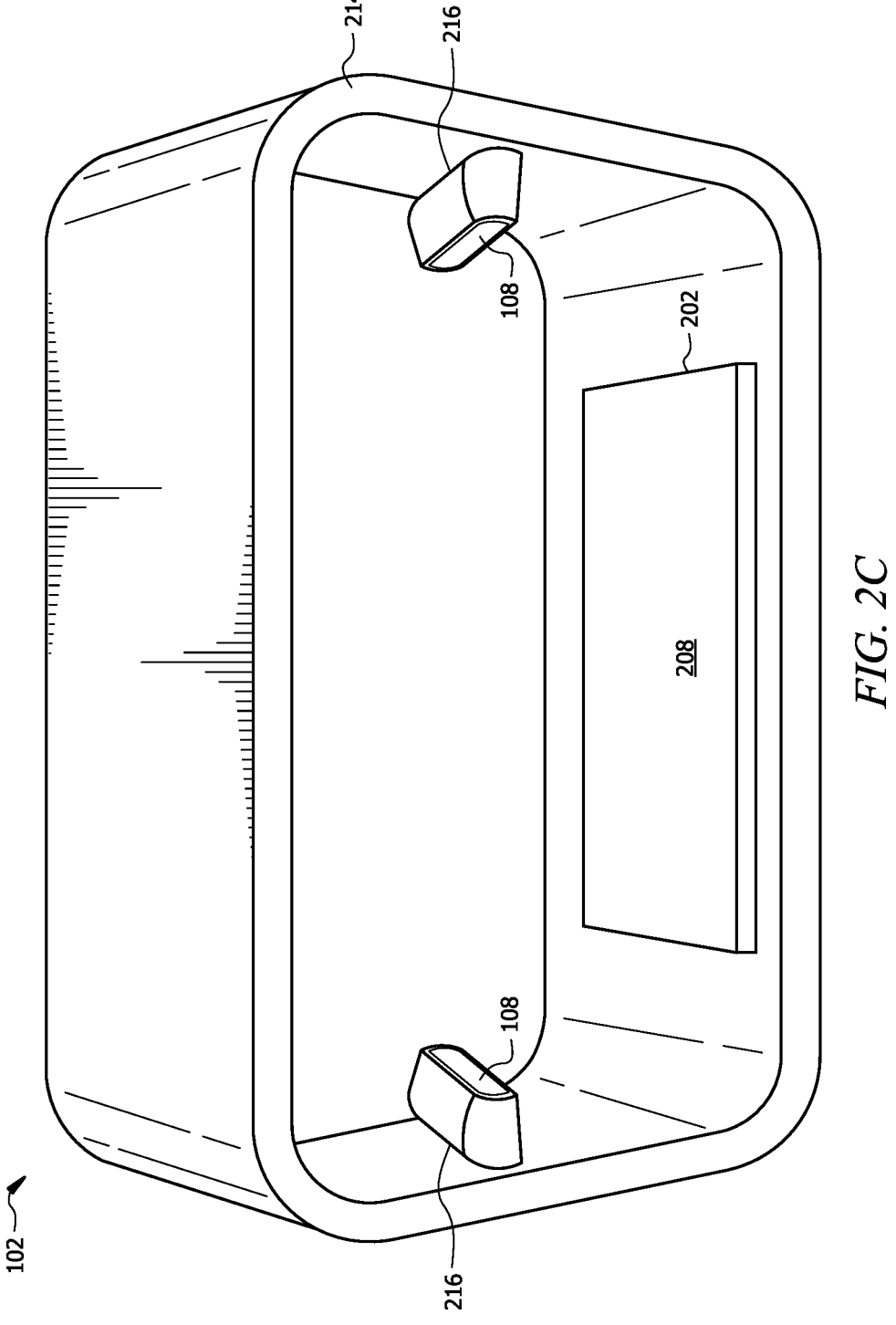
FIG. 2C is a perspective view of another embodiment of an imaging device with an open enclosure.

FIG. 2C is a perspective view of another embodiment of an imaging device 102 with an open enclosure 214. In this configuration, the enclosure 214 is configured to at least partially cover the frame structure 206, the cameras 108, the 3D sensors 110, and the platform 202 of the imaging device 102. The frame structure 206, the cameras 108, the 3D sensors 110, and the platform 202 may be configured similar to as described in FIG. 2A. In one embodiment, the frame structure 206 may be integrated within the enclosure 214. For example, the enclosure 214 may comprise openings 216 that are configured to house the cameras 108 and the 3D sensors 110. In FIG. 2C, the enclosure 214 has a rectangular cross section with rounded edges. In other embodiments, the enclosure 214 may be configured with any other suitable shape cross section.

An Item Tracking Process

Figure 3:
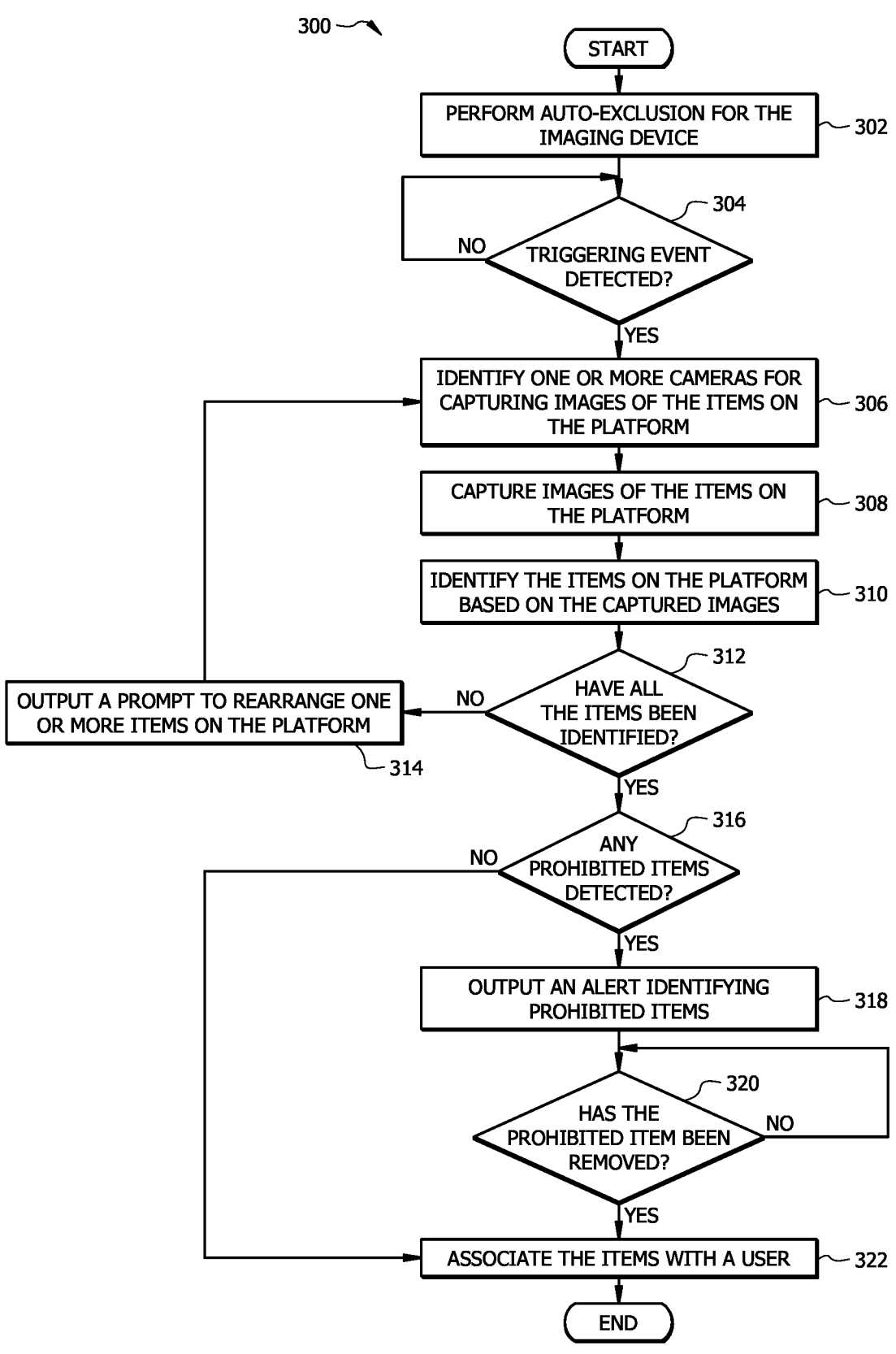
FIG. 3 is a flowchart of an embodiment of an item tracking process for the item tracking system.

FIG. 3 is a flowchart of an embodiment of an item tracking process 300 for the item tracking system 100. The item tracking system 100 may employ process 300 to identify items 204 that are placed on the platform 202 of an imaging device 102 and to assign the items 204 to a particular user. As an example, the item tracking system 100 may employ process 300 within a store to add items 204 to a user's digital cart for purchase. As another example, the item tracking system 100 may employ process 300 within a warehouse or supply room to check out items to a user. In other examples, the item tracking system 100 may employ process 300 in any other suitable type of application where items 204 are assigned or associated with a particular user. This process allows the user to obtain items 204 from a space without having the user scan or otherwise identify the items 204 they would like to take.

At operation 302, the item tracking device 104 performs auto-exclusion for the imaging device 102. During an initial calibration period, the platform 202 may not have any items 204 placed on the platform 202. During this period of time, the item tracking device 104 may use one or more cameras 108 and 3D sensors 110 to capture reference images 122 and reference depth images 124 of the platform without any items 204 placed on the platform 202. The item tracking device 104 can then use the captured images 122 and depth images 124 as reference images to detect when an item is placed on the platform 202. For example, the item tracking device 104 may use a 3D sensor 110 that is configured with a top view or overhead view of the platform 202 to capture a reference depth image 124 of the platform 202 when no items 204 are placed on the platform 202. In this example, the captured depth image 124 may comprise a substantially constant depth value throughout the depth image 124 that corresponds with the surface 208 of the platform 202. At a later time, the item tracking device 104 can detect that an item 204 has been placed on the surface 208 of the platform 202 based on differences in depth values between subsequent depth images 124 and the reference depth image 124. As another example, the item tracking device 104 may use a camera 108 that is configured with a top view or a perspective view of the platform 202 to capture a reference image 122 of the platform when no items 204 are placed on the platform 202. In this example, the captured image 122 comprises pixel values that correspond with a scene of the platform when no items 204 are present on the platform 202. At a later time, the item tracking device 104 can detect that an item 204 has been placed on the platform 202 based on differences in the pixel values between subsequent images 122 and the reference image 122.

At operation 304, the item tracking device 104 determines whether a triggering event has been detected. A triggering event corresponds with an event that indicates that a user is interacting with the imaging device 102. For instance, a triggering event may occur when a user approaches the imaging device 102 or places an item 204 on the imaging device 102. As an example, the item tracking device 104 may determine that a triggering event has occurred in response to detecting motion using a 3D sensor 110 or based on changes in depths images 124 captured by a 3D sensor 110. For example, the item tracking device 104 can detect that an item 204 has been placed on the surface 208 of the platform 202 based on differences in depth values between depth images 124 captured by a 3D sensor 110 and the reference depth image 124. Referring to FIG. 4 as an example, FIG. 4 shows an example of a comparison between depth images 124 from an overhead view of the platform 202 of the imaging device 102 before and after placing items 204 shown in FIG. 2A on the platform 202. Depth image 124A corresponds with a reference depth image 124 that is captured when no items 204 are placed on the platform 202. Depth image 124B corresponds with a depth image 124 that is captured after items 204 are placed on the platform 202. In this example, the colors or pixel values within the depth images 124 represent different depth values. In depth image 124A, the depth values in the depth image 124A are substantially constant which means that there are no items 204 on the platform 202. In depth image 124B, the different depth values correspond with the items 204 (i.e. items 204A, 204B, and 204C) that are placed on the platform 202. In this example, the item tracking device 104 detects a triggering event in response to detecting the presence of the items 204 on the platform 202 based on differences between depth image 124A and depth image 124B. The item tracking device 104 may also use an image 122 or depth image 124 to count the number of items 204 that are on the platform 202. In this example, the item tracking device 104 determines that there are three items 204 placed on the platform 202 based on the depth image 124B. The item tracking device 104 may use the determined number of items 204 later to confirm whether all of the items 204 have been identified. This process is discussed in more detail below in operation 312.

As another example, the item tracking device 104 may determine that a triggering event has occurred in response to detecting motion using a camera 108 or based on changes in images 122 captured by a camera 108. For example, the item tracking device 104 can detect that an item 204 has been placed on the platform 202 based on differences in the pixel values between subsequent images 122 and the reference image 122. As another example, the item tracking device 104 may determine that a triggering event has occurred in response to a weight increase on the weight sensor 112 of the imaging device 102. In this case, the increase in weight measured by the weight sensor 112 indicates that one or more items 204 have been placed on the platform 202. In other examples, the item tracking device 104 may use any other suitable type of sensor or technique for detecting when a user approaches the imaging device 102 or places an item 204 on the imaging device 102.

The item tracking device 104 remains at operation 304 in response to determining that a triggering event has not been detected. In this case, the item tracking device 104 determines that a user has not interacted with the imaging device 102 yet. The item tracking device 104 will remain at operation 304 to continue to check for triggering events until a user begins interacting with the imaging device 102. The item tracking device 104 proceeds to operation 306 in response to determining that a triggering event has been detected. In this case, the item tracking device 104 determines that a user has begun interacting with the imaging device 102. The item tracking device 104 proceeds to operation 306 to begin identifying items that are placed on the platform 202 of the imaging device 102.

At operation 306, the item tracking device 104 identifies one or more cameras 108 for capturing images 122 of the items 204 on the platform 202 of the imaging device 102. The item tracking device 104 may identify cameras 108 for capturing images 122 of the items 204 based at least in part upon the pose (e.g., location and orientation) of the items 204 on the platform 202. The pose of an item 204 corresponds with the location the item 204 and how the item 204 is positioned with respect to the platform 202. Referring to the example in FIG. 2A, a first item 204A and a second item 204C are positioned in a vertical orientation with respect to the platform 202. In the vertical orientation, the identifiable features of an item 204 are primarily in the vertical orientation. Cameras 108 with a perspective view, such as cameras 108A and 108C, may be better suited for capturing images 122 of the identifiable features of item 204 that are in a vertical orientation. For instance, the item tracking device 104 may select camera 108A to capture images 122 of item 204A since most of the identifiable features of item 204A, such as branding, text, and barcodes, are located on the sides of the item 204A and are most visible using a perspective view of the item 204. Similarly, the item tracking device 104 may then select camera 108C to capture images 122 of item 204C. In this example, a third item 204B is positioned in a horizontal orientation with respect to the platform 202. In the horizontal orientation, the identifiable features of an item 204 are primarily in the horizontal orientation. Cameras 108 with a top view or overhead view, such as camera 108B, may be better suited for capturing images 122 of the identifiable features of item 204 that are in a horizontal orientation. In this case, the item tracking device 104 may select camera 108B to capture images 122 of item 204B since most of the identifiable features of item 204B are located on the top of the item 204B and are most visible from using an overhead view of the item 204B.

In one embodiment, the item tracking device 104 may determine the pose of items 204 on the platform 202 using depth images 124. Referring to FIG. 4 as an example, the depth image 124B corresponds with an overhead depth image 124 that is captured after the items 204 shown in FIG. 2A (i.e., items 204A, 204B, and 204C) are placed on the platform 202. In this example, the item tracking device 104 may use areas in the depth image 124B that correspond with each item 204 to determine the pose of the items 204. For example, the item tracking device 104 may determine the area 402 within the depth image 124B that corresponds with item 204A. The item tracking device 104 compares the determined area 402 to a predetermined area threshold value 614. The item tracking device 104 determines that an item 204 is in a vertical orientation when the determined area 402 for the item 204 is less than or equal to the predetermined area threshold value 614. Otherwise, the item tracking device 104 determines that the item 204 is in a horizontal orientation when the determined area 402 for the item 204 is greater than the predetermined area threshold value 614. In this example, the item tracking device 104 determines that items 204A and 204C are in a vertical orientation because their areas 402 and 406, respectively, are less than or equal to the area threshold value 614. The item tracking device 104 determines that item 204B is in a horizontal orientation because its area 404 is greater than the area threshold value 614. This determination means that the item tracking device 104 will select cameras 108 (e.g., cameras 108A and 108C) with a perspective view of the platform 202 to capture images 122 of items 204A and 204C. The item tracking device 104 will select a camera 108 (e.g., camera 108B) with a top view or overhead view of the platform 202 to capture images 122 of item 204B.

In one embodiment, the item tracking device 104 may identify a camera 108 for capturing images 122 of an item 204 based at least in part on the distance between the item 204 and the camera 108. For example, the item tracking device 104 may generate homographies 608 between the cameras 108 and/or the 3D sensors 110 of the imaging device 102. By generating a homography 608 the item tracking device 104 is able to use the location of an item 204 within an image 122 to determine the physical location of the item 204 with respect to the platform 202, the cameras 108, and the 3D sensors 110. This allows the item tracking device 104 to use the physical location of the item 204 to determine distances between the item 204 and each of the cameras 108 and 3D sensors 110. A homography 608 comprises coefficients that are configured to translate between pixel locations in an image 122 or depth image 124 and (x,y) coordinates in a global plane (i.e. physical locations on the platform 202). The item tracking device 104 uses homographies 608 to correlate between a pixel location in a particular camera 108 or 3D sensor 110 with a physical location on the platform 202. In other words, the item tracking device 104 uses homographies 608 to determine where an item 204 is physically located on the platform 202 based on their pixel location within an image 122 or depth image 124 from a camera 108 or a 3D sensor 110, respectively. Since the item tracking device 104 uses multiple cameras 108 and 3D sensors 110 to monitor the platform 202, each camera 108 and 3D sensor 110 is uniquely associated with a different homography 608 based on the camera's 108 or 3D sensor's 110 physical location on the imaging device 102. This configuration allows the item tracking device 104 to determine where an item 204 is physically located on the platform 202 based on which camera 108 or 3D sensor 110 it appears in and its location within an image 122 or depth image 124 that is captured by that camera 108 or 3D sensor 110. Additional information about generating a homography 608 and using a homography 608 is disclosed in U.S. Pat. No. 11,023,741 entitled, "DRAW WIRE ENCODER BASED HOMOGRAPHY" which is hereby incorporated by reference herein as if reproduced in its entirety.

As an example, the item tracking device 104 may use an image 122 or a depth image 124 from a camera 108 or 3D sensor 110, respectively, with a top view or overhead view of the platform 202 to determine the physical location of an item on the platform 202. In this example, the item tracking device 104 may determine a pixel location for the item 204 within the image 122 or depth image 124. The item tracking device 104 may then use a homography 608 to determine the physical location for the item 204 with respect to the platform 202 based on its pixel location. After determining the physical location of the item 204 on the platform 202, the item tracking device 104 may then identify which camera 108 is physically located closest to the item 204 and select the identified camera 108. Returning to the example in FIG. 2A, the item tracking device 104 may select camera 108A to capture images 122 of item 204A since camera 108A is closer to item 204A than camera 108C. Similarly, the item tracking device 104 may select camera 108C to capture images 122 of item 204C since camera 108C is closer to item 204C than camera 108A. This process ensures that the camera 108 with the best view of an item 204 is selected to capture an image 122 of the item 204.

At operation 308, the item tracking device 104 captures images 122 of the items 204 on the platform 202 using the identified cameras 108. Here, the item tracking device 104 uses the identified cameras 108 to capture images of the items 204. Referring to FIGS. 5A, 5B, and 5C as examples, the item tracking device 104 may capture a first image 122A of the item 204A, a second image 122B of item 204B, and a third image 122C of item 204C using cameras 108A, 108B, and 108C, respectively. The item tracking device 104 may collect one or more images 122 of each item 204 for processing. By using a subset of the cameras 108 available on the imaging device 102 to capture images of the items 204, the item tracking device 104 is able to reduce the number of images 122 that will be captured and processed to identify the items 204 on the platform 202. This process reduces the search space for identifying items 204 and improves the efficiency and hardware utilization of the item tracking device 104 by allowing the item tracking device 104 to process fewer images 122 to identify the item 204 instead of processing images 122 from all of the cameras 108 on the imaging device 102, which may include multiple images 122 of the same items 204. In addition, the item tracking device 104 also selects cameras 108 that are positioned to capture features that are the most useful for identifying the items 204 based on the orientation and location of the items 204, as discussed in operation 306. Examples of features include, but are not limited to, text, logos, branding, colors, barcodes, patterns, a shape, or any other suitable type of attributes of an item 204.

Returning to FIG. 3 at operation 310, the item tracking device 104 identifies the items 204 on the platform 202 based on the captured images 122. Here, the item tracking device 104 identifies an item 204 within each image 122 based on the features of the item 204 in the image 122. As an example, the machine learning model 126 may be a CNN. In this example, the machine learning model 126 includes an input layer, an output layer, and one or more hidden layers. The hidden layers include at least one convolution layer. For example, the machine learning model 126 may include the following sequence of layers: input layer, convolution layer, pooling layer, convolution layer, pooling layer, one or more fully connected layers, output layer. Each convolution layer of machine learning model 126 uses a set of convolution kernels to extract features from the pixels that form an image 122. In certain embodiments, the convolution layers of machine learning model 126 are implemented in the frequency domain, and the convolution process is accomplished using discrete Fourier transforms. This may be desirable to reduce the computational time associated with training and using machine learning model 126 for image classification purposes. For example, by converting to the frequency domain, the fast Fourier transform algorithm (FFT) may be implemented to perform the discrete Fourier transforms associated with the convolutions. Not only does the use of the FFT algorithm alone greatly reduce computational times when implemented on a single CPU (as compared with applying convolution kernels in the spatial domain), the FFT algorithm may be parallelized using one or more graphics processing units (GPUs), thereby further reducing computational times. Converting to the frequency domain may also be desirable to help ensure that the machine learning model 126 is translation and rotation invariant (e.g., the assignment made by machine learning model 126 of an image 122 to an item identifier, based on the presence of an item 204 in the image 122, should not depend on the position and/or orientation of the item 204 within image 122).

As another example, the machine learning model 126 may be a supervised learning algorithm. Accordingly, in certain embodiments, item tracking device 104 is configured to train the machine learning model 126 to assign input images 122 to any of a set of predetermined item identifiers. The item tracking device 104 may train the machine learning model 126 in any suitable manner. For example, in certain embodiments, the item tracking device 104 trains the machine learning model 126 by providing the machine learning model 126 with training data (e.g., images 122) that includes a set of labels (e.g., item identifiers) attached to the input images 122. As another example, the machine learning model 126 may be an unsupervised learning algorithm. In such embodiments, the item tracking device 104 is configured to train machine learning model 126 by providing the machine learning model 126 with a collection of images 122 and instructing the machine learning model 126 to classify these images 122 with item identifiers identified by the item tracking device 104, based on common features extracted from the images 122. The item tracking device 104 may train the machine learning model 126 any time before inputting the captured images 122 into the machine learning model 126.

After training the machine learning model 126, the item tracking device 104 may input each of the captured images 122 into the machine learning model 126. In response to inputting an image 122 in the machine learning model 126, the item tracking device 104 receives an item identifier for an item 204 from the machine learning model 126. The item identifier corresponds with an item 204 that was identified within the image 122. Examples of item identifiers include, but are not limited to, an item name, a barcode, an item number, a serial number, or any other suitable type of identifier that uniquely identifies an item 204.

In some embodiments, the item tracking device 104 may employ one or more image processing techniques without using the machine learning model 126 to identify an item 204 within an image 122. For example, the item tracking device 104 may employ object detection and/or optical character recognition (OCR) to identify text, logos, branding, colors, barcodes, or any other features of an item 204 that can be used to identify the item 204. In this case, the item tracking device 104 may process pixels within an image 122 to identify text, colors, barcodes, patterns, or any other characteristics of an item 204. The item tracking device 104 may then compare the identified features of the item 204 to a set of features that correspond with different items 204. For instance, the item tracking device 104 may extract text (e.g., a product name) from an image 122 and may compare the text to a set of text that is associated with different items 204. As another example, the item tracking device 104 may determine a dominant color within an image 122 and may compare the dominant color to a set of colors that are associated with different items 204. As another example, the item tracking device 104 may identify a barcode within an image 122 and may compare the barcode to a set of barcodes that are associated with different items 204. As another example, the item tracking device 104 may identify logos or patterns within the image 122 and may compare the identified logos or patterns to a set of logos or patterns that are associated with different items 204. In other examples, the item tracking device 104 may identify any other suitable type or combination of features and compare the identified features to features that are associated with different items 204. After comparing the identified features from an image 122 to the set of features that are associated with different items 204, the item tracking device 104 then determines whether a match is found. The item tracking device 104 may determine that a match is found when at least a meaningful portion of the identified features match features that correspond with an item 204. In response to determining that a meaningful portion of features within an image 122 match the features of an item 204, the item tracking device 104 may output an item identifier that corresponds with the matching item 204. In other embodiments, the item tracking device 104 may employ one or more image processing techniques in conjunction with the machine learning model 126 to identify an item 204 within an image 122 using any combination of the techniques discussed above.

In some embodiments, the item tracking device 104 is configured to output a confidence score 610 that indicates a probability that an item 204 has been correctly identified. For example, the item tracking device 104 may obtain a confidence score 610 from the machine learning model 126 with the determined item identifier. In this example, the machine learning model 126 outputs a confidence score 610 that is proportional to the number of features that were used or matched when determining the item identifier. As another example, the item tracking device 104 may determine a confidence score 610 based on how well identified features match the features of the identified item 204. For instance, the item tracking device 104 may obtain a confidence score 610 of 50% when half of the text identified within an image 122 matches the text associated with identified item 204. As another example, the item tracking device 104 may determine obtain a confidence score 610 of 100% when a barcode within an image 122 matches a barcode of the identified item 204. As another example, the item tracking device 104 may obtain a confidence score 610 of 25% when the dominant color within an image 122 matches a dominant color of the identified item 204. In other examples, the item tracking device 104 may obtain a confidence score 610 that is based on how well any other suitable type or combination of features matches the features of the identified item 204. Other information that can impact a confidence score 610 include, but are not limited to, the orientation of the object, the number of items on the platform 202 (e.g., a fewer number of items on the platform 202 are easier to identify than a greater number of items on the platform 202); the relative distance between items on the platform (e.g., spaced apart items on the platform 202 are easier to identify than crowded items on the platform 202); and the like. The item tracking device 104 may compare the confidence score 610 for an identified item 204 to a confidence score threshold value 612 to determine whether the item 204 has been identified. The item tracking device 104 may determine that an item 204 has not been identified when the confidence score 610 for the item 204 is less than the confidence score threshold value 612. The item tracking device 104 determines that the item 204 has been identified when the confidence score 610 for the item 204 is greater than or equal to the confidence score threshold value 612. The confidence score threshold value 612 may be set to 90%, 80%, 75%, or any other suitable value.

At operation 312, the item tracking device 104 determines whether all of the items 204 on the platform 202 have been identified. For example, the item tracking device 104 may compare the number of identified items 204 from the captured images 122 to the number of items 204 on the platform 202 that was determined in operation 304. The item tracking device 104 determines that all of the items 204 on the platform 202 have been identified when the number of items 204 identified items 204 from the captured images 122 matches the determined number of items 204 on the platform 202. Otherwise, the item tracking device 104 determines that at least one of the items 204 has not been identified when the number of items 204 identified items 204 from the captured images 122 does not match the determined number of items 204 on the platform 202.

The item tracking device 104 proceeds to operation 314 in response to determining that one or more of the items 204 on the platform 202 have not been identified. In this case, the item tracking device 104 may output a request for the user to reposition one or more items 204 on the platform 202 to assist the item tracking device 104 with identifying some of the items 204 on the platform. At operation 314, the item tracking device 104 outputs a prompt to rearrange one or more items 204 on the platform 202. As an example, one or more items 204 may be obscuring the view of an item 204 for one of the cameras 108. In this example, the item tracking device 104 may output a message on a graphical user interface that is located at the imaging device 102 with instructions for the user to rearrange the position of the items 204 on the platform 202. In some embodiments, the item tracking device 104 may also identify the locations of the one or more items 204 on the platform 202 that were not identified. For example, the item tracking device 104 may activate a light source above or below the platform 202 that illuminates an item 204 that was not recognized. In one embodiment, after outputting the message to rearrange the items 204 on the platform 202, the item tracking device 104 returns to operation 306 to restart the process of identifying the items 204 on the platform 202. This process prevents the item tracking device 104 from double counting items 204 after the items 204 have been rearranged on the platform 202.

Returning to operation 312, the item tracking device 104 proceeds to operation 316 in response to determining that all of the items 204 on the platform 202 have been identified. In some embodiments, the item tracking device 104 may validate the accuracy of detecting the identified items 204 based on the weight of the items 204 on the platform 202. For example, the item tracking device 104 may determine a first weight that is associated with the weight of the identified items 204 based on item information 118 that is associated with the identified items 204. For instance, the item tracking device 104 may use item identifiers for the identified items 204 to determine a weight that corresponds with each of the identified items 204. The item tracking device 104 may sum the individual weights for the identified items 204 to determine the first weight. The item tracking device 104 may also receive a second weight for the items 204 on the platform 202 from the weight sensor 112. The item tracking device 104 then determines a weight difference between the first weight and the second weight and compares the weight difference to a weight difference threshold value. The weight difference threshold value corresponds with a maximum weight difference between the first weight and the second weight. When the weight difference exceeds the weight difference threshold value, the item tracking device 104 may determine that there is a mismatch between the weight of the items 204 on the platform 202 of the imaging device 102 and the expected weight of the identified items 204. In this case, the item tracking device 104 may output an error message and/or return to operation 306 to restart the item tracking process. When the weight difference is less than or equal to the weight difference threshold value, the item tracking device 104 may determine that there is a match between the weight of the items 204 on the platform 202 of the imaging device 102 and the expected weight of the identified items 204. In this case, the item tracking device 104 may proceed to operation 316.

At operation 316, the item tracking device 104 checks whether any prohibited or restricted item 204 are present on the platform 202. A prohibited or restricted item 204 is an item 204 that the user is not authorized to obtain due to permission restrictions, age restrictions, or any other type of restrictions. The item tracking device 104 may compare item identifiers for the identified items 204 to a list of item identifiers for restricted or prohibited items 616. In response to determining that an item 204 matches one of the items on the list of restricted or prohibited items 616, the item tracking device 104 proceeds to operation 318 to output an alert or notification that indicates that the user is prohibited from obtaining one of the items 204 that is on the platform 202. For example, the item tracking device 104 may output an alert message that identifies the prohibited item 204 and asks the user to remove the prohibited item 204 from the platform 202 using a graphical user interface that is located at the imaging device 102. As another example, the item tracking device 104 may output an alert message that identifies the prohibited item 204 to another user (e.g. an employee) that is associated with the space. In other examples, the item tracking device 104 may output any other suitable type of alert message in response to detecting a prohibited item 204 on the platform 202.

At operation 320, the item tracking device 104 determines whether the prohibited item 204 has been removed from the platform 202. For example, the item tracking device 104 may use the weight sensors 112 to determine whether the measured weight of the item 204 on the platform 202 has decreased by an amount that corresponds with the weight of the prohibited item 204. As another example, the item tracking device 104 may use the cameras 108 and/or 3D sensors 110 to determine whether the prohibited item 204 is still present on the platform 202. In response to determining that the prohibited item 204 is still present on the platform 202, the item tracking device 104 may pause process 300 and remain at operation 320 until the prohibited item 204 has been removed from the platform 202. This process prevents the user from obtaining the prohibited item 204. The item tracking device 104 may proceed to operation 322 after the prohibited item 204 has been removed from the platform 202.

Otherwise, the item tracking device 104 proceeds to operation 322 in response to determining that no prohibited items 204 are present on the platform 202. At operation 322, the item tracking device 104 associates the items 204 with the user. In one embodiment, the item tracking device 104 may identify the user that is associated with the items 204 on the platform 202. For example, the user may identify themselves using a scanner or card reader that is located at the imaging device 102. Examples of a scanner include, but are not limited to, a QR code scanner, a barcode scanner, a near-field communication (NFC) scanner, or any other suitable type of scanner that can receive an electronic code embedded with information that uniquely identifies a person. In other examples, the user may identify themselves by providing user information on a graphical user interface that is located at the imaging device 102. Examples of user information include, but are not limited to, a name, a phone number, an email address, an identification number, an employee number, an alphanumeric code, or any other suitable type of information that is associated with the user.

The item tracking device 104 uses the information provided by the user to identify an account that is associated with the user and then to add the identified items 204 to the user's account. For example, the item tracking device 104 may use the information provided by the user to identify an account within the user account information 120 that is associated with the user. As an example, the item tracking device 104 may identify a digital cart that is associated with the user. In this example, the digital cart comprises information about items 204 that the user has placed on the platform 202 to purchase. The item tracking device 104 may add the items 204 to the user's digital cart by adding the item identifiers for the identified items 204 to the digital cart. The item tracking device 104 may also add other information to the digital cart that is related to the items 204. For example, the item tracking device 104 may use the item identifiers to look up pricing information for the identified items 204 from the stored item information 118. The item tracking device 104 may then add pricing information that corresponds with each of the identified items 204 to the user's digital cart.

After the item tracking device 104 adds the items 204 to the user's digital cart, the item tracking device 104 may trigger or initiate a transaction for the items 204. In one embodiment, the item tracking device 104 may use previously stored information (e.g., payment card information) to complete the transaction for the items 204. In this case, the user may be automatically charged for the items 204 in their digital cart when they leave the space. In other embodiments, the item tracking device 104 may collect information from the user using a scanner or card reader that is located at the imaging device 102 to complete the transaction for the items 204. This process allows the items 204 to be automatically added to the user's account (e.g., digital cart) without having the user scan or otherwise identify the items 204 they would like to take. After adding the items 204 to the user's account, the item tracking device 104 may output a notification or summary to the user with information about the items 204 that were added to the user's account. For example, the item tracking device 104 may output a summary on a graphical user interface that is located at the imaging device 102. As another example, the item tracking device 104 may output a summary by sending the summary to an email address or a user device that is associated with the user.

Hardware Configuration for the Item Tracking Device

Figure 6:
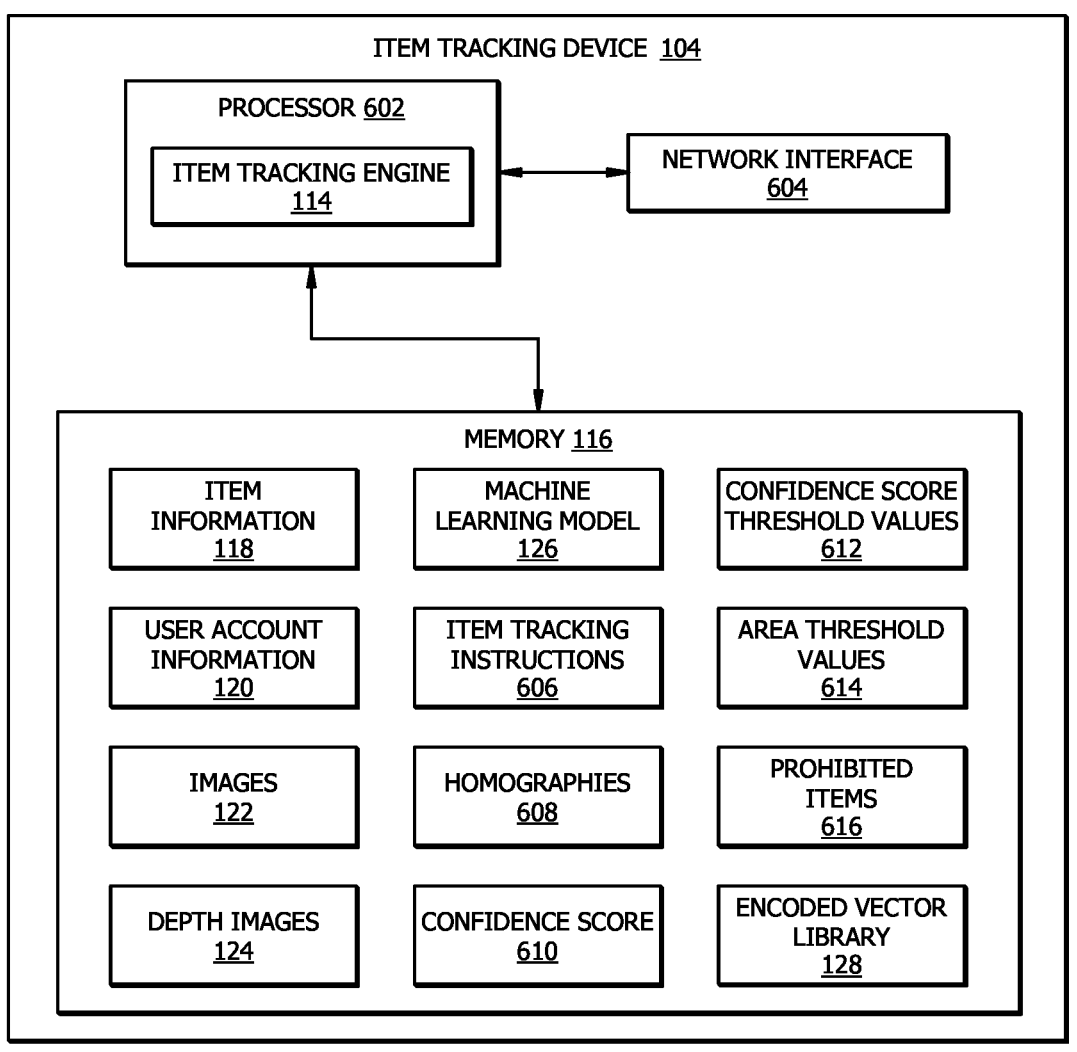
FIG. 6 is an embodiment of an item tracking device configured for the item tracking system.

FIG. 6 is an embodiment of an item tracking device 104 for the item tracking system 100. In one embodiment, the item tracking device 104 may comprise a processor 602, a memory 116, and a network interface 604. The item tracking device 104 may be configured as shown or in any other suitable configuration.

Processor

The processor 602 comprises one or more processors operably coupled to the memory 116. The processor 602 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 116 and the network interface 604. The one or more processors are configured to process data and may be implemented in hardware or software. For example, the processor 602 may be 8-bit, 16-bit, 32-bit, 64-bit, or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute item tracking instructions 606 that cause the processor to implement the item tracking engine 114. In this way, processor 602 may be a special-purpose computer designed to implement the functions disclosed herein. In an embodiment, the item tracking engine 114 is implemented using logic units, FPGAs, ASICs, DSPs, or any other suitable hardware. The item tracking engine 114 is configured to operate as described in FIGS. 1 and 3. For example, the item tracking engine 114 may be configured to perform the operations s of process 300 as described in FIG. 3.

Memory

The memory 116 is operable to store any of the information described above with respect to FIGS. 1 and 3 along with any other data, instructions, logic, rules, or code operable to implement the function(s) described herein when executed by the processor 602. The memory 116 may comprise one or more non-transitory computer-readable mediums such as computer disks, tape drives, or solid-state drives, and may be used as an over-flow data storage device, to store programs when such programs are selected for execution, and to store instructions and data that are read during program execution. The memory 116 may be volatile or non-volatile and may comprise a read-only memory (ROM), random-access memory (RAM), ternary content-addressable memory (TCAM), dynamic random-access memory (DRAM), and static random-access memory (SRAM).

The memory 116 is operable to store item tracking instructions 606, item information 118, user account information 120, machine learning models 126, images 122, depth images 124, homographies 608, confidence scores 610, confidence score threshold values 612, area threshold values 614, a list of restricted or prohibited items 616, encoded vector libraries 128, and/or any other data or instructions. The item tracking instructions 606 may comprise any suitable set of instructions, logic, rules, or code operable to execute the item tracking engine 114. The item information 118, the user account information 120, the machine learning models 126, images 122, depth images 124, homographies 608, confidence scores 610, confidence score threshold values 612, area threshold values 614, the list of restricted or prohibited items 616, and encoded vector libraries 128 are configured similar to the item information 118, the user account information 120, the machine learning models 126, images 122, depth images 124, homographies 608, confidence scores 610, confidence score threshold values 612, area threshold values 614, the list of restricted or prohibited items 616, and encoded vector libraries 128 described in FIGS. 1-26, respectively.

Network Interface

The network interface 604 is configured to enable wired and/or wireless communications. The network interface 604 is configured to communicate data between the imaging device 102 and other devices, systems, or domains. For example, the network interface 604 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 602 is configured to send and receive data using the network interface 604. The network interface 604 may be configured to use any suitable type of communication protocol as would be appreciated by one of ordinary skill in the art.

Hand Detection Process for Triggering Item Identification

Figure 7:
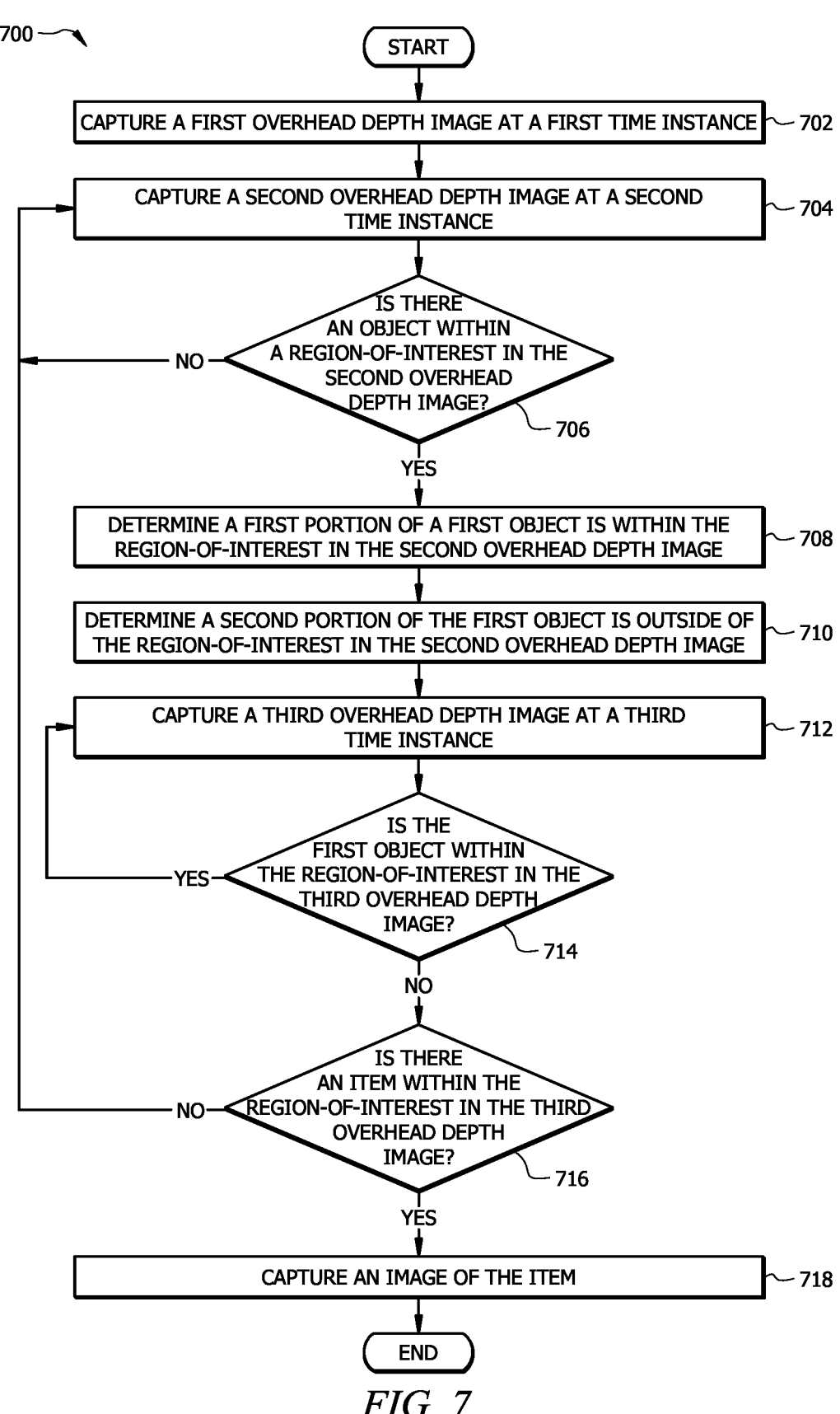
FIG. 7 is a flowchart of an embodiment of a hand detection process for triggering item identification.

FIG. 7 is a flowchart of an embodiment of a hand detection process 700 for triggering an item identification process for the item tracking system 100. The item tracking system 100 may employ process 700 to detect a triggering event that corresponds with when a user puts their hand above the platform 202 to place an item 204 on the platform 202. This process allows the item tracking device 104 to detect the presence of a user interacting with the platform 202 which can be used to initiate an item detection process such as processes 300 and 2300 described in FIGS. 3 and 23, respectively.

Figures 8A, 8B, 8C, 8D:
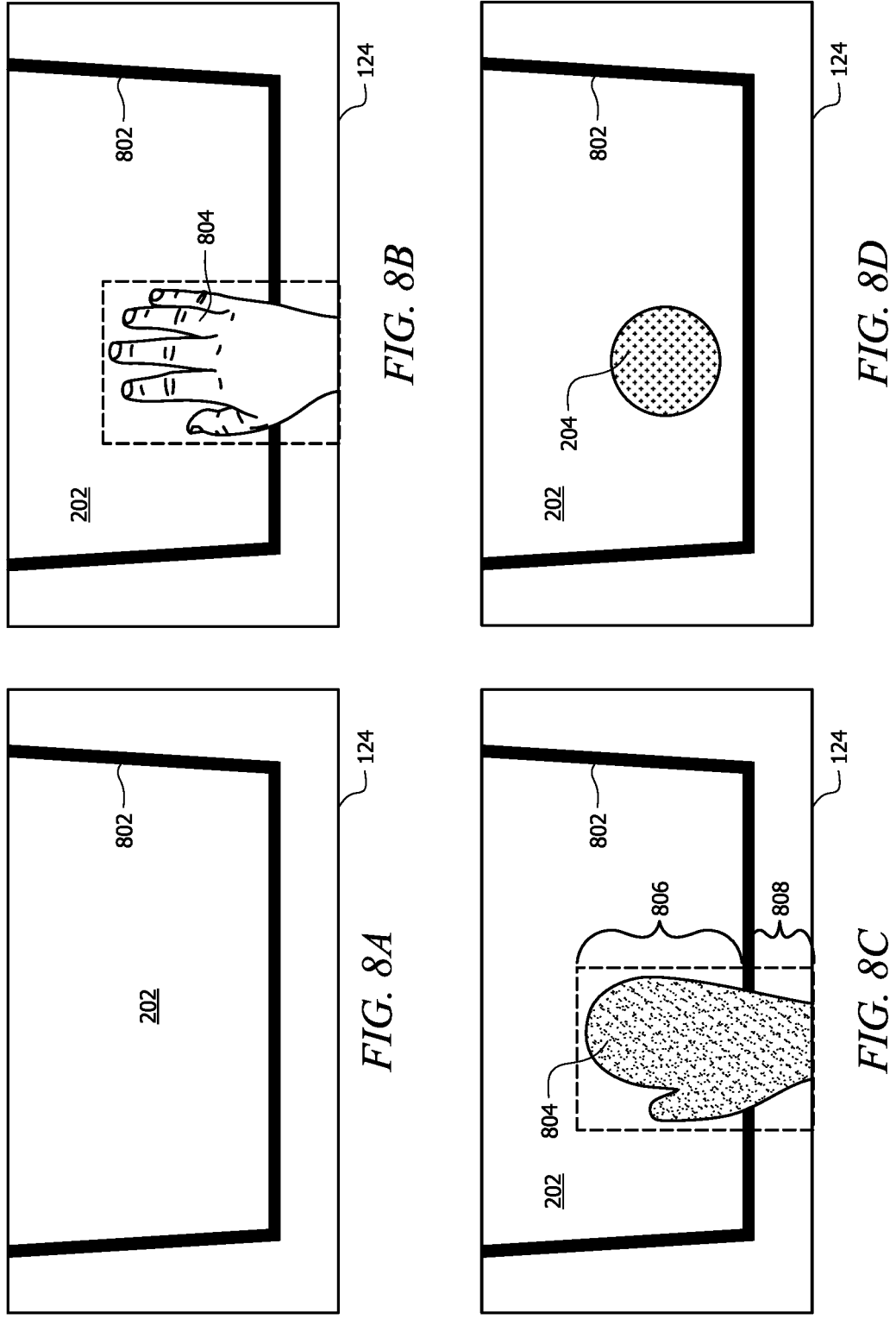
FIG. 8A is an example of an overhead depth image of a platform without any items placed on the platform of the imaging device.
FIG. 8B is an example of an overhead depth image of the platform when a hand is above the platform of the imaging device.
FIG. 8C is an example of an overhead image of the platform when the hand is above the platform of the imaging device.
FIG. 8D is an example of an overhead depth image of the platform with an item placed on the platform of the imaging device.

At operation 702, the item tracking device 104 captures a first overhead depth image 124 using a 3D sensor 110 at a first time instance. Here, the item tracking device 104 first captures an overhead depth image 124 of the platform 202 to ensure that there are no items 204 placed on the platform 202 and that there are no hands present above the platform 202 before periodically checking for the presence of a user's hand above the platform 202. The overhead depth image 124 captures any upward-facing surfaces of objects and the platform 202. Referring to FIG. 8A as an example, the item tracking device 104 may employ a 3D sensor 110 that is positioned above the platform 202 to capture an overhead depth image 124 of the platform 202. Within the overhead depth images 124 of the platform 202, the item tracking device 104 defines a region-of-interest 802 for the platform 202. The region-of-interest 802 (outlined with bold lines in FIGS. 8A-8C) identifies a predetermined range of pixels in an overhead depth image 124 that corresponds with the surface of the platform 202. The item tracking device 104 uses the defined region-of-interest 802 to determine whether any item 204 has been placed on the platform 202 or whether a user has their hand positioned above the platform 202. The region-of interest 802 is the same predetermined range of pixels for all of the depth images 124 captured by the 3D sensor 110.

Returning to FIG. 7 at operation 704, the item tracking device 104 captures a second overhead depth image 124 using the same 3D sensor 110 at a second time instance. After capturing the first overhead depth image 124, the item tracking device 104 begins periodically capturing additional overhead depth images 124 of the platform 202 to check whether a user's hand has entered the region-of-interest 802 for the platform 202. The item tracking device 104 may capture additional overhead depth images 124 every second, every ten seconds, every thirty seconds, or at any other suitable time interval. In some embodiments, the item tracking device 104 may capture the second overhead depth image 124 in response to detecting motion near the platform 202. For example, the item tracking device 104 may employ a proximity sensor that is configured to detect motion near the platform 202 before capturing the second overhead depth image 124. As another example, the item tracking device 104 may periodically capture additional overhead depth image 124 to detect motion. In this example, the item tracking device 104 compares the first overhead depth image 124 to subsequently captured overhead depth images 124 and detects motion based on differences, for example, the presence of an object, between the overhead depth images 124.

At operation 706, the item tracking device 104 determines whether an object is present within the region-of-interest 802 in the second overhead depth image 124. In one embodiment, the item tracking device 104 determines an object is present within the region-of-interest 802 based on differences between the first overhead depth image 124 and the second overhead depth image 124. Referring to FIG. 8B as an example, the item tracking device 104 compares the second overhead depth image 124 (shown in FIG. 8B) to the first overhead depth image 124 (shown in FIG. 8A) to identify differences between the first overhead depth image 124 and the second overhead depth image 124. In this example, the item tracking device 104 detects an object 804 within the in region-of-interest 802 in the second overhead depth image 124 that corresponds with the hand of a user. FIG. 8C shows a corresponding image 122 of the object 804 that is present in the second overhead depth image 124.

Returning to FIG. 7 at operation 706, the item tracking device 104 returns to operation 704 in response to determining that there is not an object present within the region-of-interest 802 in the second overhead depth image 124. In this case, the item tracking device 104 returns to operation 704 to continue periodically capturing overhead depth image 124 of the platform 202 to check where a user's hand has entered the region-of-interest 802 of the platform 202. The item tracking device 104 proceeds to operation 708 in response to determining that an object is present within the region-of-interest 802 in the second overhead depth image 124. In this case, the item tracking device 104 proceeds to operation 708 to confirm whether the object in the second overhead depth image 124 corresponds with the hand of a user.

The item tracking device 104 is configured to distinguish between an item 204 that is placed on the platform 202 and the hand of a user. When a user's hand is above the platform 202, the user's hand will typically be within the region-of-interest 802 in the second overhead depth image 124 while the user's arm remains outside of the region-of-interest 802 in the second overhead depth image 124. The item tracking device 104 uses these characteristics to confirm that a user's hand is above the platform 202, for example, when the user places an item 204 on the platform 202.

At operation 708, the item tracking device 104 determines that a first portion 806 of a first object (e.g., a user's hand and arm) is within the region-of-interest 802 in the second overhead depth image 124. Here, the item tracking device 104 confirms that a first portion 806 of the detected object which corresponds with the user's hand is within the region-of-interest 802 in the second overhead depth image 124. Returning to the example in FIG. 8B, the user's hand (shown as portion 806 of the object 804) is at least partially within the region-of-interest 802 in the second overhead depth image 124.

Returning to FIG. 7 at operation 710, the item tracking device 104 determines that a second portion 808 of the first object (e.g., a user's wrist or arm) is outside of the region-of-interest 802 while the first portion 806 of the first object (e.g., a user's hand) is within the region-of-interest 802 in the second overhead depth image 124. Returning to the example in FIG. 8B, the user's wrist and arm (shown as portion 808 of the object 804) is at least partially outside of the region-of-interest 802 while the user's hand (shown as portion 806 of the object 804) is within the region-of-interest 802 in the second overhead depth image 124. These characteristics allow the item tracking device 104 to confirm that a user's hand has been detected in the second overhead depth image 124.

After detecting the user's hand, the item tracking device 104 begins periodically capturing additional overhead depth images 124 of the platform 202 to check whether a user's hand has exited the region-of-interest 802 for the platform 202. At operation 712, the item tracking device 104 captures a third overhead depth image 124 using the 3D sensor 110 at a third time instance. The item tracking device 104 may capture additional overhead depth images 124 every second, every ten seconds, every thirty seconds, or at any other suitable time interval. In some embodiments, the item tracking device 104 may capture the third overhead depth image 124 in response to a weight change or difference on the platform 202. For example, the item tracking device 104 may use a weight sensor 112 to determine a first weight value at the first time instance when no items 204 are placed on the platform 202. The item tracking device 104 may then use the weight sensor 112 to determine a second weight value at a later time after the user places an item 204 on the platform 202. In this example, the item tracking device 104 detects a weight difference between the first weight value and the second weight value and then captures the third overhead depth image 124 in response to detecting the weight difference.

At operation 714, the item tracking device 104 determines whether the first object (i.e., the user's hand) is still present within the region-of-interest 802 in the third overhead depth image 124. Here, the item tracking device 104 may determine whether the first object is present still within the region-of-interest 802 based on differences between the second overhead depth image 124 and the third overhead depth image 124. Referring to the example in FIG. 8D, the item tracking device 104 compares the third overhead depth image 124 (shown in FIG. 8D) to the second overhead depth image 124 (shown in FIG. 8B) to identify differences between the third overhead depth image 124 and the second overhead depth image 124. In this example, the item tracking device 104 detects the first object 804 corresponding with the user's hand is no longer present within the in region-of-interest 802 in the third overhead depth image 124.

Returning to FIG. 7 at operation 714, the item tracking device 104 returns to operation 712 in response to determining that the first object 804 is still present within the region-of-interest 802 in the third overhead depth image 124. In this case, the item tracking device 104 returns to operation 712 to continue periodically checking for when the user's hand exits the region-of-interest 802 for the platform 202. The item tracking device 104 proceeds to operation 716 in response to determining that the first object 804 is no longer present within the region-of-interest 802 in the third overhead depth image 124. In this case, the item tracking device 104 begins checking for any items 204 that the user placed onto the platform 202.

At operation 716, the item tracking device 104 determines whether an item 204 is within the region-of-interest 802 in the third overhead depth image 124. When an item 204 is placed on the platform 202, the item 204 will typically be completely within the region-of-interest 802 in the third overhead depth image 124. The item tracking device 104 uses this characteristic to distinguish between an item 204 that is placed on the platform 202 and the hand of a user. Returning to the example in FIG. 8D, the item tracking device 104 detects that there is an item 204 within the region-of-interest 802 in the third overhead depth image 124.

Returning to FIG. 7 at operation 716, the item tracking device 104 returns to operation 704 in response to determining that an item 204 is not present within the region-of-interest 802 in the third overhead depth image 124. In this case, the item tracking device 104 determines that the user did not place any items 204 onto the platform 202. The item tracking device 104 returns to operation 704 to repeat the hand detection process to detect when the user's hand reenters the region-of-interest 802 for the platform 202. The item tracking device 104 proceeds to operation 718 in response to determining that an item 204 is present within the region-of-interest 802 in the third overhead depth image 124. In this case, the item tracking device 104 proceeds to operation 718 to begin capturing images 122 and/or depth images 124 of the item 204 for additional processing such as item identification.

At operation 718, the item tracking device 104 captures an image 122 of the item 204 in response to determining that the first object 804 is no longer present within the region-of-interest 802 in the third overhead depth image 124 and that an item 204 is present within the region-of-interest 802 in the third overhead depth image 124. The item tracking device 104 may use one or more cameras 108 and/or 3D sensors 110 to capture images 122 or depth images 124, respectively, of the item 204 that is placed on the platform 202.

In some embodiments, the item tracking device 104 may capture an image 122 in response to detecting a weight change or difference on the platform 202. For example, the item tracking device 104 may use a weight sensor 112 to determine a first weight value at the first time instance when no items 204 are placed on the platform 202. The item tracking device 104 may then use the weight sensor 112 to determine a second weight value at a later time after the user places the item 204 on the platform 202. In this example, the item tracking device 104 detects a weight difference between the first weight value and the second weight value and then captures image 122 in response to detecting the weight difference.

Figure 23:
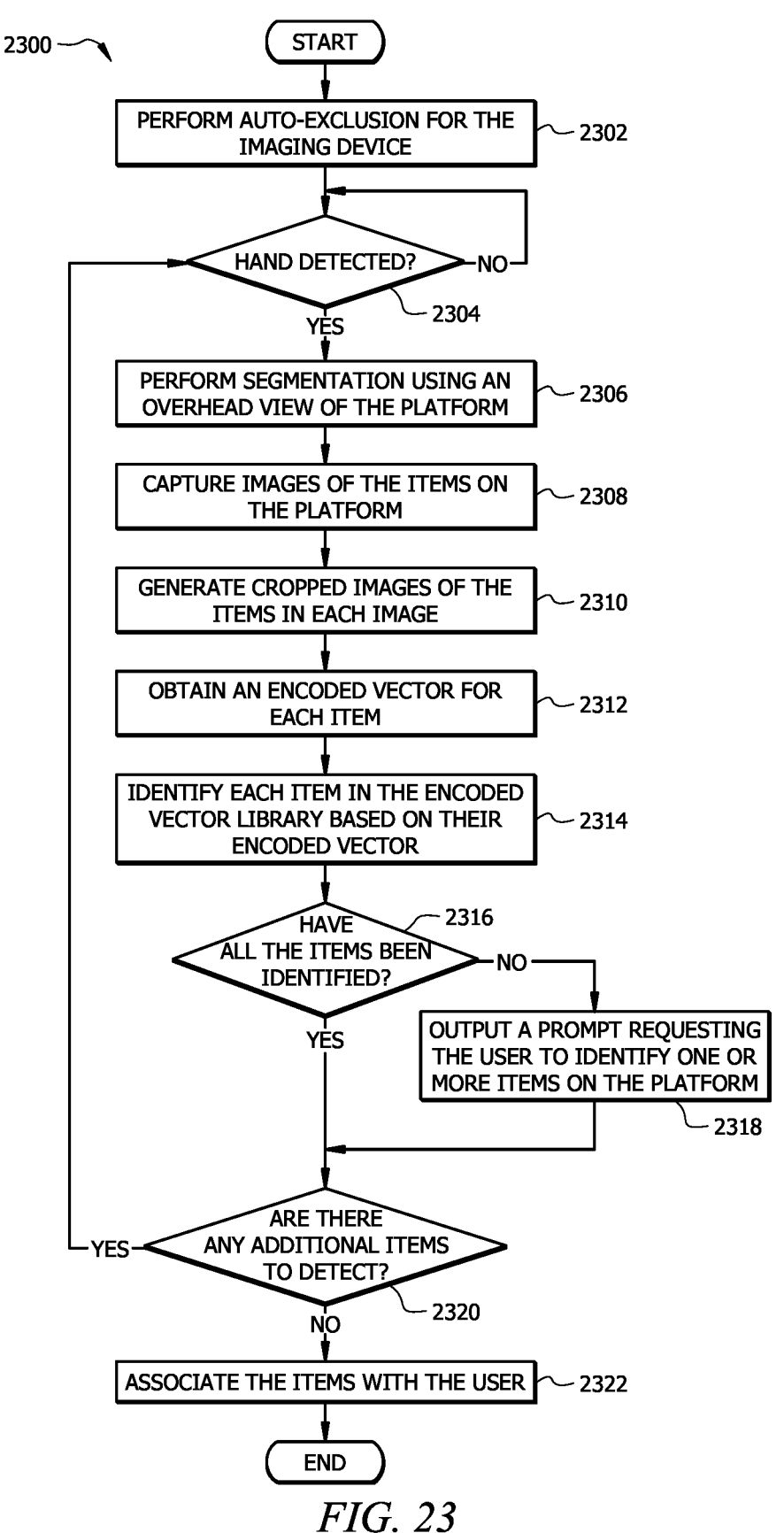
FIG. 23 is a flowchart of an embodiment of an item tracking process using encoded vectors.

After capturing the image 122 of the item 204, the item tracking device 104 may use a process similar to processes 300 and 2300 that are described in FIGS. 3 and 23, respectively, to identify items 204 that are placed on the platform 202 based on physical attributes of the item 204 that are present in the captured image 122.

Image Cropping Process for Item Identification

Figure 9:
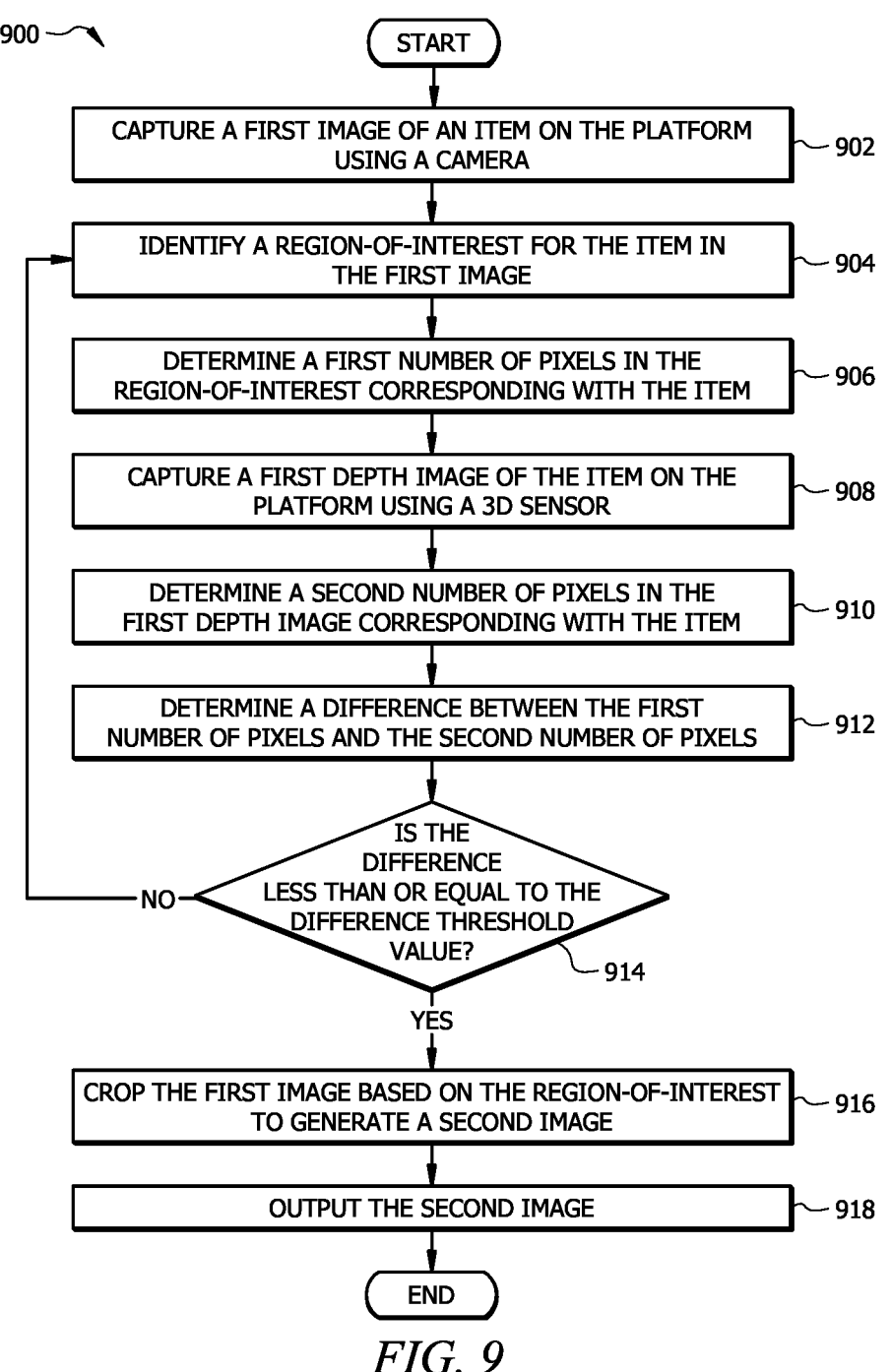
FIG. 9 is a flowchart of an embodiment of an image cropping process for item identification.

FIG. 9 is a flowchart of an embodiment of an image cropping process 900 for item identification by the item tracking system 100. The item tracking system 100 may employ process 900 to isolate items 204 within an image 122. For example, when a camera 108 captures an image 122 of the platform 202, the image 122 may contain multiple items 204 that are placed on the platform 202. To improve the accuracy when identifying an item 204, the item tracking device 104 first crops the image 122 to isolate each item 204 within the image 122. Cropping the image 122 generates a new image 122 (i.e., a cropped image 122) that comprises pixels from the original image 122 that correspond with an item 204. The item tracking device 104 repeats the process to create a set of cropped images 122 that each correspond with an item 204.

At operation 902, the item tracking device 104 captures a first image 122 of an item 204 on the platform 202 using a camera 108. The item tracking device 104 may use a camera 108 with an overhead, perspective, or side profile view to capture the first image 122 of the item 204 on the platform 202. As an example, the camera 108 may be configured with an overhead view to capture upward-facing surfaces of the item 204. As another example, the camera 108 may be configured with a perspective or side profile view to capture the side-facing surfaces of the item 204.

At operation 904, the item tracking device 104 identifies a region-of-interest 1002 for the item 204 in the first image 122. The region-of-interest 1002 comprises a plurality of pixels that correspond with an item 204 in the first image 122. An example of a region-of-interest 1002 is a bounding box. In some embodiments, the item tracking device 104 may employ one or more image processing techniques to identify a region-of-interest 1002 for an item 204 within the first image 122. For example, the item tracking device 104 may employ object detection and/or OCR to identify text, logos, branding, colors, barcodes, or any other features of an item 204 that can be used to identify the item 204. In this case, the item tracking device 104 may process the pixels within the first image 122 to identify text, colors, barcodes, patterns, or any other characteristics of an item 204. The item tracking device 104 may then compare the identified features of the item 204 to a set of features that correspond with different items 204. For instance, the item tracking device 104 may extract text (e.g., a product name) from the first image 122 and may compare the text to a set of text that is associated with different items 204. As another example, the item tracking device 104 may determine a dominant color within the first image 122 and may compare the dominant color to a set of colors that are associated with different items 204. As another example, the item tracking device 104 may identify a barcode within the first image 122 and may compare the barcode to a set of barcodes that are associated with different items 204. As another example, the item tracking device 104 may identify logos or patterns within the first image 122 and may compare the identified logos or patterns to a set of logos or patterns that are associated with different items 204. In other examples, the item tracking device 104 may identify any other suitable type or combination of features and compare the identified features to features that are associated with different items 204.

After comparing the identified features from the first image 122 to the set of features that are associated with different items 204, the item tracking device 104 then determines whether a match is found. The item tracking device 104 may determine that a match is found when at least a meaningful portion of the identified features match features that correspond with an item 204. In response to determining that a meaningful portion of features within the first image 122 matches the features of an item 204, the item tracking device 104 identifies a region-of-interest 1002 that corresponds with the matching item 204. In other embodiments, the item tracking device 104 may employ any other suitable type of image processing techniques to identify a region-of-interest 1002. FIGS. 10A, 10B, 10C, and 10D illustrate examples of region-of-interest 1002 for the item 204.

At operation 906, the item tracking device 104 determines a first number of pixels in the region-of-interest 1002 that correspond with the item 204 in the first image 122. Here, the item tracking device 104 counts the number of pixels within the plurality of pixels in the identified region-of-interest 1002. The number of pixels within the region-of-interest 1002 is proportional to how much of the first item 204 was detected within the first image 122. For example, a greater number of pixels within the region-of-interest 1002 indicates that a larger portion of the item 204 was detected within the first image 122. Alternatively, a fewer number of pixels within the region-of-interest 1002 indicates that a smaller portion of the item 204 was detected within the first image 122. In some instances, a small number of pixels within the region-of-interest 1002 may indicate that only a small portion of the item 204 was visible to the selected camera 108 or that the region-of-interest 1002 was incorrectly identified. The item tracking device 104 proceeds to operation 908 to determine whether the region-of-interest 1002 was correctly identified.

At operation 908, the item tracking device 104 captures a first depth image 124 of the item 204 on the platform using a 3D sensor 110. Here, the item tracking device 104 uses a 3D sensor 110 to capture a first depth image 124 with a similar view of the item 204 that was captured by the camera 108 in operation 902. For example, the item tracking device 104 may use a 3D sensor 110 that is configured with an overhead view of the item 204 when a camera 108 with an overhead view of the item 204 is used to capture the first image 122. As another example, the item tracking device 104 may use a 3D sensor 110 that is configured with a perspective or side profile view of the item 204 when a camera 108 with a perspective or side profile view of the item 204 is used to capture the first image 122. In other examples, the item tracking device 104 may use a 3D sensor 110 that has any other type of view of the item 204 that is similar the view captured in the first image 122. FIGS. 10A, 10B, 10C, and 10D illustrate examples of the first depth image 124.

At operation 910, the item tracking device 104 determines a second number of pixels in the first depth image 124 corresponding with the item 204. Here, the item tracking device 104 counts the number of pixels within the first depth image 124 that correspond with the item 204. In some embodiments, the item tracking device 104 may use a depth threshold value to distinguish between pixels corresponding with the item 204 and other items 204 or the platform 202. For example, the item tracking device 104 may set a depth threshold value that is behind the surface of the item 204 that is facing the 3D sensor 110. After applying the depth threshold value, the remaining pixels in the first depth image 124 correspond with the item 204. The item tracking device 104 may then count the remaining number of pixels within the first depth image 124 after applying the depth threshold value to the first depth image 124.

At operation 912, the item tracking device 104 determines a difference between the first number of pixels and the second number of pixels. Here, the item tracking device 104 the difference between the number of pixels for the item 204 from the region-of-interest 1002 and the number of pixels for the item 204 from the first depth image 124 to determine how similar the two values are to each other. For example, the item tracking device 104 may subtract the first number of pixels from the second number of pixels to determine the difference between the two values. In this example, the item tracking device 104 may use the absolute value of the difference between the two values.

Figure 10A:
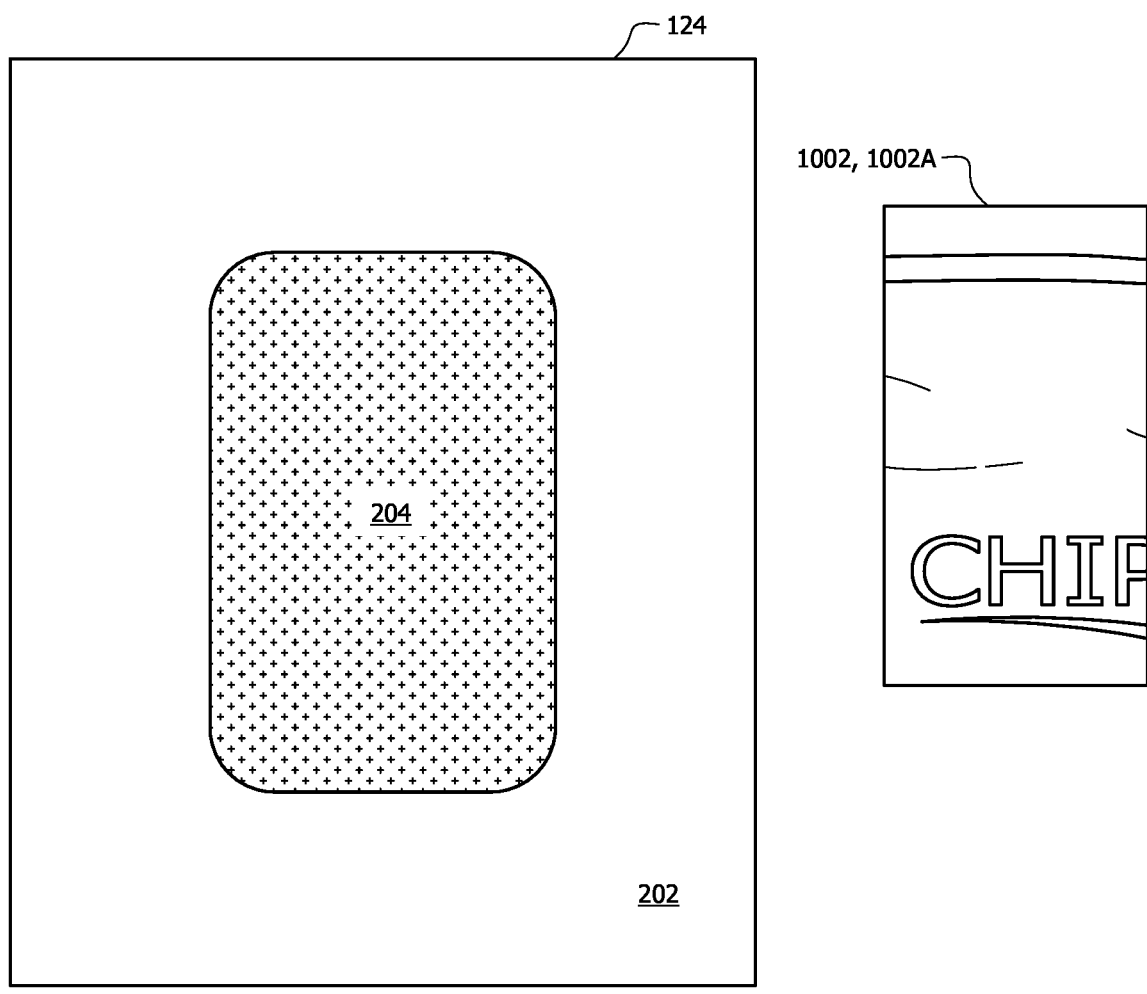
FIG. 10A is an example of a depth image of an item on the platform of the imaging device and a region-of-interest from an image capturing the item.
Figure 10B:
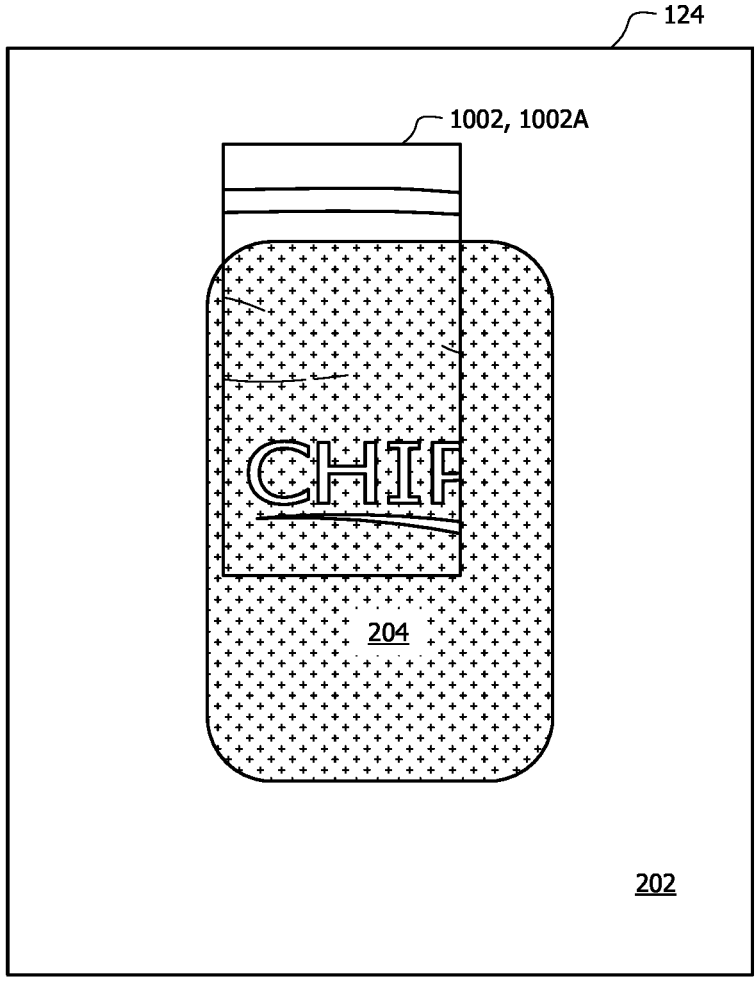
FIG. 10B is an example of overlaying the region-of-interest from the image capturing the item onto the depth image of the item.

At operation 914, the item tracking device 104 determines whether the difference is less than or equal to a difference threshold value. The distance threshold value is a user-defined value that identifies a maximum pixel difference for the identified region-of-interest 1002 to be considered valid for additional processing. An invalid region-of-interest 1002 means that the difference between the number of pixels for the item 204 in the region-of-interest 1002 and the number of pixels for the item 204 in the first depth image 124 is too great. An invalid region-of-interest 1002 indicates that the region-of-interest 1002 captures a smaller portion of the item 204 than is visible from the camera 108 and the 3D sensor 110. Since an invalid region-of-interest 1002 only captures a small portion of the item 204, the region-of-interest 1002 may not be suitable for subsequent image processing after cropping the first image 122 using the region-of-interest 1002. Referring to FIG. 10A as an example of an invalid region-of-interest 1002, the item tracking device 104 identifies a first region-of-interest 1002A and the first depth image 124 of the item 204. In this example, the difference between the number of pixels for the item 204 in the region-of-interest 1002 and the number of pixels for the item 204 in the first depth image 124 is greater than the difference threshold value. An example of the first region-of-interest 1002A overlaid with the item 204 in the first depth image 124 is shown in FIG. 10B.

Figure 10D:
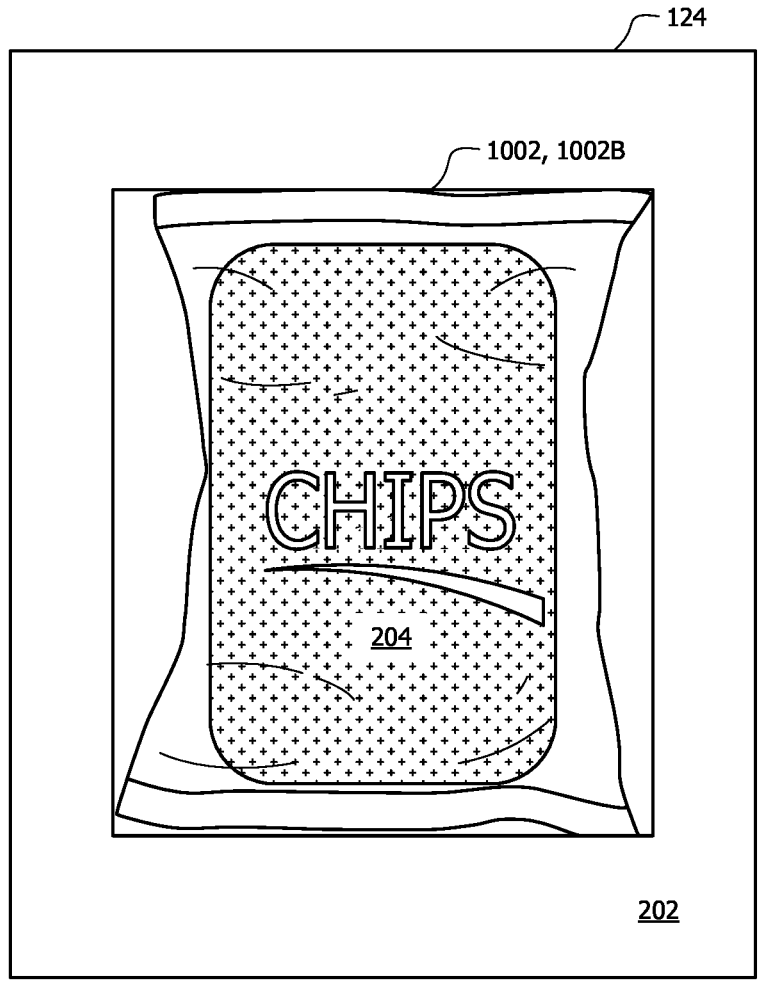
FIG. 10D is another example of overlaying the region-of-interest from the image capturing the item onto the depth image of the item.

A valid region-of-interest 1002 means that the difference between the number of pixels for the item 204 in the region-of-interest 1002 and the number of pixels for the item 204 in the first depth image 124 is within a predetermined tolerance level (i.e. the difference threshold value). Referring to FIG. 10C as an example of a valid region-of-interest 1002, the item tracking device 104 identifies a second region-of-interest 1002B and the first depth image 124 of the item 204. In this example, the difference between the number of pixels for the item 204 in the region-of-interest 1002 and the number of pixels for the item 204 in the first depth image 124 is less than or equal to the difference threshold value. An example of the second region-of-interest 1002B overlaid with the item 204 in the first depth image 124 is shown in FIG. 10D.

Returning to FIG. 9, the item tracking device 104 returns to operation 904 in response to determining that the difference is greater than the difference threshold value. In this case, the item tracking device 104 discards the current region-of-interest 1002 and returns to operation 904 to obtain a new region-of-interest 1002 for the item 204. The item tracking device 104 proceeds to operation 916 in response to determining that the difference is less than or equal to the difference threshold value. In this case, the item tracking device 104 proceeds to operation 916 to crop the first image 122 using the identified region-of-interest 1002.

At operation 916, the item tracking device 104 crops the first image 122 based on the region-of-interest 1002. After determining that the region-of-interest 1002 is valid additional processing, the item tracking device 104 crops the first image 122 by extracting the pixels within the region-of-interest 1002 from the first image 122. By cropping the first image 122, the item tracking device 104 generates a second image 122 that comprises the extracted pixels within the region-of-interest 1002 of the first image 122.

At operation 918, the item tracking device 104 outputs the second image 122. After generating the second image 122, the item tracking device 104 may output the second image 122 for additional processing. For example, the item tracking device 104 may output the second image 122 by inputting or loading the second image 122 into a machine learning model 126 to identify the item 204 using a process similar to process 2300 that is described in FIG. 23. As another example, the item tracking device 104 may associate the second image 122 with feature descriptors 1608 (e.g. an item type 1610, dominant color 1612, dimensions 1614, weight 1616) for the item 204 using a process similar to process 2300 that is described in FIG. 23.

Item Location Detection Process

FIG. 11 is a flowchart of an embodiment of an item location detection process 1100 for the item tracking system 100. The item tracking system 100 may employ process 1100 to identify groups of images 122 that correspond with the same item 204. The item tracking device 104 typically uses multiple cameras 108 to capture images 122 of the items 204 on the platform 202 from multiple perspectives.

This process allows the item tracking device 104 to use redundancy to ensure that all of the items 204 are visible in at least one of the captured images 122. Since each camera 108 has a different physical location and perspective of the platform 202, the items 204 will appear in different locations in each of the captured images 122. To resolve this issue, the item tracking device 104 uses homographies 608 to cluster together images 122 of the same item 204 based on each item's 204 physical location on the platform 202. This process allows the item tracking device 104 to generate a set of images 122 for each item 204 that is on the platform 202 using the captured images 122 from the multiple camera perspectives.

Generating a Homography

The item tracking device 104 is configured to generate and use homographies 608 to map pixels from the cameras 108 and 3D sensors 110 to the platform 202. An example of a homography 608 is described below in FIGS. 12A and 12B. By generating a homography 608 the item tracking device 104 is able to use the location of an item 204 within an image 122 to determine the physical location of the item 204 with respect to the platform 202, the cameras 108, and the 3D sensors 110. This allows the item tracking device 104 to use the physical location of the item 204 to cluster images 122 and depth images 124 of an item 204 together for processing. Each homography 608 comprises coefficients that are configured to translate between pixel locations in an image 122 or depth image 124 and (x,y) coordinates in a global plane (i.e. physical locations on the platform 202). Each image 122 and depth image 124 comprises a plurality of pixels. The location of each pixel within an image 122 or depth image 124 is described by its pixel location 1202 which identifies a pixel row and a pixel column for a pixel where the pixel is located within an image 122 or depth image 124.

The item tracking device 104 uses homographies 608 to correlate between a pixel location in a particular camera 108 or 3D sensor 110 with a physical location on the platform 202. In other words, the item tracking device 104 uses homographies 608 to determine where an item 204 is physically located on the platform 202 based on their pixel location 1202 within an image 122 or depth image 124 from a camera 108 or a 3D sensor 110, respectively. Since the item tracking device 104 uses multiple cameras 108 and 3D sensors 110 to monitor the platform 202, each camera 108 and 3D sensor 110 is uniquely associated with a different homography 608 based on the camera's 108 or 3D sensor's 110 physical location on the imaging device 102. This configuration allows the item tracking device 104 to determine where an item 204 is physically located on the platform 202 based on which camera 108 or 3D sensor 110 it appears in and its location within an image 122 or depth image 124 that is captured by that camera 108 or 3D sensor 110. In this configuration, the cameras 108 and the 3D sensors 110 are configured to capture images 122 and depth images 124, respectively, of at least partially overlapping portions of the platform 202.

Figures 12A, 12B:
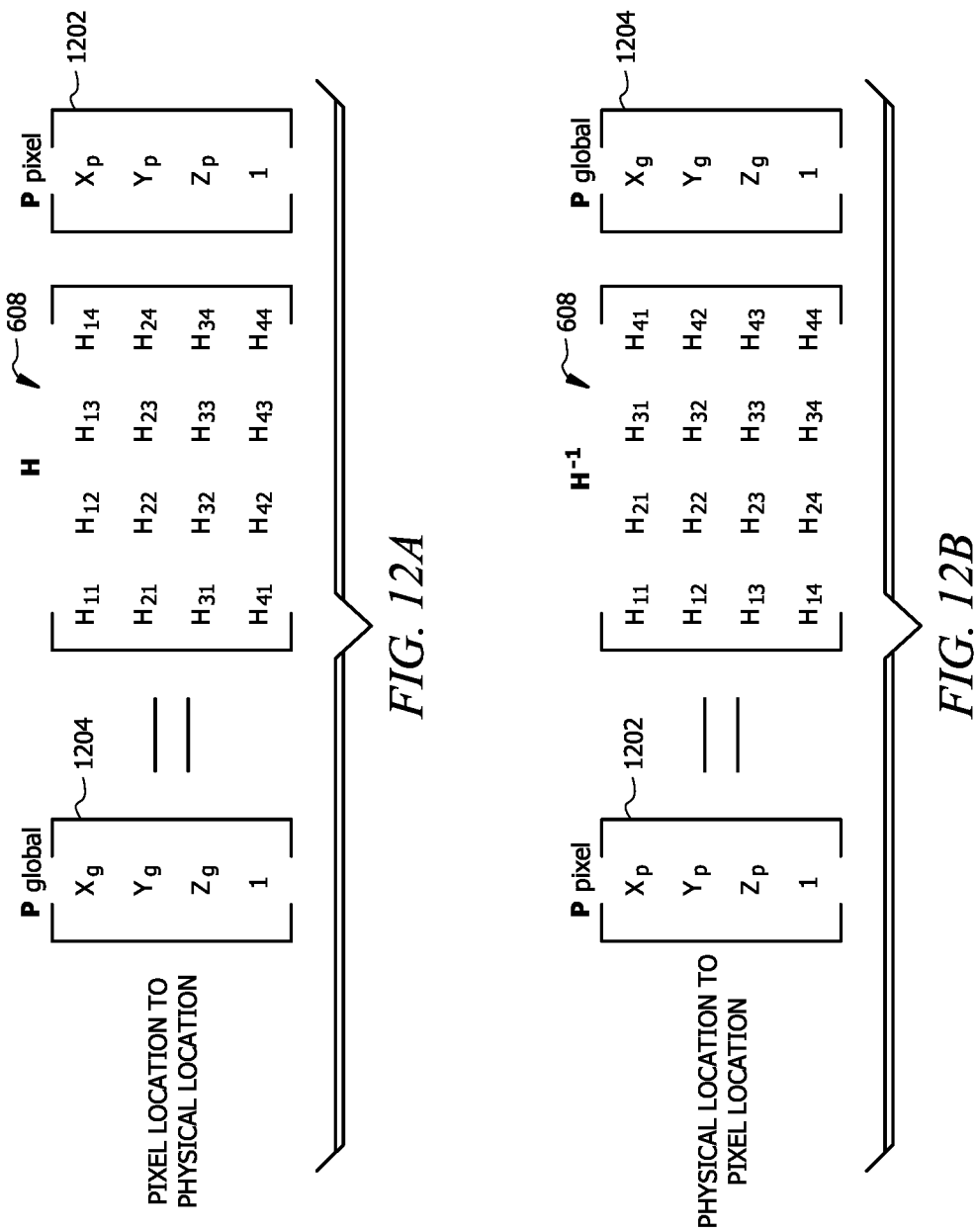
FIG. 12A is an example of a homography for the item tracking system.
FIG. 12B is an example of an inverse homography for the tracking system.

Referring to FIG. 12A, a homography 608 comprises a plurality of coefficients configured to translate between pixel locations 1202 in an image 122 or a depth image 124 and physical locations (e.g. (x,y) coordinates 1204) in a global plane that corresponds with the top surface of the platform 202. In this example, the homography 608 is configured as a matrix and the coefficients of the homography 608 are represented as $H_{11}$, $H_{12}$, $H_{13}$, $H_{14}$, $H_{21}$, $H_{22}$, $H_{23}$, $H_{24}$, $H_{31}$, $H_{32}$, $H_{33}$, $H_{34}$, $H_{41}$, $H_{42}$, $H_{43}$, and $H_{44}$. The item tracking device 104 may generate the homography 608 by defining a relationship or function between pixel locations 1202 in an image 122 or a depth image 124 and physical locations (e.g. (x,y) coordinates 1204) in the global plane using the coefficients. For example, the item tracking device 104 may define one or more functions using the coefficients and may perform a regression (e.g. least squares regression) to solve for values for the coefficients that project pixel locations 1202 of an image 122 or a depth image 124 to (x,y) coordinates 1204 in the global plane. Each (x,y) coordinate 1204 identifies an x-value and a y-value in the global plane where an item is located on the platform 202. In other examples, the item tracking device 104 may solve for coefficients of the homography 608 using any other suitable technique. In the example shown in FIG. 5A, the z-value at the pixel location 1202 may correspond with a pixel value that represents a distance, depth, elevation, or height. In this case, the homography 608 is further configured to translate between pixel values in a depth image 124 and z-coordinates (e.g. heights or elevations) in the global plane.

The item tracking device 104 may use the inverse of the homography 608 to project from (x,y) coordinates 1204 in the global plane to pixel locations 1202 in an image 122 or depth image 124. For example, the item tracking device 104 receives an (x,y) coordinate 1204 in the global plane for an object. The item tracking device 104 identifies a homography 608 that is associated with a camera 108 or 3D sensor 110 where the object is seen. The item tracking device 104 may then apply the inverse homography 608 to the (x,y) coordinate 1204 to determine a pixel location 1202 where the object is located in the image 122 or depth image 124. The item tracking device 104 may compute the matrix inverse of the homograph 608 when the homography 608 is represented as a matrix. Referring to FIG. 12B as an example, the item tracking device 104 may perform matrix multiplication between an (x,y) coordinates 1204 in the global plane and the inverse homography 608 to determine a corresponding pixel location 1202 in the image 122 or depth image 124.

Additional information about generating a homography 608 and using a homography 608 is disclosed in U.S. Pat. No. 11,023,741 entitled, "DRAW WIRE ENCODER BASED HOMOGRAPHY" which is hereby incorporated by reference herein as if reproduced in its entirety.

Using Homographies to Determine an Item's Location

Figure 13A:
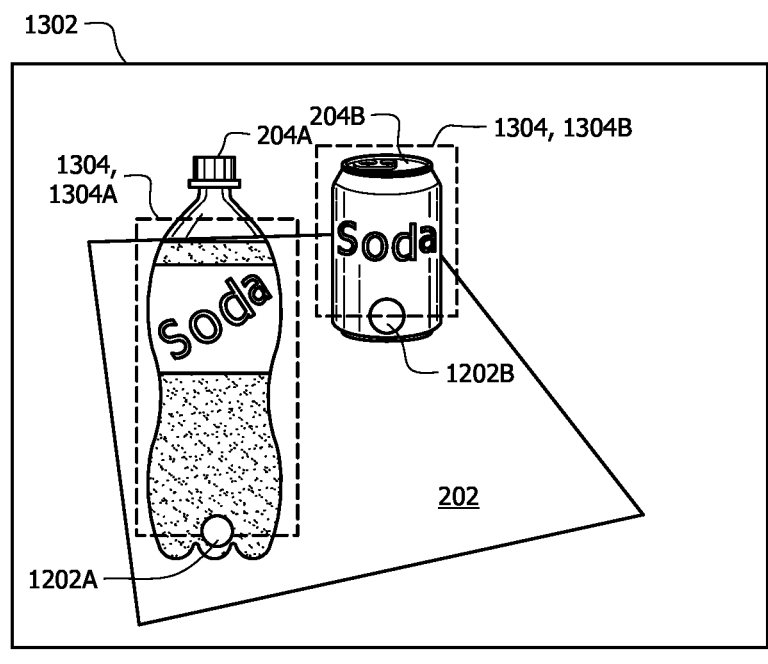
FIG. 13A is an example of an image captured by a camera with regions-of-interest for items on the platform of the imaging device.
Figure 13B:
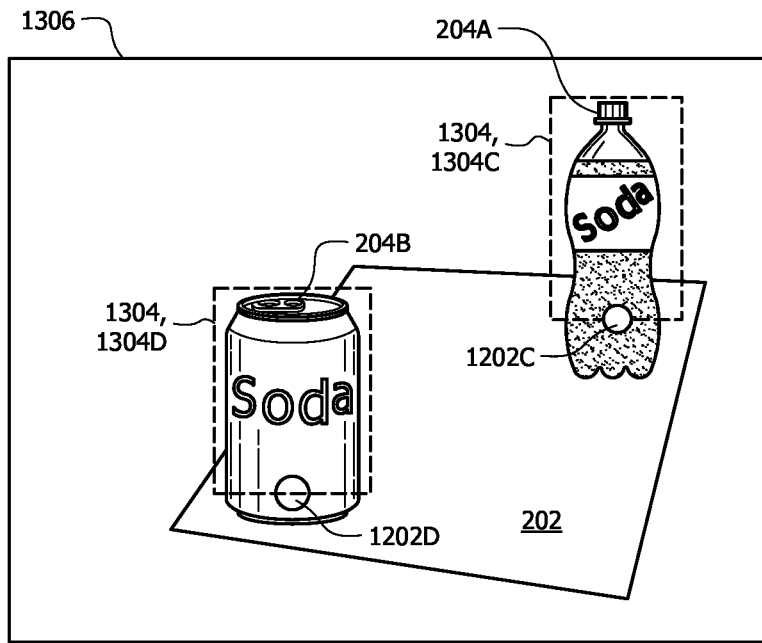
FIG. 13B is another example of an image captured by a camera with regions-of-interest for items on the platform of the imaging device.

Returning to FIG. 11, after generating homographies 608 for the cameras 108 and/or 3D sensors 110, the item tracking device 104 may then use the homographies 608 to cluster images 122 and depth images 124 of items 204 together for processing. At operation 1102, the item tracking device 104 captures a first image 122 of an item 204 using a first camera 108. The first camera 108 may be configured upward-facing surfaces and/or side surfaces of the items 204 on the platform 202. Referring to FIG. 13A, the item tracking device 104 uses a first camera 108 to capture a first image 1302 of items 204A and 204B that are on the platform 202.

Returning to FIG. 11 at operation 1104, the item tracking device 104 identifies a first region-of-interest 1304 for an item 204 in the first image 122. The first region-of-interest 1304 comprises a plurality of pixels that correspond with the item 204 in the first image 122. An example of a region-of-interest 1304 is a bounding box. In some embodiments, the item tracking device 104 may employ one or more image processing techniques to identify a region-of-interest 1304 for an item 204 within the first image 122. For example, the item tracking device 104 may employ object detection and/or OCR to identify text, logos, branding, colors, barcodes, or any other features of an item 204 that can be used to identify the item 204. In this case, the item tracking device 104 may process pixels within an image 122 to identify text, colors, barcodes, patterns, or any other characteristics of an item 204. The item tracking device 104 may then compare the identified features of the item 204 to a set of features that correspond with different items 204. For instance, the item tracking device 104 may extract text (e.g. a product name) from an image 122 and may compare the text to a set of text that is associated with different items 204. As another example, the item tracking device 104 may determine a dominant color within an image 122 and may compare the dominant color to a set of colors that are associated with different items 204. As another example, the item tracking device 104 may identify a barcode within an image 122 and may compare the barcode to a set of barcodes that are associated with different items 204. As another example, the item tracking device 104 may identify logos or patterns within the image 122 and may compare the identified logos or patterns to a set of logos or patterns that are associated with different items 204. In other examples, the item tracking device 104 may identify any other suitable type or combination of features and compare the identified features to features that are associated with different items 204.

After comparing the identified features from an image 122 to the set of features that are associated with different items 204, the item tracking device 104 then determines whether a match is found. The item tracking device 104 may determine that a match is found when at least a meaningful portion of the identified features match features that correspond with an item 204. In response to determining that a meaningful portion of features within an image 122 match the features of an item 204, the item tracking device 104 may identify a region-of-interest 1304 that corresponds with the matching item 204. In other embodiments, the item tracking device 104 may employ any other suitable type of image processing techniques to identify a region-of-interest 1304. Returning to the example in FIG. 13A, the item tracking device 104 identifies a first region-of-interest 1304A corresponding with the first item 204A and a second region-of-interest 1304B corresponding with the second item 204B in the first image 1302.

Returning to FIG. 11 at operation 1106, the item tracking device 104 identifies a first pixel location 1202 within the first region-of-interest 1304. The pixel location 1202 may be any pixel within the first region-of-interest 1304. In some embodiments, the item tracking device 104 may identify a pixel location 1202 that is closest to the platform 202. For example, the item tracking device 104 may identify a pixel location 1202 at a midpoint on a lower edge of the region-of-interest 1304. Returning to the example in FIG. 13A, the item tracking device 104 may identify a pixel location 1202A within the first region-of-interest 1304A for the first item 204A and a pixel location 1202B within the second region-of-interest 1304B for the second item 204B.

Returning to FIG. 11 at operation 1108, the item tracking device 104 applies a first homography 608 to the first pixel location 1202 to determine a first (x,y) coordinate 1204 on the platform 202 for the item 204. For example, the item tracking device 104 identifies a homography 608 that is associated with the first camera 108 and then applies the identified homography 608 to the pixel location 1202 for each item 204 to determine their corresponding (x,y) coordinate 1204 on the platform 202.

At operation 1110, the item tracking device 104 captures a second image 122 of the item 204 using a second camera 108. Here, the item tracking device 104 uses a different camera 108 to capture a different view of the items 204 on the platform 202. The second camera 108 may be configured upward-facing surfaces and/or side surfaces of the items 204 on the platform 202. Referring to the example in FIG. 13B, the item tracking device 104 uses a second camera 108 to capture a second image 1306 of the items 204A and 204B that are on the platform 202. In this example, the second camera 108 is on the opposite side of the platform 202 from the first camera 108. In this example, the first camera 108 captures a first side of the items 204 on the platform 202 and the second camera 108 captures an opposing side of the items 204 on the platform 202. In other examples, the second camera 108 may be in any other suitable location.

Returning to FIG. 11 at operation 1112, the item tracking device 104 identifies a second region-of-interest 1304 for the item 204 in the second image 122. The second region-of-interest 1304 comprises a second plurality of pixels that correspond with the item 204 in the second image 122. The item tracking device 104 may repeat the process described in operation 1104 to identify the second region-of-interest 1304. Returning to the example in FIG. 13B, the item tracking device 104 identifies a third region-of-interest 1304C corresponding with the first item 204A and a fourth region-of-interest 1304D corresponding with the second item 204B in the second image 1306.

Returning to FIG. 11 at operation 1114, the item tracking device 104 identifies a second pixel location 1202 within the second region-of-interest 1304. Returning to the example in FIG. 13B, the item tracking device 104 may identify a pixel location 1202C within the third region-of-interest 1304C for the first item 204A and a pixel location 1202D within the fourth region-of-interest 1304D for the second item 204B.

Returning to FIG. 11 at operation 1116, the item tracking device 104 applies a second homography 608 to the second pixel location 1202 to determine a second (x,y) coordinate 1204 on the platform 202 for the item 204. Here, the item tracking device 104 identifies a homography 608 that is associated with the second camera 108 and then applies the identified homography 608 to the pixel location 1202 for each item 204 to determine their corresponding (x,y) coordinate 1204 on the platform 202.

Figure 13C:
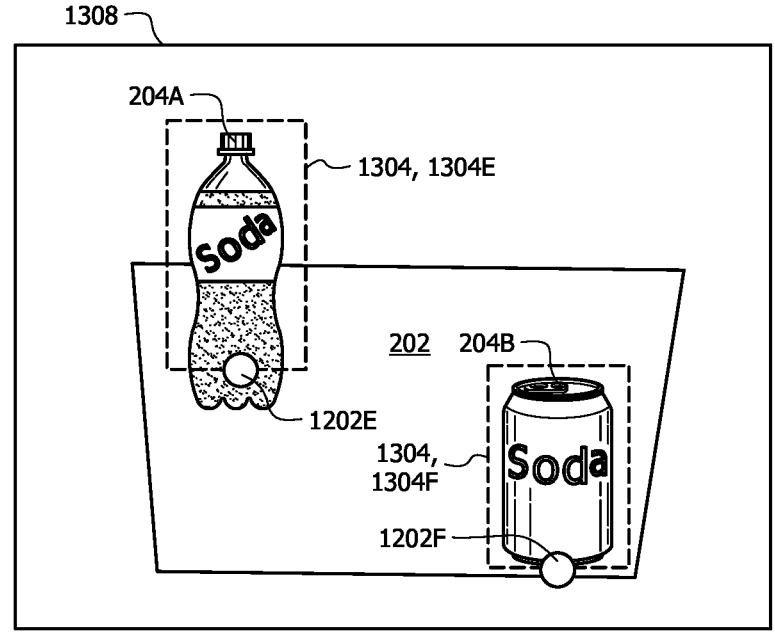
FIG. 13C is another example of an image captured by a camera with regions-of-interest for items on the platform of the imaging device.

The item tracking device 104 may repeat this process for any other suitable number of cameras 108. Referring to FIG. 13C as another example, the item tracking device 104 may use third camera 108 to capture a third image 1308 of the items 204 on the platform 202. The item tracking device 104 may then identify regions-of-interest 1304 and pixel locations 1202 for each item 204. In this example, the item tracking device 104 identifies a region-of-interest 1304E and a pixel location 1202E for the first item 204A and a region-of-interest 1304F and a pixel location 1202F for the second item 204B. After determining the pixel locations 1202 for the items 204, the item tracking device 104 then identifies a homography 608 that is associated with the third camera 108 and applies the identified homography 608 to the pixel location 1202 for each item 204 to determine their corresponding (x,y) coordinate 1204 on the platform 202.

Figure 14:
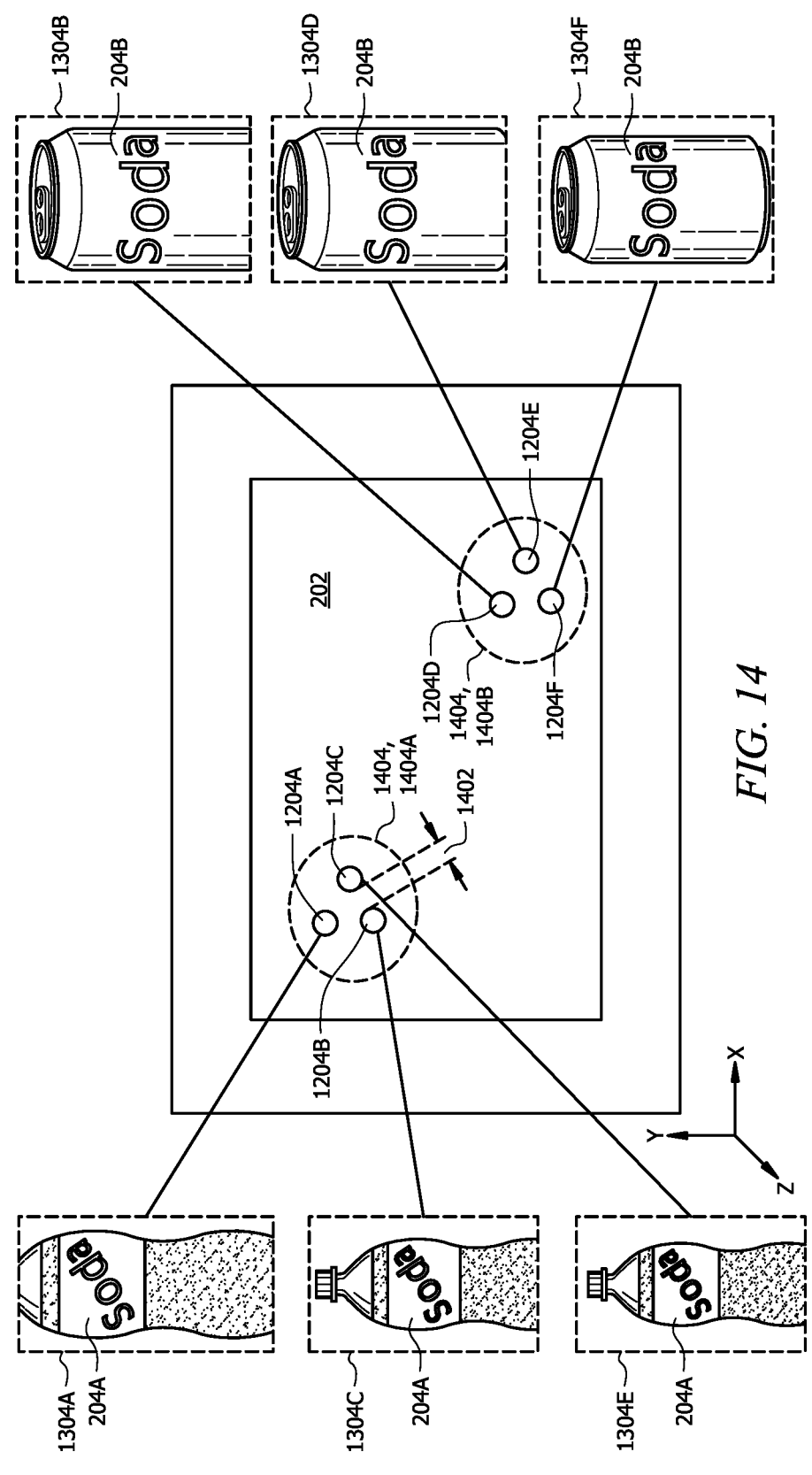
FIG. 14 is an example of an overhead view of the platform of the imaging device with item clusters during item location detection.

Returning to FIG. 11 at operation 1118, the item tracking device 104 determines a distance 1402 between the first (x,y) coordinate 1204 and the second (x,y) coordinate 1204. Referring to FIG. 14 as an example, FIG. 14 shows an overhead view of the platform 202 with the (x,y) coordinates 1204 for each item 204 projected onto the platform 202. In this example, (x,y) coordinates 1204A, 1204B, and 1204C are associated with the first item 204A and (x,y) coordinates 1204D, 1204E, and 1204F are associated with the second item 204B. The item tracking device 104 is configured to iteratively select pairs of (x,y) coordinates 1204 and to determine a distance 1402 between a pair of (x,y) coordinates 1204. In one embodiment, the item tracking device 104 is configured to determine a Euclidian distance between a pair of (x,y) coordinates 1204.

Returning to FIG. 11 at operation 1120, the item tracking device 104 determines whether the distance 1402 is less than or equal to a distance threshold value. The distance threshold value identifies a maximum distance between a pair of (x,y) coordinates 1204 to be considered members of the same cluster 1404 for an item 204. The distance threshold value is a user-defined value that may be set to any suitable value. The distance threshold value may be in units of inches, centimeters, millimeters, or any other suitable units. The item tracking device 104 compares the distance 1402 between a pair of (x,y) coordinates 1204 and the distance threshold value and determines whether the distance 1402 between the pair of (x,y) coordinates 1204 is less than the distance threshold value.

The item tracking device 104 terminates process 1100 in response to determining that the distance 1402 is greater than the distance threshold value. In this case, the item tracking device 104 determines that the pair of (x,y) coordinates 1204 are not members of the same cluster 1404 for an item 204. In some embodiments, the item tracking device 104 may not terminate process 1100, but instead will select another pair of (x,y) coordinates 1204 when additional (x,y) coordinates 1204 are available to compare to the distance threshold value.

The item tracking device 104 proceeds to operation 1122 in response to determining that the distance 1402 is less than or equal to the distance threshold value. In this case, the item tracking device 104 determines that the pair of (x,y) coordinates 1204 are members of the same cluster 1404 for an item 204. At operation 1122, the item tracking device 104 associates the pixels within the first region-of-interest 1304 from the first image 122 and the pixels within the second region-of-interest 1304 from the second image 122 with a cluster 1404 for the item 204. Referring to FIG. 14 as an example, the item tracking device 104 may identify a first cluster 1404A for the first item 204A and a second cluster 1404B for the second item 204B. The first cluster 1404A is associated with (x,y) coordinates 1204A, 1024B, and 1204C and region-of-interest 1304A, 1304C, and 1304E. The second cluster 1404B is associated with (x,y) coordinates 1204D, 1024E, and 1204F and region-of-interest 1304B, 1304D, and 1304F.

Returning to FIG. 11 at operation 1124, the item tracking device 104 outputs the pixels within the first region-of-interest 1304 from the first image 122 and the pixels within the second region-of-interest 1304 from the second image 122. In one embodiment, the item tracking device 104 will crop the captured images 122 by extracting the pixels within identified regions-of-interest 1304 from the images 122. By cropping an image 122, the item tracking device 104 generates a new image 122 that comprises the extracted pixels within a region-of-interest 1304 of the original image 122. This process allows the item tracking device 104 to generate a new set of images 122 for an item 204 that each comprise the extracted pixels from the identified regions-of-interest 1304 that were associated with the item 204. The item tracking device 104 may output the new images 122 for the item 204 for additional processing. For example, the item tracking device 104 may output the images 122 by inputting or loading them into a machine learning model 126 to identify the item 204 based on the physical attributes of the item 204 in the images 122 using a process similar to process 2300 that is described in FIG. 23.

In some embodiments, the item tracking device 104 may also associate any identified feature descriptors with the images 122 for the item 204 and output the feature descriptors with the images 122 of the item 204. For example, while determining the region-of-interest 1304 for an item 204, the item tracking device 104 may identify an item type for the item 204. In this example, the item tracking device 104 may associate the item type with the region-of-interest 1304 and output the item type with the image 122 of the item 204 that is generated based on the region-of-interest 1304. As another example, the item tracking device 104 may obtain a weight for the item 204 using the weight sensor 112. In this example, the item tracking device 104 may associate the weight with the region-of-interest 1304 and output the weight with the image 122 of the item 204 that is generated based on the region-of-interest 1304. In other examples, the item tracking device 104 may be configured to identify and associate any other suitable type of feature descriptors with a region-of-interest 1304 before outputting the region-of-interest 1304.

Search Space Reduction Process for an Encoded Vector Library

Figure 15:
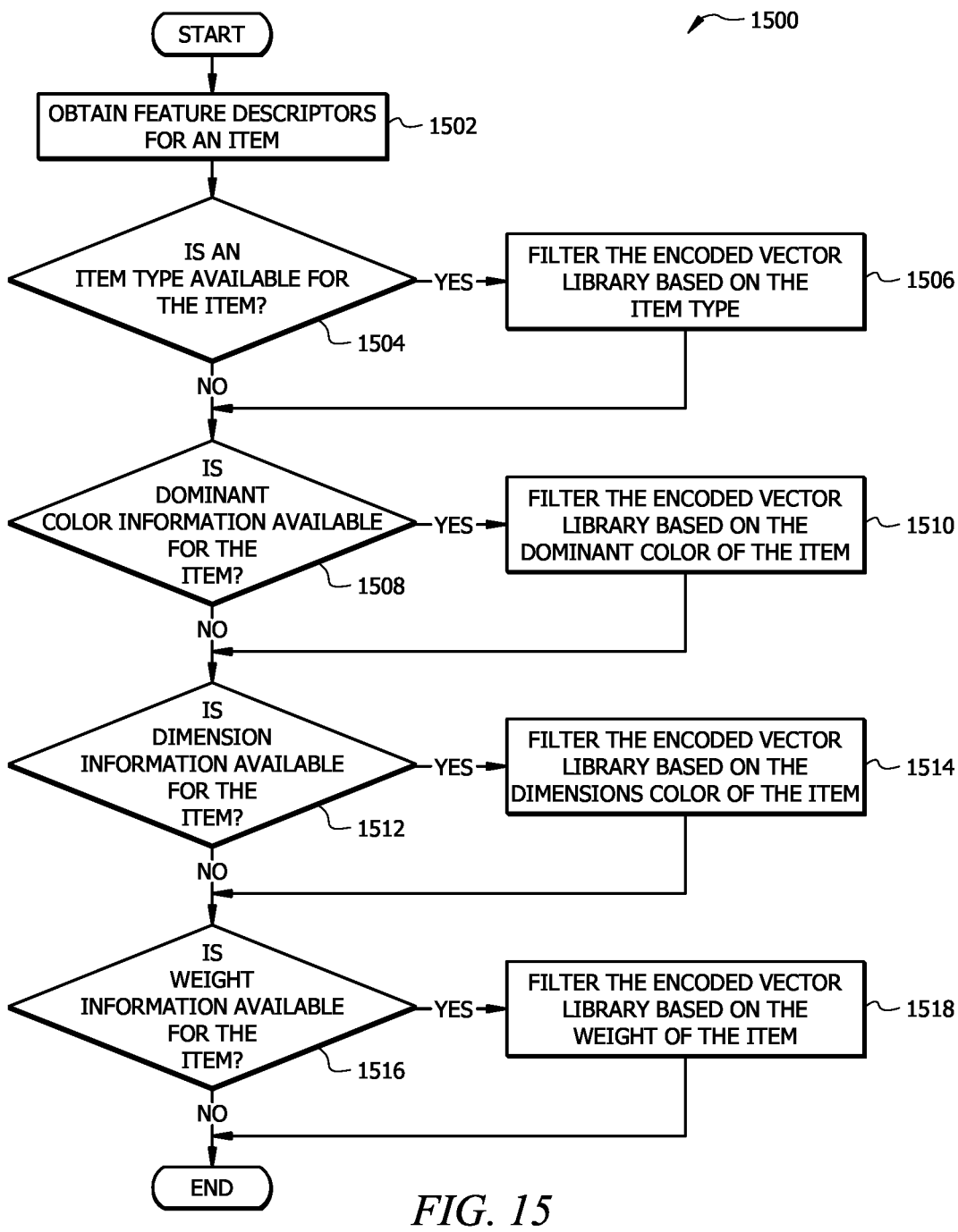
FIG. 15 is a flowchart of an embodiment of a search space reduction process for an encoded vector library.

FIG. 15 is a flowchart of an embodiment of a search space reduction process 1500 for an encoded vector library 128. The item tracking system 100 may employ process 1500 to filter the entries 1602 in the encoded vector library 128 to reduce the amount of items 204 that are considered when attempting to identify an item 204 that is placed on the platform 202. This process reduces the amount of time required to search for a corresponding entry 1602 in the encoded vector library 128 as well as improves the accuracy of the results from identifying an entry 1602 in the encoded vector library 128.

At operation 1502, the item tracking device 104 obtains feature descriptors 1608 for an item 204. Each of the feature descriptors 1608 describes the physical characteristics or attributes of an item 204. Examples of feature descriptors 1608 include, but are not limited to, an item type 1610, a dominant color 1612, dimensions 1614, weight 1616, or any other suitable type of descriptor that describes an item 204. In one embodiment, the item tracking device 104 may obtain feature descriptors using a process similar to the process described in operation 1104 of FIG. 11. For example, the item tracking device 104 may employ object detection and/or OCR to identify text, logos, branding, colors, barcodes, or any other features of an item 204 that can be used to identify the item 204. In some embodiments, the item tracking device 104 may determine the dimensions of the item 204 using a process similar to process 1800 that is described in FIG. 18. The item tracking device 104 may determine the weight of the item 204 using a weight sensor 112. In other embodiments, the item tracking device 104 may use any other suitable process for determining feature descriptors for the item 204.

At operation 1504, the item tracking device 104 determines whether the feature descriptors 1608 identify an item type 1610 for the item 204. Here, the item tracking device 104 determines whether any information associated with an item type 1610 for the item 204 is available. An item type 1610 identifies a classification for the item 204. For instance, an item type 1610 may indicate whether an item 204 is a can, a bottle, a box, a fruit, a bag, etc. The item tracking device 104 proceeds to operation 1506 in response to determining that the feature descriptors 1608 identify an item type 1610 for the item 204. In this case, the item tracking device 104 uses the item type 1610 to filter the encoded vector library

128 to reduce the number of entries 1602 in the encoded vector library 128 before attempting to identify the item 204.

At operation 1506, the item tracking device 104 filters the encoded vector library 128 based on the item type 1610. Referring to FIG. 16 as an example, the encoded vector library 128 comprises a plurality of entries 1602. Each entry 1602 corresponds with a different item 204 that can be identified by the item tracking device 104. Each entry 1602 may comprise an encoded vector 1606 that is linked with an item identifier 1604 and a plurality of feature descriptors 1608. An encoded vector 1606 comprises an array of numerical values. Each numerical value corresponds with and describes an attribute (e.g. item type, size, shape, color, etc.) of an item 204. An encoded vector 1606 may be any suitable length. For example, an encoded vector 1606 may have a size of 1×256, 1×512, 1×1024, or any other suitable length. The item identifier 1604 uniquely identifies an item 204. Examples of item identifiers 1604 include, but are not limited to, a product name, an SKU number, an alphanumeric code, a graphical code (e.g. a barcode), or any other suitable type of identifier. In this example, the item tracking device 104 uses the item type 1610 to filter out or remove any entries 1602 in the encoded vector library 128 that do not contain the same item type 1610. This process reduces the number of entries 1602 in the encoded vector library 128 that will be considered when identifying the item 204.

Returning to FIG. 15 at operation 1504, the item tracking device 104 proceeds to operation 1508 in response to determining that the feature descriptors 1608 do not identify an item type 1610. In this case, the item tracking device 104 checks for other types of feature descriptors 1608 that can be used to filter the entries 1602 in the encoded vector library 128. At operation 1508, the item tracking device 104 determines whether the feature descriptors 1608 identify a dominant color 1612 for the item 204. A dominant color 1612 identifies one or more colors that appear on the surface (e.g. packaging) of an item 204.

The item tracking device 104 proceeds to operation 1510 in response to determining that the feature descriptors 1608 identify a dominant color 1612 for the item 204. In this case, the item tracking device 104 proceeds to operation 1510 to reduce the number of entries 1602 in the encoded vector library 128 based on the dominant color 1612 of the item 204. At operation 1510, the item tracking device 104 filters the encoded vector library 128 based on the dominant color 1612 of the item 204. Here, the item tracking device 104 uses the dominant color 1612 to filter out or remove any entries 1602 in the encoded vector library 128 that do not contain the same dominant color 1612.

Returning to operation 1508, the item tracking device 104 proceeds to operation 1512 in response to determining that the feature descriptors 1608 do not identify a dominant color 1612 for the item 204. At operation 1512, the item tracking device 104 determines whether the feature descriptors 1608 identify dimensions 1614 for the item 204. The dimensions 1614 may identify the length, width, and height of an item 204. In some embodiments, the dimensions 1614 may be listed in ascending order.

The item tracking device 104 proceeds to operation 1514 in response to determining that the feature descriptors 1608 identify dimensions 1614 for the item 204. In this case, the item tracking device 104 proceeds to operation 1514 to reduce the number of entries 1602 in the encoded vector library 128 based on the dimensions 1614 of the item 204. At operation 1514, the item tracking device 104 filters the encoded vector library 128 based on the dimensions 1614 of the item 204. Here, the item tracking device 104 uses the dimensions 1614 to filter out or remove any entries 1602 in the encoded vector library 128 that do not contain the same dimensions 1614 as the item 204 or within a predetermined tolerance of the dimensions 1614 of the item 204. In some embodiments, this dimensions 1614 of the item 204 may be listed in ascending order to make the comparison easier between the dimensions 1614 of the item 204 and the dimensions 1614 of the item 204 in the encoded vector library 128.

Returning to operation 1512, the item tracking device 104 proceeds to operation 1516 in response to determining that the feature descriptors 1608 do not identify dimensions 1614 for the item 204. At operation 1516, the item tracking device 104 determines whether the feature descriptors 1608 identify a weight 1616 for the item 204. The weight 1616 identifies the weight of an item 204. The weight 1616 may be in pounds, ounces, litters, or any other suitable units.

The item tracking device 104 proceeds to operation 1518 in response to determining that the feature descriptors 1608 identify a weight 1616 for the item 204. In this case, the item tracking device 104 proceeds to operation 1518 to reduce the number of entries 1602 in the encoded vector library 128 based on the weight 1616 of the item 204.

At operation 1518, the item tracking device 104 filters the encoded vector library 128 based on the weight of the item 204. Here, the item tracking device 104 uses the weight 1616 to filter out or remove any entries 1602 in the encoded vector library 128 that do not contain the same weight 1616 as the item 204 or within a predetermined tolerance of the weight 1616 of the item 204.

In some embodiments, the item tracking device 104 may repeat a similar process to filter or reduce the number of entries 1602 in the encoded vector library 128 based on any other suitable type or combination of feature descriptors 1608.

Similarity Vectors

Figure 17:
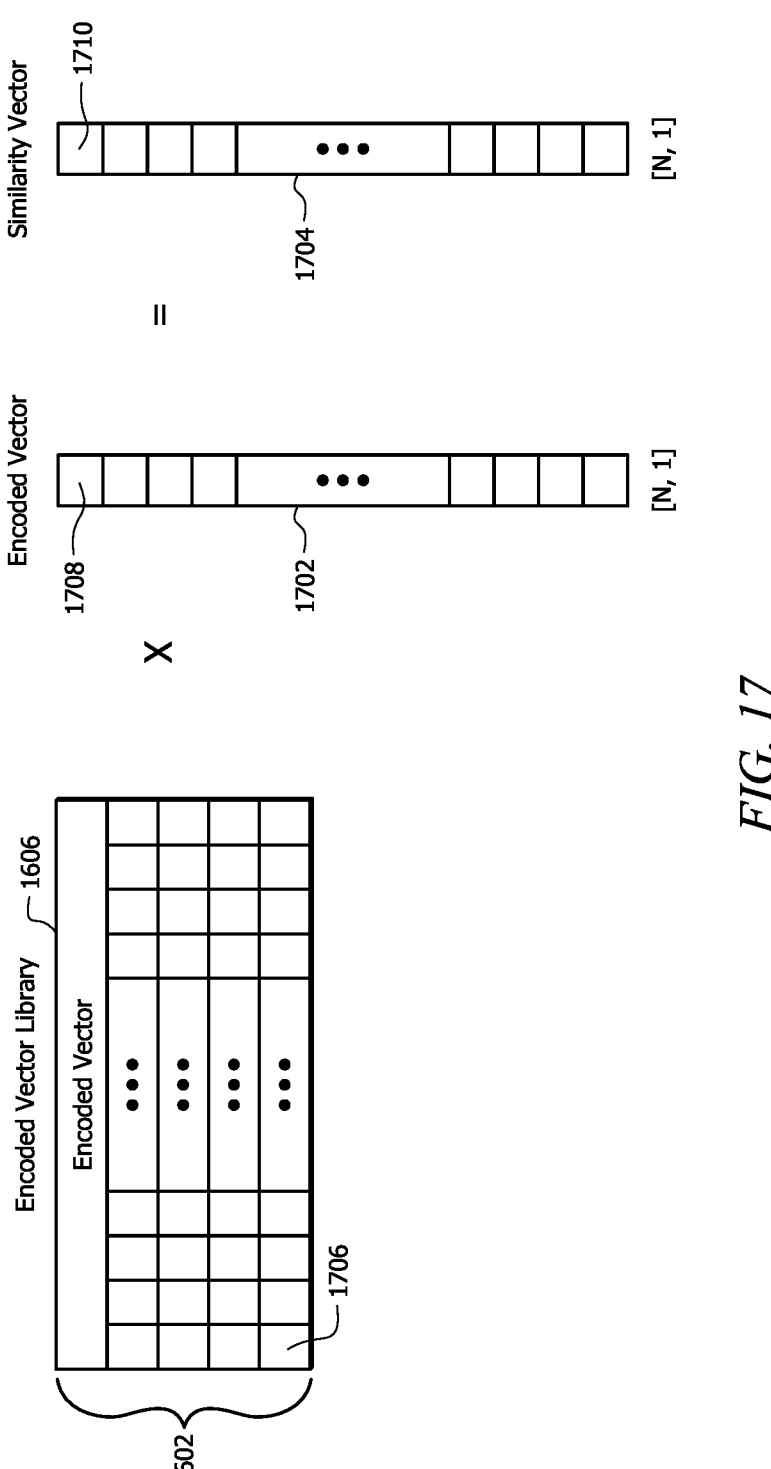
FIG. 17 is an example of a process for generating a similarity vector between an encoded vector and entries in the encoded vector library.

After filtering the encoded vector library 128 based on the feature descriptors 1608 of the item 204, the item tracking device 104 may generate a similarity vector 1704 for a received encoded vector 1702. A similarity vector 1704 comprises an array of numerical values 1710 where each numerical value 1710 indicates how similar the values in the received encoded vector 1702 are to the values in an encoded vector 1606 in the encoded vector library 128. In one embodiment, the item tracking device 104 may generate the similarity vector 1704 by using matrix multiplication between the received encoded vector 1702 and the encoded vectors 1606 in the encoded library 128. Referring to FIG. 17 as an example, the dimensions of the encoded vectors 1606 in the encoded vector library 128 may be M-by-N, where M is the number of entries 1602 in the encoded vector library 128, for example, after filtering the encoded vector library 128, and N is the length of each encoded vector 1606, which corresponds with the number of numerical values 1706 in an encoded vector 1606. The encoded vector 1702 for an unidentified item 204 may have the dimensions of N-by-1 where is N is the length of the encoded vector 1702, which corresponds with the number of numerical values 1708 in the encoded vector 1702. In this example, the item tracking device 104 may generate the similarity vector 1704 by performing matrix multiplication between the encoded vector 1702 and the encoded vectors 1606 in the encoded vector library 128. The resulting similarity vector 1704 has the dimensions of N-by-1 where N is the length of the similarity vector 1704 which is the same length as the encoded vector 1702. Each numerical value 1710 in the similarity vector 1704 corresponds with an entry 1602 in the encoded vector library 128. For example, the first numerical value 1710 in the similarity vector 1704 indicates how similar the values in the encoded vector 1702 are to the values in the encoded vector 1606 in the first entry 1602 of the encoded vector library 128, the second numerical value 1710 in the similarity vector 1704 indicates how similar the values in the encoded vector 1702 are to the values in the encoded vector 1606 in the second entry 1602 of the encoded vector library 128, and so on.

After generating the similarity vector 1704, the item tracking device 104 can identify which entry 1602, or entries 1602, in the encoded vector library 128 most closely matches the encoded vector 1702 for the identified item 204. In one embodiment, the entry 1602 that is associated with the highest numerical value 1710 in the similarity vector 1704 corresponds is the entry 1602 that closest matches the encoded vector 1702 for the item 204. After identifying the entry 1602 from the encoded vector library 128 that most closely matches the encoded vector 1702 for the identified item 204, the item tracking device 104 may then identify the item identifier 1604 that is associated with the identified entry 1602. Through this process, the item tracking device 104 is able to determine which item 204 from the encoded vector library 128 corresponds with the unidentified item 204 based on its encoded vector 1702. The item tracking device 104 then output or use the identified item identifier 1604 for other processes such as process 2300 that is described in FIG. 23.

Item Dimensioning Process Using Point Cloud Information

FIG. 18 is a flowchart of an embodiment of an item dimensioning process 1800 using point cloud information. The item tracking system 100 may employ process 1800 to determine the dimensions 1614 of an item 204 that is placed on the platform 202. This process generally involves first capturing 3D point cloud data for an item 204 using multiple 3D sensors 110 and then combining the 3D point cloud data from all of the 3D sensors 110 to generate a more complete point cloud representation of the item 204. After combining the point cloud data from the 3D sensors 110, the item tracking device 104 then determines the dimensions 1614 of the item 204 based on the new point cloud data representation. This process allows the item tracking device 104 to determine the dimensions 1614 of an item 204 without having a user take physical measurements of the item 204.

Figure 19:
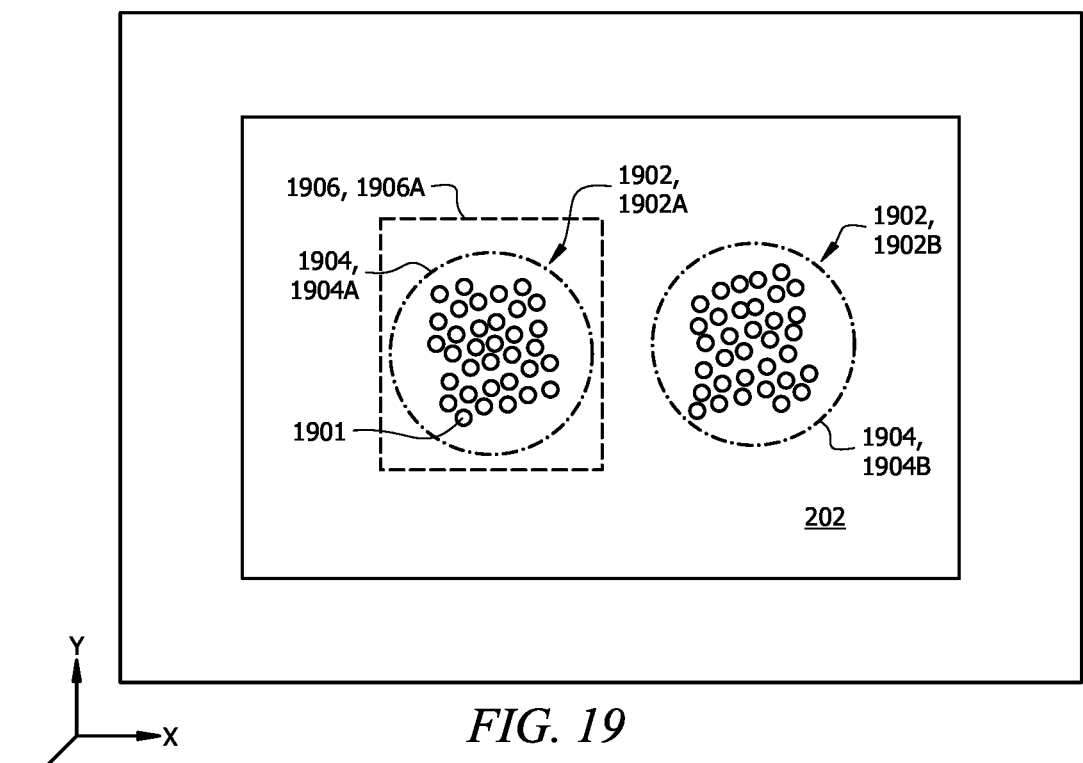
FIG. 19 is an example of an overhead view of point cloud data from a 3D sensor for items on the platform of the imaging device.

At operation 1802, the item tracking device 104 captures point cloud data 1902 of items 204 on the platform 202 using an overhead 3D sensor 110. The point cloud data 1902 comprises a plurality of data points 1901 within a 3D space. Each data point 1901 is associated with an (x, y, z) coordinate that identifies the location of the data point 1901 within the 3D space. In general, the point cloud data 1902 corresponds with the surfaces of objects that are visible to the 3D sensor 110. Referring to FIG. 19 as an example, FIG. 19 illustrates an example of point cloud data 1902 that is captured using an overhead 3D sensor 110. In this example, the 3D sensor 110 is positioned directly above the platform 202 and is configured to capture point cloud data 1902 that represents upward-facing surfaces of the items 204 on the platform 202. The 3D sensor 110 captures point cloud data 1902A that corresponds with a first item 204 and point cloud data 1902B that corresponds with a second item 204.

Returning to FIG. 18 at operation 1804, the item tracking device 104 segments the point cloud data 1902 based on clusters 1904 within the point cloud data 1902. In one embodiment, the item tracking device 104 may identify clusters 1904 within the point cloud data 1902 based on the distance between the data points 1901 in the point cloud data 1902. For example, the item tracking device 104 may use a distance threshold value to identify data points 1901 that are members of the same cluster 1904. In this example, the item tracking device 104 may compute the Euclidian distance between pairs of data points 1901 to determine whether the data points 1901 should be members of the same cluster 1904. For instance, when a pair of data points 1901 are within the distance threshold value from each other, the item tracking device 104 may associate the data points 1901 with the same cluster 1904. When the distance between a pair of data points 1901 is greater than the distance threshold value, the item tracking device 104 determines that the data points 1901 are not members of the same cluster 1904. The item tracking device 104 may repeat this process until one or more clusters 1904 have been identified within the point cloud data 1902. In other examples, the item tracking device 104 may cluster the data points 1901 using k-means clustering or any other suitable clustering technique. After identifying clusters 1904 within the point cloud data 1902, the item tracking device 104 segments the point cloud data 1902 based on the identified clusters 1904. Segmenting the point cloud data 1902 splits the data points 1901 in the point cloud data 1902 into smaller groups of point cloud data 1902 based on the identified clusters 1904. Each cluster 1904 of data points 1901 corresponds with a different item 204 that is placed on the platform 202.

At operation 1806, the item tracking device 104 selects a first item 204 from the segmented point cloud data 1902. Here, the item tracking device 104 identifies one of the items 204 on the platform 202 to begin aggregating the point cloud data 1902 from other 3D sensors 110 that are associated with the first item 204. The item tracking device 104 may iteratively select each item 204 from the platform 202. Returning to the example in FIG. 19, the item tracking device 104 may select a first item 204 that corresponds with cluster 1904A.

Returning to FIG. 18 at operation 1808, the item tracking device 104 identifies a region-of-interest 1906 for the first item 204 within the point cloud data 1902. The region-of-interest 1906 identifies a region within the 3D space. For example, the region-of-interest 1906 may define a range of x-values, y-values, and/or z-values within the 3D space. Returning to the example in FIG. 19, the item tracking device 104 may identify a region-of-interest 1906A that contains the point cloud data 1902A for the first item 204. In this example, the item tracking device 104 identifies the range of x-values, y-values, and z-values within the 3D space that contains the point cloud data 1902A.

Returning to FIG. 18 at operation 1810, the item tracking device 104 extracts point cloud data 1902 from the identified region-of-interest 1906. Here, the item tracking device 104 identifies and extracts the point cloud data 1902 from within the region-of-interest 1906 for the first item 204. By extracting the point cloud data 1902 within the region-of-interest 1906, the item tracking device 104 is able to isolate the data points 1901 for the first item 204 in the point cloud data 1902 from the data points 1901 that are associated with other items 204 on the platform 202. Returning to the example in FIG. 19, the item tracking device 104 may extract the data points 1901 (i.e. point cloud data 1902A) within the region-of-interest 1906A from the point cloud data 1902 for all the items 204 on the platform 202.

Returning to FIG. 18 at operation 1812, the item tracking device 104 selects another 3D sensor 110. After extracting point cloud data 1902 for the first item 204 from the overhead 3D sensor 110, the item tracking device 104 may repeat the same process to extract additional point cloud data 1902 for the first item 204 from the perspective of other 3D sensors 110. Each 3D sensor 110 is only able to capture point cloud data 1902 for the portion of the first item 204 that is visible to the 3D sensor 110. By capturing point cloud data 1902 from multiple 3D sensors 110 with different views of the first item 204, the item tracking device 104 is able to generate a more complete point cloud data representation of the first item 204. The item tracking device 104 may iteratively select a different 3D sensor 110 from among the 3D sensors 110 of the imaging device 102.

Figure 20:
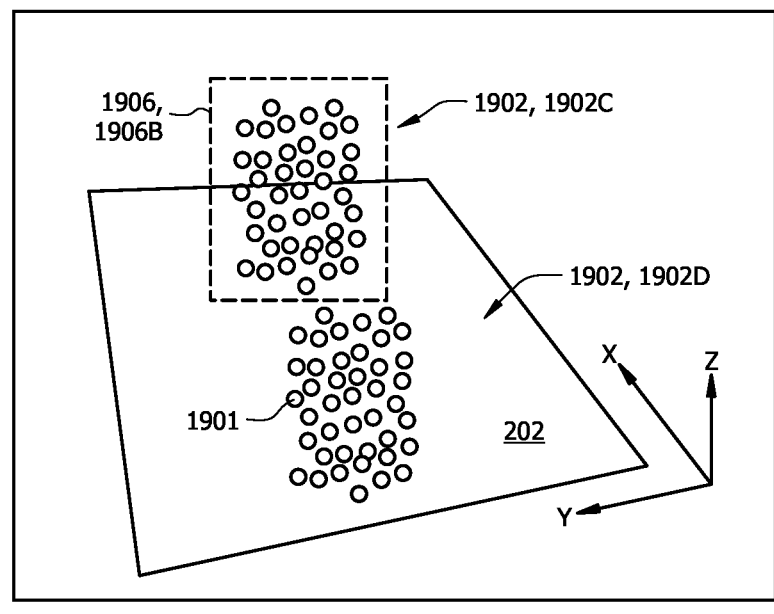
FIG. 20 is an example of a perspective view of point cloud data from a 3D sensor for items on the platform of the imaging device.

At operation 1814, the item tracking device 104 captures point cloud data 1902 using the selected 3D sensor 110. Here, the item tracking device 104 uses a process similar to the process described in operation 1802 to capture point cloud data 1902 using the selected 3D sensor 110. Referring to FIG. 20 as an example, the item tracking device 104 may select a 3D sensor 110 that has a side perspective view of the items 204 on the platform 202. In other words, the selected 3D sensor 110 captures point cloud data 1902 that represents side-facing surfaces of the items 204 on the platform 202. In this example, the 3D sensor 110 captures point cloud data 1902C that corresponds with the first item 204 and point cloud data 1902D that corresponds with the second item 204.

Returning to FIG. 18 at operation 1816, the item tracking device 104 identifies a region-of-interest 1906 corresponding with the first item 204 for the selected 3D sensor 110. In one embodiment, the item tracking device 104 may use a homography 608 to determine the region-of-interest 1906 for the selected 3D sensor 110 based on the region-of-interest 1906 identified by the overhead 3D sensor 110. In this case, the item tracking device 104 may identify a homography 608 that is associated with the selected 3D sensor 110. The homography 608 is configured similarly to as described in FIGS. 12A and 12B. After identifying the homography 608 that is associated with the 3D sensor 110, the item tracking device 104 uses the homography 608 to convert the range of x-values, y-values, and z-values within the 3D space that are associated with the region-of-interest 1906 for the overhead 3D sensor 110 to a corresponding range of x-values, y-values, and z-values within the 3D space that are associated with the selected 3D sensor 110. In other examples, the item tracking device 104 may use any other suitable technique for identifying a region-of-interest 1906 for the first item 204. For example, the item tracking device 104 may use a process similar to the process described in operation 1808. Returning to the example in FIG. 20, the item tracking device 104 identifies a region-of-interest 1906B that contains the point cloud data 1902C for the first item 204. In this example, the item tracking device 104 identifies the range of x-values, y-values, and z-values within the 3D space that contains the point cloud data 1902C.

Returning to FIG. 18 at operation 1818, the item tracking device 104 extracts point cloud data 1902 from the region-of-interest 1906 corresponding with the first item 204. Here, the item tracking device 104 identifies and extracts the point cloud data 1902 from within the identified region-of-interest 1906 for the first item 204. Returning to the example in FIG. 20, the item tracking device 104 may extract the data points 1901 (i.e. point cloud data 1902C) within the region-of-interest 1906B from the point cloud data 1902 for all the items 204 on the platform 202.

Returning to FIG. 18 at operation 1820, the item tracking device 104 determines whether to select another 3D sensor 110. Here, the item tracking device 104 determines whether to collect additional point cloud data 1902 for the first item 204. In one embodiment, the item tracking device 104 may determine whether to select another 3D sensor 110 based on the amount of point cloud data 1902 that has been collected. For example, the item tracking device 104 may be configured to collect point cloud data 1902 from a predetermined number (e.g. three) of 3D sensors 110. In this example, the item tracking device 104 may keep track of how many sets of point cloud data 1902 have been collected. Each set of collected point cloud data 1902 corresponds with point cloud data 1902 that has been obtained from a 3D sensor 110. The item tracking device 104 then compares the number of collected sets of point cloud data 1902 to the predetermined number of 3D sensors 110. The item tracking device 104 determines to select another 3D sensor 110 when the number of collected sets of point cloud data 1902 is less than the predetermined number of 3D sensors 110.

As another example, the item tracking device 104 may determine whether to select another 3D sensor 110 to collect additional point cloud data 1902 based on the number of data points 1901 that have been collected for the first item 204. In this example, the item tracking device 104 may determine the number of data points 1901 that have been obtained from all of the extracted point cloud data 1902 for the first item 204. The item tracking device 104 compares the number of obtained data points 1901 to a predetermined data point threshold value. The data threshold value identifies a minimum number of data points 1901 that should be collected for the first item 204. The item tracking device 104 determines to select another 3D sensor 110 when the number of collected data points 1901 is less than the predetermined data point threshold value. In other examples, the item tracking device 104 may determine whether to select another 3D sensor 110 to collect additional point cloud data 1902 based on any other suitable type of criteria.

Figure 21:
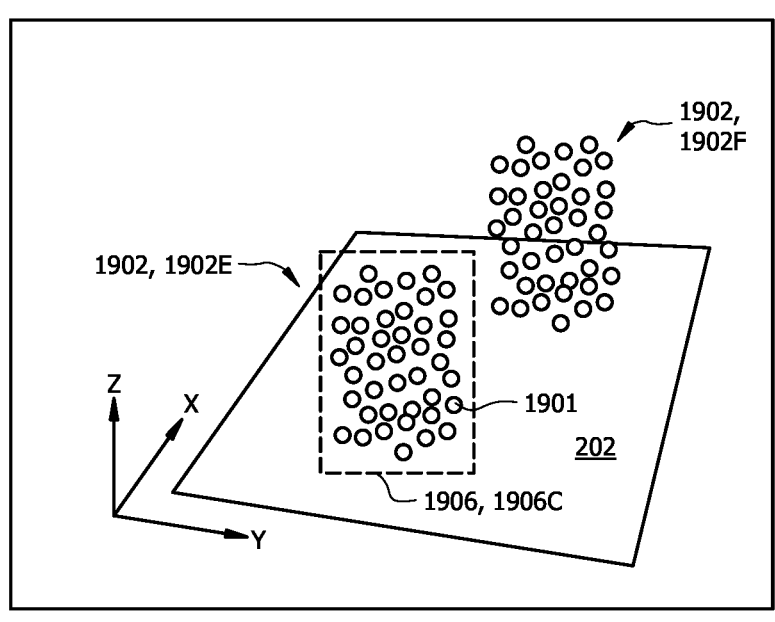
FIG. 21 is another example of a perspective view of point cloud data from a 3D sensor for items on the platform of the imaging device.

The item tracking device 104 returns to operation 1812 in response to determining to select another 3D sensor. In this case, the item tracking device 104 returns to operation 1812 to select another 3D sensor 110 and to obtain additional point cloud data 1902 for the first item 204. Referring to FIG. 21 as an example, the item tracking device 104 may determine to select another 3D sensor 110 that has a side perspective view of the items 204 on the platform 202. In this example, the 3D sensor 110 captures point cloud data 1902E that corresponds with the first item 204 and point cloud data 1902F that corresponds with the second item 204. The item tracking device 104 then identifies a region-of-interest 1906C that contains the point cloud data 1902E for the first item 204. In this example, the item tracking device 104 identifies the range of x-values, y-values, and z-values within the 3D space that contains the point cloud data 1902E. After identifying the region-of-interest 1906C, the item tracking device 104 extracts the data points 1901 (i.e. point cloud data 1902E) within the region-of-interest 1906C from the point cloud data 1902 for all the items 204 on the platform 202. The item tracking device 104 may repeat this process for any other selected 3D sensors 110.

Returning to FIG. 18 at operation 1820, the item tracking device 104 proceeds to operation 1822 in response to determining to not select another 3D sensor 110. At operation 1822, the item tracking device 104 combines the extracted point cloud data 1902 for the first item 204. Here, the item tracking device 104 merges all of the collected point cloud data 1902 into a single set of point cloud data 1902. By combining the point cloud data 1902 from multiple 3D sensors 110, the item tracking device 104 can generate a more complete point cloud data representation of the first item 204 that can be used for determining the dimensions

Figure 22:
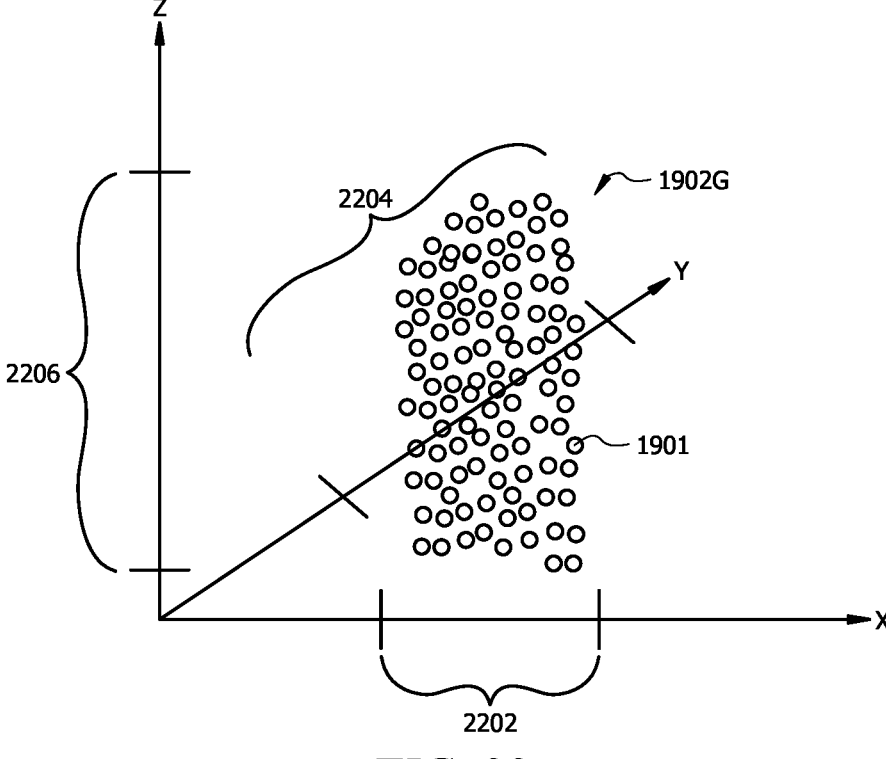
FIG. 22 is example of combined point cloud data for an item from multiple 3D sensors.

1614 of the first item 204. Referring to FIG. 22 as an example, the item tracking device 104 may combine point cloud data 1902A, 1902C, and 1902E into a single set of point cloud data 1902G. The combined point cloud data 1902G contains all of the data points 1901 from point cloud data 1902A, 1902C, and 1902E.

Returning to FIG. 18 at operation 1824, the item tracking device 104 determines the dimensions 1614 of the first item 204 based on the combined point cloud data 1902. In one embodiment, the item tracking device 104 may determine the dimensions 1614 of the item 204 by determining the distance between data points 1901 at the edges of the combined point cloud data 1902. For example, the item tracking device 104 may identify a pair of data points 1901 on opposing ends of the combined point cloud data 1902 and then compute the distance (e.g. Euclidean distance) between the pair of data points 1901. In this example, the distance between the data points 1901 may correspond with the length 2202, width 2204, or height 2206 of the first item 204. In other examples, the item tracking device 104 may determine the dimensions 1614 of the first item 204 using any other suitable technique. Returning to the example in FIG. 22, the item tracking device 104 may determine a length 2202, a width 2204, and a height 2206 for the first item 204 based on the combined point cloud data 1902G.

Returning to FIG. 18 at operation 1826, the item tracking device 104 determines whether to determine the dimensions 1614 for another item 204. In one embodiment, the item tracking device 104 may be configured to determine the dimensions 1614 for all of the items 204 that are on the platform 202. In this case, the item tracking device 104 may determine whether the dimensions 1614 for all of the items 204 on the platform 202 have been determined. The item tracking device 104 will determine the dimensions 1614 for another item 204 when the dimensions 1614 of an item 204 are still unknown and have not yet been determined. In other examples, the item tracking device 104 may determine whether to determine the dimensions 1614 for another item 204 based on any other suitable criteria.

The item tracking device 104 returns to operation 1806 in response to determining to find the dimensions 1614 for another item 204. In this case, the item tracking device 104 returns to operation 1806 to collect point cloud data 1902 for a different item 204. The item tracking device 104 may then repeat the same process of aggregating point cloud data 1902 from multiple 3D sensors 110, combining the point cloud data 1902, and then determining the dimensions 1614 of the item 204 based on the combined point cloud data 1902.

In response to determining not to determine the dimensions 1614 for another item 204, the item tracking device 104 may store the dimensions 1614 for the first item 204. For example, the item tracking device 104 may obtain an item identifier 1604 for the first item 204 and then generate an entry 1602 in the encoded vector library 128 that associates the determined length 2202, width 2204, and height 2206 with the first item 204 as feature descriptors 1608. In some embodiments, the item tracking device 104 may store the length 2202, width 2204, and height 2206 for the first item 204 in ascending order when generating the entry 1602.

In other embodiments, the item tracking device 104 may output or store the determined length 2202, width 2204, and height 2206 for the first item 204 as feature descriptors 1608 for other processes such as item identification. For instance, the item tracking device 104 may use the feature descriptors 1608 to help identify the first item 204 using a process similar to process 2300 that is described in FIG. 23.

An Item Tracking Process Using Encoded Vectors

FIG. 23 is a flowchart of an embodiment of an item tracking process 2300 for using encoded vectors 1606 for the item tracking system 100. The item tracking system 100 may employ process 2300 to identify items 204 that are placed on the platform 202 of an imaging device 102 and to assign the items 204 to a particular user. As an example, the item tracking system 100 may employ process 2300 within a store to add items 204 to a user's digital cart for purchase. As another example, the item tracking system 100 may employ process 2300 within a warehouse or supply room to check out items to a user. In other examples, the item tracking system 100 may employ process 2300 in any other suitable type of application where items 204 are assigned or associated with a particular user. This process allows the user to obtain items 204 from a space without having the user scan or otherwise identify the items 204 they would like to take.

At operation 2302, the item tracking device 104 performs auto-exclusion for the imaging device 102. The item tracking device 104 may perform auto-exclusion using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 to capture reference images 122 and reference depth images 124, respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 of the platform 202 based on differences in depth values between subsequent depth images 124 and the reference depth image 124 and/or differences in the pixel values between subsequent images 122 and the reference image 122.

At operation 2304, the item tracking device 104 determines whether a hand has been detected above the platform 202. In one embodiment, the item tracking device 104 may use a process similar to process 700 that is described in FIG. 7 for detecting a triggering event that corresponds with a user's hand being detected above the platform 202. For example, the item tracking device 104 may check for differences between a reference depth image 124 and a subsequent depth image 124 to detect the presence of an object above the platform 202. The item tracking device 104 then checks whether the object corresponds with a user's hand or an item 204 that is placed on the platform 202. The item tracking device 104 determines that the object is a user's hand when a first portion of the object (e.g., a user's wrist or arm) is outside a region-of-interest 802 for the platform 202 and a second portion of the object (e.g., a user's hand) is within the region-of-interest 802 for the platform 202. When this condition is met, the item tracking device 104 determines that a user's hand has been detected above the platform 202. In other examples, the item tracking device 104 may use proximity sensors, motion sensors, or any other suitable technique for detecting whether a user's hand has been detected above the platform 202.

The item tracking device 104 remains at operation 2304 in response to determining that a user's hand has not been detected above the platform 202. In this case, the item tracking device 104 remains at operation 2304 to keep checking for the presence of a user's hand as a triggering event. The item tracking device 104 proceeds to operation 2306 in response to determining that a user's hand has been detected. In this case, the item tracking device 104 uses the presence of a user's hand as a triggering event and proceeds to operation 2306 to begin identifying any items 204 that the user has placed on the platform 202.

At operation 2306, the item tracking device 104 performs segmentation using an overhead view of the platform 202. In one embodiment, the item tracking device 104 may perform segmentation using a depth image 124 from a 3D sensor 110 that is configured with overhead or perspective view of the items 204 on the platform 202. In this example, the item tracking device 104 captures an overhead depth image 124 of the items 204 that are placed on the platform 202. The item tracking device 104 may then use a depth threshold value to distinguish between the platform 202 and items 204 that are placed on the platform 202 in the captured depth image 124. For instance, the item tracking device 104 may set a depth threshold value that is just above the surface of the platform 202. This depth threshold value may be determined based on the pixel values corresponding with the surface of the platform 202 in the reference depth images 124 that were captured during the auto-exclusion process in operation 2302. After setting the depth threshold value, the item tracking device 104 may apply the depth threshold value to the captured depth image 124 to filter out or remove the platform 202 from the depth image 124. After filtering the depth image 124, the remaining clusters of pixels correspond with items 204 that are placed on the platform 202. Each cluster of pixels corresponds with a different item 204. After identifying the clusters of pixels for each item 204, the item tracking device 104 then counts the number of items 204 that are placed on the platform 202 based on the number of pixel clusters that are present in the depth image 124. This number of items 204 is used later to determine whether all of items 204 on the platform 202 have been identified.

At operation 2308, the item tracking device 104 captures images 122 of the items 204 on the platform 202. Here, the item tracking device 104 captures multiple images 122 of the items 204 on the platform 202 using multiple cameras 108. For example, the item tracking device 104 may capture images 122 with an overhead view, a perspective view, and/or a side view of the items 204 on the platform 202. The item tracking device 104 may also capture multiple depth images 124 of the items 204 on the platform 202 using one or more 3D sensors 110.

At operation 2310, the item tracking device 104 generates cropped images 122 of the items 204 in each image 122. In one embodiment, the item tracking device 104 generates a cropped image 122 of an item 204 based on the features of the item 204 that are present in an image 122. The item tracking device 104 may first identify a region-of-interest (e.g., a bounding box) for an item 204 based on the detected features of the item 204 that are present in an image 122 and then may crop the image 122 based on the identified region-of-interest. The region-of-interest comprises a plurality of pixels that correspond with the item 204 in a captured image 122 or depth image 124 of the item 204 on the platform 202. The item tracking device 104 may employ one or more image processing techniques to identify a region-of-interest for an item 204 within an image 122 based on the features and physical attributes of the item 204. For example, the item tracking device 104 may employ object detection and/or OCR to identify text, logos, branding, colors, barcodes, or any other features of an item 204 that can be used to identify the item 204. In this case, the item tracking device 104 may process pixels within an image 122 to identify text, colors, barcodes, patterns, or any other characteristics of an item 204. The item tracking device 104 may then compare the identified features of the item 204 to a set of features that correspond with different items 204. For instance, the item tracking device 104 may extract text (e.g. a product name) from an image 122 and may compare the text to a set of text that is associated with different items 204. As another example, the item tracking device 104 may determine a dominant color within an image 122 and may compare the dominant color to a set of colors that are associated with different items 204. As another example, the item tracking device 104 may identify a barcode within an image 122 and may compare the barcode to a set of barcodes that are associated with different items 204. As another example, the item tracking device 104 may identify logos or patterns within the image 122 and may compare the identified logos or patterns to a set of logos or patterns that are associated with different items 204. In other examples, the item tracking device 104 may identify any other suitable type or combination of features and compare the identified features to features that are associated with different items 204.

After comparing the identified features of the item 204 to the set of features that are associated with different items 204, the item tracking device 104 then determines whether a match is found. The item tracking device 104 may determine that a match is found when at least a meaningful portion of the identified features match features that correspond with an item 204. In response to determining that a meaningful portion of features within an image 122 match the features of an item 204, the item tracking device 104 may identify a region-of-interest that corresponds with the matching item 204.

After identifying a region-of-interest for the item 204, the item tracking device 104 crops the image 122 by extracting the pixels within the region-of-interest for the item 204 from the image 122. By cropping the image 122, the item tracking device 104 generates a second image 122 that comprises the extracted pixels within the region-of-interest for the item 204 from the original image 122. This process allows the item tracking device 104 to generate a new image 122 that contains an item 204 that is on the platform 202. The item tracking device 104 repeats this process for all of the items 204 within a captured image 122 and all of the captured images 122 of the items 204 on the platform 202. The result of this process is a set of cropped images 122 that each correspond with an item 204 that is placed on the platform 202.

In some embodiments, the item tracking device 104 may use a process similar to process 900 in FIG. 9 to generate the cropped images 122 of the items 204. In some embodiments, operation 2310 may be optional and omitted. For example, operation 2310 may be omitted when the item tracking device 104 detects that only one item 204 is placed on the platform 202.

At operation 2312, the item tracking device 104 obtains an encoded vector 1606 for each item 204. An encoded vector 1606 comprises an array of numerical values. Each numerical value in the encoded vector 1606 corresponds with and describes an attribute (e.g., item type, size, shape, color, etc.) of an item 204. An encoded vector 1606 may be any suitable length. The item tracking device 104 obtains an encoded vector 1606 for each item 204 by inputting each of the images 122 (e.g., cropped images 122) from operation 2310 into the machine learning model 126. The machine learning model 126 is configured to output an encoded vector 1606 for an item 204 based on the features or physical attributes of the item 204 that are present in the image 122 of the item 204. Examples of physical attributes include, but are not limited to, an item type, a size, shape, color, or any other suitable type of attribute of the item 204. After inputting the image 122 of the item 204 into the machine learning model 126, the item tracking device 104 receives an encoded vector 1606 for the item 204. The item tracking device 104 repeats this process to obtain an encoded vector 1606 for each item 204 on the platform 202.

At operation 2314, the item tracking device 104 identifies each item 204 in the encoded vector library 128 based on their corresponding encoded vector 1606. Here, the item tracking device 104 uses the encoded vector 1606 for each item 204 to identify the closest matching encoded vector 1606 in the encoded vector library 128. In some embodiments, the item tracking device 104 may first reduce the search space within the encoded vector library 128 before attempting to identify an item 204. In this case, the item tracking device 104 may obtain or identify feature descriptors 1608 for the item 204 using a process similar to the process described in operation 1104 of FIG. 11. Each of the feature descriptors 1608 describes the physical characteristics of an item 204. Examples of feature descriptors 1608 include, but are not limited to, an item type 1610, a dominant color 1612, dimensions 1614, weight 1616, or any other suitable type of descriptor that describes an item 204. The item tracking device 104 may employ object detection and/or OCR to identify text, logos, branding, colors, barcodes, or any other features of an item 204 that can be used to identify the item 204. The item tracking device 104 may determine the dimensions of the item 204 using a process similar to process 1800 that is described in FIG. 18. The item tracking device 104 may determine the weight of the item 204 using a weight sensor 112. In other embodiments, the item tracking device 104 may use any other suitable process for determining feature descriptors 1608 for the item 204. After obtaining feature descriptor 1608 for an item 204, the item tracking device 104 may filter or remove the entries 1602 from consideration in the encoded vector library 128 using a process similar to process 1500 in FIG. 15. After filtering the entries 1602 in the encoded vector library 128, the item tracking device 104 may then identify the closest matching encoded vector 1606 in the encoded vector library 128 to the encoded vector 1606 for an unidentified item 204. This process reduces the amount of time required to search for a corresponding entry 1602 in the encoded vector library 128 as well as improves the accuracy of the results from identifying an entry 1602 in the encoded vector library 128.

In one embodiment, the item tracking device 104 identifies the closest matching encoded vector 1606 in the encoded vector library 128 by generating a similarity vector 1704 between the encoded vector 1606 for an unidentified item 204 and the remaining encoded vectors 1606 in the encoded vector library 128. The similarity vector 1704 comprises an array of numerical values 1710 where each numerical value 1710 indicates how similar the values in the encoded vector 1606 for the item 204 are to the values in an encoded vector 1606 in the encoded vector library 128. In one embodiment, the item tracking device 104 may generate the similarity vector 1704 by using a process similar to the process described in FIG. 17. In this example, the item tracking device 104 uses matrix multiplication between the encoded vector 1606 for the item 204 and the encoded vectors 1606 in the encoded vector library 128. Each numerical value 1710 in the similarity vector 1704 corresponds with an entry 1602 in the encoded vector library 128. For example, the first numerical value 1710 in the similarity vector 1704 indicates how similar the values in the encoded vector 1702 are to the values in the encoded vector 1606 in the first entry 1602 of the encoded vector library 128, the second numerical value 1710 in the similarity vector 1704 indicates how similar the values in the encoded vector 1702 are to the values in the encoded vector 1606 in the second entry 1602 of the encoded vector library 128, and so on.

After generating the similarity vector 1704, the item tracking device 104 can identify which entry 1602, or entries 1602, in the encoded vector library 128 most closely matches the encoded vector 1606 for the item 204. In one embodiment, the entry 1602 that is associated with the highest numerical value 1710 in the similarity vector 1704 corresponds is the entry 1602 that most closely matches the encoded vector 1606 for the item 204. After identifying the entry 1602 from the encoded vector library 128 that most closely matches the encoded vector 1606 for the item 204, the item tracking device 104 may then identify the item identifier 1604 from the encoded vector library 128 that is associated with the identified entry 1602. Through this process, the item tracking device 104 is able to which item 204 from the encoded vector library 128 corresponds with the item 204 based on its encoded vector 1606. The item tracking device 104 then outputs the identified item identifier 1604 for the identified item 204. For example, the item tracking device 104 may output the identified item identifier 1604 for the identified item 204 by adding the item identifier 1604 to a list of identified items 204 that is on a graphical user interface. The item tracking device 104 repeats this process for all of the encoded vectors 1606 that were obtained in operation 2312.

At operation 2316, the item tracking device 104 determines whether all of the items 204 have been identified. Here, the item tracking device 104 determines whether the number of identified items 204 matches the number of items 204 that were detected on the platform 202 in operation 2306. The item tracking device 104 determines that all of the items 204 have been identified when the number of identified items 204 matches the number of items 204 that were detected on the platform 202. Otherwise, the item tracking device 104 determines that one or more items 204 have not been identified when the number of identified items 204 does not match the number of items 204 that were detected on the platform 202.

Figure 24:
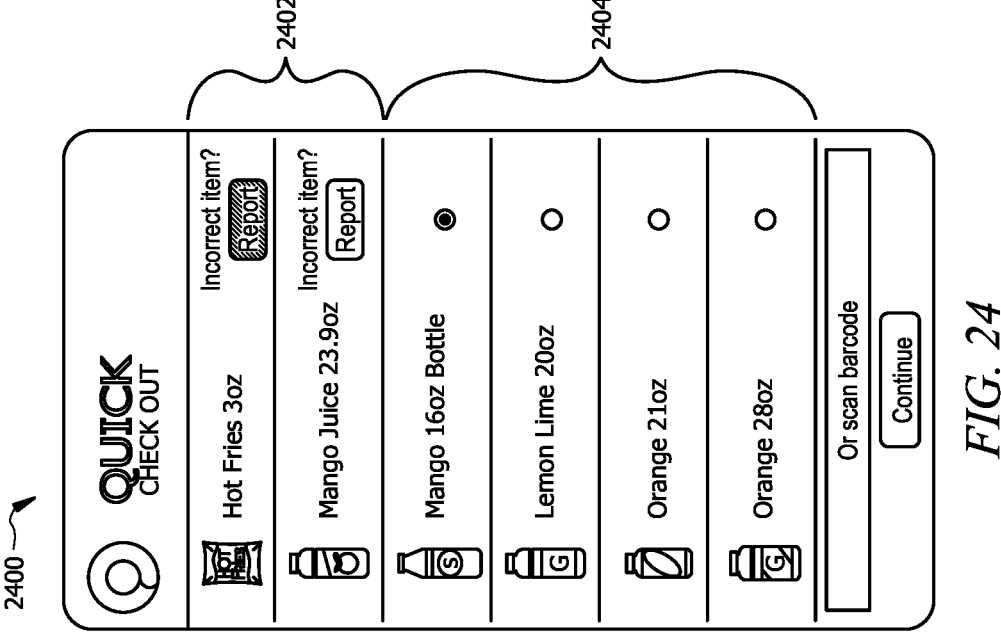
FIG. 24 is an example of a graphical user interface displaying items that are detected on the platform of the imaging device.

The item tracking device 104 proceeds to operation 2318 in response to determining that one or more items 204 have not been identified. In this case, the item tracking device 104 proceeds to operation 2318 to ask the user to identify the one or more items 204 that have not been identified. At operation 2318, the item tracking device 104 outputs a prompt requesting the user to identify one or more items 204 on the platform 202. In one embodiment, the item tracking device 104 may request for the user to identify an item 204 from among a set of similar items 204. Referring to FIG. 24 as an example, the item tracking device 104 may output a screen 2400 that displays items 204 that were detected (shown as display elements 2402) as well as any items 204 that were not identified. In this example, the screen 2400 displays the recommendations (shown as display elements 2404) for other similar items 204 in the event that an item 204 is not identified. In one embodiment, the item recommendations may correspond with other items 204 that were identified using the similarity vector 1704. For example, the item recommendations may comprise items 204 that are associated with the second and third highest values in the similarity vector 1704. The user may provide a user input to select the any items 204 that were not identified.

Figure 25:
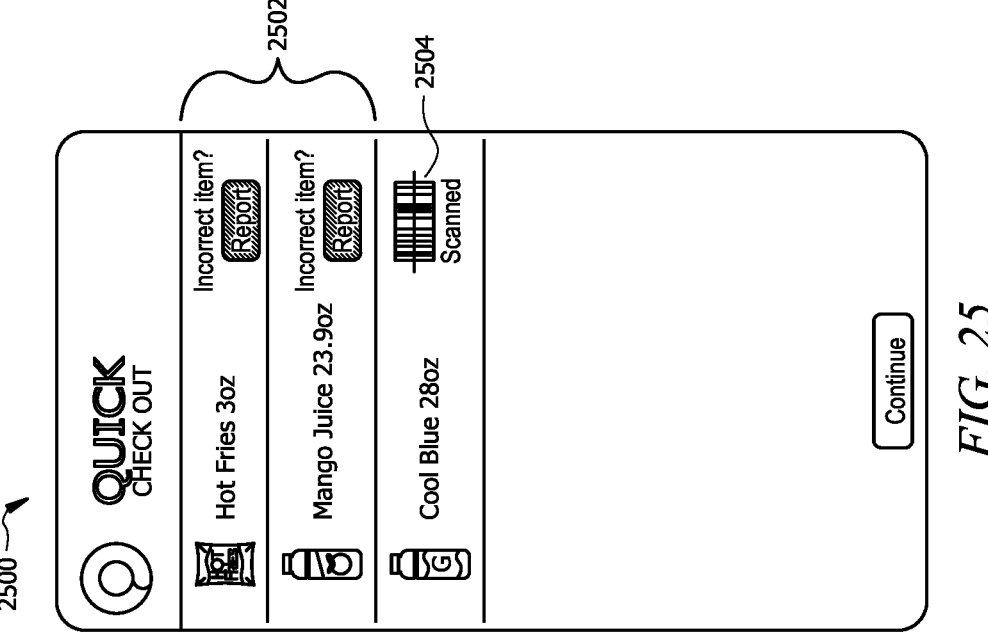
FIG. 25 is another example of a graphical user interface displaying items that are detected on the platform of the imaging device.

In some embodiments, the item tracking device 104 may prompt the user scan any items 204 that were not identified. For example, the item tracking device 104 may provide instructions for the user to scan a barcode of an item 204 using a barcode scanner. In this case, the item tracking device 104 may use the graphical user interface to display a combination of items 204 that were detected on the platform 202 as well as items 204 that were manually scanned by the user. Referring to FIG. 25 as an example, the item tracking device 104 may output a screen 2500 that displays items 204 (shown as display elements 2502) that were detected on the platform 202 and items 204 (shown as display elements 2504) that were manually scanned by the user.

Returning to FIG. 23 at operation 2316, the item tracking device 104 proceeds to operation 2320 in response to determining that all of the items 204 have been identified. At operation 2320, the item tracking device 104 determines whether there are any additional items 204 to detect for the user. In some embodiments, the user may provide a user input that indicates that the user would like to add additional items 204 to the platform 202. In other embodiments, the item tracking device 104 may use the presence of the user's hand removing and adding items 204 from the platform 202 to determine whether there are additional items 204 to detect for the user. The item tracking device 104 returns to operation 2304 in response to determining that there are additional items 204 to detect. In this case, the item tracking device 104 returns to operation 2304 to begin detecting additional items 204 that the user places on the platform 202. The item tracking device 104 proceeds to operation 2322 in response to determining that there are no additional items 204 to detect for the user. In this case, the item tracking device 104 proceeds to operation 2322 to associate the detected items 204 with the user.

Figure 26:
FIG. 26 is an example a graphical user interface displaying a confirmation message for removing an item from the platform of the imaging device.

Before associating the items 204 with the user, the item tracking device 104 may allow the user to remove one or more items 204 from the list of identified items 204 by selecting the items 204 on the graphical user interface. Referring to FIG. 26 as an example, the item tracking device 104 may receive a user input that identifies an item 204 to remove from the list of identified items 204 and output a screen 2600 that confirms that the user would like to remove the item 204. This feature allows the user to edit and finalize the list of detected items 204 that they would like to purchase.

Returning to FIG. 23 at operation 2322, the item tracking device 104 associates the items 204 with the user. In one embodiment, the item tracking device 104 may identify the user that placed the items 204 on the platform 202. For example, the user may identify themselves using a scanner or card reader that is located at the imaging device 102. Examples of a scanner include, but are not limited to, a QR code scanner, a barcode scanner, an NFC scanner, or any other suitable type of scanner that can receive an electronic code embedded with information that uniquely identifies a person. In other examples, the user may identify themselves by providing user information on a graphical user interface that is located at the imaging device 102. Examples of user information include, but are not limited to, a name, a phone number, an email address, an identification number, an employee number, an alphanumeric code, or any other suitable type of information that is associated with the user.

The item tracking device 104 uses the information provided by the user to identify an account that is associated with the user and then to add the identified items 204 to the user's account. For example, the item tracking device 104 may use the information provided by the user to identify an account within the user account information 120 that is associated with the user. As an example, the item tracking device 104 may identify a digital cart that is associated with the user. In this example, the digital cart comprises information about items 204 that the user has placed on the platform 202 to purchase. The item tracking device 104 may add the items 204 to the user's digital cart by adding the item identifiers 1604 for the identified items 204 to the digital cart. The item tracking device 104 may also add other information to the digital cart that is related to the items 204. For example, the item tracking device 104 may use the item identifiers 1604 to look up pricing information for the identified items 204 from the stored item information 118. The item tracking device 104 may then add pricing information that corresponds with each of the identified items 204 to the user's digital cart.

After the item tracking device 104 adds the items 204 to the user's digital cart, the item tracking device 104 may trigger or initiate a transaction for the items 204. In one embodiment, the item tracking device 104 may use previously stored information (e.g. payment card information) to complete the transaction for the items 204. In this case, the user may be automatically charged for the items 204 in their digital cart when they leave the space. In other embodiments, the item tracking device 104 may collect information from the user using a scanner or card reader that is located at the imaging device 102 to complete the transaction for the items 204. This process allows the items 204 to be automatically added to the user's account (e.g. digital cart) without having the user scan or otherwise identify the items 204 they would like to take. After adding the items 204 to the user's account, the item tracking device 104 may output a notification or summary to the user with information about the items 204 that were added to the user's account. For example, the item tracking device 104 may output a summary on a graphical user interface that is located at the imaging device 102. As another example, the item tracking device 104 may output a summary by sending the summary to an email address or a user device that is associated with the user.

Identifying an Item Based on Associations with Other Items

Figure 27:
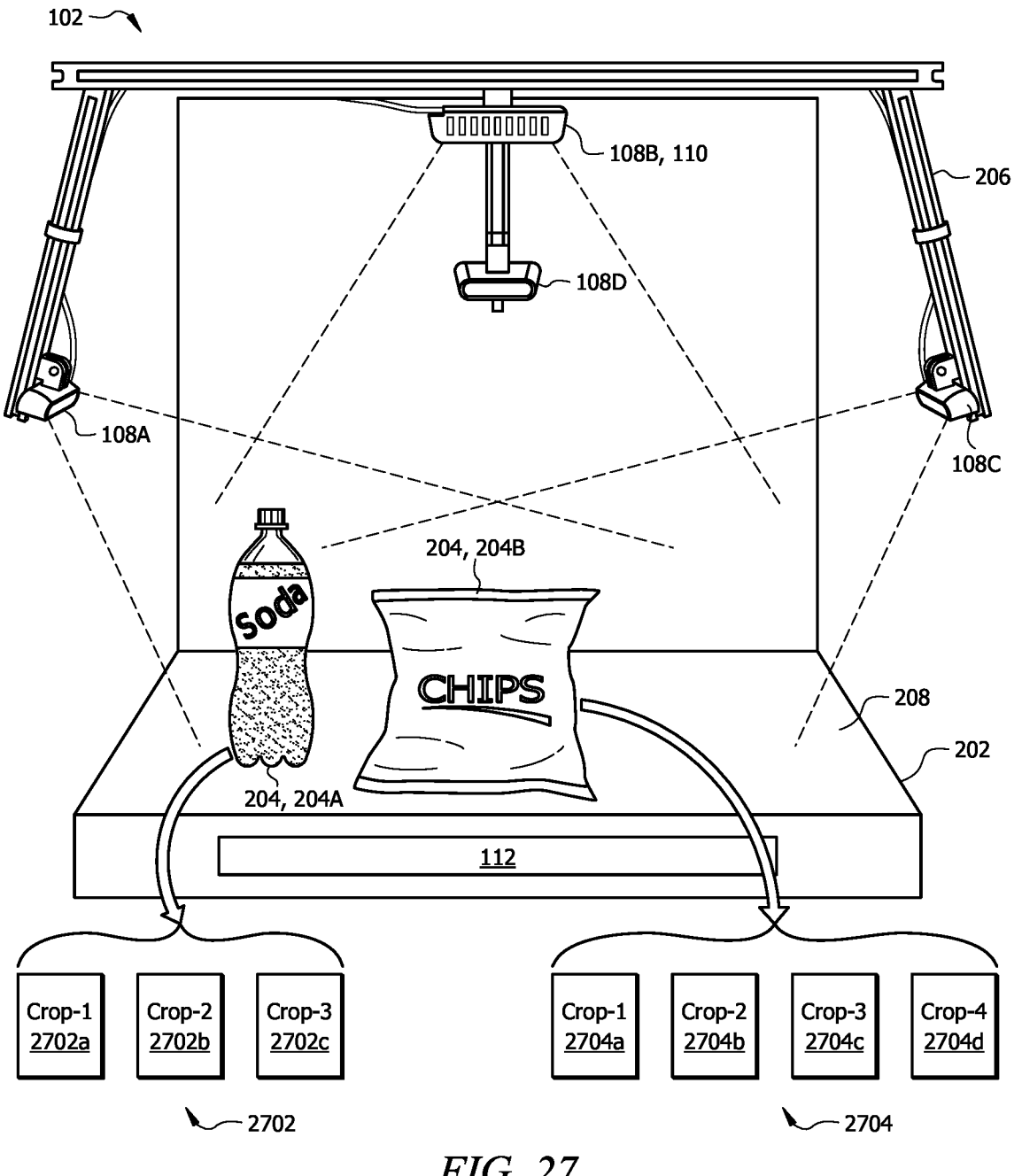
FIG. 27 illustrates identifying a second item based on an association with a first item, in accordance with one or more embodiments of the present disclosure.

In some cases, item tracking device 104 may be unable to identify an item 204 placed on the platform 202. In such cases, as described further below, item tracking device 104 may identify the unidentified item 204 based on a pre-defined association 2802 (shown in FIG. 28) between the unidentified item 204 and another item 204 on the platform 202 that was previously identified as part of the same transaction. For example, as shown in FIG. 27, a transaction may include placement of a first item 204A (e.g., a 1-liter bottle of soda) on the platform 202. Item tracking device 104 may successfully identify the first item 204A as a 1-liter bottle of soda and assign a corresponding item identifier 1604a (shown as I2 in FIG. 28) from the encoded vector library 128. Item tracking device 104 may use a process similar to process 2300 that is described with reference to FIG. 23 to identify the first item 204A. For example, as described with reference to FIG. 29, identifying the first item 204A includes generating cropped images 2702 of the first item 204A, wherein the first item 204A is identified based on the cropped images 2702 of the first item 204A. Once the first item 204A is identified, a second item 204B (e.g., a small bag of chips) may be subsequently placed on the platform 202 as part of the same transaction. In one embodiment, the placement of the first item 204A may be referred to as a first interaction of the transaction and the placement of the second item 204B may be referred to as a second interaction of the same transaction. In some embodiments, item tracking device 104 may be unable to identify the second item 204b. In such a case, as described further below with reference to FIG. 29, item tracking device 104 may identify the second item 204B based on a pre-defined association 2802 between the unidentified second item 204B and the previously identified first item 204A. As described with reference to FIG. 29, identifying the second item 204B includes generating cropped images 2704 of the second item 204B, wherein the second item 204B is identified based on the cropped images 2704 of the second item 204B.

Figure 28:
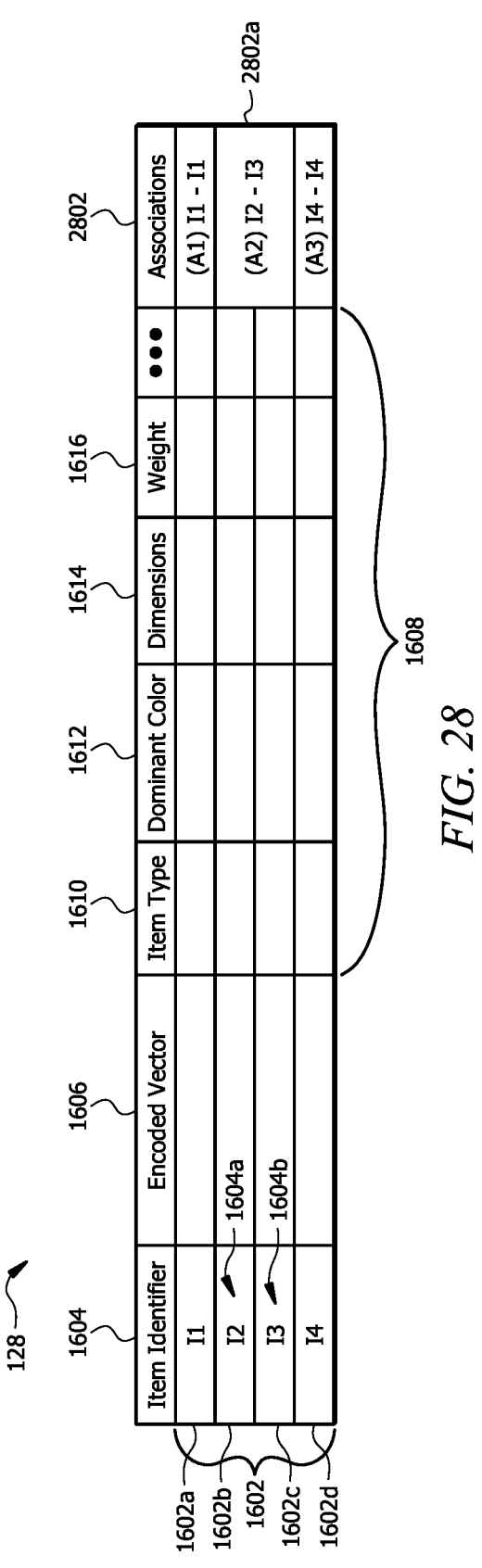
FIG. 28 illustrates associations between item identifiers, in accordance with one or more embodiments of the present disclosure.

In this context, referring to FIG. 28, item tracking device 104 stores (e.g., in memory 116) associations 2802 between item identifiers 1604 of items 204 listed in the encoded vector library 128. An association 2802 between two item identifiers 1604 may correspond to any logical association between items 204 associated with the item identifiers 1604. For example, when the item tracking system 100 is deployed and used in a store where a plurality of items 204 are available for purchase, the store may offer certain promotions when two or more items 204 are purchased together in a single transaction. One example promotion may include a small bag of chips free with the purchase of a 1-liter bottle of soda. Another example promotion may include a reduced price or "buy one get one free" when two 16 oz soda bottles of a particular brand and/or flavor are purchased together in a single transaction. In such cases, a particular promotion that includes two or more items 204 may be stored as an association 2802 between the respective item identifiers 1604 (e.g., stored in the encoded vector library 128) of the items 204. It may be noted that an association 2802 between two item identifiers 1604 may include an association between two instances of the same item identifier 1604 associated with the same item 204. For example, when an example promotion includes two or more of the same item 204 (e.g., buy two of the same item 204 for a reduced price), this promotion is stored in the memory as an association 2802 between two or more instances of the same item identifier 1604 associated with the same item 204.

As shown in FIG. 28 associations 2802 are stored (e.g., in memory 116) as part of the encoded vector library 128. As shown, each of the entries 1602 is associated with an association 2802. Entry 1602a is associated with association-1 (shown as A1), entries 1602b and 1602c are associated with association-2 (shown as A2), and entry 1602d is associated with association-3 (shown as A3). In one example, association-1 may indicate a promotion associated with two or more of the same items 204 having the same item identifier 1604 (shown as I1) stored in entry 1602a. For example, association-1 may indicate a promotion including a reduced price when two 16 oz water bottles of the same brand are purchased together as part of the same transaction. In this example, the 16 oz water bottle is associated with the item identifier 1604 (I1) from entry 1602a. Similarly, association-3 may indicate a promotion associated with two or more of the same items 204 having the same item identifier 1604 (shown as I4) stored in entry 1602d. For example, association-3 may indicate a promotion including a reduced price when two 16 oz bottles of soda of the same brand and/or flavor are purchased together as part of the same transaction. In this example, the 16 oz bottle of soda is associated with the item identifier 1604 (I4) from entry 1602d. Association-2, for example, may indicate a promotion associated with two different items 204 having two different item identifiers 1604a (I2) and 1604b (I3) stored in the respective entries 1602b and 1602c. For example, association-2 may indicate a promotion including a bag of chips free with a 1-liter bottle of soda. In this example, the 1-liter bottle of soda may be associated with a first item identifier 1604a (I2) from entry 1602b and the bag of chips may be associated with a second item identifier 1604b (I3) from entry 1602c.

Figure 29:
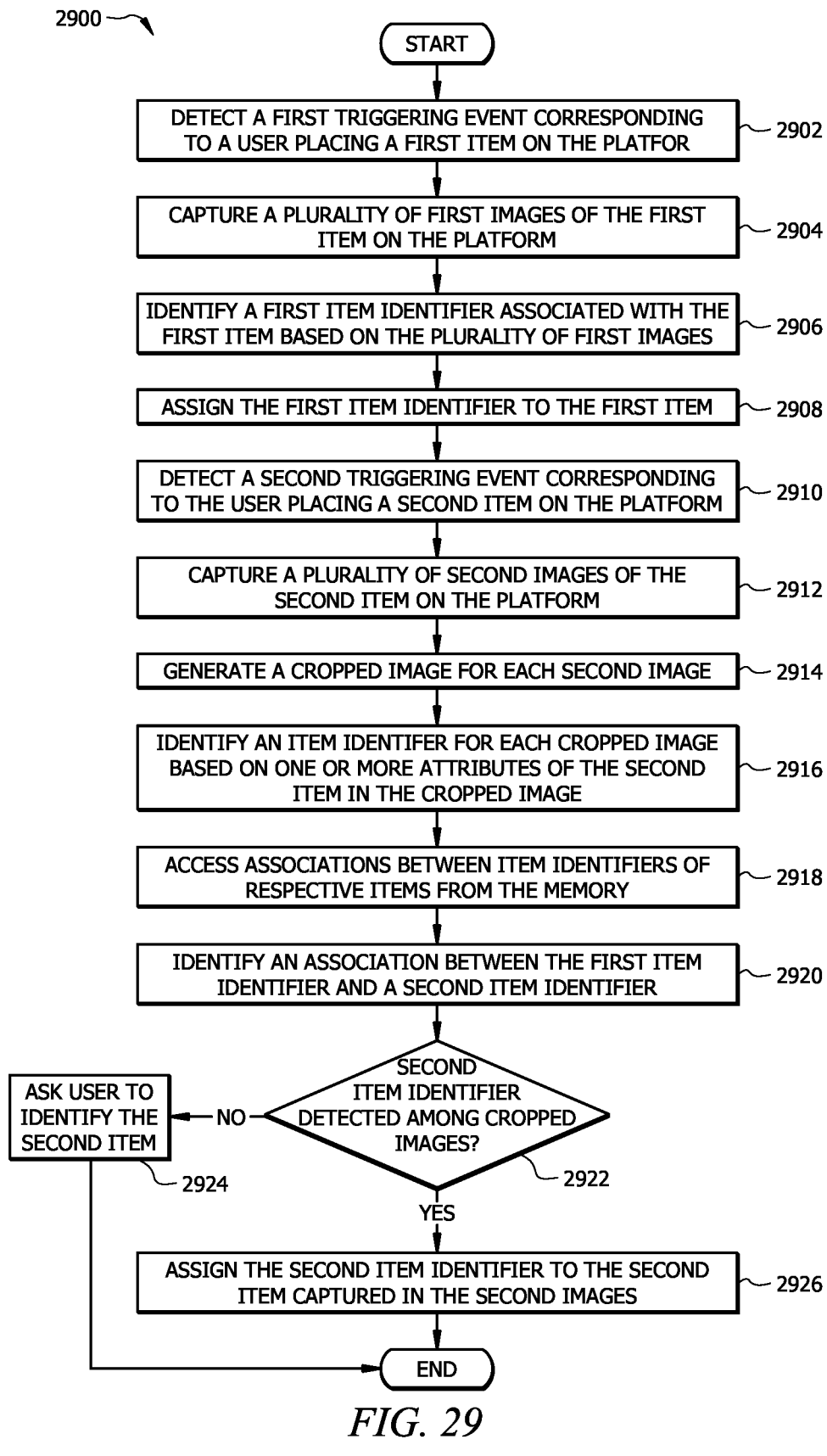
FIG. 29 illustrates a flowchart of an example method for identifying a second item based on an association with a first item, in accordance with one or more embodiments of the present disclosure.

FIG. 29 illustrates a flowchart of an example method 2900 for identifying a second item 204B based on an association 2802 with a first item 204A, in accordance with one or more embodiments of the present disclosure. Method 2900 may be performed by item tracking device 104 as shown in FIG. 1.

At operation 2902, item tracking device 104 detects a first triggering event at the platform 202, wherein the first triggering event corresponds to the placement of a first item 204A on the platform 202. In a particular embodiment, the first triggering event may correspond to a user placing the first item 204A on the platform 202.

As described above, the item tracking device 104 performs auto-exclusion for the imaging device 102 using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 to capture reference images 122 and reference depth images 124, respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 of the platform 202 based on differences in depth values between subsequent depth images 124 and the reference depth image 124 and/or differences in the pixel values between subsequent images 122 and the reference image 122.

In one embodiment, to detect the first triggering event, the item tracking device 104 may use a process similar to process 700 that is described in FIG. 7 for detecting a triggering event, such as, for example, an event that corresponds with a user's hand being detected above the platform 202 and placing an item 204 on the platform. For example, the item tracking device 104 may check for differences between a reference depth image 124 and a subsequent depth image 124 to detect the presence of an object above the platform 202. The item tracking device 104 then checks whether the object corresponds with a user's hand or an item 204 that is placed on the platform 202. The item tracking device 104 determines that the object is a user's hand when a first portion of the object (e.g., a user's wrist or arm) is outside a region-of-interest 802 for the platform 202 and a second portion of the object (e.g., a user's hand) is within the region-of-interest 802 for the platform 202. When this condition is met, the item tracking device 104 determines that a user's hand has been detected above the platform 202. In other examples, the item tracking device 104 may use proximity sensors, motion sensors, or any other suitable technique for detecting whether a user's hand has been detected above the platform 202. After detecting the user's hand, the item tracking device 104 begins periodically capturing additional overhead depth images 124 of the platform 202 to check whether a user's hand has exited the platform 202. In response to determining that the user's hand is no longer on the platform 202, the item tracking device 104 determines whether the first item 204A is on the platform 202. In response to determining that the first item 204A has been placed on the platform, the item tracking device 104 determines that the first triggering event has occurred and proceeds to identify the first item 204A that the user has placed on the platform 202.

Once the first triggering event is detected, the item tracking device 104 performs segmentation using an overhead view of the platform 202. In one embodiment, the item tracking device 104 may perform segmentation using a depth image 124 from a 3D sensor 110 that is positioned for an overhead or perspective view of the items 204 on the platform 202. In this example, the item tracking device 104 captures an overhead depth image 124 of the items 204 that are placed on the platform 202. The item tracking device 104 may then use a depth threshold value to distinguish between the platform 202 and items 204 that are placed on the platform 202 in the captured depth image 124. For instance, the item tracking device 104 may set a depth threshold value that is just above the surface of the platform 202. This depth threshold value may be determined based on the pixel values corresponding with the surface of the platform 202 in the reference depth images 124 that were captured during the auto-exclusion process described above. After setting the depth threshold value, the item tracking device 104 may apply the depth threshold value to the captured depth image 124 to filter out or remove the platform 202 from the depth image 124. After filtering the depth image 124, the remaining clusters of pixels correspond with items 204 that are placed on the platform 202. Each cluster of pixels corresponds with a different item 204. For example, one of the clusters of pixels corresponds to the first item 204 placed on the platform 202 as part of the first triggering event detected in operation 2902.

At operation 2904, in response to detecting the first triggering event, item tracking device 104 captures a plurality of first images 122A of the first item 204 placed on the platform 202 using two or more cameras 108.

As described above, the item tracking device 104 may capture a plurality of first images 122A (as shown in FIG. 5A) of the first item 204 on the platform 202 using multiple cameras 108. For example, the item tracking device 104 may capture first images 122A with an overhead view, a perspective view, and/or a side view of the first item 204 on the platform 202.

At operation 2906, item tracking device 104 identifies a first item identifier 1604a associated with the first item 204 based on the plurality of first images 122A.

The item tracking device 104 may use a process similar to process 2300 that is described with reference to FIG. 23 to identify first item 204A. For example, the item tracking device 104 may generate a cropped image 2702 of the first item 204A from each first image 122A of the first item 204A captured by a respective camera 108 by isolating at least a portion of the first item 204A from the first image 122A. In other words, item tracking device 104 generates one cropped image 2702 of the first item 204A based on each first image 122A of the first item 204A captured by a respective camera 108. As shown in FIG. 27, item tracking device 104 generates three cropped images 2702a, 2702b and 2702c of the first item 204A from respective first images 122A of the first item 204A.

As described above, in one embodiment, the item tracking device 104 may generate a cropped image 2702 of the first item 204A based on the features of the first item 204A that are present in a first image 122A (e.g., one of the first images 122A). The item tracking device 104 may first identify a region-of-interest (e.g., a bounding box) 1002 (as shown in FIG. 10A) for the first item 204A based on the detected features of the first item 204A that are present in a first image 122A and then may crop the first image 122A based on the identified region-of-interest 1002. The region-of-interest 1002 comprises a plurality of pixels that correspond with the first item 204A in a captured first image 122A of the first item 204A on the platform 202. The item tracking device 104 may employ one or more image processing techniques to identify a region-of-interest 1002 for the first item 204A within the first image 122A based on the features and physical attributes of the first item 204A. After identifying a region-of-interest 1002 for the first item 204A, the item tracking device 104 crops the first image 122A by extracting the pixels within the region-of-interest 1002 that correspond to the first item 204A in the first image 122A. By cropping the first image 122A, the item tracking device 104 generates another image (e.g., cropped image 2702) that comprises the extracted pixels within the region-of-interest 1002 for the first item 204A from the original first image 122A. The item tracking device 104 may repeat this process for all of the captured first images 122A of the first item 204A on the platform 202. The result of this process is a set of cropped images 2702 corresponding to the first item 204A that is placed on the platform 202. In some embodiments, the item tracking device 104 may use a process similar to process 900 in FIG. 9 to generate the cropped images 2702 of the first item 204A.

The item tracking device 104 generates an encoded vector 1702 (shown in FIG. 17) for each cropped image 2702 of the first item 204A. An encoded vector 1702 comprises an array of numerical values. Each numerical value in the encoded vector 1702 corresponds with and describes an attribute (e.g., item type, size, shape, color, etc.) of the first item 204A. An encoded vector 1702 may be any suitable length. The item tracking device 104 generates an encoded vector 1702 for the first item 204A by inputting each of the cropped images 2702 into a machine learning model (e.g., machine learning model 126). The machine learning model 126 is configured to output an encoded vector 1702 for an item 204 based on the features or physical attributes of the item 204 that are present in the image 122 of the item 204. Examples of physical attributes include, but are not limited to, an item type, a size, shape, color, or any other suitable type of attribute of the item 204. After inputting a cropped image 2702 of the first item 204A into the machine learning model 126, the item tracking device 104 receives an encoded vector 1702 for the first item 204A. The item tracking device 104 repeats this process to obtain an encoded vector 1702 for each cropped image 2702 of the first item 204A on the platform 202.

The item tracking device 104 identifies the first item 204A from the encoded vector library 128 based on the corresponding encoded vector 1702 generated for the first item 204A. Here, the item tracking device 104 uses the encoded vector 1702 for the first item 204A to identify the closest matching encoded vector 1606 in the encoded vector library 128. In one embodiment, the item tracking device 104 identifies the closest matching encoded vector 1606 in the encoded vector library 128 by generating a similarity vector 1704 (shown in FIG. 17) between the encoded vector 1702 generated for the unidentified first item 204A and the encoded vectors 1606 in the encoded vector library 128. The similarity vector 1704 comprises an array of numerical similarity values 1710 where each numerical similarity value 1710 indicates how similar the values in the encoded vector 1702 for the first item 204A are to a particular encoded vector 1606 in the encoded vector library 128. In one embodiment, the item tracking device 104 may generate the similarity vector 1704 by using a process similar to the process described in FIG. 17. In this example, the item tracking device 104 uses matrix multiplication between the encoded vector 1702 for the first item 204A and the encoded vectors 1606 in the encoded vector library 128. Each numerical similarity value 1710 in the similarity vector 1704 corresponds with an entry 1602 in the encoded vector library 128. For example, the first numerical value 1710 in the similarity vector 1704 indicates how similar the values in the encoded vector 1702 are to the values in the encoded vector 1606 in the first entry 1602 of the encoded vector library 128, the second numerical value 1710 in the similarity vector 1704 indicates how similar the values in the encoded vector 1702 are to the values in the encoded vector 1606 in the second entry 1602 of the encoded vector library 128, and so on.

After generating the similarity vector 1704, the item tracking device 104 can identify which entry 1602, in the encoded vector library 128, most closely matches the encoded vector 1702 for the first item 204A. In one embodiment, the entry 1602 that is associated with the highest numerical similarity value 1710 in the similarity vector 1704 is the entry 1602 that most closely matches the encoded vector 1702 for the first item 204A. After identifying the entry 1602 from the encoded vector library 128 that most closely matches the encoded vector 1702 for the first item 204A, the item tracking device 104 may then identify the item identifier 1604 from the encoded vector library 128 that is associated with the identified entry 1602. Through this process, the item tracking device 104 is able to determine which item 204 from the encoded vector library 128 corresponds with the unidentified first item 204A based on its encoded vector 1702. The item tracking device 104 then outputs the identified item identifier 1604 for the identified item 204. The item tracking device 104 repeats this process for each encoded vector 1702 generated for each cropped image 2702 (e.g., 2702a, 2702b and 2702c) of the first item 204A. This process may yield a set of item identifiers 1604 corresponding to the first item 204A, wherein the set of item identifiers 1604 corresponding to the first item 204A may include a plurality of item identifiers 1604 corresponding to a plurality of cropped images 2702 of the first item 204A. In other words, item tracking device 104 identifies an item identifier 1604 for each cropped image 2702 of the first item 204A.

Item tracking device 104 may select one of a plurality of item identifiers 1604 identified for the first item 204A based on the respective plurality of cropped images 2702 of the first item 204A. For example, item tracking device 104 may select the first item identifier 1604a associated with the first item 204A based a plurality of item identifiers 1604 identified for the first item 204A based on the respective plurality of cropped images 2702 of the first item 204A.

In one or more embodiments, item tracking device 104 may input each cropped image 2702 of the first item 204A into a machine learning model which is configured to determine whether the cropped image 2702 of the first item 204A is a front image 122 of the first item 204A or a back image 122 of the first item 204A. A front image 122 of the first item 204 corresponds to an image 122 of a portion of the first item 204A which includes identifiable information (e.g., text, color, logos, patterns, pictures, images etc.) which is unique to the first item 204A and/or otherwise may be used to identify the first item 204A. A back image 122 of the first item 204A corresponds to an image 122 of a portion of the first item 204 which does not include identifiable information that can be used to identify the first item 204A. The machine learning model may be trained using a data set including known front images 122 and back images of items 204 of the first item 204A identified in the encoded vector library 128. Once each cropped image 2702 of the unidentified first item 204A is identified (e.g., tagged) as a front image 122 or a back image 122 of the first item 204A, item tracking device 104 discards all cropped images 2702 that were identified as back images 122. Item tracking device 104 selects an item identifier 1604 for the unidentified first item 204A from only those item identifiers 1604 corresponding to cropped images 2702 identified as front images 122 of the first item 204A. In a particular embodiment, after discarding all cropped images 2702 of the first item 204A that were identified as back images 122, if only one cropped image 2702 remains that was identified as a front image 122 of the first item 204A, item tracking device 104 selects the item identifier 1604 corresponding to the one remaining cropped image 2702. In case all cropped images 2702 of the first item 204A were identified as back images 122, the item tracking device 104 displays the item identifiers 1604 corresponding to one or more cropped images 2702 of the first item 204A on a user interface device and asks the user to select one of the displayed item identifiers 1604. Alternatively, item tracking device 104 may display instructions on the user interface device for the user to flip or rotate the first item 204A on the platform 202. Once the first item 204A has been flipped or rotated on the platform 202, item tracking device 104 may perform operations 2902-2906 to re-identify the first item 204A.

In some cases, multiple cropped images 2702 of the first item 204A may be identified as front images 122. In such cases, item tracking device 104 may be configured to select an item identifier 1604 from the item identifiers 1604 corresponding to cropped front images 122 of the item 204, based on the similarity values 1710 used to identify the respective item identifiers 1604 from the encoded vector library 128. As described above, for each cropped image 2702, item tracking device 104 selects an entry 1602 from the encode vector library 128 that is associated with the highest numerical similarity value 1710 in the similarity vector 1704 generated for the cropped image 2702. Item tracking device 104 then identifies the item identifier 1604 from the encoded vector library 128 that is associated with the identified entry 1602. Thus, the item identifier 1604 identified for each cropped image 2702 of the first item 204A corresponds to a respective similarity value 1710 based on which the item identifier 1604 was selected from the encoded vector library 128.

In one embodiment, among the cropped front images 2702 of the first item 204A, item tracking device 104 discards all cropped front images 2702 whose item identifiers 1604 were selected from the encoded vector library 128 based on numerical similarity values 1710 that are below a threshold similarity value. Since a similarity value 1710 is indicative of a degree of similarity between the encoded vector 1702 generated for an unidentified first item 204A and a particular encoded vector 1606 from the encoded vector library 128, a lower similarity value 1710 indicates a lower similarity between the generated encoded vector 1702 and corresponding encoded vector 1606 from the encoded vector library 128. By discarding all cropped front images 2702 whose item identifiers 1604 were selected from the encoded vector library 128 based on numerical similarity values 1710 that are below the threshold similarity value, item tracking device 104 discards all those cropped images 2702 that are unlikely to correctly identify the unidentified first item 204A. In an embodiment, if item identifiers 1604 of all cropped front images 2702 of the item 204 were selected from the encoded vector library 128 based on numerical similarity values 1710 that are below a threshold similarity value, item tracking device 104 displays the item identifiers 1604 on the user interface device and asks the user to select one of the displayed item identifiers 1604.

After discarding all cropped front images 2702 whose item identifiers 1604 were selected from the encoded vector library 128 based on numerical similarity values 1710 that are below the threshold value, item tracking device 104 applies a majority voting rule to select an item identifier 1604 from the item identifiers 1604 corresponding to the remaining cropped front images 2702 whose item identifiers 1604 were selected from the encoded vector library 128 based on numerical similarity values 1710 that equal or exceed the threshold similarity value. The majority voting rule defines that when a same item identifier 1604 has been identified for a majority of the remaining cropped front images 2702 of the unidentified item 204, the same item identifier 1604 is to be selected.

However, when no majority exists among the item identifiers 1604 of the remaining cropped front images, the majority voting rule cannot be applied. For example, when a same item identifier 1604 was not identified for a majority of the remaining cropped front images 2702 of the unidentified first item 204, the majority voting rule does not apply. In such cases, item tracking device 104 compares the two highest numerical similarity values 1710 among the remaining cropped front images 2702. When the difference between the highest similarity value and the second highest similarity value equals or exceeds a threshold difference, item tracking device 104 selects an item identifier 1604 that corresponds to the highest similarity value. However, when the difference between the highest similarity value and the second highest similarity value is below the threshold difference, item tracking device 104 displays the item identifiers 1604 corresponding to one or more remining cropped front images 2702 of the first item 204A on the user interface device and asks the user to select one of the displayed item identifiers 1604.

Regardless of the particular method used to identify the first item 204A, an end result of this entire process is that a first item identifier 1604a is identified for the first item 204A.

At operation 2908, item tracking device 104 assigns the first item identifier 1604a to the first item 204A captured in the first images 122A.

At operation 2910, item tracking device 104 detects a second triggering event at the platform 202, wherein the second triggering event corresponds to the placement of a second item 204B on the platform 202. In a particular embodiment, the second triggering event may correspond to a user placing the second item 204B on the platform 202. Item tracking device 104 may detect the second triggering event similar to detecting the first triggering event described above with reference to operation 2902.

At operation 2912, in response to detecting the second triggering event, item tracking device 104 captures a plurality of second images 122B (e.g., as shown in FIG. 5B) of the second item 204B using two or more cameras 108 of the plurality of cameras 108.

At operation 2914, item tracking device 104 generates a plurality of cropped images 2704 (as shown in FIG. 27), wherein each cropped image (e.g., 2704a, 2704b, 2704c and 2704d) is associated with a corresponding second image 122b and is generated by editing the corresponding second image 122B to isolate at least a portion of the second item 204B.

To generate the plurality of cropped images 2704 of the second item 204B, item tracking device 104 may use a method similar to the method described above with reference to operation 2906 for generating cropped images 2702 of the first item 204A based on the first images 122A.

At operation 2916, for each cropped image 2704 of the second item 204B generated from the respective second image 122B, item tracking device 104 identifies an item identifier 1604 based on the attributes of the second item 204B in the cropped image 122B.

Item tracking device 104 may identify an item identifier 1604 for each cropped image 2704 of the second item 204B based on a method similar to the method described above with reference to operation 2906 for identifying an item identifier 1604 for each cropped image 2702 of the first item 204A.

At operation 2918, item tracking device 104 accesses (e.g., from the memory 116) associations 2802 between item identifiers 1604 of respective items 204.

At operation 2920, based on the associations 2802 stored in the memory 116, item tracking device 104 identifies an association 2802a between the first item identifier 1604a identified for the first item 204A and a second item identifier 1604b. Based on searching the associations 2802 stored in the memory 116, item tracking device 104 may determine that an association 2802a (e.g., association-2) exists between the first item identifier 1604a from entry 1602b and a second item identifier 1604b from entry 1602c. Following the example described above, the first item identifier 1604a from entry 1602b may be associated with a 1-liter bottle of soda and the second item identifier 1604b from entry 1602c may be associated with a small bag of chips.

At operation 2922, item tracking device 104 checks whether at least one of the item identifiers 1604, among item identifiers 1604 identified for the cropped images 2704 of the second item 204B, is the second item identifier 1604b. If none of the item identifiers 1604 identified for the cropped images 2704 of the second item 204B is the second item identifier 1604b, method 2800 proceeds to operation 2924 where item tracking device 104 displays the item identifiers 1604 of the cropped images 2704 of the second item 204B on the user interface device and asks the user to select one of the displayed item identifiers 1604.

However, if at least one of the item identifiers 1604 among item identifiers 1604 identified for the cropped images 2704 of the second item 204B is the second item identifier 1604b, the method 2900 proceeds to operation 2926 where item tracking device 104 assigns the second item identifier 1604b to the second item 204B captured in the second images 122B. Following the example described above, when the first item 204A is assigned the first item identifier 1604a from entry 1602b associated with a 1-liter bottle of soda, and at least one of the item identifiers 1604 among item identifiers 1604 identified for the cropped images 2704 of the second item 204B is the second item identifier 1604b from entry 1602c associated with a small bag of chips, item tracking device 104 assigns the second item identifier 1604b from entry 1602c to the second item 204B, thus identifying the second item 204 as a small bag of chips.

Following a second example of association-1 described above, when the first item 204A is assigned the first item identifier 1604 (I1) from entry 1602a associated with a 16 oz water bottle, and at least one of the item identifiers 1604 among item identifiers 1604 identified for the cropped images 2704 of the second item 204B is also the first item identifier 1604 (I1) from entry 1602a, item tracking device 104 assigns the same first item identifier 1604 (I1) from entry 1602a to the second item 204B as well. In this example, the first item identifier 1604 and the second item identifier 1604 are two different instances of the same item identifier 1604 (I1) from entry 1602a, and the first item 204A and the second item 204B are two different instances of the same item 204, for example two different 16 oz water bottles.

In one or more embodiments, item tracking device 104 applies the associations 2802 based logic described above to identify the second item 204B when one or more other methods described above for identifying the first item 204A do not apply or otherwise fail to identify the second item 204B.

In one embodiment, after generating cropped images 2704 for each second image 122B of the unidentified second item 204B, item tracking device 104 inputs each cropped image 2704 of the second item 204 into a machine learning model which determines whether the cropped image 2702 of the second item 204B is a front image 122 of the second item 204B or a back image 122 of the item second item 204B. Once each cropped image 2704 of the second item 204B is identified as a front image 122 or a back image 122 of the second item 204B, item tracking device 104 discards all cropped images 2704 that were identified as back images 122. Item tracking device 104 selects an item identifier 1604 for the unidentified second item 204B from only those item identifiers 1604 corresponding to cropped images 2704 identified as front images 122. For example, after discarding all cropped images 2704 of the second item 204 that were identified as back images 122, if only one cropped image 2704 remains that was identified as a front image 122, item tracking device 104 selects the item identifier 1604 corresponding to the one remaining cropped image 2704. In case all cropped images 2704 of the second item 204B were identified as back images 122, the item tracking device 104 displays the item identifiers 1604 corresponding to one or more cropped images 2704 on a user interface device and asks the user to select one of the displayed item identifiers 1604. Alternatively, item tracking device 104 may display instructions on the user interface device for the user to flip or rotate the second item 204B on the platform 202. Once the second item 204B has been flipped or rotated on the platform 202, item tracking device 104 may perform operations 2910-2916 to re-identify the second item 204b.

When multiple cropped images 2704 of the second item 204B are identified as front images 122, item tracking device 104 selects an item identifier 1604 from the item identifiers 1604 corresponding to cropped front images 2704 of the second item 204B, based on the similarity values 1710 used to identify the respective item identifiers 1604 from the encoded vector library 128. As described above with reference to cropped images 2702 of the first item 204B, for each cropped image 2704 of the second item 204B, item tracking device 104 selects an entry 1602 from the encoded vector library 128 that is associated with the highest numerical similarity value 1710 in the similarity vector 1704 generated for the cropped image 2704. Item tracking device 104 then identifies the item identifier 1604 from the encoded vector library 128 that is associated with the identified entry 1602. Thus, the item identifier 1604 identified for each cropped image 2704 of the second item 204B corresponds to a respective similarity value 1710 based on which the item identifier 1604 was selected from the encoded vector library 128.

In one embodiment, among the cropped front images 2704 of the second item 204B, item tracking device 104 discards all cropped front images 2704 whose item identifiers 1604 were selected from the encoded vector library 128 based on numerical similarity values 1710 that are below a threshold similarity value. Since a similarity value 1710 is indicative of a degree of similarity between the encoded vector 1702 generated for the unidentified second item 204B and a particular encoded vector 1606 from the encoded vector library 128, a lower similarity value 1710 indicates a lower similarity between the generated encoded vector 1702 and corresponding encoded vector 1606 from the encoded vector library 128. By discarding all cropped front images 2704 whose item identifiers 1604 were selected from the encoded vector library 128 based on numerical similarity values 1710 that are below the threshold value, item tracking device 104 discards all those cropped images 2704 that are unlikely to correctly identify the unidentified second item 204B. In an embodiment, if item identifiers 1604 of all cropped front images 2704 of the second item 204B were selected from the encoded vector library 128 based on numerical similarity values 1710 that are below the threshold similarity value, item tracking device 104 displays the item identifiers 1604 on the user interface device and asks the user to select one of the displayed item identifiers 1604.

After discarding all cropped front images 2704 whose item identifiers 1604 were selected from the encoded vector library 128 based on numerical similarity values 1710 that are below the threshold similarity value, item tracking device 104 applies a majority voting rule to select an item identifier 1604 from the item identifiers 1604 corresponding to the remaining cropped front images 2704 whose item identifiers 1604 were selected from the encoded vector library 128 based on numerical similarity values 1710 that equal or exceed the threshold similarity value. The majority voting rule defines that when a same item identifier 1604 has been identified for a majority of the remaining cropped front images 2704 of the unidentified second item 204B, the same item identifier 1604 is to be selected.

However, when no majority exists among the item identifiers 1604 of the remaining cropped front images 2704, the majority voting rule cannot be applied. For example, when a same item identifier 1604 was not identified for a majority of the remaining cropped front images 2704 of the unidentified second item 204B, the majority voting rule does not apply. In such cases, item tracking device 104, compares the two highest numerical similarity values 1710 among the remaining cropped front images 2704. When the difference between the highest similarity value and the second highest similarity value equals or exceeds a threshold difference, item tracking device 104 selects an item identifier 1604 that corresponds to the highest similarity value.

However, when the difference between the highest similarity value and the second highest similarity value is below the threshold difference, item tracking device 104 applies the associations-based logic described above with reference to operations 2918-2926.

Example System for Camera Re-Calibration Based on an Updated Homography

In general, certain embodiments of the present disclosure describe techniques for camera re-calibration based on an updated homography in response to a shift in position of any system component, such as a camera, 3D sensor or a platform. For example, the disclosed system is configured to detect if there is shift in position of any of the camera, 3D sensor, and/or platform, and in response to detecting the shift in position of any of the camera, 3D sensor, and platform, generate a new homography, and re-calibrate the camera and 3D sensor using the new homography. In this manner, the disclosed system improves the item identifying and tracking techniques. For example, the disclosed system increases the accuracy in item tracking and identification techniques, specifically, in cases where a camera, a 3D sensor, and/or platform has moved from its initial position when the initial homography was generated and determined. Accordingly, the disclosed system provides the practical application and technical improvements to the item identification and tracking techniques. For example, the disclosed system offers technical improvements in the field of item identification and tracking technology by addressing the inherent challenge of maintaining accuracy in a dynamic environment. For example, the disclosed system may continuously or periodically (e.g., every second, every milliseconds, etc.) monitor the positions of cameras, 3D sensors, and the platform. When the disclosed system detects any shift in the location of any of these components, the disclosed system generates a new homography and recalibrates the cameras and 3D sensors accordingly. Therefore, the pixel-to-physical location mapping remains precise (or within an acceptable precision threshold), even in scenarios where one or more system components (e.g., cameras, 3D sensors, and platform) have been moved or shifted. Furthermore, the disclosed system increases reliability by proactively addressing challenges of shifts in locations of cameras, 3D sensors, and the platform and maintains high accuracy even in changing conditions. In this manner, the disclosed system provides additional practical applications and technical improvements to the item identification and tracking technology. Accordingly, this represents an improvement to the efficiency, throughput, and productivity of computer systems implemented to perform the described operations.

Figure 30:
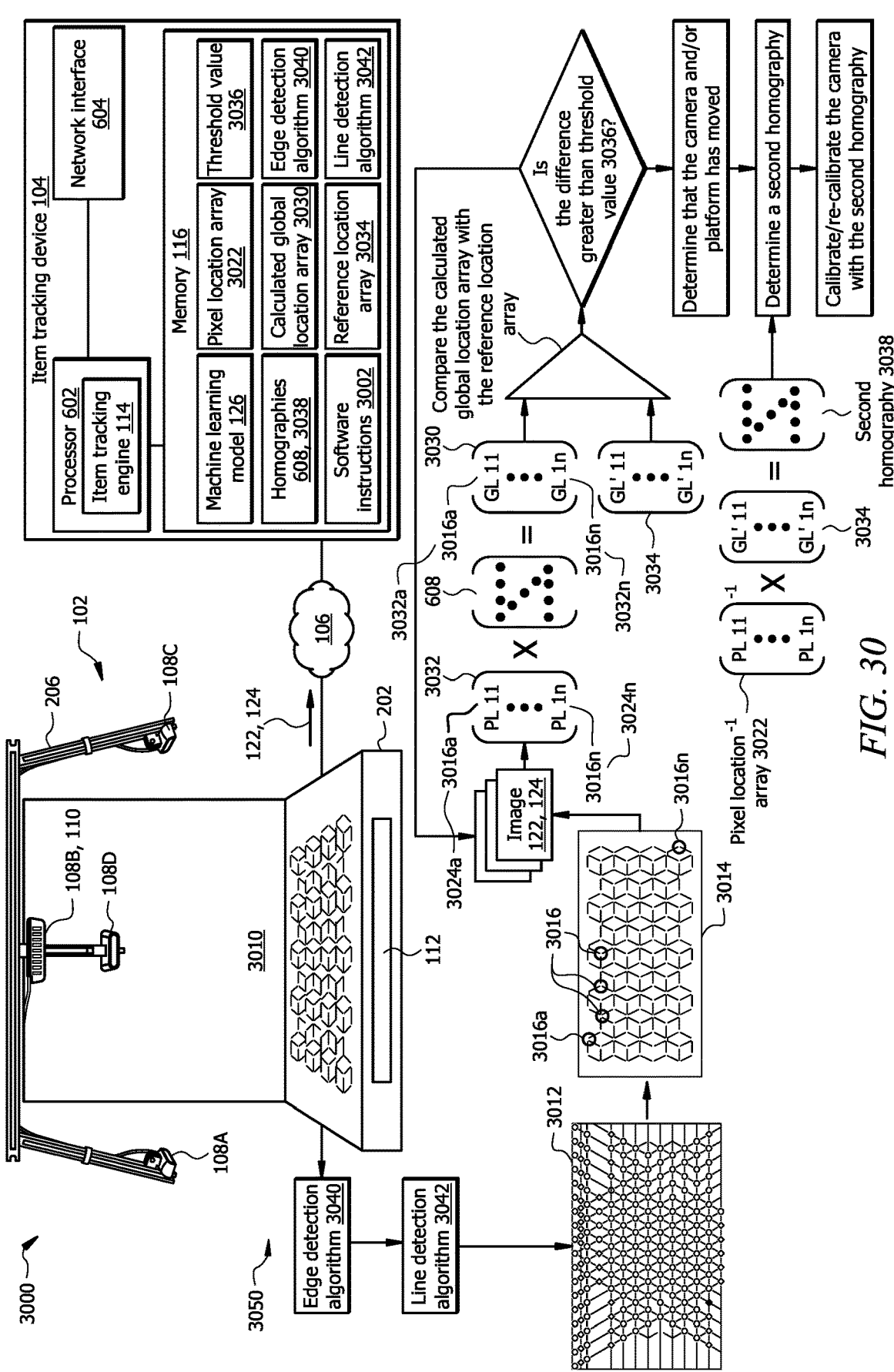
FIG. 30 illustrates an embodiment of a system configured for camera re-calibration using an updated homography.

FIG. 30 illustrates an embodiment of a system 3000 configured to detect if there is any change in the initial homography 608 used to translate between pixel locations in an image 122, 124 captured by a camera 108 or 3D sensor 110 and physical locations in a global plane; generate an updated homography 3038; and calibrate or re-calibrate camera 108 and/or 3D sensor 110 based on the updated homography 3038. FIG. 30 further illustrates an example operational flow 3050 of the system 3000 for camera calibration/re-calibration based on the updated homography 3038. In some embodiments, the system 3000 includes the item tracking device 104 communicatively coupled with the imaging device 102, via a network 106. In the example of FIG. 30, the configuration of imaging device 102 described in FIG. 2A is used. However, the configuration of imaging device 102 described in FIG. 2B or any other configuration of the imaging device 102 may be used in the system 3000. In the example configuration of imaging device 102 in FIG. 30, the imaging device 102 includes cameras 108a-d, 3D sensor 110, structure 206, weight sensor 112, and platform 202. In some configurations of the imaging device 102, any number of cameras 108, 3D sensors 110, and weight sensors 112 may be implemented, similar to that described in FIGS. 1, 2A, and 2B. The 3D sensor 110 may also interchangeably be referred to as a 3D camera or camera. The system 3000 may be configured as shown in FIG. 30 or in any other configuration. The systems and components illustrated and described in the discussions of any of the figures may be used and implemented to perform operations of the systems and methods described in FIGS. 30-31. Additionally, systems and components illustrated and described with reference to any figure of this disclosure may be used and implemented to perform operations of the systems and methods described in FIGS. 30-31.

In general, the system 3000 increases the accuracy in item tracking and identification techniques, specifically, in cases where a camera 108, a 3D sensor 110, and/or platform 202 has moved from its initial position when the homography 608 was generated and determined. The process of generating the homography 608 is described above in conjunction with the discussion of FIG. 11 and the process of using the homography 608 to determine a physical location of an item from pixel locations where the item is shown in an image captured by a camera 108 is described in conjunction with FIGS. 12A-B.

In some embodiments, when the cameras 108, 3D sensor 110, and the platform 202 are deployed onto the imaging device 102, the cameras 108 and 3D sensor 110 may be calibrated during an initial calibration so pixel locations in an image 122, 124 captured by a given camera 108 and 3D sensor 110 are mapped to respective physical locations on the platform 202 in the global plane. For example, during the initial calibration of cameras 108, a paper printed with unique patterns of checkboards may be placed on the platform 202. Each camera 108 may capture an image 122 of the paper and transmit to the item tracking device 104. The item tracking device 104 may generate the homography 608 that maps pixel locations of each unique pattern on the paper shown in the image 122 to corresponding physical locations of the unique pattern on the paper on the platform 202. Similar operations may be performed with respect to depth images 124 captured by the 3D sensor 110. For example, during the initial calibration of 3D sensor 110, the paper printed with unique patterns of checkboards may be placed on the platform 202. Each 3D sensor 110 may capture a depth image 124 of the paper and transmit it to the item tracking device 104. The item tracking device 104 may generate the homography 608 that maps pixel locations of each unique pattern on the paper shown in the image 124 to corresponding physical locations of the unique pattern on the paper on the platform 202.

After the initial calibration, the item tracking engine 114 may determine the physical location of any item (204 in FIG. 2A) placed on the platform 202 by applying the homography 608 to the pixel locations of the item shown in an image 122 or depth image 124. In some cases, a camera 108, 3D sensor 110, and/or the platform 202 may move or be shifted from its initial location due to any number of reasons, such as an impact from a person, movement by an item when it is being placed on the platform 202, and the like. Because the homography 608 is determined based on the locations of the camera 108, 3D sensor 110, and the platform 202, a change in the initial location of one or more of the camera 108, 3D sensor 110, and/or the platform 202 may lead to the homography 608 not being accurate anymore. As a result, applying the homography 608 to subsequent pixel locations of items shown in images 122 or depth images 124 may not lead to the actual physical location of the items on the platform 202, and vice versa—meaning that applying an inverse of the homography 608 to physical locations of subsequent items placed on the platform 202 may not lead to the actual pixel locations of the items shown in a respective image 122 or depth image 124.

In practice, it is very difficult, if not impossible, to know if a camera 108, 3D sensor 110, and/or the platform 202 is shifted in position if no one witnessed it or if it is not captured on a camera facing the imaging device 102. One potential solution to this problem of a camera 108, 3D sensor 110 and/or platform 202 being shifted, resulting in an inaccurate homography 608, is to provide routine maintenance to the cameras 108, 3D sensor 110, and platform 202 to ensure that they are not shifted from their respective original locations. However, this potential solution is not feasible given that the imaging device 102 may be deployed in a store and routine maintenance of the cameras 108, 3D sensor 110, and platform 202 will interrupt the item checkout process. Besides, routine maintenance is labor-intensive and requires precise measurement of the locations of the cameras 108, 3D sensor 110, and platform 202, which makes it an error-prone process.

The present disclosure provides a solution to this and other technical problems that are currently arising in the realm of item identification and tracking technology. For example, the system 3000 is configured to detect if there is a shift in location of camera 108, 3D sensor 110, and/or platform 202, and in response to detecting the shift in location of either camera 108, 3D sensor 110, and platform 202, generate a new homography 3038, and re-calibrate the camera 108, 3D sensor 110 using the new homography 3038. In this manner, the system 3000 improves the item identifying and tracking techniques.

System Components

Aspects of the item tracking device 104 are described in FIGS. 1-29, and additional aspects are described below. The item tracking device 104 may include the processor 602 in signal communication with the network interface 604 and the memory 115. The memory 116 stores software instructions 3002 that when executed by the processor 602 cause the processor 602 to execute the item tracking engine 114 to perform one or more operations of the item tracking device 104 described herein.

Memory 116 also stores homographies 608, 3038, machine learning model 126, pixel location array 3022, calculated global location array 3030, reference location array 3034, threshold value 3036, line detection algorithm 3042, edge detection algorithm 3040, and/or any other data or instructions. The software instructions 3002 may comprise any suitable set of instructions, logic, rules, or code operable to execute the processor 602 and item tracking engine 114 and perform the functions described herein. Machine learning model 126 is described with respect to FIGS. 1-6. Other elements are described further below in conjunction with the operational flow 3050 of the system 3000.

Calibration Board

The calibration board 3010 may include a pattern of lines embedded on the surface of the platform 202. In certain embodiments, instead of using a unique checkboard pattern that was used in the initial calibration of the cameras 108, 3D sensor 110, and generation of the homography 608, the calibration board 3010 that includes repeating patterns of lines and edges may be used for the camera re-calibration process and generating the new homography 3038. In one example, this may be because, for the initial camera calibration process and homography generation, the uniqueness of each checkboard helps to differentiate the different checkboard patterns, and therefore different locations of the respective checkboard patterns may be determined with a greater confidence score. In another example, embedding the checkboard into platform 202 when the imaging device 102 is deployed in a physical store may appear intimidating to users and may not be user-friendly.

In the camera re-calibration process and generation of the new homography 3038, the repeating patterns on the calibration board 3010 may suffice and a unique checkboard may not be needed. However, in some embodiments, the checkboard that was used in the camera calibration process may be used in the camera re-calibration process.

The lines and edges on the calibration board 3010 may be detected by the item tracking engine 114. For example, a camera 108 may capture an image 122 of the calibration board 3010 and transmit it to the item tracking device 104. In a case where the image 122 is a color image, the item tracking engine 114 may convert the image 122 into a gray-scale image. In some embodiments, to generate the image of the calibration board 3010, the item tracking engine 114 may determine the intersections between the lines shown in the image 122. To this end, the item tracking engine 114 may perform one or more of the operations below. The item tracking engine 114 may implement an edge detection algorithm 3040, such as Sobel filters, and the like, to detect edges of the pattern displayed on the image of the calibration board 3010. The edge detection algorithm 3040 may be implemented by the processor 602 executing the software instructions 3002 and is generally configured to detect edges and shapes in an image. The edge detection algorithm 3040 may include an image processing algorithm, neural network, and the like.

The item tracking engine 114 may implement a line detection algorithm 3042, such as, for example, a Hough transform, and the like, to detect the lines of the pattern displayed on the image of the calibration board 3010. The line detection algorithm 3042 may be implemented by the processor 602 executing the software instructions 3002 and is generally configured to detect lines in an image. The edge detection algorithm 3040 may include an image processing algorithm, neural network, and the like. In this process, the item tracking engine 114 feeds the image of the calibration board 3010 to the edge detection algorithm 3040 and line detection algorithm 3042 to generate the image 3012. In this process, the item tracking engine 114 may apply line and edge fitters and algorithms on the image 3012 to generate the image 3014 of the calibration board. The item tracking engine 114 may implement a noise reduction algorithm to reduce (or remove) noises on the pattern displayed on the image 3014 of the calibration board 3010, where the noises are small dots scattered around the lines and edges displayed on the image of the calibration board 3010. For example, if a dot is less than a threshold area (e.g., less than 5 centimeters (cm), 3 cm, etc.), the item tracking engine 114 may remove the dot from the image of the calibration board 3010. In this manner, the item tracking engine 114 may detect and draw the lines and intersections between the lines on the image 3014 of the calibration board 3010. Similar operations may be performed with respect to a color image 122 and/or depth image 124 of the calibration board 3010.

Operational Flow for Camera Re-Calibration Based on an Updated Homography

The operational flow 3050 of the system 3000 may begin when a camera 108 captures an image 122 and/or a 3D sensor 110 captures a depth image 124 and transmits the image 122 and/or the dept image 124 to the item tracking device 104. For simplicity and brevity, 3D sensor 110 may be referred to as a camera 108. For example, if the camera 108 is configured to capture color images 122 and depth images 124, the operations with respect to the camera 108 for camera re-calibration may also apply to the 3D sensor 110. The image 122 and/or the depth image 124 may display at least a portion of the platform 202. The image 122, 124 may be processed to detect lines and edges and the image 3014 of the calibration board 3010 may be produced by the item tracking engine 114, similar to that described above. The image 3014 of the calibration board 3010 may display or show points 3016-$n$ that are intersecting points between each pair of lines on the image 3014. For clarity, the operations below are described with respect to the image 122. However, similar operations may be performed with respect to depth image 124.

The item tracking engine 144 may determine the pixel location array 3022 that comprises a set of pixel locations 3024$a$ through 3024$n$, where each row in the pixel location array 3022 represents a pixel location of a single point 3016 that is an intersection of a pair of lines on the image 3014 of the calibration board 3010. For example, the first row as indicated by pixel location (PL) 11 represents the pixel location of a first point 3016$a$, and the n-th row as indicated by PL In represents the pixel location of the n-th point 3016$n$. In some embodiments, the item tracking engine 144 may determine the pixel location array 3022 by feeding the image 3014 to the machine learning model 126 which includes an image processing algorithm, similar to that described in FIGS. 1-3, and 7-26. Each of the pixel location array 3022, calculated location array 3030, homography 608, reference location array 3034, and second homography 3038 may have any dimension that leads to the correct matrix/array multiplication.

Detecting Physical Locations of Points on the Calibration Board by Using Initial Homography The item tracking engine 144 may apply the first (initial) homography 608 to each pixel location 3024$a$-$n$ to determine the respective physical location of each point 3016 in the global plane. In this process, the item tracking engine 144 may perform a matrix multiplication between the pixel location array 3022 and the first homography 608 if they are presented as matrices. In certain embodiments, each row of the pixel location array 3022 may be multiplied by the first homography 608 to determine the respective physical location of the point 3016 associated with the respective row of the pixel location array 3022. In some embodiments, the coefficients of the first homography 608 (see, e.g., FIGS. 12A-B) may be repeated in each column of the first homography 608 matrix so multiplication of each row of the pixel location array 3022 with a column of the first homography 608 matrix results in a respective calculated physical location coordinates associated with the respective row in the pixel location array 3022. By applying the first homography 608 to the pixel location array 3022, the item tracking engine 114 determines the calculated location array 3030.

The calculated location array 3030 identifies a set of calculated physical (x,y) location coordinates of the set of points 3016 on the calibration board in the global plane. Each row in the calculated location array 3030 represents a calculated physical location coordinate (x,y) of the respective point 3016 on the calibration board 3010 in the global plane. For example, the first row as indicated by global location (GL) 11 represents the calculated physical (x1,y1) location coordinates of the PL 11 of the point 3016$a$, and the n-th row as indicated by GL In represents the calculated physical (xn,yn) location coordinates of the PL In of the point 3016$n$. The item tracking engine 114 may repeat similar operations for each image 122, 124 that is captured by a respective camera 108, where for each camera 108, a different homography 608 is used because the coefficients of the homography 608 depend on the locations of the camera 108 with respect to the platform 202 in the global plane.

The item tracking engine 114 may perform similar operations to determine the calculated physical locations of items that are placed on the platform 202 with respect to the previously determined and known physical locations of the points 3016 on platform 202 for each captured image 122, 124 captured by each camera 108, similar to that described in FIGS. 1-29.

Detecting Whether the Camera and/or the Platform is Moved

In cases where the camera 108, 3D sensor 110, and/or the platform 202 has moved (or shifted in position), the first homography 608 may not be accurate, and therefore, the calculated physical location coordinates (x,y) of points 3016 may not be the actual physical location coordinates (x,y) of the points 3016. To determine if the camera 108, 3D sensor 110, and/or the platform 202 has moved, the item tracking engine 114 may compare the newly calculated location array 3030 with the reference location array 3034. The reference location array 3034 may be the ground truth that represents the actual and previously verified physical location coordinates (x,y) of the points 3016 in the global plane.

The reference location array 3034 may be determined by applying the first homography 608 on to the pixel location array 3022 under known conditions where the cameras 108 and platform 202 are at their respective expected locations. For example, a first row of the reference location array 3034 represented by GL' 11 may represent the actual physical location coordinates (x1',y1') of the first point 3016*a*, and the n-th row of the reference location array 3034 represented by GL' In may represent the actual physical location coordinates (xn', yn') of the n-th point 3016*n* on the calibration board 3010. By comparing the newly calculated location array 3030 with the reference location array 3034, the item tracking engine 114 may determine whether there is any change or shift in the calculated physical locations of the points 3016 as a result of a change in the location of the camera 108, 3D sensor 110, and/or the platform 202. In this process, the item tracking engine 114 may perform a vector comparison between the newly calculated location array 3030 and the reference location array 3034.

The item tracking engine 114 may determine the difference between the newly calculated location array 3030 and the reference location array 3034. The item tracking engine 114 may determine whether the determined difference between the newly calculated location array 3030 and the reference location array 3034 is more than a threshold value 3036. The threshold value 3036 may be 3%, 4%, and the like. For example, in some embodiments, the item tracking engine 114 may determine a Euclidean distance between the newly calculated location array 3030 and the reference location array 3034. If the determined Euclidean distance is more than a threshold distance value (e.g., more than 0.1 cm, 0.3 cm, etc.), it may be determined that the difference between the newly calculated location array 3030 and the reference location array 3034 is more than the threshold value 3036. Otherwise, the item tracking engine 114 may determine that the difference between the newly calculated location array 3030 and the reference location array 3034 is less than the threshold value 3036. In other examples, the item tracking engine 114 may use any other type of distance calculations between the newly calculated location array 3030 and the reference location array 3034.

In another example, in some embodiments, the item tracking engine 114 may determine the difference between the reference location array 3034 and the calculated location array 3030 by performing a dot product operation between each element of the reference location array 3034 and the respective element in the calculated location array 3030. The dot product is a multiplication of the absolute values of the two elements multiplied by a cosine of an angle between the two elements, where each of the two elements is a vector representing a location coordinate of the respective point 3016.

In another example, in some embodiments, the item tracking engine 114 may determine the difference between the reference location array 3034 and the calculated location array 3030 by performing a dot product operation between the newly calculated location array 3030 and the reference location array 3034.

Generating a Second Homography

If the item tracking engine 114 determines that the difference between the newly calculated location array 3030 and the reference location array 3034 is more than the threshold value 3036, it may be an indication that the camera 108, 3D sensor 110, and/or the platform 202 has moved from its respective initial location when the first homography 608 was generated and determined that resulted in a significant difference or shift in the newly calculated physical locations coordinates (x,y) of the points 3016 in the calculated location array 3030 compared to the reference location array 3034. In response, the item tracking engine 114 may determine that the camera 108 and/or the platform 202 has moved from their respective initial location when the first homography 608 was determined and used to determine the reference location array 3034.

In response, the item tracking engine 114 may determine a second homography 3038. In this process, the item tracking engine 114 may determine the inverse of the physical location array 3022 and compute the multiplication of the inverse of the physical location array 3022 with the reference location array 3034. Similarly, if matrix format is used, the inverse matrix of the physical location matrix maybe multiplied with the reference location matrix. The result of this multiplication is the second homography 3038 that is configured to translate between the pixel locations 3024*a-n* of the points 3016 in an image of the calibration board 3010 and the reference location array 3034.

The item tracking engine 114 may then use the second homography 3038 to re-calibrate or calibrate the camera 108. In this process, the item tracking engine 114 may use the second homography 3038 in determining the physical locations of items that are placed on the platform 202, similar to that described in FIGS. 1-29. In other words, the item tracking device 104 may use the second homography 3038 to translate between a pixel location in an image 122, 124 and a respective physical location coordinate (x,y) in the global plane. For example, the item tracking device 104 may project from (x,y) coordinates indicated in the reference location array 3034 in the global plane to pixel locations in the pixel location array 3022 associated with an image 122 or depth image 124. For example, the item tracking device 104 may receive an (x,y) physical coordinate (e.g., GL' 11) for an object in the global plane. The item tracking device 104 identifies a homography 3038 that is associated with a camera 108 or 3D sensor 110 where the object is seen. The item tracking device 104 may then apply the inverse homography 3038 to the (x,y) physical coordinate to determine a pixel location 3024*a* where the object is located in the image 122 or depth image 124. To this end, the item tracking device 104 may compute the matrix inverse of the homography 3038 when the homography 3038 is represented as a matrix. For example, the item tracking device 104 may perform matrix multiplication between an (x,y) coordinates (e.g., GL' 11) of an object in the global plane and the inverse homography 3038 to determine a corresponding pixel location 3024*a* of the object (e.g., PL 11) in the image 122 or depth image 124.

In another example, the item tracking device 104 may receive a pixel location of an object in an image 122 or depth image 124. The item tracking device 104 may identify the homography 3038 that is associated with a camera 108 or 3D sensor 110 that captured the image 122 or depth image 124. The item tracking device 104 may then apply homography 3038 to the pixel location of the object to determine the physical location of the object in the global plane. For example, the item tracking device 104 may perform matrix multiplication between the pixel location 3024*a* of the object in an image 122 or a depth image 124 and the homography 3038 to determine the physical location coordinate (x,y) of the object in the global plane. In this manner, the item tracking device 104 may translate between pixel locations in an image 122 or a depth image 124 and respective physical locations using the homography 3038.

In certain embodiments, the second homography 3038 may comprise coefficients that translate between the pixel location array 3022 in the image 122, 124 and the reference location array 3034 in the global plane.

The item tracking engine 114 may perform similar operations with respect to each camera 108 that a change more than the threshold value 3036 is detected, similar to that described above. For example, with respect to a second camera 108, the item tracking engine 114 may receive an image 122, 124 from the second camera 108, where the image 122, 124 shows at least a portion of the set of points 3016 on the calibration board 3010. The image 122, 124 may include the image 3014. In this example, the second camera 108 may be at a different location than the first camera 108 described above. Therefore, the second image 122, 124 may be captured at a different angle compared to the first image 122, 124 described above.

The item tracking engine 114 may determine a second pixel location array 3022 that comprises a second set of pixel locations 3024*a-n* associated with the set of points 3016 in the second image 122, 124. The item tracking engine 114 may determine a second calculated location array 3030 by applying the first homography 608 to the second pixel location array 3022. The second calculated location array 3030 identifies a second set of calculated physical (x,y) location coordinates of the set points 3016 in the global plane. The item tracking engine 114 may compare the reference location array 3034 with the second calculated location array 3030.

The item tracking engine 114 may determine whether there is a difference between the reference location array 3034 and the second calculated location array 3030 and if the difference is more than the threshold value 3036. If it is determined that the difference between the reference location array 3034 and the second calculated location array 3030 is more than the threshold value 3036, the item tracking engine 114 may determine that the second camera 108 and/or the platform 202 has moved from its respective location from when the first homography 608 was determined. In response, the item tracking engine 114 may determine a third homography 3038 by multiplying an inverse of the second pixel location array 3022 and the reference location array 3034. The item tracking engine 114 may then calibrate the second camera 108 using the third homography 3038 to determine the physical locations of items that are placed on the platform 202.

In certain embodiments, comparing the reference location array 3034 with the calculated location array 3030 may include comparing each element in the reference location array 3034 with a counterpart element in the calculated location array 3030. For example, GL 11 may be compared with GL' 11, and GL ln may be compared with GL' ln. The threshold value 3036 may be with respect to differences between each element in the calculated location array 3030 and the respective element in the reference location array 3034. For example, the threshold value 3036 may correspond to an accumulation or an average of differences between each element in the calculated location array 3030 and the respective element in the reference location array 3034.

In certain embodiments, to determine the pixel location array 3022, the item tracking engine 114 may convert the image 122, 124 into a gray-scale image 122, 124, remove noises, such as areas or dots that have less than a threshold circumference (e.g., less than 3 cm, 4 cm, etc.) from the gray-scale image 122, 124, detect a set of lines on the image 3014 of the calibration board 3010 (e.g., via a line detection algorithm), detect a set of intersections where each pair of lines meet on the image 3014 of the calibration board 3010 (e.g., via an edge detection algorithm), determine a pixel location 3024*a-n* of each intersection from among the set of intersections, and form the set of pixel locations 3024*a-n* of the set of intersections in the pixel location array 3022.

Example Method for Camera Re-Calibration Based on Updated Homography

Figure 31:
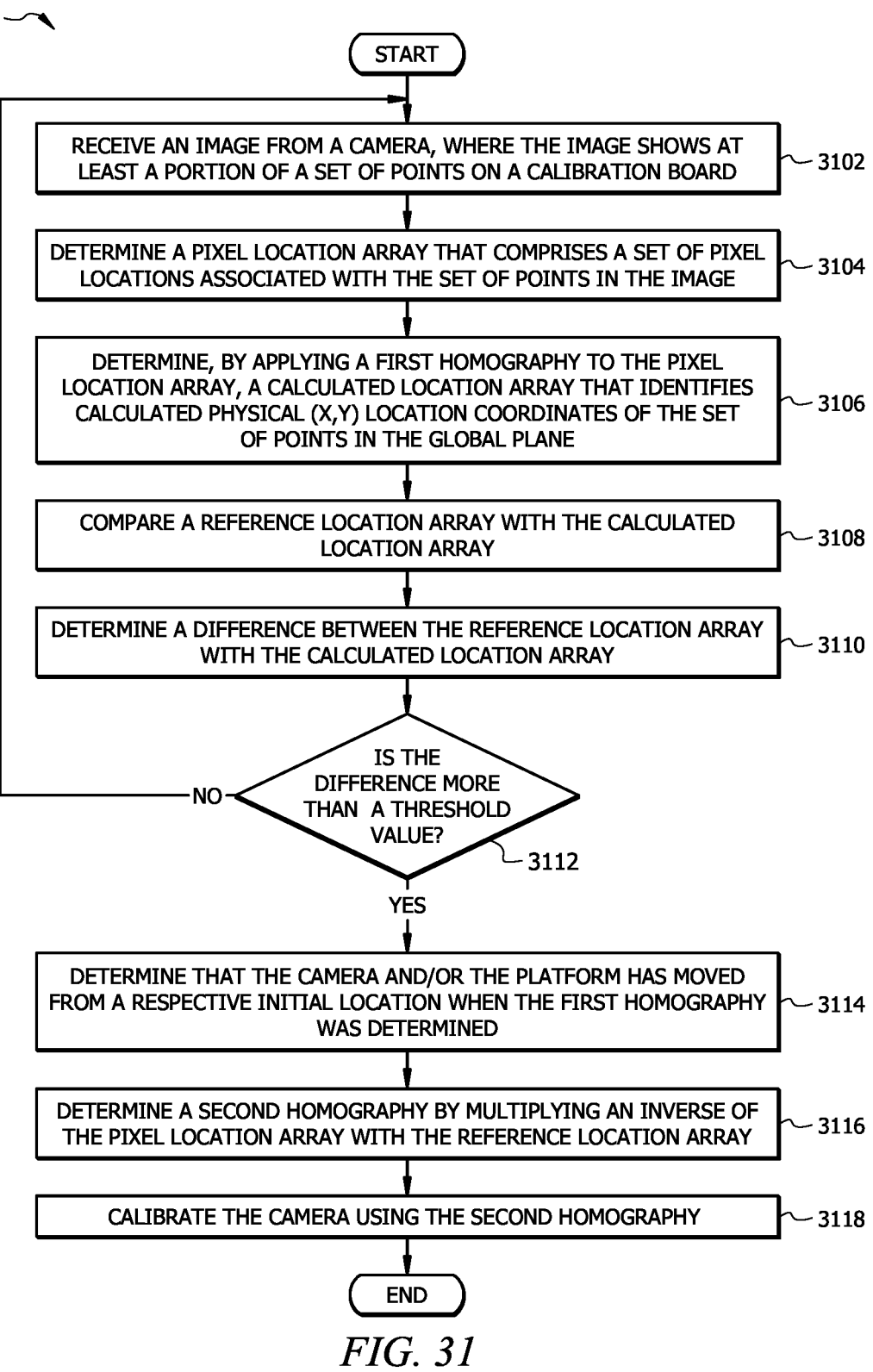
FIG. 31 illustrates an example flow chart of a method for camera re-calibration using an updated homography.

FIG. 31 illustrates an example flow chart of a method 3100 for camera re-calibration based on an updated homography 3038. Modifications, additions, or omissions may be made to method 3100. Method 3100 may include more, fewer, or other operations. For example, operations may be performed in parallel or in any suitable order. While at times discussed as the system 3900, item tracking device 104, item tracking engine 114, imaging device 102, or components of any of thereof performing operations, any suitable system or components of the system may perform one or more operations of the method 3100. For example, one or more operations of method 3100 may be implemented, at least in part, in the form of software instructions 3002 of FIG. 30, stored on a tangible non-transitory computer-readable medium (e.g., memory 116 of FIG. 30) that when run by one or more processors (e.g., processors 602 of FIG. 30) may cause the one or more processors to perform operations 3102-3118.

At operation 3102, the item tracking engine 114 receives an image 122, 124 from a camera 108, where the image 122, 124 shows at least a portion of the set of points 3016 on the calibration board 3010. For example, the item tracking engine 114 may receive the image 122, 124 when the imaging device 102 sends the image 122, 124 to the item tracking device 104.

At operation 3104, the item tracking engine 114 determines the pixel location array 3022 that comprises a set of pixel locations 3024*a-n* associated with the set of points 3016 in the image 122, 124. For example, the item tracking engine 114 may feed the image 122, 124 to the image processing algorithm included in the machine learning module 126, similar to that described in FIGS. 1-29.

At operation 3106, the item tracking engine 114 determines, by applying a first homography 608 to the pixel location array 3022, the calculated location array 3030 that identifies calculated physical (x,y) location coordinates of the set of points 3016 in the global plane. For example, the item tracking engine 114 may multiply each element of the pixel location array 3022 with the first homography 608 to determine the respective calculated physical location coordinate (x,y) of the respective point 3016 in the global plane.

At operation, 3108, the item tracking engine 114 compares the reference location array 3034 with the calculated location array 3030. At operation 3110, the item tracking engine 114 determines a difference between the reference location array 3034 and the calculated location array 3030.

At operation 3112, the item tracking engine 114 determines whether the difference between the reference location array 3034 and the calculated location array 3030 is more than the threshold value 836. If it is determined that the difference between the reference location array 3034 and the calculated location array 3030 is more than the threshold value 836, method 3100 proceeds to operation 3114. Otherwise, method 3100 returns to operation 3102 to evaluate another image 122, 124 captured by the same or another camera 108.

At operation 3114, the item tracking engine 114 determines that the camera 108, (3D sensor 110), and/or the platform 202 have/has moved from a respective initial location when the first homography 608 was determined. At operation 3116, the item tracking engine 114 determines a second homography 3038 by multiplying an inverse of the pixel location array 3022 with the reference location array 3034. At operation 3118, the item tracking engine 114 calibrates the camera 108 and/or 3D sensor 110 using the second homography 3038.

Detecting a Trigger Event for Identification of an Item

In general, certain embodiments of the present disclosure describe techniques for detecting a triggering event corresponding to a placement of an item on a platform (e.g., platform 202 shown in FIG. 2A) of an imaging device (e.g., imaging device 102 shown in FIG. 2A). An overhead camera positioned above the platform and having a top view of the platform is configured to take pictures of the platform (e.g., periodically or continually). Each particular pixel of an image captured by the overhead camera is associated with a depth value indicative of a distance between the overhead camera and a surface depicted by the particular pixel. A reference image of an empty platform is captured and an average reference depth value associated with all pixels in the reference image is calculated. Thereafter, for each subsequent image captured by the overhead camera, a real-time average depth associated with all pixels of the subsequent image is calculated and subtracted from the reference depth calculated for the empty platform. When the difference between the reference depth and real-time depth stays constant above zero across several images of the platform, it means that an item has been placed on the platform and is ready for identification. In response, a triggering event is determined to have been detected.

Item tracking device 104 may be configured to detect a triggering event at the platform 202 of an imaging device 102 (shown in FIG. 2A), wherein the triggering event corresponds to the placement of an item 204 on the platform 202.

The item tracking device 104 detects a triggering event corresponding to the placement of an item 204 on the platform 202 of the imaging device 102 by detecting that a user's hand holding the first item 204A entered the platform 202, placed the first item 204A on the platform 202, and exited the platform 202.

As described further below in accordance with certain embodiments of the present disclosure, the item tracking device 104 can use a depth image 124 (e.g., shown in FIG. 33A) of an empty platform 202 or a depth image 124 of the platform 202 with one or more items 204 already placed on the platform 202 as a reference overhead depth image 3302 (shown in FIG. 33A). At a later time, the item tracking device 104 can detect that an item 204 or an additional item 204 has been placed on the surface 208 of the platform 202 based on differences in depth values of pixels between subsequent depth images 124 (e.g., secondary depth images

Figures 33A, 33B, 33C, 33D:
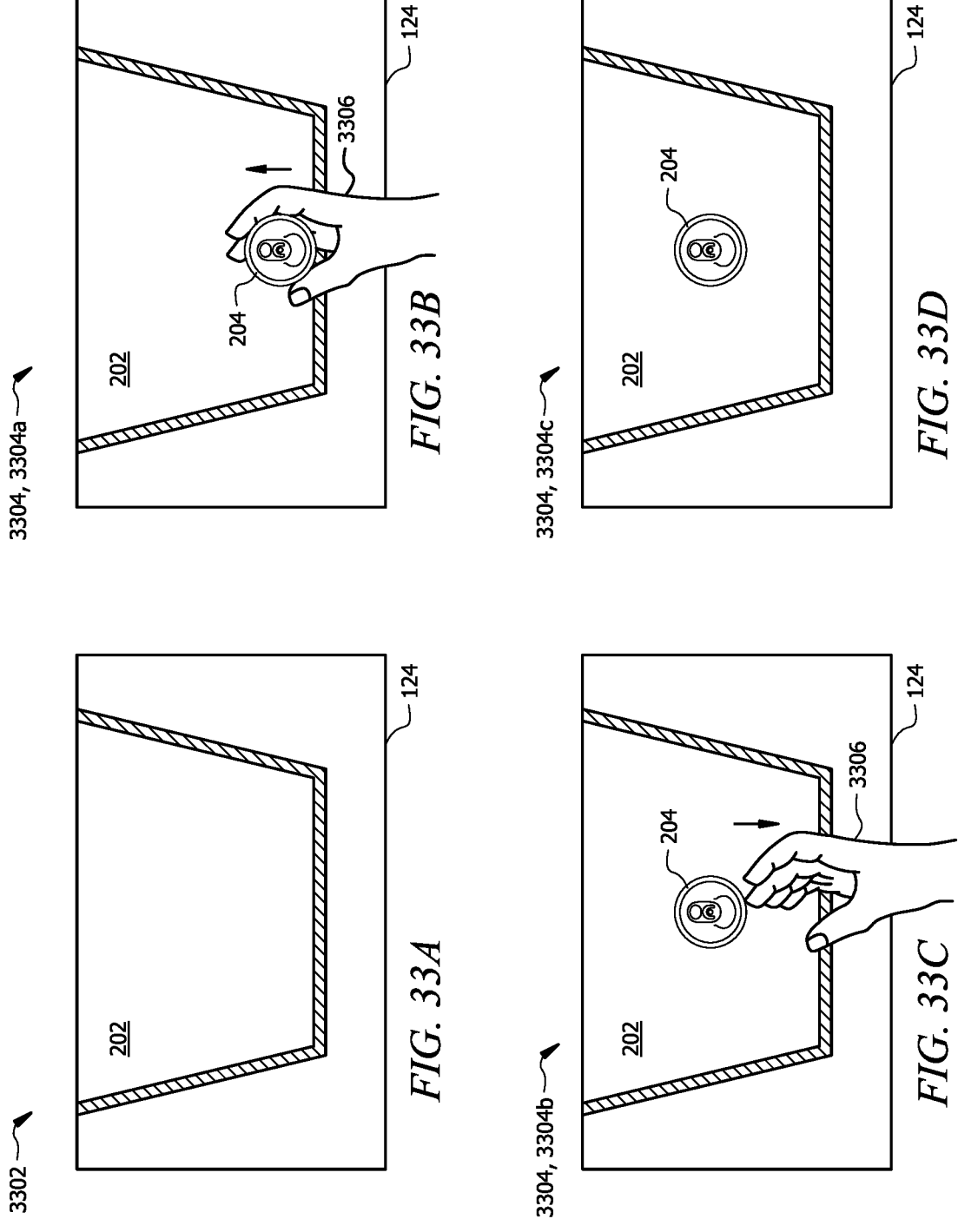
FIGS. 33A, 33B, 33C and 33D illustrate overhead depth images of a platform, in accordance with one or more embodiments of the present disclosure.

3304 shown in FIGS. 33A, 33B and 33C) of the platform 202 and the reference depth image 3302.

For example, as shown in FIG. 33A, item tracking device 104 first captures a reference overhead depth image 3302, wherein the reference overhead depth image 3302 is captured by a 3D sensor 110 (shown in FIG. 2A) that is positioned above the platform 202 and that is configured to capture overhead depth images 124 of the platform 202. In one embodiment, the reference overhead depth image 3302 is of the platform 202 without any obstructions between the 3D sensor 110 and the surface 208 of the platform 202. Each pixel in the reference overhead depth image 3302 is associated with a depth value (d) 111 (shown in FIG. 2A) indicating a distance between the 3D sensor 110 and a portion of the surface of the platform 202 depicted by the pixel. Item tracking device 104 determines a reference average depth value across all pixels of the reference overhead depth image 3302. Subsequently, in response to detecting a motion by a proximity sensor 250 (shown in FIG. 2A) of the imaging device 102, item tracking device 104 starts capturing secondary overhead depth images 3304 (shown as 3304a in FIG. 33B, 3304b in FIG. 33C, and 3304c at FIG. 33D) of the platform 202 using the 3D sensor 110 (shown in FIG. 2A). Like the reference overhead depth image 3302, each pixel of each secondary overhead depth image 3304 is associated with a depth value indicating a distance (d) 111 (shown in FIG. 2A) between the 3D sensor 110 and a surface (e.g., surface of the platform 202, a hand or an item 204, etc.) depicted by the pixel. Item tracking device 104 compares each secondary overhead depth image 3304 with the reference overhead depth image 3302 to determine one or more events (shown as events E1, E2 and E3 in FIG. 34) associated with identifying a triggering event corresponding to placement of an item 204 on the platform 202. For example, item tracking device 104 calculates a depth difference parameter (D) 3402 (shown in FIG. 34) based on comparing each captured secondary overhead depth image 3304 captured by the 3D sensor 110 with the reference overhead depth image 3302. The depth difference parameter (D) 3402 is a single numerical value that represents a comparison of the depth values associated with pixels in the secondary overhead depth image 3304 and the pixels in the reference overhead depth image 3302.

Figure 34:
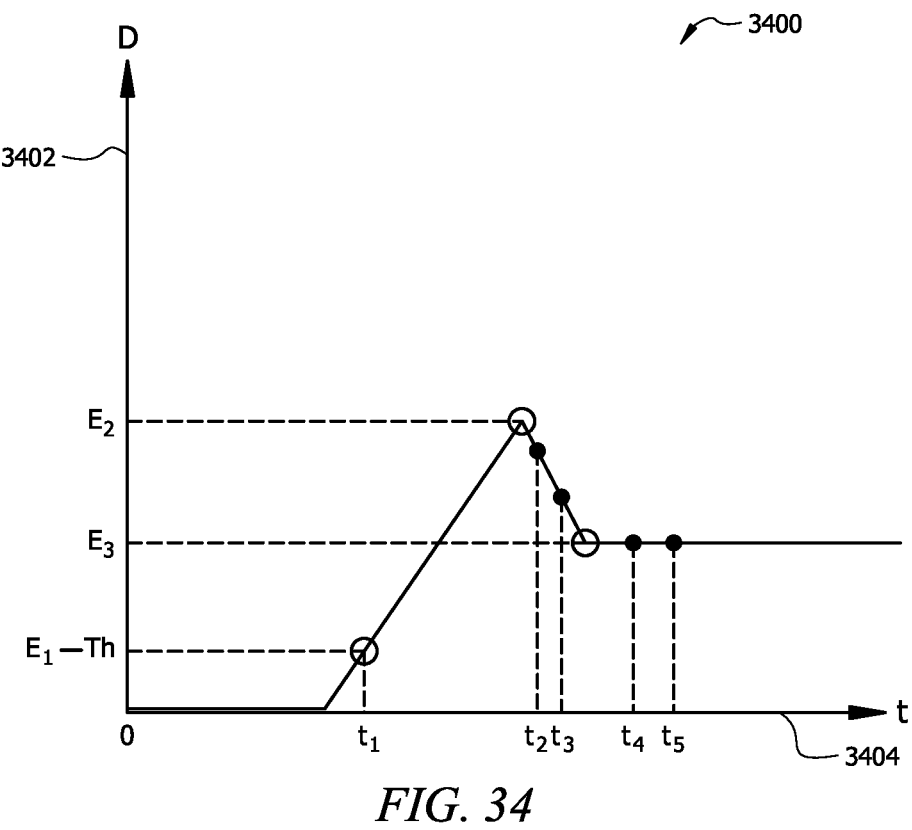
FIG. 34 illustrates a plot between the depth difference parameter (D) and time (t), in accordance with one or more embodiments of the present disclosure.

FIG. 34 illustrates a plot 3400 of the depth difference parameter (D) 3402 over time (t). By tracking the value of the depth difference parameter (D) 3402 across a plurality of secondary overhead depth images 3304, item tracking device 104 determines whether a triggering event has occurred at the platform 202 of the imaging device 102. As shown in FIG. 34, item tracking device detects a first event E1 when D exceeds a pre-set threshold value (Th) at a secondary overhead depth image 3304 (e.g., 3304a shown in FIG. 33B) that is captured at time instant t1. Event E1 may indicate that a user's hand 3306 holding item 204 has entered the view of the 3D sensor 110 and is moving inward on the platform 202 as shown in FIG. 33B. Referring back to FIG. 34, item tracking device detects a second event E2 when the value of D starts dropping, indicating that the user's hand 3306 has placed the item 204 on the platform 202 and is moving away from the platform 202, as shown in FIG. 33C. Referring back to FIG. 34, item tracking device detects a third event E3 in response to detecting that the value of D has stayed constant at a value higher than a threshold for a given time interval, indicating that the user's hand 3306 has completely moved away from the platform 202 and is no more in view of the 3D sensor 110. This is shown in FIG. 33D where item 204 is placed on the platform 202 and the user's hand 3306 is not visible. In response to determining that the value of D has stayed constant at a value higher than the threshold for a given time interval, item tracking device 104 may determine that a triggering event has occurred at the platform 202 corresponding to placement of the item 204 on the platform 202. These aspects will now be described below in further detail with reference to FIGS. 32A, 32B, 33A-D and 34.

The system and method described in certain embodiments of the present disclosure provide a practical application of intelligently detecting a triggering event corresponding to placement of an item 204 on the platform 202 of the imaging device 102. As described with reference to FIGS. 32A-B, 33A-D, and 34, the item tracking device 104 detects whether an item 204 has been placed on the platform 202 by comparing a reference overhead image of an empty platform 202 with a plurality of subsequently captured overhead images of the platform 202. By calculating a difference in the average depth values associated with pixels of the reference image and the plurality of subsequent images, the item tracking device 104 determines, for example, that a user's hand holding an item 204 entered the platform 202, placed the first item 204 on the platform 202, and exited the platform 202. This technique for detecting a triggering event avoids false detection of triggering events as well as avoids missed detection of triggering events, thus improving accuracy associated with detecting triggering events at the platform 202. Further, by avoiding false detection of triggering events, the disclosed system and method saves computing resources (e.g., processing and memory resources associated with the item tracking device 104) which would otherwise be used to perform one or more processing steps that follow the detection of a triggering event such as capturing images using cameras 108 of the imaging device 102 to identify items 204 placed on the platform 202. This, for example, improves the processing efficiency associated with the processor 602 (shown in FIG. 6) of the item tracking device 104. Thus, the disclosed system and method generally improve the technology associated with automatic detection of items 204.

It may be noted that the systems and components illustrated and described in the discussions of FIGS. 1-29 may be used and implemented to perform operations of the systems and methods described in FIGS. 32A-B, 33A-D, and 34. Additionally, systems and components illustrated and described with reference to any figure of this disclosure may be used and implemented to perform operations of the systems and methods described in FIGS. 32A-B, 33A-D, and 34.

Figure 32A:
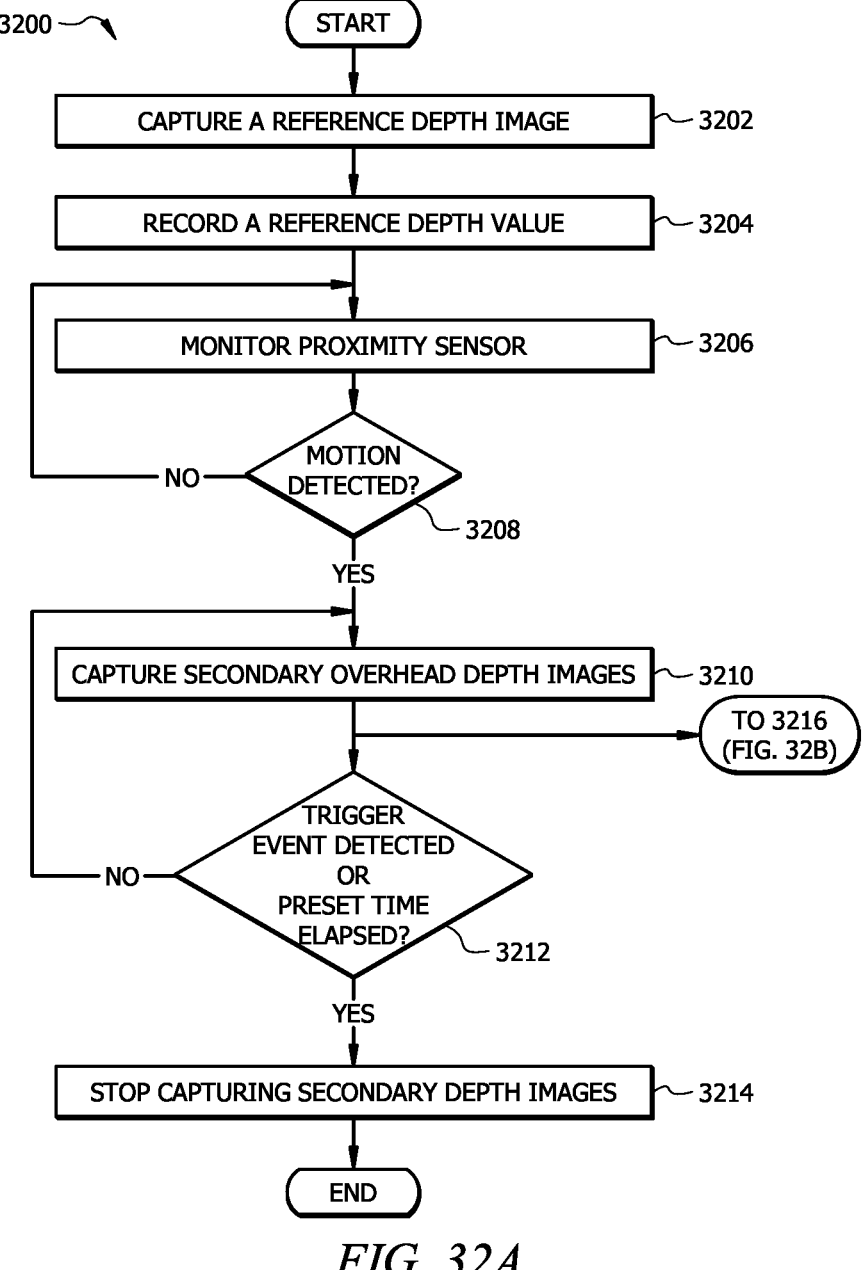
FIGS. 32A and 32B illustrate a flowchart of an example method for detecting a triggering event corresponding to placement of an item on the platform, in accordance with one or more embodiments of the present disclosure.
Figure 32B:
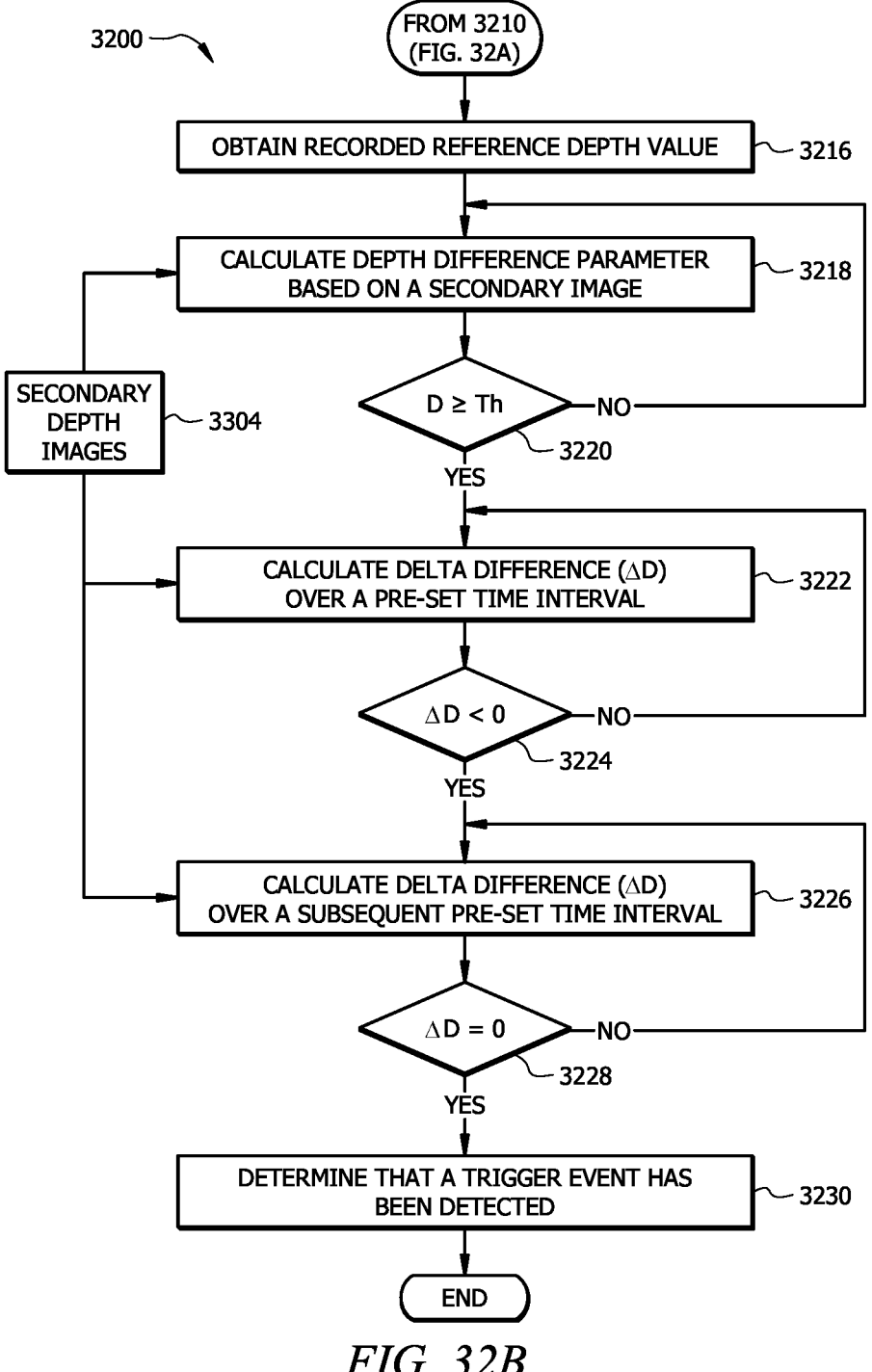

FIGS. 32A and 32B illustrate a flowchart of an example method 3200 for detecting a triggering event corresponding to placement of an item 204 on the platform 202, in accordance with one or more embodiments of the present disclosure. Method 3200 may be performed by item tracking device 104 as shown in FIG. 1. For example, one or more operations of method 3900 may be implemented, at least in part, in the form of software instructions (e.g., item tracking instructions 606 shown in FIG. 6), stored on tangible non-transitory computer-readable medium (e.g., memory 116 shown in FIGS. 1 and 6) that when run by one or more processors (e.g., processors 602 shown in FIG. 6) may cause the one or more processors to perform operations 3202-3230. It may be noted that method 3200 may be an alternative or additional embodiment to the process 700 described above with reference to FIG. 7 for detecting a triggering event. It may be noted that operations 3202-3230 are described primarily with reference to FIGS. 33A-33D, 34 and additionally with certain references to FIGS. 1, 2A, 16, and 17.

Referring to FIG. 32A, at operation 3202, item tracking device 104 captures a reference overhead depth image 3302 (shown in FIG. 33A), wherein the reference overhead depth image 3302 is captured by a 3D sensor 110 (shown in FIG. 2A) that is positioned above the platform 202 and that is configured to capture overhead depth images 124 (shown in FIGS. 33A-33D) of the platform 202. Each overhead depth image 124 taken by the 3D sensor 110 depicts a top view of the platform 202 including upward-facing surfaces of objects (e.g., items 204, a user's hand 3306 etc. shown in FIG. 33A-D) placed on the platform 202. In one embodiment, the reference overhead depth image 3302 is of the platform 202 without any obstructions between the 3D sensor 110 and the surface 208 of the platform 202. In other words, the reference overhead depth image 3302 is of an empty platform 202 without any items 204 placed on the platform 202 and without any other objects (e.g., user's hand 3306 shown in FIGS. 33B and 33C) obstructing the view of the surface 208 of the platform 202 as viewed by the 3D sensor 110. In an additional or alternative embodiment, the reference overhead depth image 3302 is of the platform 202 with one or more items 204 already placed on the platform 202 as part of one or more previous interactions by the user with the imaging device 102.

As described above, the 3D sensor 110 is configured to capture depth images 124 such as depth maps or point cloud data for items 204 placed on the platform 202. A depth image 124 includes a plurality of pixels distributed across the depth image 124. Each of the plurality of pixels is associated with a depth value (d) 111 (shown in FIG. 2A) indicating a distance between the 3D sensor 110 and at least a portion of an upward-facing surface (e.g., surface 208 of the platform 202 or a surface of an object such as an item 204) depicted by the pixel.

At operation 3204, item tracking device 104 records (e.g., stores in memory 116 shown in FIG. 1) a reference depth value 3350 (also shown in FIG. 1) associated with the reference overhead depth image 3302. In one embodiment, the reference depth value 3350 includes a reference average depth value 3350a (shown in FIG. 1) associated with all pixels in the reference overhead depth image 3302. For example, item tracking device 104 calculates the reference depth value 3350 by adding individual depth values (d) 111 associated with all pixels in the reference overhead depth image 3302 and dividing the sum by the number of pixels in the reference overhead depth image 3302. In an alternative embodiment, the reference depth value 3350 includes the sum of depth values (d) 111 associated with all pixels in the reference overhead depth image 3302, wherein the item tracking device 104 calculates the reference depth value 3350 by adding depth values (d) 111 associated with all pixels of the reference overhead depth image 3302.

At operation 3206, item tracking device 104 monitors a proximity sensor 250 (shown in FIG. 2A) that is configured to detect motion near the platform 202 of the imaging device 102.

At operation 3208, if the item tracking device 104 does not detect motion near the platform 202 in conjunction with proximity sensor 250, the item tracking device 104 continues to monitor the proximity sensor 250 for motion. On the other hand, upon detecting motion near the platform 202 in conjunction with proximity sensor 250, method 3200 proceeds to operation 3210 where the item tracking device 104 starts capturing secondary overhead depth images 3304

(shown as 3304a in FIG. 33B, 3304b in FIG. 33C, and 3304c at FIG. 33D) of the platform 202. Motion detected near the platform 202 by the proximity sensor 250 may indicate that a user has approached the imaging device 102 and is about to place an item 204 on the platform 202.

From operation 3210, method 3200 proceeds in parallel to operations 3212 and 3216 (shown in FIG. 32B). At operation 3216, item tracking device 104 obtains the reference depth value 3350 that was previously stored in memory 116 at operation 3204.

At operation 3218, item tracking device 104 calculates a depth difference parameter (D) 3402 (shown in FIG. 34) based on a particular secondary overhead depth image 3304 (e.g., 3304a), for example, by comparing the secondary overhead depth image 3304 to the reference overhead depth image 3302. The depth difference parameter (D) 3402 is a single numerical value that represents a comparison of the depth values (d) 111 associated with pixels in the secondary overhead depth image 3304 and the pixels in the reference overhead depth image 3302. Item tracking device 104 calculates the depth difference parameter (D) 3402 by subtracting a depth value calculated based on individual depth values (d) 111 of pixels in the secondary overhead depth image 3304 from the reference depth value 3350 associated with the reference overhead depth image 3302.

In a first embodiment, when the reference depth value 3350 is a reference average depth value 3350a associated with pixels in the reference overhead depth image 3302, item tracking device 104 determines the depth difference parameter (D) 3402 by calculating a second average depth value associated with pixels in the secondary overhead depth image 3304 and subtracting the second average depth value from the reference average depth value 3350a. The second average depth value is an average of the individual depth values (d) 111 associated with pixels in the secondary overhead depth image 3304.

In a second alternative embodiment, when the reference depth value 3350 includes the sum of depth values (d) 111 associated with all pixels in the reference overhead depth image 3302, the item tracking device 104 determines the depth difference parameter (D) 3402 by subtracting a sum of depth values (d) 111 associated with pixels in the secondary overhead depth image 3304 from the sum of depth values (d) 111 associated with all pixels in the reference overhead depth image 3302.

While embodiments of the present disclosure are described with reference to the first embodiment described above wherein depth difference parameter (D) 3402 is determined by subtracting average of depth values (d) 111 associated with a secondary overhead depth image 3304 from the reference average depth value 3350a, a person having ordinary skill in the art may appreciate that these embodiments apply when the depth difference parameter (D) 3402 is determined by subtracting a sum of depth values (d) 111 associated with pixels in a secondary overhead depth image 3304 from the sum of depth values (d) 111 associated with all pixels in the reference overhead depth image 3302. Additionally, it may be noted that while certain embodiments of the present disclosure including FIGS. 33A, 33B, 33C, 33D and 34 illustrate and describe detecting a triggering event corresponding to placement of an item 204 on an empty platform, a person having ordinary skill in the art may appreciate that the embodiments apply to detecting a triggering event corresponding to placement of an additional item 204 on the platform 202 which has one or more other items 204 already placed on the platform 202.

Referring back to FIG. 32B, at operation 3220, if the depth difference parameter (D) 3402 is less than a predetermined threshold (Th) value (e.g., D<Th), method 3200 returns to operation 3218 where the item tracking device 104 continues to calculate the depth difference parameter (D) 3402 based on subsequent secondary overhead depth images 3304 captured by the 3D sensor 110. The value of the threshold (Th) may be set to a value slightly above zero to avoid false positives. It may be noted that D<Th indicates that there are no additional obstructions, as compared to the reference overhead depth image 3302, between the 3D sensor 110 and the surface 208 of the platform 202 at the time the secondary overhead depth image 3304 (based on which D was calculated) was captured. This means that the secondary overhead depth image 3304 is the same as or very similar to the reference overhead depth image 3302. For example, when the reference overhead depth image 3302 is of an empty platform 202 as shown in FIG. 33A, D<Th calculated by comparing a subsequently captured secondary overhead depth image 3304 and the reference overhead depth image 3302 indicates that the platform 202 was still empty at the time the subsequent secondary overhead depth image 3304 was taken, which may mean that the user has not initiated placement of an item 204 on the platform 202. For example, referring to FIG. 34, assuming that item tracking device 104 starts capturing secondary overhead depth images 3304 at t=0, the value of D stays below the pre-set threshold value (Th) between time t=0 and time t=t1. This indicates that the user's hand 3306 holding the item 204 does not enter the view of the 3D sensor 110 between time t=0 and time t=t1.

On the other hand, if the depth difference parameter (D) 3402 equals or is greater than the predetermined threshold (Th) value (e.g., D≥Th), method 3200 proceeds to operation 3222. D>Th indicates that there are one or more additional obstructions (e.g., user's hand 3306 and/or item 204), as compared to the reference overhead depth image 3302, between the 3D sensor 110 and the surface 208 of the platform 202 at the time the secondary overhead depth image 3304 (based on which D was calculated) was captured. For example, FIG. 33B shows a secondary overhead depth image 3304a which depicts a portion of the user's hand 3306 holding an item 204 (e.g., a soda can). The pixels in the secondary overhead depth image 3304a that depict the user's hand 3306 holding an item 204 are associated with a smaller average of depth value (d) 111 as compared to the reference average depth value 3350a corresponding pixels in the reference overhead depth image 3302. This means that the depth difference parameter (D) 3402 calculated as described above by comparing the secondary overhead depth image 3304a with the reference overhead depth image 3302 is a larger value as compared to a value of the depth difference parameter (D) 3402 calculated by comparing a previously captured secondary overhead depth image 3304 of an empty platform 202 with the reference overhead depth image 3302 which is also of the empty platform 202. A change in value of D from 0 or a value less than Th to a value greater than the Th, may indicate that the user has initiated the process of placing an item 204 on the platform 202 and that the user's hand 3306 holding an item 204 has moved from a first position that is outside a view of the 3D sensor 110 to a second position on the platform 202 (e.g., as shown in FIG. 33B) that is within the view of the 3D sensor 110. For example, as shown in FIG. 34, the value of D exceeds the pre-set threshold value (Th) at a secondary overhead depth image 3304 (e.g., 3304a) that is captured at time instant t1 (shown as event E1).

Referring back to FIG. 32B, at operation 3222, item tracking device 104 calculates a delta difference (ΔD) over a duration of a pre-set time interval (e.g., after time instant t1 in FIG. 34), wherein ΔD corresponds to a change in the depth difference parameter (D) 3402 over the pre-set time interval. For example, item tracking device 104 may calculate ΔD between time instant t2 and time instant t3 as follows:

$$\Delta D = \frac{D2 - D1}{t3 - t2}$$

where D1 is a depth difference parameter (D) 3402 calculated for a secondary overhead depth image 3304 captured at time instant t2; and D2 is depth difference parameter (D) 3402 calculated for a secondary overhead depth image 3304 captured at time instant t3.

At operation 3224, if ΔD≥0, method 3200 returns to operation 3222 where item tracking device 104 continues to calculate ΔD based on subsequently captured secondary overhead depth images 3304. In one example, item tracking device 104 calculates ΔD each time the pre-set time interval has elapsed and based on secondary overhead depth images 3304 captured at either ends of the time interval. In a second example, item tracking device 104 may calculate ΔD periodically. In one embodiment, ΔD>0 indicates that the user's hand 3306 holding the item 204 is moving toward the platform 202 (e.g., inwards from an outer boundary of the platform 202). For example, as the user's hand 3306 holding the item 204 moves further inwards on the platform 202, depth values (d) 111 associated with more pixels of a secondary overhead depth image 3304 have smaller values (e.g., as compared depth values (d) 111 associated with pixels of a previously captured secondary overhead depth image 3304), causing the depth difference parameter D to be progressively larger. Thus, a positive change in the value of D (indicated by ΔD>0) over a pre-set time interval indicates that the user's hand 3306 holding the item 204 is moving toward the platform 202 (e.g., inwards from an outer boundary of the platform 202). For example, as shown in FIG. 34, the value of D increases between t1 and t2, causing ΔD>0, indicating that the user's hand 3306 holding the item 204 is moving toward the platform 202 (e.g., inwards from an outer boundary of the platform 202) between t1 and t2.

Referring back to FIG. 32B, if ΔD<0 (e.g., at operation 3224) over the pre-set time interval, method 3200 proceeds to operation 3226. For example, upon detecting that ΔD calculated based on two secondary overhead depth images 3304 on either ends of a pre-set time interval is less than zero, meaning that the value of the depth difference parameter (D) 3402 has dropped between the pre-set time interval, method 3200 proceeds to operation 3226. ΔD<0 may indicate that the user's hand 3306 has placed the item 204 on the platform 202 and is moving away from the platform 202. This is depicted in FIG. 33C. For example, as the user's hand 3306 moves away from the platform 202, depth values (d) 111 associated with more pixels of a secondary overhead depth image 3304 have larger values (e.g., as compared to pixels of a previously captured secondary overhead depth image 3304), causing the depth difference parameter D to be progressively smaller. Thus, a negative change in the value of D over a pre-set time interval indicates that the user's hand 3306 has placed the item 204 on the platform 202 and is moving away from the platform 202. For example, FIG.

33C shows a secondary overhead depth image 3304b which depicts the user's hand 3306 having placed the item 204 on the platform 202 and having moved away from the position of the item 204 on the platform 202. Referring to FIG. 34, item tracking device 104 calculates ΔD over the pre-set time interval between time instant t2 and time instant t3 based on secondary overhead depth images 3304 captured at t2 and t3. As shown, the value of the depth difference parameter D has dropped between t2 and t3, which means that ΔD<0 between t2 and t3.

Referring back to FIG. 32B, at operation 3226, item tracking device 104 calculates a delta difference ΔD over a subsequent pre-set time interval (e.g., after t3 in FIG. 34), wherein ΔD corresponds to a change in the depth difference parameter (D) 3402 over the subsequent pre-set time interval. It may be noted that the length of the subsequent pre-set time interval associated with operation 3226 may be different from the pre-set time interval associated with operation 3222 described above.

For example, item tracking device 104 may calculate ΔD between time t4 and time t5 as follows:

$$\Delta D = \frac{D4 - D3}{t5 - t4}$$

where D3 is a depth difference parameter calculated for a secondary overhead depth image 3304 captured at time instant t4; and D4 is depth difference parameter calculated for a secondary overhead depth image 3304 captured at time instant t5.

At operation 3228, if ΔD≠0, method 3200 returns to operation 3226 where item tracking device 104 continues to calculate ΔD based on subsequently captured secondary overhead depth images 3304. In one example, item tracking device 104 calculates ΔD each time the subsequent pre-set time interval has elapsed and based on secondary overhead depth images 3304 captured at either ends of the subsequent pre-set time interval. In a second example, item tracking device 104 may calculate ΔD periodically. ΔD≠0 indicates that the user's hand 3306, after placing the item 204 on the platform 202, has not completely moved away from the platform 202 and out of the view of the 3D sensor 110. This means that one or more pixels of the secondary overhead depth images 3304 have captured at least a portion of the user's hand 3306, causing the depth difference parameter (D) 3402 to change between two secondary overhead depth images 3304 that were used to calculate ΔD.

Referring back to operation 3228 of FIG. 32B, if ΔD=0 (or near zero) over the subsequent pre-set time interval (e.g., between t4 and t5 in FIG. 34), method 3200 proceeds to operation 3230. For example, upon detecting that ΔD calculated based on two secondary overhead depth images 3304 on either ends of a subsequent pre-set time interval (e.g., between t4 and t5 in FIG. 34) equals zero (i.e., ΔD=0), meaning that the value of the depth difference parameter D was unchanged over the time interval, method 3200 proceeds to operation 3230. ΔD=0 may indicate that the user's hand 3306, after placing the item 204 on the platform 202, is out of view of the 3D sensor 110. This is depicted in FIG. 33D. Once the user's hand 3306 is out of view of the 3D sensor 110, depth values (d) 111 of pixels associated with a plurality of subsequent secondary overhead depth images 3304 remain unchanged, causing the depth difference parameter D to also stay unchanged. Thus, ΔD=0 detected after detecting ΔD<0 in a previous time interval may indicate that the user's hand 3306 has placed the item 204 on the platform 202 and has moved away far enough from the platform 202 that it is out of the view of the 3D sensor 110. For example, FIG. 33D shows a secondary overhead depth image 3304c which depicts the item 204 placed on the platform 202 with the user's hand 3306 out of view of the 3D sensor 110. Referring to FIG. 34, item tracking device 104 calculates ΔD over the pre-set time interval between time instant t4 and time instant t5 based on secondary overhead depth images 3304 captured at t4 and t5. As shown, the value of the depth difference parameter D is constant between t4 and t5, which means that ΔD=0 between t4 and t5.

Referring back to FIG. 32B, at operation 3230, in response to detecting that ΔD=0, item tracking device 104 determines that a trigger event has been detected, wherein the trigger event corresponds to placement of the item 204 on the platform. In other words, item tracking device 104 determines that the item 204 has been placed on the platform 202 and is ready for identification. In one embodiment, when item 204 is the first item to be placed on the platform 202 (e.g., on an empty platform 202), item tracking device 104 determines that a trigger event has been detected in response to detecting that ΔD=0 and that D>0. In other words. item tracking device 104 determines that a trigger event has been detected when D stays constant at a value higher than zero over a pre-set time interval.

In one or more embodiments, although the above discussion describes that the item tracking device 104 detects a triggering event in response to detecting events E1, E2 and E3 (shown in FIG. 34) one after the other in a sequence, it may be noted that the item tracking device 104 may detect a triggering event in response to detecting any one or more of these events. For example, item tracking device 104 may determine that a triggering event has been detected in response to detecting event E3 alone without detecting events E1 and E2.

In one or more embodiments, in response to determining that a trigger event has been detected, item tracking device 104 may initiate a procedure to identify the item 204 as described in certain embodiments of the present disclosure and display information associated with the identified item 204 on a user interface associated with the item tracking device 104.

Referring back to FIG. 32A, at operation 3212, in response to detecting a triggering event (e.g., at operation 3230 in FIG. 32B) or in response to detecting that a pre-set time interval has elapsed after initiating to capture the secondary overhead depth images 3304, item tracking device 104 stops capturing the secondary overhead depth images 3304. Operation then ends.

Identifying Unmoved Items on the Platform During Item Identification

In general, certain embodiments of the present disclosure describe techniques for detecting an item that was placed on the platform of the imaging device in a previous interaction and assigning to the item an item identifier that was identified in the previous interaction. The disclosed techniques determine whether an item has moved on the platform between interactions associated with a particular transaction. Upon determining that the item has not moved between interactions, the item is assigned an item identifier that was identified as part of a previous interaction. For example, when a first item is placed on the platform for the first time as part of an interaction, a first image of the first item is captured using an overhead camera positioned above the platform. An item identifier is determined for the first item and stored in a memory. Subsequently, when a second item is placed on the platform as part of a subsequent interaction, a second image of the first item is captured using the overhead camera. The second image of the first item is compared with the first image of the first item. When an overlap between the first and second images of the first item equals or exceeds a threshold, it is determined that the first item has not moved from its position on the platform between the first and second interactions. In response to determining that the first item has not moved between the two interactions, the first item is assigned the item identifier that was identified as part of the first interaction.

Figures 36A, 36B:
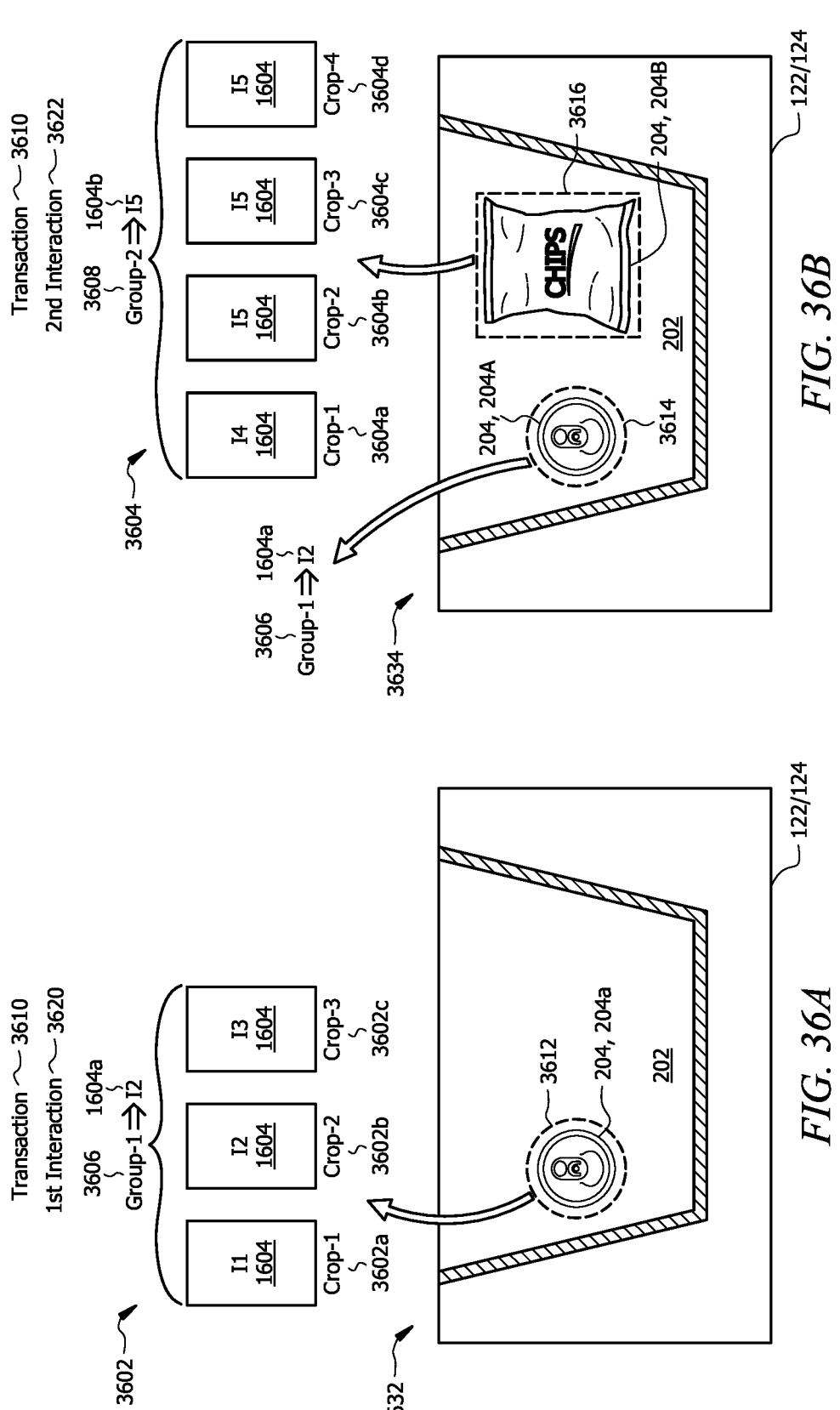
FIGS. 36A and 36B illustrate overhead images of a platform for identifying unmoved items on the platform, in accordance with one or more embodiments of the present disclosure.

In certain embodiments, multiple items 204 may be placed on the platform 202 of the imaging device (shown in FIG. 2A) one-by-one for identification as part of a same transaction. For example, when purchasing a plurality of items 204 at a store where the imaging device 102 is deployed, a user may be instructed to place the items 204 on the platform 202 one by one for identification of the items 204. In this context, placement of each item 204 on the platform 202 as part of a particular transaction may be referred to as a separate interaction associated with the transaction. In response to detecting a triggering event corresponding to placement of an item 204 on the platform 202, item tracking device 104 may identify the item 204 using a method similar to the method described with reference to FIG. 23 and/or the method described with reference to FIG. 29. However, when a transaction includes multiple interactions, item tracking device 104 is configured to identify all items 204 placed on the platform 202 after each additional item 204 is placed on the platform 202. For example, when the user places a bottle of soda on the platform 202 as part of a first interaction, the item tracking device 104 identifies the bottle of soda. When the user adds a bag of chips on the platform 202 as part of a second interaction, the item tracking device 104 re-identifies the bottle of soda in addition to identifying the bag of chips that is newly placed on the platform 202. When the user adds a pack of gum to the platform 202 as part of a third interaction, the item tracking device again re-identifies the bottle of soda and re-identifies the bag of chips in addition to identifying the pack of gum that is newly placed on the platform 202. In other words, item tracking device 104 identifies all items 204 that are placed on the platform 202 as part of every interaction associated with a transaction despite the fact that all but one item 204 that was placed as part of a current interaction were already identified as part of previous interactions. This causes a lot of redundant processing as items 204 are re-identified as part of every subsequent interaction of the transaction. For example, FIG. 36A shows a first interaction 3620 of a transaction 3610, wherein the first interaction 3620 includes placement of a first item 204A on the platform 202. FIG. 36B shows a second interaction 3622 belonging to the same transaction 3610, wherein the second interaction 3622 includes placement of a second item 204B on the platform 202. As described above, item tracking device 104 is generally configured to identify the first item 204a as part of the first interaction 3620, and then re-identify the first item 204a along with identifying the second item 204B as part of the second interaction 3622.

Certain embodiments of the present disclosure describe improved techniques to identify items 204 placed on the platform 202 of an imaging device 102. As described below, these techniques retain item identifiers 1604 associated with items 204 that were identified as part of previous interactions to avoid re-identification of the same item 204. As described below, item tracking device 104 runs the item identification process (e.g., as described with reference to FIG. 23 and/or FIG. 29) only for that item 204 that was placed on the platform 202 as part of the latest interaction and that was not previously identified. For example, referring to the example discussed in the previous paragraph, when the user places a bottle of soda on the platform 202 as part of a first interaction, the item tracking device 104 identifies the bottle of soda and stores the identity of the bottle of soda in a memory. When the user adds a bag of chips on the platform 202 as part of a second interaction, the item tracking device 104 assigns the stored identity to the bottle of soda from the memory and only identifies the bag of chips that is newly placed on the platform 202 as part of the second interaction. The item tracking device 104 stores the identity of the bag of chips along with the identity of the bottle of soda as part of the second interaction. When the user adds a pack of gum to the platform 202 as part of a third interaction, the item tracking device 104 assigns the stored identities to the bottle of soda and the bag of chips from the memory, and only identifies the pack of gum that is newly placed on the platform 202 as part of the third interaction.

Thus, these techniques save processing resources associated with the item tracking device 104 that would otherwise be used in re-running item identification algorithms for items 204 that were already identified as part of a previous interaction of the transaction.

As described in more detail with reference to FIGS. 35A, 35B, 36A and 36B, item tracking device 104 determines whether an item 204 has moved on the platform 202 between interactions of a particular transaction. Upon determining that a particular item 204 has unmoved between interactions, item tracking device 104 assigns an item identifier to the particular item that was identified in a previous interaction. For example, referring to FIG. 36A in response to detecting that the first item 204A (e.g., a can of soda) has been placed on the platform 202 as part of the first interaction 3620, the item tracking device 104 captures a first overhead image of the platform 202 and identifies a first region 3612 within the first image 3632 that depicts the first item 204A. The item tracking device 104 identifies the first item 204A and stores a first item identifier 1604a associated with the first item 204A in a memory (e.g., memory 116 shown in FIG. 1). Referring to FIG. 36B, in response to detecting that a second item 204B (e.g., a bag of chips) has been added on the platform 202 as part of a second interaction 3622, item tracking device 104 captures a second overhead image 3634 of the platform 202 and determines a second region 3614 within the second image 3634 that depicts the first item 204A. The item tracking device 104 compares the second image 3634 to the first image 3632. In response to determining, based on the comparison, that an overlap between the first region 3612 of the first image 3632 and the second region 3614 of the second image 3634 equals or exceeds a threshold, item tracking device 104 accesses the first item identifier 1604a (e.g., from the memory 116) and assigns the first item identifier 1604a to the first item 204A depicted in the second image 3634. The overlap between the first region 3612 of the first image 3632 and the second region 3614 of the second image 3634 equaling or exceeding the threshold indicates that the first item 204A has unmoved on the platform 202 between the first interaction 3620 and the second interaction 3622. These aspects will now be described below in further detail with reference to FIGS. 35A-B, 36A-B, and 37.

The system and method described in certain embodiments of the present disclosure provide a practical application of intelligently determining whether an item 204 has moved on the platform 202 between interactions and assigning a previously identified item identifier 1604 to the item 204 in response to determining that the item has not moved on the platform 202 between interactions. As described with reference to FIGS. 35A-B, 36A-B, and 37, the item tracking device 104 determines whether an item 204 has moved between two interactions by comparing overhead images of the item captured during the two interactions. When an overlap between the overhead images equals or exceeds a threshold, the item tracking device 104 determines that the item 204 has not moved on the platform 202 between the two interactions, and in response, assigns an item identifier to the item that was identified in a previous interaction. These techniques save computing resources (e.g., processing and memory resources associated with the item tracking device 104) that would otherwise be used to re-run item identification algorithms for items 204 that were already identified as part of a previous interaction. This, for example, improves the processing efficiency associated with the processor 602 (shown in FIG. 6) of the item tracking device 104. Thus, the disclosed system and method generally improve the technology associated with automatic detection of items 204.

It may be noted that the systems and components illustrated and described in the discussions of FIGS. 1-29 may be used and implemented to perform operations of the systems and methods described in FIGS. 35A-B, 36A-B, and 37. Additionally, systems and components illustrated and described with reference to any figure of this disclosure may be used and implemented to perform operations of the systems and methods described in FIGS. 35A-B, 36A-B, and 37.

Figure 35A:
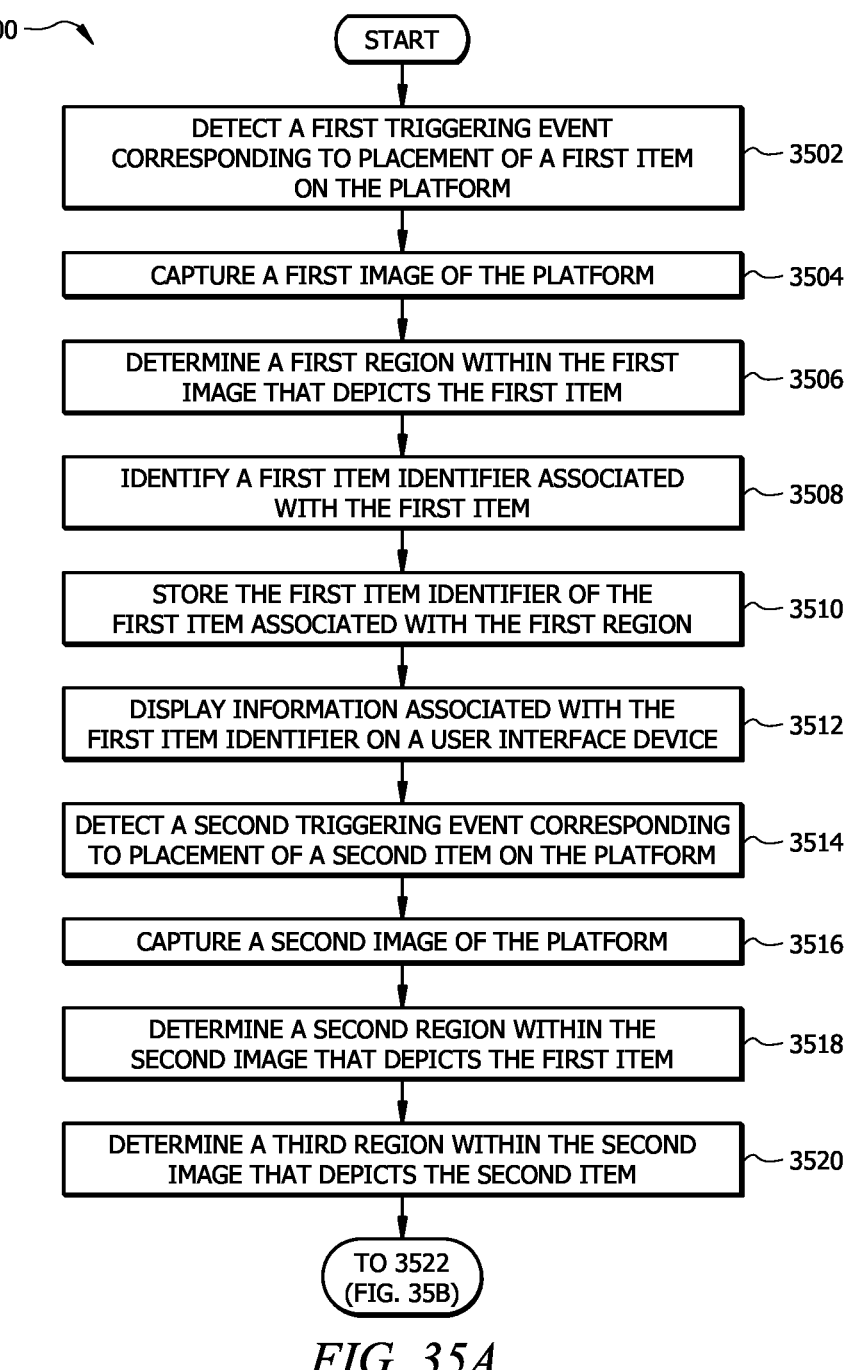
FIGS. 35A and 35B illustrate a flowchart of an example method for identifying unmoved items on a platform between interactions, in accordance with one or more embodiments of the present disclosure.
Figure 35B:
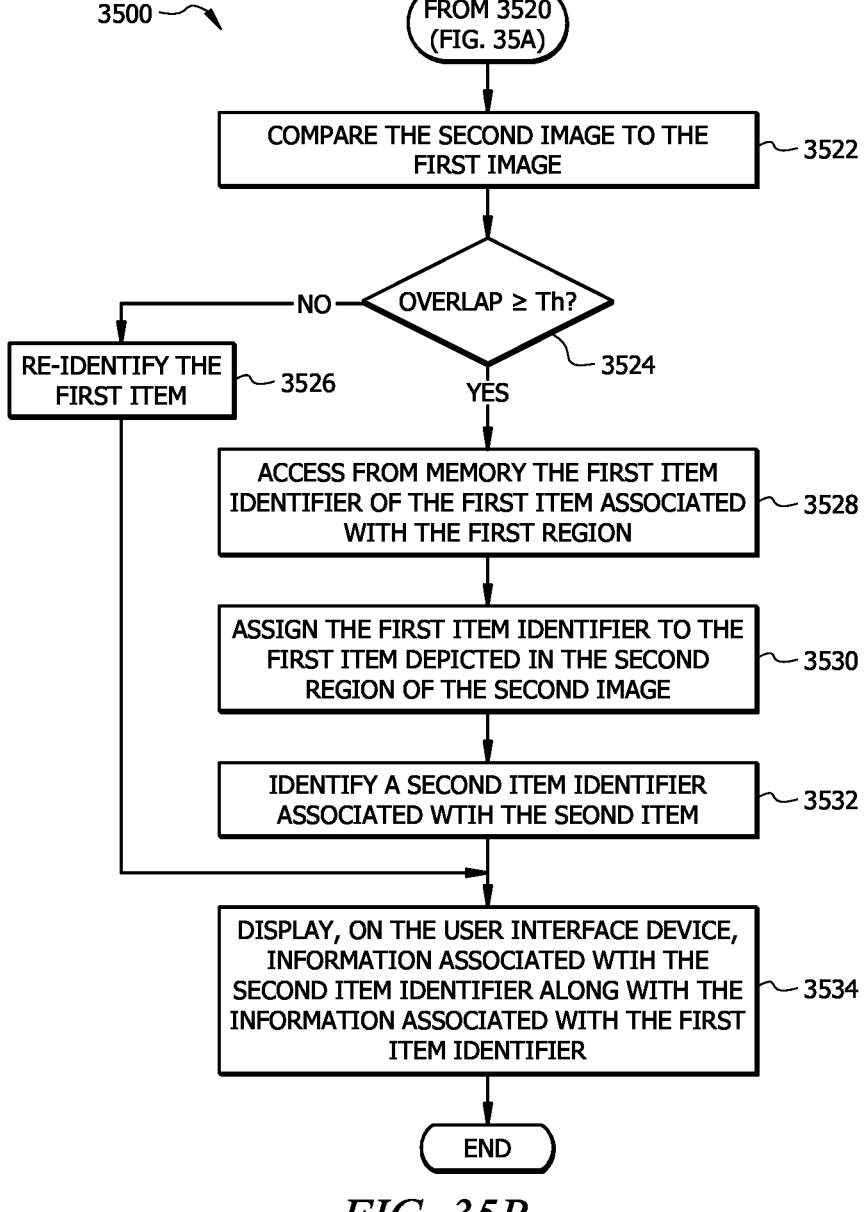

FIGS. 35A and 35B illustrate a flowchart of an example method 3500 for identifying unmoved items 204 on a platform 202 between interactions, in accordance with one or more embodiments of the present disclosure. Method 3500 may be performed by item tracking device 104 as shown in FIG. 1. For example, one or more operations of method 3500 may be implemented, at least in part, in the form of software instructions (e.g., item tracking instructions 606 shown in FIG. 6), stored on tangible non-transitory computer-readable medium (e.g., memory 116 shown in FIGS. 1 and 6) that when run by one or more processors (e.g., processors 602 shown in FIG. 6) may cause the one or more processors to perform operations 3502-3534. As described below, method 3500 identifies an item 204 that remained unmoved on the platform 202 over one or more interactions and re-assigns an item identifier to the item 204 that was identified as part of a previous interaction. It may be noted that operations 3502-3534 are described primarily with reference to FIGS. 36A, 36B, and 37 and additionally with certain references to FIGS. 1, 2A, 16, and 17.

Referring to FIG. 35A, at operation 3502, item tracking device 104 detects a first triggering event at the platform 202, wherein the first triggering event corresponds to the placement of a first item 204A (shown in FIG. 36A) on the platform 202. In a particular embodiment, the first triggering event may correspond to a user placing the first item 204A on the platform 202. As shown in FIG. 36A, the first triggering event corresponds to placement of the first item 204A on the platform 202 as part of a first interaction 3620 associated with a transaction 3610.

Item tracking device 104 may perform auto-exclusion for the imaging device 102 using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 (shown in FIG. 2A) to capture reference images 122 and reference depth images 124 (e.g., shown in FIG. 33A), respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 of the platform 202 based on differences in depth values (d) 111 (shown in FIG. 2A) between subsequent depth images 124 and the reference depth image 124 and/or differences in the pixel values between subsequent images 122 and the reference image 122.

In one embodiment, to detect the first triggering event, the item tracking device 104 may use a process similar to process 700 that is described with reference to FIG. 7 and/or a process similar to method 3200 that is described with reference to FIGS. 32A and 32B for detecting a triggering event, such as, for example, an event that corresponds with a user's hand being detected above the platform 202 and placing an item 204 on the platform 202. For example, the item tracking device 104 may check for differences between a reference depth image 124 (e.g., shown in FIG. 33A) and a subsequent depth image 124 (e.g., shown in FIGS. 33B-C) to detect the presence of an object above the platform 202. For example, based on comparing the reference depth image 124 with a plurality of subsequent depth images 124, item tracking device 104 may determine that a user's hand holding the first item 204A entered the platform 202, placed the first item 204A on the platform 202, and exited the platform 202. In response to determining that the first item 204A has been placed on the platform 202, the item tracking device 104 determines that the first triggering event has occurred and proceeds to identify the first item 204A that the user has placed on the platform 202.

At operation 3504, in response to detecting the first triggering event, item tracking device 104 captures a first image 3632 (e.g., image 122 or depth image 124 shown in FIG. 36A) of the platform 202 using a camera 108 or 3D sensor 110 (shown in FIG. 2A). In one embodiment, the first image 3632 is captured by a camera 108 or 3D sensor 110 that is positioned above the platform 202, that has a top view of the entire platform 202, and that is configured to capture overhead images 122 or overhead depth images 124 of the platform 202. For example, item tracking device 104 may capture the overhead image 122 using the camera 108B (shown in FIG. 2A) or may capture the overhead depth image 124 using the 3D sensor 110 (also shown in FIG. 2A).

At operation 3506, item tracking device 104 determines a first region 3612 (shown in FIG. 36A) within the first image 3632 that depicts the first item 204A, wherein the first region 3612 includes a group of pixels of the respective first image 3632 that correspond to the first item 204A. It may be noted that while first region 3612 is shown in FIG. 36A to follow the boundary of the first item 204A as depicted in the first image 3632 and includes the first item 204A as depicted in the first image 3632, the first region 3612 may be of any shape and size as long as the first region 3612 includes the first item 204A as depicted in the first image 3632. In one embodiment, the first region 3612 includes those pixels of the first image 3632 that depict the first item 204A.

In one embodiment, as described above with reference to FIG. 23, the item tracking device 104 may perform segmentation using a depth image (e.g., depth image 124) from a 3D sensor 110 that is positioned for an overhead or perspective view of the items 204 (e.g., first item 204A) placed on the platform 202. In this example, the item tracking device 104 captures an overhead depth image 124 of the items 204 that are placed on the platform 202. As described above, each pixel of a depth image 124 is associated with a depth value (d) 111 that represents a distance between the 3D sensor and a surface of an object (e.g., platform 202, user's hand, a surface of an item 204) depicted by the pixel. The item tracking device 104 may then use a depth threshold value associated with the pixels in the overhead depth image 124 to distinguish between the platform 202 and items 204 that are placed on the platform 202 in the captured depth image 124. For instance, the item tracking device 104 may set a depth threshold value that is just above the surface of the platform 202. This depth threshold value may be determined based on the pixel values corresponding with the surface of the platform 202 in the reference depth images 124 that were captured during the auto-exclusion process described above. After setting the depth threshold value, the item tracking device 104 may apply the depth threshold value to the captured depth image 124 to filter out or remove the platform 202 from the depth image 124. For example, the item tracking device 104 removes all pixels from the depth image 124 that are associated with a depth value (d) 111 below the depth threshold value. After filtering the depth image 124, the remaining clusters of pixels in the depth image 124 correspond with items 204 that are placed on the platform 202, wherein each cluster of pixels corresponds to an item 204 depicted in the depth image 124. In one embodiment, each cluster of pixels corresponds with a different item 204 depicted in the depth image 124. For example, one of the clusters of pixels identified in the first image 3632 corresponds to the first item 204A placed on the platform 202 as part of the first triggering event detected in operation 3502. This identified cluster of pixels that depicts the first item 204A in the first image 3632 may make up the first region 3612.

In other embodiments, the item tracking device 104 may employ any other suitable type of image processing techniques to identify the first region 3612.

At operation 3508, item tracking device 104 may be configured to identify a first item identifier 1604a (e.g., shown in FIG. 36A) associated with the first item 204A.

As described above, the item tracking device 104 may capture a plurality of images 122A (as shown in FIG. 5A) of the first item 204A on the platform 202 using multiple cameras 108. For example, the item tracking device 104 may capture images 122A with an overhead view, a perspective view, and/or a side view of the first item 204 on the platform 202.

The item tracking device 104 may use a process similar to process 2300 that is described with reference to FIG. 23 or a process similar to method 2900 described with reference to FIG. 29 to identify first item 204A. For example, the item tracking device 104 may generate a cropped image 3602 (shown in FIG. 36A) of the first item 204A from each image 122A of the first item 204A captured by a respective camera 108 by isolating at least a portion of the first item 204A from the image 122A. In other words, item tracking device 104 generates one cropped image 3602 of the first item 204A based on each image 122A of the first item 204A captured by a respective camera 108. As shown in FIG. 36A, item tracking device 104 generates three cropped images 3602a, 3602b and 3602c of the first item 204A from respective images 122A of the first item 204A. In some embodiments, the item tracking device 104 may use a process similar to process 900 described with reference to FIG. 9 to generate the cropped images 3602 of the first item 204A. For example, the item tracking device 104 may generate a cropped image 3602 of the first item 204A based on the features of the first item 204A that are present in an image 122A (e.g., one of the images 122A). The item tracking device 104 may first identify a region-of-interest (e.g., a bounding box) 1002 (as shown in FIG. 10A) for the first item 204A based on the detected features of the first item 204A that are present in an image 122A and then may crop the image 122A based on the identified region-of-interest 1002. The region-of-interest 1002 comprises a plurality of pixels that correspond with the first item 204A in the captured image 122A of the first item 204A on the platform 202. The item tracking device 104 may employ one or more image processing techniques to identify a region-of-interest 1002 for the first item 204A within the image 122A based on the features and physical attributes of the first item 204A. After identifying a region-of-interest 1002 for the first item 204A, the item tracking device 104 crops the image 122A by extracting the pixels within the region-of-interest 1002 that corresponds to the first item 204A in the image 122A. By cropping the image 122A, the item tracking device 104 generates another image (e.g., cropped image 3602) that comprises the extracted pixels within the region-of-interest 1002 for the first item 204A from the original image 122A. The item tracking device 104 may repeat this process for all of the captured images 122A of the first item 204A on the platform 202. The result of this process is a set of cropped images 3602 (e.g., 3602a, 3602b, and 3602c) corresponding to the first item 204A that is placed on the platform 202.

In one embodiment, item tracking device 104 may be configured to assign a group ID 3606 (shown as Group-1) to the group of cropped images 3602 generated for the first item 204A. Group ID refers to a group of cropped images associated with a particular item. As described further below, an item identifier 1604a identified for the first item 204A is mapped to the group ID 3606. It may be noted that item tracking device 104 may be configured to assign a unique group ID to each group of cropped images generated for each respective item 204 placed on the platform 202.

Once the cropped images 3602 of the first item 204A have been generated, item tracking device identifies an item identifier 1604 based on each cropped image 3602. Item tracking device 104 may identify an item identifier 1604 based on a cropped image 3602 by using a process similar to the method 2900 described above with reference to FIG. 23. For example, item tracking device 104 generates an encoded vector 1702 (shown in FIG. 17) for each cropped image 3602 of the first item 204A. An encoded vector 1702 comprises an array of numerical values 1708. Each numerical value 1708 in the encoded vector 1702 corresponds with and describes an attribute (e.g., item type, size, shape, color, etc.) of the first item 204A. An encoded vector 1702 may be any suitable length. The item tracking device 104 generates an encoded vector 1702 for the first item 204A by inputting each of the cropped images 3602 into a machine learning model (e.g., machine learning model 126). The machine learning model 126 is configured to output an encoded vector 1702 for an item 204 based on the features or physical attributes of the item 204 that are present in the image 122 of the item 204. Examples of physical attributes include, but are not limited to, an item type, a size, shape, color, or any other suitable type of attribute of the item 204. After inputting a cropped image 3602 of the first item 204A into the machine learning model 126, the item tracking device 104 receives an encoded vector 1702 for the first item 204A.

The item tracking device 104 repeats this process to obtain an encoded vector 1702 for each cropped image 3602 of the first item 204A on the platform 202.

The item tracking device 104 identifies the first item 204A from the encoded vector library 128 based on the corresponding encoded vector 1702 generated for the first item 204A. Here, the item tracking device 104 uses the encoded vector 1702 for the first item 204A to identify the closest matching encoded vector 1606 in the encoded vector library 128. In one embodiment, the item tracking device 104 identifies the closest matching encoded vector 1606 in the encoded vector library 128 by generating a similarity vector 1704 (shown in FIG. 17) between the encoded vector 1702 generated for the unidentified first item 204A and the encoded vectors 1606 in the encoded vector library 128. The similarity vector 1704 comprises an array of numerical similarity values 1710 where each numerical similarity value 1710 indicates how similar the values in the encoded vector 1702 for the first item 204A are to a particular encoded vector 1606 in the encoded vector library 128. In one embodiment, the item tracking device 104 may generate the similarity vector 1704 by using a process similar to the process described in FIG. 17. In this example, the item tracking device 104 uses matrix multiplication between the encoded vector 1702 for the first item 204A and the encoded vectors 1606 in the encoded vector library 128. Each numerical similarity value 1710 in the similarity vector 1704 corresponds with an entry 1602 in the encoded vector library 128. For example, the first numerical value 1710 in the similarity vector 1704 indicates how similar the values in the encoded vector 1702 are to the values in the encoded vector 1606 in the first entry 1602 of the encoded vector library 128, the second numerical value 1710 in the similarity vector 1704 indicates how similar the values in the encoded vector 1702 are to the values in the encoded vector 1606 in the second entry 1602 of the encoded vector library 128, and so on.

After generating the similarity vector 1704, the item tracking device 104 can identify which entry 1602, in the encoded vector library 128, most closely matches the encoded vector 1702 for the first item 204A. In one embodiment, the entry 1602 that is associated with the highest numerical similarity value 1710 in the similarity vector 1704 is the entry 1602 that most closely matches the encoded vector 1702 for the first item 204A. After identifying the entry 1602 from the encoded vector library 128 that most closely matches the encoded vector 1702 for the first item 204A, the item tracking device 104 may then identify the item identifier 1604 from the encoded vector library 128 that is associated with the identified entry 1602. Through this process, the item tracking device 104 is able to determine which item 204 from the encoded vector library 128 corresponds with the unidentified first item 204A based on its encoded vector 1702. The item tracking device 104 then outputs the identified item identifier 1604 for the identified item 204. The item tracking device 104 repeats this process for each encoded vector 1702 generated for each cropped image 3602 (e.g., 3602a, 3602b and 3602c) of the first item 204A. This process may yield a set of item identifiers 1604 (shown as I1, I2 and I3 in FIG. 36A) corresponding to the first item 204A, wherein the set of item identifiers 1604 corresponding to the first item 204A may include a plurality of item identifiers 1604 corresponding to the plurality of cropped images 3602 of the first item 204A. In other words, item tracking device 104 identifies an item identifier 1604 for each cropped image 3602 of the first item 204A.

Item tracking device 104 may select one of a plurality of item identifiers 1604 (e.g., I1, I2, I3) identified for the first item 204A based on the respective plurality of cropped images 3602 of the first item 204A. For example, item tracking device 104 may select the first item identifier 1604*a* associated with the first item 204A based the plurality of item identifiers 1604 identified (e.g., I1, I2, I3) for the first item 204A based on the respective plurality of cropped images 3602 of the first item 204A. For example, item tracking device 104 selects I2 as the first item identifier 1604*a* associated with the first item 204*a*. Once the first item identifier 1604*a* has been identified, item tracking device 104 may map the first item identifier 1604*a* to the first group ID 3606 (shown as Group-1).

In one embodiment, item tracking device 104 may be configured to select the first item identifier 1604*a* (e.g., I2) from the plurality of item identifiers (e.g., I1, I2, I3) based on a majority voting rule. The majority voting rule defines that when a same item identifier 1604 has been identified for a majority of cropped images (e.g., cropped images 3602*a-c*) of an unidentified item (e.g., first item 204A), the same item identifier 1604 is to be selected. For example, assuming that item identifier I2 was identified for two of the three cropped images 3602, item tracking device 104 selects I2 as the first item identifier 1604*a* associated with the first item 204A.

However, when no majority exists among the item identifiers 1604 of the cropped images 3602, the majority voting rule cannot be applied. For example, when a same item identifier 1604 was not identified for a majority of the cropped images 3602 of the unidentified first item 204A, the majority voting rule does not apply. In such cases, item tracking device 104 displays the item identifiers 1604 corresponding to one or more cropped images 3602 of the first item 204A on a user interface device and asks the user to select one of the displayed item identifiers 1604. For example, as shown in FIG. 36A, I1 was identified for cropped image 3602*a*, I2 was identified for cropped image 3602*b*, and I3 was identified for cropped image 3602*c*. Thus, no majority exists among the identified item identifiers 1604. In this case, item tracking device 104 displays the item identifiers I1, I2 and I3 on the display of the user interface device and prompts the user to select the correct item identifier 1604 for the first item 204A. For example, item tracking device 104 may receive a user selection of I2 from the user interface device, and in response, determine that I2 is the first item identifier 1604*a* associated with the first item 204A.

It may be noted that item tracking device 104 may use any of the methods described in this disclosure to select a particular item identifier (e.g., first item identifier 1604*a*) from a plurality of item identifiers (e.g., item identifiers 1604) that were identified based on respective cropped images (e.g., cropped images 3602*a-c*).

Regardless of the particular method used to identify the first item 204A, an end result of this entire process is that a first item identifier 1604*a* is identified for the first item 204A.

Referring back to FIG. 35, at operation 3510, item tracking device 104 stores (e.g., in memory 116) the first item identifier 1604*a* of the first item 204*a* associated with the first region 3612. In an additional or alternative embodiment, item tracking device 104 stores (e.g., in memory 116) the first item identifier 1604*a* mapped to the first group identifier 3606 (e.g., Group-1) of the cropped images 3602 associated with the first item 204*a* in the first region 3612 of the first image 3632.

At operation 3512, item tracking device 104 displays, on the user interface device, information associated with the first item identifier 1604*a* identified for the first item 204*a*. In one embodiment, item tracking device 104 displays, on the user interface device, an indication of the first group identifier 3606 next to an indication of the first item identifier 1604*a*. For example, the first item identifier (I2) may be associated with the name and a description of the first item 204A, such as XYZ soda—12 oz can. In this case, item tracking device may display "Item 1—XYZ soda—12 oz can", wherein "Item 1" is an indication of the group ID 3606 and "XYZ soda—12 oz can" is an indication of the first item identifier 1604*a*.

At operation 3514, item tracking device 104 detects a second triggering event at the platform 202 corresponding to the placement of a second item 204B (e.g., a bag of chips) on the platform 202. In a particular embodiment, the second triggering event may correspond to the user placing the second item 204B on the platform 202. As shown in FIG. 36B, the second triggering event corresponds to placement of the second item 204B on the platform 202 as part of a second interaction 3622 associated with a transaction 3610.

Item tracking device 104 may detect the second triggering event using a similar process described above with reference to operation 3502 for detecting the first triggering event. For example, to detect the second triggering event, the item tracking device 104 may use a process similar to process 700 that is described with reference to FIG. 7 and/or a process similar to method 3200 that is described with reference to FIGS. 32A and 32B for detecting a triggering event, such as, for example, an event that corresponds with a user's hand being detected above the platform 202 and placing an item 204 on the platform 202. For example, item tracking device 104 may capture a reference depth image 124 of the platform 202 with the second item 204B placed on the platform 202. Item tracking device 104 may check for differences between this reference depth image 124 and a subsequent depth image 124 to detect the presence of an object above the platform 202. For example, based on comparing the reference depth image 124 with a plurality of subsequent depth images 124, item tracking device 104 may determine that a user's hand holding the second item 204B entered the platform 202, placed the second item 204B on the platform 202, and exited the platform 202. In response to determining that the second item 204B has been placed on the platform 202, the item tracking device 104 determines that the second triggering event has occurred.

At operation 3516, in response to detecting the second triggering event, item tracking device 104 captures a second image 3634 (e.g., image 122 or depth image 124 shown in FIG. 36B) of the platform 202 using a camera 108 or 3D sensor 110. In one embodiment, the second image 3634 is captured by a camera 108 or 3D sensor 110 that is positioned above the platform 202, that has a top view of the entire platform 202, and that is configured to capture overhead images 122 or overhead depth images 124 of the platform 202. For example, item tracking device 104 may capture the overhead image 122 using the camera 108B or may capture the overhead depth image 124 using the 3D sensor 110. In one embodiment, to capture the second image 3634, item tracking device 104 uses the same camera 108B or 3D sensor 110 that was used at operation 3504 to capture the first image 3632.

At operation 3518, item tracking device 104 determines a second region 3614 within the second image 3634 that depicts the first item 204A which was previously placed on the platform 202 as part of the first interaction 3620, wherein the second region 3614 includes a group of pixels of the respective second image 3634 that correspond to the first item 204A. It may be noted that while second region 3614 is shown in FIG. 36B to follow the boundary of the first item 204A as depicted in the second image 3634 and includes the first item 204A as depicted in the second image 3634, the second region 3614 may be of any shape and size as long as the second region 3614 includes the first item 204A as depicted in the second image 3634. In one embodiment, the second region 3614 includes those pixels of the second image 3634 that depict the first item 204A.

At operation 3520, item tracking device 104 determines a third region 3616 within the second image 3634 that depicts the second item 204B, wherein the third region 3616 includes a group of pixels of the respective second image 3634 that correspond to the second item 204B. It may be noted that while third region 3616 is shown in FIG. 36B to follow the boundary of the second item 204B as depicted in the second image 3634 and includes the second item 204B as depicted in the second image 3634, the third region 3616 may be of any shape and size as long as the third region 3616 includes the second item 204B as depicted in the second image 3634. In one embodiment, the third region 3616 includes those pixels of the second image 3634 that depict the second item 204B.

In one embodiment, as described above, the item tracking device 104 may perform segmentation using a depth image (e.g., depth image 124) from a 3D sensor 110 that is positioned for an overhead or perspective view of the items 204 (e.g., first item 204A and second item 204B) placed on the platform 202. In this example, the item tracking device 104 captures an overhead depth image 124 of the items 204A and 204B that are placed on the platform 202. The item tracking device 104 may then use a depth threshold value to distinguish between the platform 202 and items 204A and 204B that are placed on the platform 202 in the captured depth image 124. For instance, the item tracking device 104 may set a depth threshold value that is just above the surface of the platform 202. This depth threshold value may be determined based on the pixel values corresponding with the surface of the platform 202 in a reference depth images 124 that were captured during the auto-exclusion process described above. After setting the depth threshold value, the item tracking device 104 may apply the depth threshold value to the captured depth image 124 to filter out or remove the platform 202 from the depth image 124. After filtering the depth image 124, the remaining clusters of pixels correspond with items 204A and 204B that are placed on the platform 202. Each cluster of pixels corresponds with one of the items 204A and 204B. For example, a first clusters of pixels identified in the second image 3634 corresponds to the first item 204A placed on the platform 202 and a second cluster of pixels identified in the second image 3634 corresponds to the second item 204B placed on the platform 202. The identified first cluster of pixels that depicts the first item 204A in the second image 3634 may make up the second region 3614. The identified second cluster of pixels that depicts the second item 204B in the second image 3634 may make up the third region 3616.

Referring to FIG. 35B, at operation 3522, item tracking device 104 compares the second image 3634 to the first image 3632. In one embodiment, comparing the second image 3634 to the first image 3632 may include comparing each of the second region 3614 and the third region 3616 of the second image 3634 to the first region 3612 of the first image 3632.

At operation 3524, based on comparing the second image 3634 to the first image 3632, item tracking device 104 determines a degree of overlap between the first region 3612 of the first image 3632 and the second region 3614 of the second image 3634. Essentially, item tracking device 104 determines a degree of overlap between the depiction of the first item 204A in the first image 3632 and the depiction of the first item 204A in the second image 3634. In one embodiment, item tracking device 104 may use an intersection over union (IOU) algorithm to compare the second image 3634 with the first image 3632 and to determine the degree of overlap/intersection between the first region 3612 of the first image 3632 (e.g., depiction of the first item 204A in the first image 3632) and the second region 3614 of the second image 3632 (e.g., depiction of the first item 204A in the second image 3634).

In response to determining that the overlap between the first region 3612 of the first image 3632 (e.g., depiction of the first item 204A in the first image 3632) and the second region 3614 of the second image 3632 (e.g., depiction of the first item 204A in the second image 3634) does not equal or exceed a pre-configured threshold overlap, method 3500 proceeds to operation 3526 where the item tracking device 104 re-identifies the first item 204A as described above with reference to operation 3508. When the overlap between the first region 3612 of the first image 3632 (e.g., depiction of the first item 204A in the first image 3632) and the second region 3614 of the second image 3632 (e.g., depiction of the first item 204A in the second image 3634) does not equal or exceed a threshold overlap, this may indicate that the first item 204A may have been moved to a different position on the platform 202 between the first interaction 3620 and the second interaction 3622.

On the other hand, in response to determining that the overlap between the first region 3612 of the first image 3632 (e.g., depiction of the first item 204A in the first image 3632) and the second region 3614 of the second image 3632 (e.g., depiction of the first item 204A in the second image 3634) equals or exceeds the threshold overlap, method 3500 proceeds to operation 3528. When the overlap equals or exceeds the threshold overlap, this may indicate that the position of the first item 204A is unchanged between the first interaction 3620 and the second interaction 3622. In other words, an overlap that equals or exceeds the threshold overlap may mean that the first item 204A has not moved from its position on the platform 202 after the detection of the first triggering event. In such a case, item tracking device 104 may not re-identify the first item 204A and may re-assign the first item identifier 1604a (e.g., that was determined as part of the first interaction 3620) to the first item 204a depicted in the second image 3634.

Figure 37:
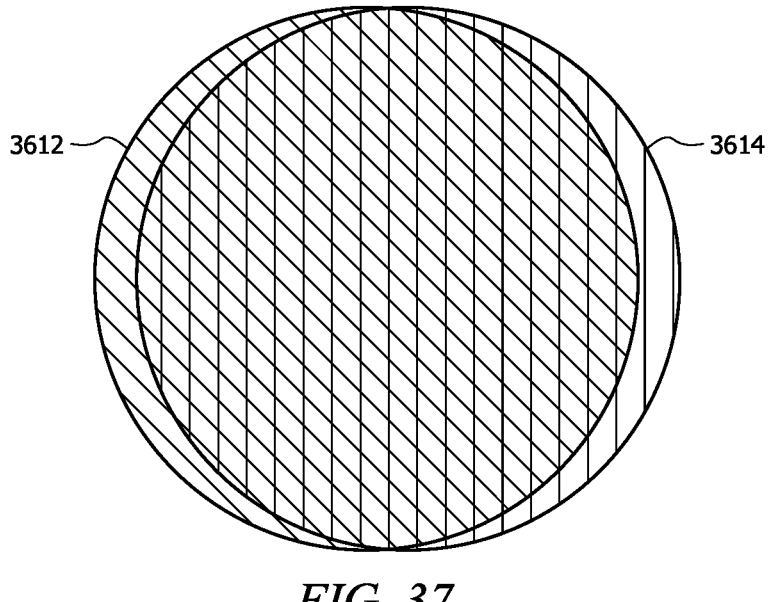
FIG. 37 illustrates an example comparison of a second region depicting a first item in a second image to a first region depicting the first item in a first image, in accordance with one or more embodiments of the present disclosure.

FIG. 37 shows an example comparison of the second region 3614 associated with the first item 204A depicted in the second image 3634 with the first region 3612 associated with the first item 204A depicted in the first image 3632. As shown in FIG. 37 the second region 3614 overlaps with the first region 3612, wherein the overlap exceeds the threshold overlap. The threshold overlap may be set to a value that is sufficiently high to avoid false matches. For example, the threshold overlap may be set to 95% overlap. In one embodiment, the threshold overlap is set to a value slightly less than 100% overlap to avoid false negatives. For example, even when the first item 204A has not moved from its original position on the platform 202 after detection of the first triggering event, the position of the first item 204A depicted in the second image 3634 may not exactly match with the corresponding position of the first item 204A depicted in the first image 3632, for example, as a result of a slight movement in camera 108B or other hardware issues. Thus, setting the threshold overlap to a value that is slightly less than 100% overlap avoids false negatives.

Referring back to FIG. 35B, at operation 3528, in response to determining that the overlap between the first region 3612 of the first image 3632 (e.g., depiction of the first item 204A in the first image 3632) and the second region 3614 of the second image 3632 (e.g., depiction of the first item 204A in the second image 3634) equals or exceeds the threshold overlap, item tracking device 104 obtains (e.g., accesses from the memory 116) the first item identifier 1604a that was determined for the first item 204a as part of the first interaction 3620.

At operation 3530, item tracking device 104 assigns the obtained first item identifier 1604a to the first item 204a depicted in the second region 3614 of the second image 3634. In one embodiment, item tracking device 104 displays, on the user interface device, information associated with the first item identifier 1604a. In one embodiment, item tracking device 104 displays, on the user interface device, an indication of the first group identifier 3606 (from first interaction 3620) next to an indication of the first item identifier 1604a. In one example, this displaying of the information associated with the first item identifier 1604a is same as the displaying of the information associated with the first item identifier 1604a at operation 3512. Alternatively, item tracking device may not change the information associated with the first item identifier 1604a that was displayed as part of the first interaction at operation 3512.

At operation 3532, item tracking device 104 identifies a second item identifier 1604b (shown in FIG. 36B) associated with the second item 204B depicted in the second image 3634. To identify the second item identifier 1604b associated with the second item 204B, item tracking device 104 may use a process similar to the process described above with reference to operation 3508 for identifying the first item identifier 1604 associated with the first item 204A.

For example, item tracking device 104 may capture a plurality of images 122A (as shown in FIG. 5A) of the second item 204B on the platform 202 using multiple cameras 108. Item tracking device 104 may generate a cropped image 3604 (shown in FIG. 36B) of the second item 204B from each image 122A of the second item 204B captured by a respective camera 108 by isolating at least a portion of the second item 204B from the image 122A. In other words, item tracking device 104 generates one cropped image 3604 of the second item 204B based on each image 122A of the second item 204B captured by a respective camera 108. As shown in FIG. 36B, item tracking device 104 generates four cropped images 3604a, 3604b, 3604c and 3604d of the second item 204B from respective images 122A of the second item 204B.

In one embodiment, item tracking device 104 may be configured to assign a group ID 3608 (shown as Group-2) to the group of cropped images 3604 generated for the second item 204B. The item tracking device 104 generates an encoded vector 1702 (shown in FIG. 17) for each cropped image 3604 of the second item 204B. As described above, an encoded vector 1702 comprises an array of numerical values 1708. Each numerical value 1708 in the encoded vector 1702 corresponds with and describes an attribute (e.g., item type, size, shape, color, etc.) of the second item 204B. The item tracking device 104 compares each encoded vector 1702 of each cropped image 3604 to the encoded vector library 128. This process may yield a set of item identifiers 1604 (shown as I4, I5, I5 and I5 in FIG. 36B) corresponding to the second item 204B, wherein the set of item identifiers 1604 corresponding to the second item 204B may include a plurality of item identifiers 1604 corresponding to the plurality of cropped images 3604 of the second item 204B. In other words, item tracking device 104 identifies an item identifier 1604 for each cropped image 3604 of the second item 204B.

Item tracking device 104 may select one of a plurality of item identifiers 1604 (e.g., I4, I5, I5, I5) identified for the second item 204B based on the respective plurality of cropped images 3604 of the second item 204B. For example, item tracking device 104 may select the second item identifier 1604b associated with the second item 204B based the plurality of item identifiers 1604 (e.g., I4, I5, I5, I5) identified for the second item 204B based on the respective plurality of cropped images 3604 of the second item 204B. For example, item tracking device 104 selects I5 as the second item identifier 1604b associated with the second item 204b. Once the second item identifier 1604b has been identified, item tracking device 104 may map the second item identifier 1604b to the second group ID 3608 (shown as Group-2).

In one embodiment, item tracking device 104 may be configured to select the second item identifier 1604b (e.g., I5) from the plurality of item identifiers (e.g., I4, I5, I5) based on a majority voting rule. The majority voting rule defines that when a same item identifier 1604 has been identified for a majority of cropped images (e.g., cropped images 3604a-d) of an unidentified item (e.g., second item 204B), the same item identifier 1604 is to be selected. For example, as shown in FIG. 36B identifier I5 was identified for three of the four cropped images 3604. Thus, item tracking device 104 selects I5 as the second item identifier 1604b associated with the second item 204B.

At operation 3534, item tracking device 104 displays, on the user interface device, information associated with the second item identifier 1604b along with information associated with the first item identifier 1604a. In one embodiment, the item tracking device 104 adds the information associated with the second item identifier 1604b to the information associated with the first item identifier 1604a that was displayed as part of the first interaction 3620. In one embodiment, item tracking device 104 displays, on the user interface device, an indication of the second group identifier 3608 next to an indication of the second item identifier 1604b. For example, the second item identifier (I5) may be associated with the name and a description of the second item 204B, such as ABC CHIPS—1 oz (28.3 g). In this case, item tracking device may display "Item 2—ABC CHIPS—1 oz (28.3 g)", wherein "Item 2" is an indication of the group ID 3608 and "ABC CHIPS—1 oz (28.3 g)" is an indication of the second item identifier 1604b.

Identifying Moved Items on the Platform During Item Identification

In general, certain embodiments of the present disclosure describe techniques for detecting an item that was placed on the platform of the imaging device in a previous interaction and assigning to the item an item identifier that was identified in the previous interaction. The disclosed techniques may detect an item that has moved on the platform between interactions associated with a transaction. Upon detecting an item from a previous interaction that may have moved on the platform between interactions, the item is assigned an item identifier that was identified as part of a previous interaction. For example, when a first item is placed on the platform for the first time as part of an interaction, a plurality of first images of the first item are captured using a plurality of cameras associated with the imaging device. The item is identified based on the plurality of first images of the first item. Subsequently, when a second item is placed on the platform as part of a subsequent interaction, a plurality of second images of the first item are captured using the same cameras. Each first image of the first item captured using a particular camera is compared with a second image of the first item captured using the same camera. When a majority of the first images match with the corresponding second images of the first item, it is determined that the second images correspond to the first item and, in response, the first item is assigned the item identifier that was identified as part of the first interaction.

Figures 38A, 38B:
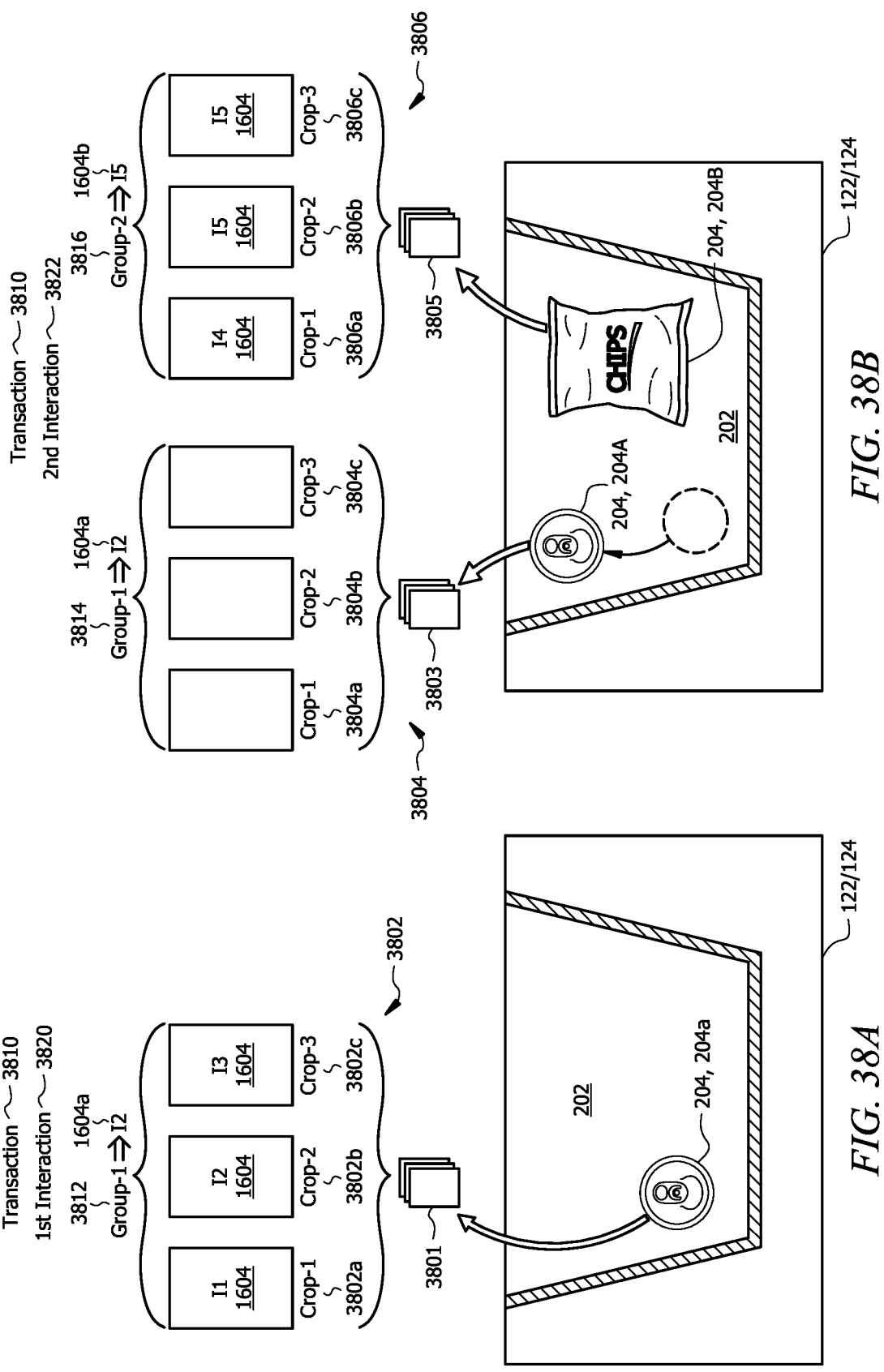
FIGS. 38A and 38B illustrate overhead views of a platform in relation to identifying items that have moved on the platform between interactions, in accordance with one or more embodiments of the present disclosure.

In some cases, a first item 204 that was placed on the platform 202 as part of a previous interaction may have been moved from its position on the platform 202 to another position on the platform 202 as part of a subsequent interaction, for example, to make room for a second item 204. For example, when performing a purchase transaction at a store, a user may first place a can of soda on the platform 202 for identification as part of a first interaction. Subsequently, the user may add a bag of chips on the platform as part of a second interaction. However, when placing the bag of chips on the platform 202, the user may move the can of soda from its position on the platform 202. In such a case, the method 3500 described above with reference to FIGS. 35A and 35B for assigning an item identifier of the first item 204A that was identified as part of the previous interaction may not work, causing the item tracking device 104 to re-identify the first item 204 as part of the subsequent interaction. For example, FIG. 38A shows a first interaction 3820 of a transaction 3610, wherein the first interaction 3820 includes placement of a first item 204A (e.g., a can of soda) on the platform 202. FIG. 38B shows a second interaction 3822 belonging to the same transaction 3810, wherein the second interaction 3822 includes placement of a second item 204B (e.g., a bag of chips) on the platform 202. As described above with reference to FIGS. 35A and 35B, when the position of first item 204A on the platform 202 remains unchanged between the first interaction 3820 and the second interaction 3822, item tracking device 104 may leverage a first item identifier 1604*a* identified for the first item as part of the first interaction 3820, to identify the first item 204A as part of the second interaction 3822. For example, when the can of soda remains unmoved between the first and second interactions, the item tracking device 104, after the bag of chips has been added on the platform, may assign an item identifier to the can of soda that was identified in the first interaction 3820. However, as shown in FIG. 38B, the position of the first item 204A on the platform 202 changes between the first interaction 3820 and the second interaction 3822. In such a case, item tracking may need to re-identify the first item 204*a* along with identifying the second item 204B as part of the second interaction 3622. As described above, re-identifying a particular item 204 as part of each subsequent interaction associated with a transaction may result in redundant processing, thus wasting computing resources.

Certain embodiments of the present disclosure describe improved techniques to identify items 204 placed on the platform 202 of an imaging device 102. As described below, these techniques retain an item identifier 1604 associated with an item 204 that was identified as part of a previous interaction even when the item was moved on the platform between interactions, to avoid re-identification of the same item 204 in a subsequent interaction. For example, when the user places a bottle of soda on the platform 202 as part of a first interaction, the item tracking device 104 identifies the bottle of soda and stores the identity of the bottle of soda in a memory. When the user adds a bag of chips on the platform 202 as part of a second interaction and moves the can of soda from its previous position on the platform to accommodate the bag of chips, the item tracking device 104 recognizes that the can of soda has moved on the platform 202 and assigns the stored identity to the bottle of soda from the memory and only identifies the bag of chips that is newly placed on the platform 202 as part of the second interaction.

Thus, these techniques save processing resources associated with the item tracking device 104 that would otherwise be used in re-running item identification algorithms for items 204 that were already identified as part of a previous interaction of the transaction.

As described in more detail with reference to FIGS. 38A-B and 39A-B, item tracking device 104 identifies an item 204 that has moved on the platform 202 between a first interaction and a second interaction based on comparing images of the item 204 captured during the first and the second interactions. Upon determining that the item 204 has moved between interactions, item tracking device 104 assigns an item identifier to the item 204 that was identified in a previous interaction. For example, referring to FIG. 38A in response to detecting that the first item 204A (e.g., a can of soda) has been placed on the platform 202 as part of the first interaction 3820, the item tracking device 104 captures a plurality of first images of the first item 204A, generates a plurality of cropped first images 3802 of the first item 204A based on the first images, identifies the first item 204A based on the cropped first images 3802, and stores a first item identifier 1604*a* associated with the first item 204A in a memory (e.g., memory 116 shown in FIG. 1). Referring to FIG. 38B, in response to detecting that a second item 204B (e.g., a bag of chips) has been added on the platform 202 as part of a second interaction 3822, item tracking device 104 captures a plurality of second images of the first item 204A and generates a plurality of cropped second images 3804 of the first item 204A based on the second images. Item tracking device 104 compares the cropped first images 3802 with the cropped second images 3804. When item tracking device 104 determines that the cropped first images 3802 match with the cropped second images 3804, item tracking device 104 determines that the cropped second images 3804 are associated with (e.g., depict) the first item 204A that was identified as part of the first interaction 3802. In response, item tracking device 104 accesses the first item identifier 1604*a* (e.g., from the memory 116) and assigns the first item identifier 1604*a* to the first item 204A. These aspects will now be described below in further detail with reference to FIGS. 38A-B, and 39A-B.

The system and method described in certain embodiments of the present disclosure provide a practical application of intelligently identifying an item 204 that was placed on the platform 202 of the imaging device 102 as part of a previous interaction and assigning the item 204 an item identifier 1604 that was identified for the item 204 in the previous interaction. As described with reference to FIGS. 38A-B, and 39A-B, in response to detecting that the first item 204A has been placed on the platform 202 as part of the first interaction 3820, the item tracking device 104 captures a plurality of first images of the first item 204A, generates a plurality of cropped first images 3802 of the first item 204A based on the first images, identifies the first item 204A based on the cropped first images 3802, and stores a first item identifier 1604*a* associated with the first item 204A in a memory (e.g., memory 116 shown in FIG. 1). In response to detecting that a second item 204B (e.g., a bag of chips) has been added on the platform 202 as part of a second interaction 3822, item tracking device 104 captures a plurality of second images of the first item 204A and generates a plurality of cropped second images 3804 of the first item 204A based on the second images. Item tracking device 104 compares the cropped first images 3802 with the cropped second images 3804. When item tracking device 104 determines that the cropped first images 3802 match with the cropped second images 3804, item tracking device 104 determines that the cropped second images 3804 are associated with (e.g., depict) the first item 204A that was identified as part of the first interaction 3802. In response, item tracking device 104 accesses the first item identifier 1604*a* (e.g., from the memory 116) and assigns the first item identifier 1604*a* to the first item 204A. These techniques save computing resources (e.g., processing and memory resources associated with the item tracking device 104) that would otherwise be used to re-run item identification algorithms for items 204 that were already identified as part of a previous interaction. This, for example, improves the processing efficiency associated with the processor 602 (shown in FIG. 6) of the item tracking device 104. Thus, the disclosed system and method generally improve the technology associated with automatic detection of items 204.

It may be noted that the systems and components illustrated and described in the discussions of FIGS. 1-29 may be used and implemented to perform operations of the systems and methods described in FIGS. 38A-B, and 39A-B. Additionally, systems and components illustrated and described with reference to any figure of this disclosure may be used and implemented to perform operations of the systems and methods described in FIGS. 38A-B, and 39A-B.

Figure 39B:
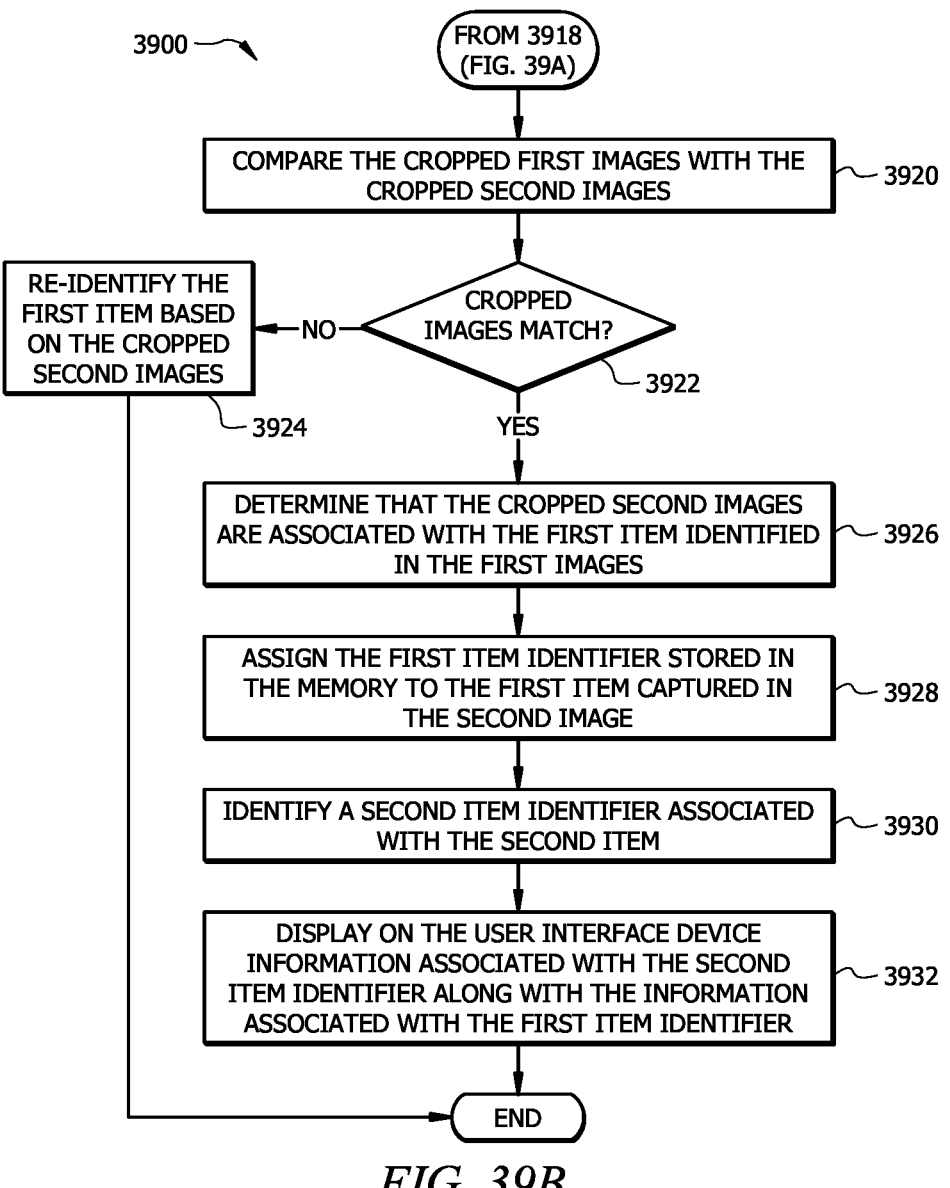

FIGS. 39A and 39B illustrate a flowchart of an example method 3900 for identifying items 204 that have moved on a platform 202 between interactions, in accordance with one or more embodiments of the present disclosure. Method 3900 may be performed by item tracking device 104 as shown in FIG. 1. For example, one or more operations of method 3900 may be implemented, at least in part, in the form of software instructions (e.g., item tracking instructions 606 shown in FIG. 6), stored on tangible non-transitory computer-readable medium (e.g., memory 116 shown in FIGS. 1 and 6) that when run by one or more processors (e.g., processors 602 shown in FIG. 6) may cause the one or more processors to perform operations 3902-3932. As described below, method 3900 identifies an item 204 that has moved on the platform 202 between interactions and re-assigns an item identifier to the item 204 that was identified as part of a previous interaction. It may be noted that operations 3902-3932 are described primarily with reference to FIGS. 38A-B and additionally with certain references to FIGS. 1, 2A, 16, and 17.

Referring to FIG. 39A, at operation 3902, item tracking device 104 detects a first triggering event corresponding to the placement of a first item 204A (shown in FIG. 38A) on the platform 202. In a particular embodiment, the first triggering event may correspond to a user placing the first item 204A on the platform 202. As shown in FIG. 38A, the first triggering event corresponds to placement of the first item 204A on the platform 202 as part of a first interaction 3820 associated with a transaction 3810.

Item tracking device 104 may perform auto-exclusion for the imaging device 102 using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 (shown in FIG. 2A) to capture reference images 122 and reference depth images 124 (e.g., shown in FIG. 33A), respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 of the platform 202 based on differences in depth values (d) 111 (shown in FIG. 2A) between subsequent depth images 124 and the reference depth image 124 and/or differences in the pixel values between subsequent images 122 and the reference image 122.

In one embodiment, to detect the first triggering event, the item tracking device 104 may use a process similar to process 700 that is described with reference to FIG. 7 and/or a process similar to method 3200 that is described with reference to FIGS. 32A and 32B for detecting a triggering event, such as, for example, an event that corresponds with a user's hand being detected above the platform 202 and placing an item 204 on the platform 202. For example, the item tracking device 104 may check for differences between a reference depth image 124 (e.g., shown in FIG. 33A) and a subsequent depth image 124 (e.g., shown in FIGS. 33B-D) to detect the presence of an object above the platform 202. For example, based on comparing the reference depth image 124 with a plurality of subsequent depth images 124, item tracking device 104 may determine that a user's hand holding the first item 204A entered the platform 202, placed the first item 204A on the platform 202, and exited the platform 202. In response to determining that the first item 204A has been placed on the platform 202, the item tracking device 104 determines that the first triggering event has occurred and proceeds to identify the first item 204A that has been placed on the platform 202.

At operation 3904, in response to detecting the first triggering event, item tracking device 104 captures a plurality of first images (e.g., images 3801) of the first item 204A placed on the platform 202 using two or more cameras (e.g., 108A-D) of a plurality of cameras 108 (shown in FIG. 2A). For example, the item tracking device 104 may capture images 3801 with an overhead view, a perspective view, and/or a side view of the first item 204A on the platform 202.

At operation 3906, item tracking device 104 generates a cropped first image 3802 for each of the first images 3801 by editing the first image 3801 to isolate at least a portion of the first item 204A, wherein the cropped first images 3802 correspond to the first item 204A depicted in the respective first images 3801. In other words, item tracking device 104 generates one cropped image 3802 of the first item 204A based on each image 3801 of the first item 204A captured by a respective camera 108. As shown in FIG. 38A, item tracking device 104 generates three cropped images 3802*a*, 3802*b* and 3802*c* of the first item 204A from respective images 3801 of the first item 204A.

Item tracking device 104 may use a process similar to process 900 described with reference to FIG. 9 to generate the cropped images 3802 of the first item 204A. For example, the item tracking device 104 may generate a cropped image 3802 of the first item 204A based on the features of the first item 204A that are present in an image 3801 (e.g., one of the images 3801). The item tracking device 104 may first identify a region-of-interest (e.g., a bounding box) 1002 (as shown in FIG. 10A) for the first item 204A based on the detected features of the first item 204A that are present in an image 3801 and then may crop the image 3801 based on the identified region-of-interest 1002. The region-of-interest 1002 comprises a plurality of pixels that correspond with the first item 204A in the captured image 3801 of the first item 204A on the platform 202. The item tracking device 104 may employ one or more image processing techniques to identify a region-of-interest 1002 for the first item 204A within the image 3801 based on the features and physical attributes of the first item 204A. After identifying a region-of-interest 1002 for the first item 204A, the item tracking device 104 crops the image 3801 by extracting the pixels within the region-of-interest 1002 that correspond to the first item 204A in the image 3801. By cropping the image 3801, the item tracking device 104 generates another image (e.g., cropped image 3802) that comprises the extracted pixels within the region-of-interest 1002 for the first item 204A from the original image 3801. The item tracking device 104 may repeat this process for all of the captured images 3801 of the first item 204A on the platform 202. The result of this process is a set of cropped images 3802 (e.g., 3802a, 3802b, and 3802c) corresponding to the first item 204A that is placed on the platform 202.

In one embodiment, item tracking device 104 may be configured to assign a group ID 3812 (shown as Group-1) to the group of cropped images 3802 generated for the first item 204A. It may be noted that item tracking device 104 may be configured to assign a unique group ID to each group of cropped images 3802 generated for each respective item 204 placed on the platform 202.

At operation 3908, image tracking device 104 identifies a first item identifier 1604a associated with the first item 204A based on the cropped images 3802.

The item tracking device 104 may use a process similar to process 2300 that is described with reference to FIG. 23 or a process similar to method 2900 described with reference to FIG. 29 to identify first item 204A.

For example, the item tracking device 104 generates an encoded vector 1702 (shown in FIG. 17) for each cropped image 3802 of the first item 204A. An encoded vector 1702 comprises an array of numerical values 1708. Each numerical value 1708 in the encoded vector 1702 corresponds with and describes an attribute (e.g., item type, size, shape, color, etc.) of the first item 204A. An encoded vector 1702 may be any suitable length. The item tracking device 104 generates an encoded vector 1702 for the first item 204A by inputting each of the cropped images 3802 into a machine learning model (e.g., machine learning model 126). The machine learning model 126 is configured to output an encoded vector 1702 for an item 204 based on the features or physical attributes of an item 204 that are present in an image (e.g., image 3801) of the item 204. Examples of physical attributes include, but are not limited to, an item type, a size, shape, color, or any other suitable type of attribute of the item 204. After inputting a cropped image 3802 of the first item 204A into the machine learning model 126, the item tracking device 104 receives an encoded vector 1702 for the first item 204A. The item tracking device 104 repeats this process to obtain an encoded vector 1702 for each cropped image 3802 of the first item 204A on the platform 202.

The item tracking device 104 identifies the first item 204A from the encoded vector library 128 based on the corresponding encoded vector 1702 generated for the first item 204A. Here, the item tracking device 104 uses the encoded vector 1702 for the first item 204A to identify the closest matching encoded vector 1606 in the encoded vector library 128. In one embodiment, the item tracking device 104 identifies the closest matching encoded vector 1606 in the encoded vector library 128 by generating a similarity vector 1704 (shown in FIG. 17) between the encoded vector 1702 generated for the unidentified first item 204A and the encoded vectors 1606 in the encoded vector library 128. The similarity vector 1704 comprises an array of numerical similarity values 1710 where each numerical similarity value 1710 indicates how similar the values in the encoded vector 1702 for the first item 204A are to a particular encoded vector 1606 in the encoded vector library 128. In one embodiment, the item tracking device 104 may generate the similarity vector 1704 by using a process similar to the process described in FIG. 17. In this example, the item tracking device 104 uses matrix multiplication between the encoded vector 1702 for the first item 204A and the encoded vectors 1606 in the encoded vector library 128. Each numerical similarity value 1710 in the similarity vector 1704 corresponds with an entry 1602 in the encoded vector library 128. For example, the first numerical value 1710 in the similarity vector 1704 indicates how similar the values in the encoded vector 1702 are to the values in the encoded vector 1606 in the first entry 1602 of the encoded vector library 128, the second numerical value 1710 in the similarity vector 1704 indicates how similar the values in the encoded vector 1702 are to the values in the encoded vector 1606 in the second entry 1602 of the encoded vector library 128, and so on.

After generating the similarity vector 1704, the item tracking device 104 can identify which entry 1602, in the encoded vector library 128, most closely matches the encoded vector 1702 for the first item 204A. In one embodiment, the entry 1602 that is associated with the highest numerical similarity value 1710 in the similarity vector 1704 is the entry 1602 that most closely matches the encoded vector 1702 for the first item 204A. After identifying the entry 1602 from the encoded vector library 128 that most closely matches the encoded vector 1702 for the first item 204A, the item tracking device 104 may then identify the item identifier 1604 from the encoded vector library 128 that is associated with the identified entry 1602. Through this process, the item tracking device 104 is able to determine which item 204 from the encoded vector library 128 corresponds with the unidentified first item 204A based on its encoded vector 1702. The item tracking device 104 then outputs the identified item identifier 1604 for the identified item 204 from the encoded vector library 128. The item tracking device 104 repeats this process for each encoded vector 1702 generated for each cropped image 3802 (e.g., 3802a, 3802b and 3802c) of the first item 204A. This process may yield a set of item identifiers 1604 (shown as I1, I2 and I3 in FIG. 38A) corresponding to the first item 204A, wherein the set of item identifiers 1604 corresponding to the first item 204A may include a plurality of item identifiers 1604 corresponding to the plurality of cropped images 3802 of the first item 204A. In other words, item tracking device 104 identifies an item identifier 1604 for each cropped image 3802 of the first item 204A.

Item tracking device 104 may select one of a plurality of item identifiers 1604 (e.g., I1, I2, I3) identified for the first item 204A based on the respective plurality of cropped images 3802 of the first item 204A. For example, item tracking device 104 may select the first item identifier 1604a associated with the first item 204A based the plurality of item identifiers 1604 identified (e.g., I1, I2, I3) for the first item 204A based on the respective plurality of cropped images 3802 of the first item 204A. For example, item tracking device 104 selects I2 as the first item identifier 1604a associated with the first item 204a. In one embodiment, once the first item identifier 1604*a* has been identified, item tracking device 104 may map the first item identifier 1604*a* to the first group ID 3812 (shown as Group-1).

In one embodiment, item tracking device 104 may be configured to select the first item identifier 1604*a* (e.g., I2) from the plurality of item identifiers (e.g., I1, I2, I3) based on a majority voting rule. The majority voting rule defines that when a same item identifier 1604 has been identified for a majority of cropped images (e.g., cropped images 3802*a-c*) of an unidentified item (e.g., first item 204A), the same item identifier 1604 is to be selected. For example, assuming that item identifier I2 was identified for two of the three cropped images 3802, item tracking device 104 selects I2 as the first item identifier 1604*a* associated with the first item 204A.

However, when no majority exists among the item identifiers 1604 of the cropped images 8602, the majority voting rule cannot be applied. For example, when a same item identifier 1604 was not identified for a majority of the cropped images 3802 of the unidentified first item 204A, the majority voting rule does not apply. In such cases, item tracking device 104 displays the item identifiers 1604 corresponding to one or more cropped images 3802 of the first item 204A on a user interface device and asks the user to select one of the displayed item identifiers 1604. For example, as shown in FIG. 36A, I1 was identified for cropped image 3802*a*, I2 was identified for cropped image 3802*b*, and I3 was identified for cropped image 3802*c*. Thus, no majority exists among the identified item identifiers 1604. In this case, item tracking device 104 displays the item identifiers I1, I2 and I3 on the display of the user interface device and prompts the user to select the correct item identifier 1604 for the first item 204A. For example, item tracking device 104 may receive a user selection of I2 from the user interface device, and in response, determine that I2 is the first item identifier 1604*a* associated with the first item 204A.

It may be noted that item tracking device 104 may use any of the methods described in this disclosure to select a particular item identifier (e.g., first item identifier 1604*a*) from a plurality of item identifiers (e.g., item identifiers 1604) that were identified based on respective cropped images (e.g., cropped images 3802*a-c*). Regardless of the particular method used to identify the first item 204A, an end result of this entire process is that a first item identifier 1604*a* is identified for the first item 204A.

Referring back to FIG. 39, at operation 3910, item tracking device 104 stores (e.g., in memory 116), the first item identifier 1604*a* associated with the first item 204A. In an additional or alternative embodiment, item tracking device 104 stores (e.g., in memory 116) the first item identifier 1604*a* mapped to the first group identifier 3812 (e.g., Group-1) of the group of cropped images 3802 associated with the first item 204*a* depicted in the images 3801.

At operation 3912, item tracking device 104 displays, on the user interface device, information associated with the first item identifier 1604*a* identified for the first item 204*a*. In one embodiment, item tracking device 104 displays, on the user interface device, an indication of the first group identifier 3812 next to an indication of the first item identifier 1604*a*. For example, the first item identifier (I2) may be associated with the name and a description of the first item 204A, such as XYZ soda—12 oz can. In this case, item tracking device 104 may display "Item 1—XYZ soda—12 oz can", wherein "Item 1" is an indication of the group ID 3812 and "XYZ soda—12 oz can" is an indication of the first item identifier 1604*a*.

At operation, 3914 item tracking device 104 detects a second triggering event at the platform 202 corresponding to the placement of a second item 204B (e.g., a bag of chips) on the platform 202. In a particular embodiment, the second triggering event may correspond to the user placing the second item 204B on the platform 202. As shown in FIG. 38B, the second triggering event corresponds to placement of the second item 204B on the platform 202 as part of a second interaction 3822 associated with the transaction 3810.

Item tracking device 104 may detect the second triggering event using a similar process described above with reference to operation 3902 for detecting the first triggering event. For example, to detect the second triggering event, the item tracking device 104 may use a process similar to process 700 that is described with reference to FIG. 7 and/or a process similar to method 3200 that is described with reference to FIGS. 32A and 32B for detecting a triggering event, such as, for example, an event that corresponds with a user's hand being detected above the platform 202 and placing an item 204 on the platform 202. For example, item tracking device 104 may capture a reference depth image 124 of the platform 202 with the second item 204B placed on the platform 202. Item tracking device 104 may check for differences between this reference depth image 124 and a subsequent depth image 124 to detect the presence of an object above the platform 202. For example, based on comparing the reference depth image 124 with a plurality of subsequent depth images 124, item tracking device 104 may determine that a user's hand holding the second item 204B entered the platform 202, placed the second item 204B on the platform 202, and exited the platform 202. In response to determining that the second item 204B has been placed on the platform 202, the item tracking device 104 determines that the second triggering event has occurred.

At operation 3916, in response to detecting the second triggering event, item tracking device 104, captures a plurality of second images (e.g., images 3803) of the first item 204A placed on the platform 202 using two or more cameras (e.g., 108A-D) of the plurality of cameras 108. For example, the item tracking device 104 may capture images 3803 with an overhead view, a perspective view, and/or a side view of the first item 204A on the platform 202.

At operation 3918, item tracking device 104 generates a cropped second image (e.g., cropped images 3804) for each of the second images (e.g., images 3803) by editing the second image 3803 to isolate at least a portion of the first item 204A, wherein the cropped second images 3804 correspond to the first item 204A depicted in the respective second images 3803.

To generate cropped images 3804, item tracking device 104 may use a process similar to the process described above with reference to operation 3906 to generate a cropped images 3802 of the first item 204A based on images 3801 as part of the first interaction 3820. For example, item tracking device 104 may generate a cropped image 3804 (shown in FIG. 38B) of the first item 204A from each image 3803 of the first item 204A captured by a respective camera 108 by isolating at least a portion of the first item 204A from the image 3803. In other words, item tracking device 104 generates one cropped image 3804 of the first item 204A based on each image 3803 of the first item 204A captured by a respective camera 108 as part of the second interaction 3822. As shown in FIG. 38B, item tracking device 104 generates three cropped images 3804*a*, 3804*b*, and 3804*c* of the first item 204A from respective images 3803 of the first item 204A. In one embodiment, item tracking device 104 is configured to capture the second images 3803 of the first item 204A using the same cameras 108 that were used to capture the first images 3801 of the first item 204A as part of the first interaction 3820. In this context, each cropped image 3804 associated with a particular camera 108 corresponds to a cropped image 3802 associated with the same particular camera 108. For example, cropped image 3804*a* corresponds to cropped image 3802*a*, cropped image 3804*b* corresponds to cropped image 3802*b*, and cropped image 3804*c* corresponds to cropped image 3802*c*.

In one embodiment, item tracking device 104 may be configured to assign a group ID 3814 (shown as Group-1) to the group of cropped images 3804 generated for the first item 204A depicted in images 3803.

In an additional or alternative embodiment, item tracking device 104 generates an encoded vector 1702 (shown in FIG. 17) for each cropped image 3804 of the first item 204A. An encoded vector 1702 comprises an array of numerical values 1708. Each numerical value 1708 in the encoded vector 1702 corresponds with and describes an attribute (e.g., item type, size, shape, color, etc.) of the first item 204A depicted in the corresponding cropped image 3804. An encoded vector 1702 may be any suitable length. The item tracking device 104 generates an encoded vector 1702 for the first item 204A by inputting each of the cropped images 3804 into a machine learning model (e.g., machine learning model 126). As described above, the machine learning model 126 is configured to output an encoded vector 1702 for an item 204 based on the features or physical attributes of an item 204 that are present in an image (e.g., image 3803) of the item 204. Examples of physical attributes include, but are not limited to, an item type, a size, shape, color, or any other suitable type of attribute of the item 204. After inputting a cropped image 3804 of the first item 204A into the machine learning model 126, the item tracking device 104 receives an encoded vector 1702 for the first item 204A. The item tracking device 104 repeats this process to obtain an encoded vector 1702 for each cropped image 3804 of the first item 204A on the platform 202.

Referring to FIG. 39B, at operation 3920, item tracking device 104 compares the cropped first images (e.g., cropped images 3802) with the cropped second images (e.g., images 3804). In one embodiment, item tracking device 104 compares each cropped first image 3802 of the first item 204A with a corresponding cropped second image 3804 of the first item 204A associated with the same camera 108. In other words, item tracking device 104 compares cropped images 3802 and 3804 of the first item 204A that were captured by the same camera 108. For example, assuming that cropped images 3802*a* and 3804*a* were captured by camera 108A, cropped images 3802*b* and 3804*b* were captured by camera 108B, and cropped images 3802*c* and 3804*c* were captured by camera 108B, item tracking device 104 compares cropped image 3802*a* with cropped image 3804*a*, compares cropped image 3802*b* with cropped image 3804*b*, and compares cropped image 3802*c* with cropped image 3804*c*.

Based on comparing cropped images 3802 with corresponding cropped images 3804, item tracking device 104 determines whether one or more cropped images 3804 are associated with the first item 204A that was placed on the platform 202 as part of the first interaction 3820. For example, for each comparison of cropped image 3802 with a corresponding cropped image 3804 captured by the same camera 108, item tracking device 104 determines whether the cropped image 3802 matches with the corresponding cropped image 3804. In one embodiment, comparing a cropped image 3802 with a corresponding cropped image

3804 that was captured by the same camera 108 includes comparing the encoded vectors 1702 generated for the respective cropped images 3802 and cropped image 3804. For example, item tracking device 104 compares an encoded vector 1702 generated for the cropped image 3802*a* with an encoded vector 1702 generated for the corresponding cropped image 3804*a* that was captured by the same camera 108. When the encoded vectors 1702 of the two corresponding cropped images 3802*a* and 3804*a* match with each other, item tracking device 104 may determine that both the cropped images 3802*a* and 3804*a* depict the same item 204 (e.g., first item 204A). In one embodiment, for each comparison of the encoded vectors 1702 corresponding to a pair of cropped images 3802 and 3804, item tracking device 104 generates a numerical similarity value that indicates a degree of match between the two encoded vectors. Item tracking device 104 determines that a pair of encoded vectors 1702 match with each other when the numerical similarity value equals or exceeds a pre-configured threshold similarity value.

Item tracking device 104 repeats this process for comparing each remaining cropped image 3802 with the corresponding cropped image 3804 and determines whether each remaining pair of cropped images 3802 and 2804 matches with each other. It may be noted that while item tracking device 104 has been described as determining whether a pair of cropped images 3802 and 3804 match with each other by comparing encoded vectors generated for the respective cropped images 3802 and 3804, a person having ordinary skill in the art may appreciate that the item tracking device 104 may compare the cropped images 3802 and 3804 using any known image processing method.

At operation 3922, based on comparing the cropped first images 3802 with the cropped second images 3804, item tracking device 104 determines whether the cropped images 3802 match with the cropped images 3804. In one embodiment, item tracking device 104 applies a majority rule for determining whether cropped first images 3802 match with the cropped second images 3804. The majority rule may define that cropped first images 3802 match with the cropped images 3804 only when a majority of individual cropped first images 3802 match with corresponding cropped second images 3804. For example, when cropped images 3802*a* and 3802*b* match with cropped images 3804*a* and 3804*b* respectively, but cropped image 3802*c* does not match with corresponding cropped image 3804*c*, item tracking device 104 determines that the cropped images 3802 match with cropped images 3804. At operation 3922, when item tracking device 104 determines that the cropped images 3802 do not match with the cropped images 3804, method 3900 proceeds to operation 3924 where the item tracking device re-identifies the first item 204A based on the cropped second images 3804. In an embodiment, item tracking device may re-identify the first item 204A based on the cropped second images 3804 based on a process similar to identifying the first item 204A based on cropped first images 3802 as described above with reference to operation 3908.

On the other hand, when item tracking device 104 determines that the cropped images 3802 match with the cropped images 3804, method 3900 proceeds to operation 3926 where, item tracking device 104 determines that the cropped second images 3804 are associated with (e.g., depict) the first item 204A that was identified as part of the first interaction 3802.

At operation 3928, item tracking device 104 assigns the first item identifier 1604*a* stored in the memory (e.g., memory 116) to the first item 204A depicted in the second images 3803. For example, item tracking device 104 obtains (e.g., accesses from the memory 116) the first item identifier 1604*a* that was determined for the first item 204*a* as part of the first interaction 3820 and assigns the obtained first item identifier 1604*a* to the first item 204A depicted in the second images 3803. In one embodiment, item tracking device 104 displays, on the user interface device, information associated with the first item identifier 1604*a*. In one embodiment, item tracking device 104 displays, on the user interface device, an indication of the group identifier 3812 (from first interaction 3820) next to an indication of the first item identifier 1604*a*. In one example, this displaying of the information associated with the first item identifier 1604*a* is same as the displaying of the information associated with the first item identifier 1604*a* at operation 3912. Alternatively, item tracking device may not change the information associated with the first item identifier 1604*a* that was displayed as part of the first interaction 3820 at operation 3912. In another example, item tracking device 104 displays, on the user interface device, an indication of the group identifier 3814 (from second interaction 3822) next to an indication of the first item identifier 1604*a*.

At operation 3930, item tracking device 104 identifies the second item 204B including determining a second item identifier 1604*b* associated with the second item 204B. To identify the second item identifier 1604*b* associated with the second item 204B, item tracking device 104 may use a process similar to the process described above with reference to operation 3908 for identifying the first item identifier 1604*a* associated with the first item 204A.

For example, item tracking device 104 may capture a plurality of images 3805 (shown in FIG. 38B) of the second item 204B on the platform 202 using multiple cameras 108. Item tracking device 104 may generate a cropped image 3806 of the second item 204B from each image 3805 of the second item 204B captured by a respective camera 108 by isolating at least a portion of the second item 204B from the image 3805. In other words, item tracking device 104 generates one cropped image 3806 of the second item 204B based on each image 3805 of the second item 204B captured by a respective camera 108. As shown in FIG. 38B, item tracking device 104 generates three cropped images 3806*a*, 3806*b*, and 3806*c* of the second item 204B from respective images 3805 of the second item 204B.

In one embodiment, item tracking device 104 may be configured to assign a group ID 3816 (shown as Group-2) to the group of cropped images 3806 generated for the second item 204B. The item tracking device 104 generates an encoded vector 1702 (shown in FIG. 17) for each cropped image 3806 of the second item 204B. As described above, an encoded vector 1702 comprises an array of numerical values 1708. Each numerical value 1708 in the encoded vector 1702 corresponds with and describes an attribute (e.g., item type, size, shape, color, etc.) of the second item 204B. The item tracking device 104 compares each encoded vector 1702 of each cropped image 3806 to the encoded vector library 128. This process may yield a set of item identifiers 1604 (shown as I4, I5, and I5 in FIG. 38B) corresponding to the second item 204B, wherein the set of item identifiers 1604 corresponding to the second item 204B may include a plurality of item identifiers 1604 corresponding to the plurality of cropped images 3806 of the second item 204B. In other words, item tracking device 104 identifies an item identifier 1604 for each cropped image 3806 of the second item 204B.

Item tracking device 104 may select one of a plurality of item identifiers 1604 (e.g., I4, I5, I5) identified for the second item 204B based on the respective plurality of cropped images 3806 of the second item 204B. For example, item tracking device 104 may select the second item identifier 1604*b* associated with the second item 204B based the plurality of item identifiers 1604 (e.g., I4, I5, I5) identified for the second item 204B based on the respective plurality of cropped images 3806 of the second item 204B. For example, item tracking device 104 selects I5 as the second item identifier 1604*b* associated with the second item 204B. Once the second item identifier 1604*b* has been identified, item tracking device 104 may map the second item identifier 1604*b* to the second group ID 3816 (shown as Group-2).

In one embodiment, item tracking device 104 may be configured to select the second item identifier 1604*b* (e.g., I5) from the plurality of item identifiers (e.g., I4, I5, based on a majority voting rule. The majority voting rule defines that when a same item identifier 1604 has been identified for a majority of cropped images (e.g., cropped images 3806*a*-*c*) of an unidentified item (e.g., second item 204B), the same item identifier 1604 is to be selected. For example, as shown in FIG. 38B identifier I5 was identified for two of the three cropped images 3806. Thus, item tracking device 104 selects I5 as the second item identifier 1604*b* associated with the second item 204B.

At operation 3932, item tracking device 104 displays, on the user interface device, information associated with the second item identifier 1604*b* along with information associated with the first item identifier 1604*a*. In one embodiment, the item tracking device 104 adds the information associated with the second item identifier 1604*b* to the information associated with the first item identifier 1604*a* that was displayed as part of the first interaction 3820. In one embodiment, item tracking device 104 displays, on the user interface device, an indication of the second group identifier 3816 next to an indication of the second item identifier 1604*b*. For example, the second item identifier (I5) may be associated with the name and a description of the second item 204B, such as ABC CHIPS—1 oz (28.3 g). In this case, item tracking device may display "Item 2—ABC CHIPS—1 oz (28.3 g)", wherein "Item 2" is an indication of the group ID 3816 and "ABC CHIPS—1 oz (28.3 g)" is an indication of the second item identifier 1604*b*.

System and Method for Item Identification Using Container-Based Classification (090278.0413)

Example System for Item Identification Using Container-Based Classification

In general, certain embodiments of the present disclosure describe techniques for item identification utilizing container-based classification. During the item identification process for an item, the disclosed system determines a container category associated with the item, identifies items that belong to the same class of container category as the item, and present the identified items in a list of item options on a graphical user interface (GUI) for the user to choose from. The user may select an item from the list on the GUI. The disclosed system uses the user selection as feedback in the item identification process. In this manner, the disclosed system improves the item identifying and tracking techniques. For example, the disclosed system may reduce the search space dataset from among the encoded vector library that includes encoded feature vectors representing all the items available at the physical location (e.g., store) to a subset of entries that are associated with the particular container category that is associated with the item in question. Therefore, the disclosed system provides practical applications and technical improvements to the item identification and tracking techniques. By reducing the search space dataset to a subset that is associated with the particular container category as the item in question, the item tracking device does not have to consider the rest of the items that are not associated with the particular container category. Therefore, the disclosed system reduces the search time and the computational complexity in the item identification process, and processing and memory resources needed for the item identification process. Furthermore, this leads to improving the accuracy of the item identification process. For example, the user feedback may be used as additional and external information to further refine the machine learning model and increase the accuracy of the machine learning model for subsequent item identification operations. Accordingly, this represents an improvement to the efficiency, throughput, and productivity of computer systems implemented to perform the described operations. Furthermore, the disclosed system provides the practical application and technical improvements to the item identification and tracking techniques.

Figure 40:
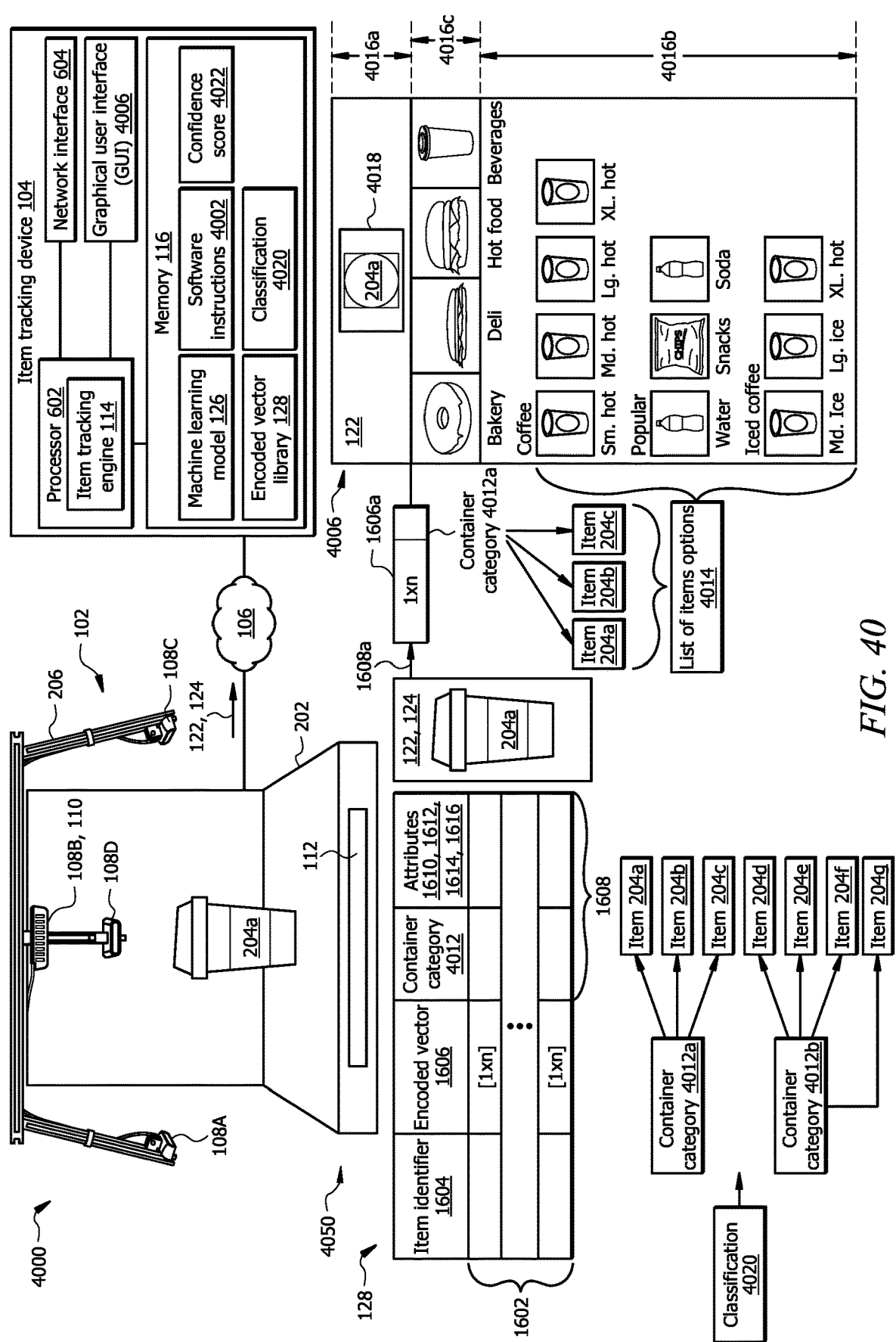
FIG. 40 illustrates an embodiment of a system configured for item identification using container-based classification.

FIG. 40 illustrates an embodiment of a system 4000 that is configured to identify an item (e.g., item 204 in FIG. 2A) based on a container category associated with the item. FIG. 40 further illustrates an example operational flow 4050 of the system 4000 for item identification using container-based classification. In some embodiments, the system 4000 includes the item tracking device 104 communicatively coupled with the imaging device 102, via a network 106. In the example of FIG. 40, the configuration of imaging device 102 described in FIG. 2A is used. However, the configuration of imaging device 102 described in FIG. 2B or any other configuration of the imaging device 102 may be used in the system 4000. In the example configuration of imaging device 102 in FIG. 40, the imaging device 102 includes cameras 108*a-d*, 3D sensor 110, the structure 206, weight sensor 112, and platform 202, similar to that described in FIGS. 1, 2A, and 2B. In some configurations of the imaging device 102, any number of cameras 108, 3D sensors 110, and weight sensors 112 may be implemented, similar to that described in FIGS. 1, 2A, and 2B. The systems and components illustrated and described in the discussions of FIGS. 1-29 may be used and implemented to perform operations of the systems and methods described in FIGS. 40-41. Additionally, systems and components illustrated and described with reference to any figure of this disclosure may be used and implemented to perform operations of the systems and methods described in FIGS. 40-41. The system 4000 may be configured as shown in FIG. 40 or in any other configuration.

In general, the system 4000 increases the accuracy in item identification and tracking, specifically, in cases where an item 204 (e.g., tea, soda) is poured or placed into a container dedicated for another item 204 (e.g., in a coffee cup). In some cases, the same container, such as a cup, a box, a bottle, and the like, may be used for multiple items 204. For example, in some cases, a user may pour an item 204 (e.g., tea or soda) into a container that is for another item 205 (e.g., in a coffee cup) and place the container on the platform 202. In other cases, the user may pour an item 204 that is for a specific container into the specific container and place it on the platform 202. In such cases, it is challenging to recognize what item 204 is placed inside the container and it would require a large amount of computing resources and training data to recognize the item 204.

The present disclosure provides a solution to this and other technical problems that are currently arising in the realm of item identification and tracking technology. For example, the system 4000 is configured to associate each item 204 with one or more container categories 4012 that have been known as being used by users to place the item 204 into, and during the item identification, determine a container category 4012 associated with the item 204, identify items 204 that are historically used in conjunction with the container category 4012, and present the identified items 204 in a list of item options 4014 on a graphical user interface (GUI) 4006 for the user to choose from. The user may select an item 204 from the list on the GUI 4006. The system 4000 uses the user selection in identifying the item 204. In this manner, the system 4000 improves the item identifying and tracking operations. For example, the system 4000 may reduce the search space dataset from among the encoded vector library 128 that includes encoded feature vectors 1606 representing all the items 204 available at the physical location (e.g., store) to a subset of entries 1602 that are associated with the particular container category 4012 that is associated with the item 204 in question placed on the platform 202. Reducing the search space dataset may be in response to filtering out items from the encoded vector library 128, where those items that are determined to not have attributes 1608 in common with the item 204 that is placed on the platform 202 and desired to be identified. In this disclosure, a feature descriptor 1608 may interchangeably referred to as a feature 1608 of an item 204.

By reducing the search space dataset to a subset that is associated with the particular container category 4012 as the item 204 in question, the item tracking device 104 does not have to consider the rest of the items that are not associated with the particular container category 4012. Therefore, the system 4000 provides a practical application of reducing search space in the item identification process, which in turn, reduces the search time and the computational complexity in the item identification process, and processing and memory resources needed for the item identification process. Furthermore, this leads to improving the accuracy of the item identification process. For example, the user feedback may be used as additional and external information to further refine the machine learning model 126 and increase the accuracy of the machine learning model 126 for subsequent item identification operations.

System Components

Aspects of the item tracking device 104 are described in FIGS. 1-29, and additional aspects are described below. The item tracking device 104 may include the processor 602 in signal communication with the network interface 604, memory 116, and the GUI 4006.

Memory 116 is configured to store software instructions 4002, machine learning model 126, encoded vector library 128, classification 4020, confidence score 4022, and/or any other data or instructions. The memory 116 stores software instructions 4002 that when executed by the processor 602 cause the processor 602 to execute the item tracking engine 114 to perform one or more operations of the item tracking device 104 described herein. The software instructions 4002 may comprise any suitable set of instructions, logic, rules, or code operable to execute the processor 602 and item tracking engine 114 and perform the functions described herein. Machine learning model 126 is described with respect to FIGS. 1-6. Other elements are described further below in conjunction with the operational flow 4050 of the system 4000.

The GUI 4006 may generally be an interface on a display screen of the item tracking device 104. In some embodiments, the GUI 4006 may be a touch-screen interface, such that users can select an item 204 from a list of item options 4014 on the GUI 4006 by pressing an icon or image associated with the item 204. In this manner, the GUI 4006 may include buttons, interactive areas on the screen, keyboard, and the like so users can interact with the item tracking device 104 via GUI 4006.

Operational Flow for Item Identification Based on Container-Based Classification The operational flow 4050 of system 4000 may begin when each entry 1602 in the encoded vector library 128 is associated with a respective container category 4012. The encoded vector library 128 is described in at least the discussion of FIG. 16-18. As mentioned in FIG. 16, the encoded vector library 128 may include a plurality of encoded vectors 1606. Each encoded vector 1606 may be identified with an item identifier 1604, such as an SKU, a barcode, and the like. In some embodiments, each entry 1602 in the encoded vector library 128 may represent a different item 204. In some embodiments, each entry 1602 in the encoded vector library 128 may represent a different image 122, 124 of an item 204. In some embodiments, multiple entries 1602 may represent images 122, 124 of an item 204 captured by cameras 108 and/or 3D sensors 110 from different angles.

Each encoded vector 1606 may be associated with one or more attributes 1608. The one or more attributes 1608 may include item type 1610, dominant color(s) 1612, dimensions 1614, and weight 1616, similar to that described in FIG. 16. In some embodiments, in addition or alternative to attributes 1608 described in FIG. 16, each encoded vector 1606 may be associated with a respective container category 4012 that indicates a container type in which the item 204 can be placed. In some examples, a container category 4012 for coffee (e.g., an item 204) may include a coffee cup, a teacup, a plastic cup, a paper cup, a cup with a lid, a cup without a lid, and any other container that coffee can be poured in. In some cases, an item 204 may be placed in different containers. For example, coffee can be placed in a coffee cup, a teacup, etc.; and soda can be placed in coffee cup, teacup, etc. Thus, each container category 4012 may be associated with multiple items 204 in their respective entries 1602 or rows. For example, a first container category 4012 (such as a cup) may be associated with multiple items 204 (such as coffee, tea, soda, and the like).

The item tracking engine 114 may be provided with the mapping or classification 4020 of each container category 4012a-b and their respective items 204a-h. For example, a first container category 4012a may be associated with items 204a-c, and a second container category 4012b may be associated with items 204e-g. In some examples, multiple container categories 4012 may include non-overlapping item(s) 204. In some examples, multiple container categories 4012 may include overlapping item(s) 204.

During the item identification process, the item tracking engine 114 may determine the container category 4012 associated with an item 204 placed on the platform 202 based on the encoded vector library 128 by implementing the machine learning model 126. The item tracking engine 114 may identify the items that are associated with the identified container category 4012 based on the provided classification 4020 and present the identified items 204 as a list of item options 4014 on the GUI 4006 to choose from. The item tracking engine 114 may use the user selection as feedback to confirm the item 204 and add the item 204 to the virtual cart of the user. This operation is described in greater detail below.

Determining a Container Category Associated with the Item

The operation of item identification may begin when the item tracking engine 114 detects a triggering event. The item tracking engine 114 may detect a triggering event that may correspond to the placement of the item 204 on the platform 202, e.g., in response to the user placing the item 204 on the platform 202. In response to detecting the triggering event, the item tracking engine 114 may capture one or more images 122, 124 of the item 204a using the cameras 108 and/or 3D sensors 110. For example, the cameras 108 and/or 3D sensors 110 may capture the images 122, 124 and transmit the images 122, 124 to the item tracking device 104, similar to that described in FIGS. 1-6.

The item tracking engine 114 may feed the image 122, 124 to the machine learning model 126 to generate an encoded vector 1606a for the item 204a. In this process, the machine learning model 126 may extract a set of physical features/attributes 1608 of the item 204a from the image 122, 124 by an image processing neural network. The encoded vector 1606a may be a vector or matrix that includes numerical values that represent or describe the attributes 1608 of the item 204a. The encoded vector 1606a may have any suitable dimension, such as 1×n, where 1 is the number of rows and n is the number of columns, and n can be any number greater than one.

Narrowing Down the Search Set to Items that are Associated with the Container Category of the Item The item tracking engine 114 may determine that the item 204a is associated with the container category 4012a based on analyzing the encoded vector 1606a and attributes 1608 of the item 204a. In response, the item tracking engine 114 may access the classification 4020 of the container categories 4012a-b and their respective items 204a-g and search for the container category 4012a class. In response, the item tracking engine 114 may identify items 204a-c that are associated with the container category 4012a class.

In some embodiments where a container associated with the container category 4012a is historically used to place the items 204a-c into, the item tracking engine 114 may identify the items 204a-c that historically have been identified to be placed inside a container associated with the container category 4012a. In response, the item tracking engine 114 may generate a list of item options 4014 that includes the items 204a-c and display the list of item options 4014 on the GUI 4006.

In some embodiments, this process may be performed before, during, and/or after the filtering operations based on any of the item type, dominant colors, dimension, weight, and/or other attributes 1608 of the item 204a described in FIG. 15. For example, in some embodiments, the process of narrowing down the search set based on the container category 4012a may be performed at any point during the item identification process.

In some embodiments, the item tracking engine 114 may determine a confidence score 4022 that represents the accuracy of the identity of the item 204a based on the previous one or more filtering operations and if the determined confidence score 4022 is less than a threshold percentage (e.g., less than 90%, 85%, etc.), the item tracking engine 114 may filter the items 204 in the encoded vector library 128 based on the container category 4012a of the item 204a to further narrow down the search list and increase the accuracy of the item identification process.

In some embodiments, besides the list of item options 4014, the item tracking engine 114 may display an image 122 of the item 204a on section 4016a of the GUI 4006, and display a bounding box 4018 around the item 204a in the image 122. To this end, the item tracking engine 114 may determine the pixel locations around the edges of the item 204a in the image 122 and generate the bounding box 4018 that shows a box around the edges of the item 204a. In some embodiments, the item tracking engine 114 may generate and display a contour of the item 204a on the image 122 on the GUI 4006.

In some embodiments, the item tracking engine 114 may display one or more item types on the section 4016c of the GUI 4006. The one or more item types may be most frequently used/acquired items by users, for example, in past hour, day, week, etc. The item tracking engine 114 may display the image 122 of the item 204a in a first section 4016a of the GUI 4006, where the first section 4016a may be on top of other sections on the display of the GUI 4006.

The item tracking engine 114 may display the list of item options 4014 in the section 4016b of the GUI 4006. As discussed above, there may be multiple container category 4012a-b classes. In some embodiments, the container category 4012a-b classes may be in a list readily available in the section 4016b of the GUI 4006. Upon determining the container category 4012a of the item 204a, the item tracking engine 114 may scroll through the list of container category 4012a-b and stop scrolling to display the items associated with the identified container category 4012a on the section 4016b of the GUI 4006.

In some embodiments, the item tracking engine 114 may order/re-order the list of item(s) 204 that historically have been placed inside the container associated with the identified container category 4012a more than other items 204 belonging to the same container category 4012a class. For example, the item tracking engine 114 may order the items 204a-c such that the item 204a that historically has been placed inside the container associated with the identified category 4012a more than other items 204b-c is displayed on top of the list of item options 4014.

In one example, assume that container category 4012a indicates a coffee cup, and the item 204a is coffee. In this example, the item tracking engine 114 may order/re-order the list of items 204a-c such that the item 204a (e.g., coffee) is displayed on top of or above the rest of the items 204b-c (e.g., tea, soda) in the list of item options 4014 on the GUI 4006. In response, the item tracking engine 114 may display the ordered/re-ordered list of items 204a-c in the list of item options 4014 on the GUI 4006. In the example of FIG. 40, the "coffee" item option is displayed above the other options of "Popular," and "Iced coffee". In other examples, some of the item options described above and/or additional item options may be displayed on the GUI 4006.

In some cases, the item 204a may have been identified as being placed inside the container associated with container category 4012a more than the items 204b-c. For example, the user may pour coffee into a coffee cup and place it on the platform 202, where coffee is the item 204a and the coffee cup is the container category 4012a in this example. In some cases, the item 204a may have been identified as being placed inside the container associated with the container category 4012a less than the items 204b-c. For example, the user may pour tea into a coffee cup and place it on the platform 202, where tea is the item 204a and the coffee cup is the container category 4012a in this example.

In some embodiments, size variations of each item 204a-c and the corresponding picture of item 204a-c may be displayed along the list of item options 4014 on the GUI 4006, such as 8 oz, 18 oz, small, medium, large, and the like. The item tracking engine 114 may receive a selection of the item 204a from the list of item options 4014, for example, when the user presses on the item 204a. In case, the size variations of the item 204a are also displayed, the user may optionally select the respective size variation of the item 204a. In response to receiving the selection of the user, the item tracking engine 114 may identify the item 204a (with the selected size variation) as being placed inside the container associated with the container category 4012a. The item tracking engine 114 may determine that the user wishes to add the selected item 204a to their virtual cart. In response, the item tracking engine 114 may add the selected item 204a to the virtual cart associated with the user.

Example Method for Item Identification Using Container-Based Classification

Figure 41:
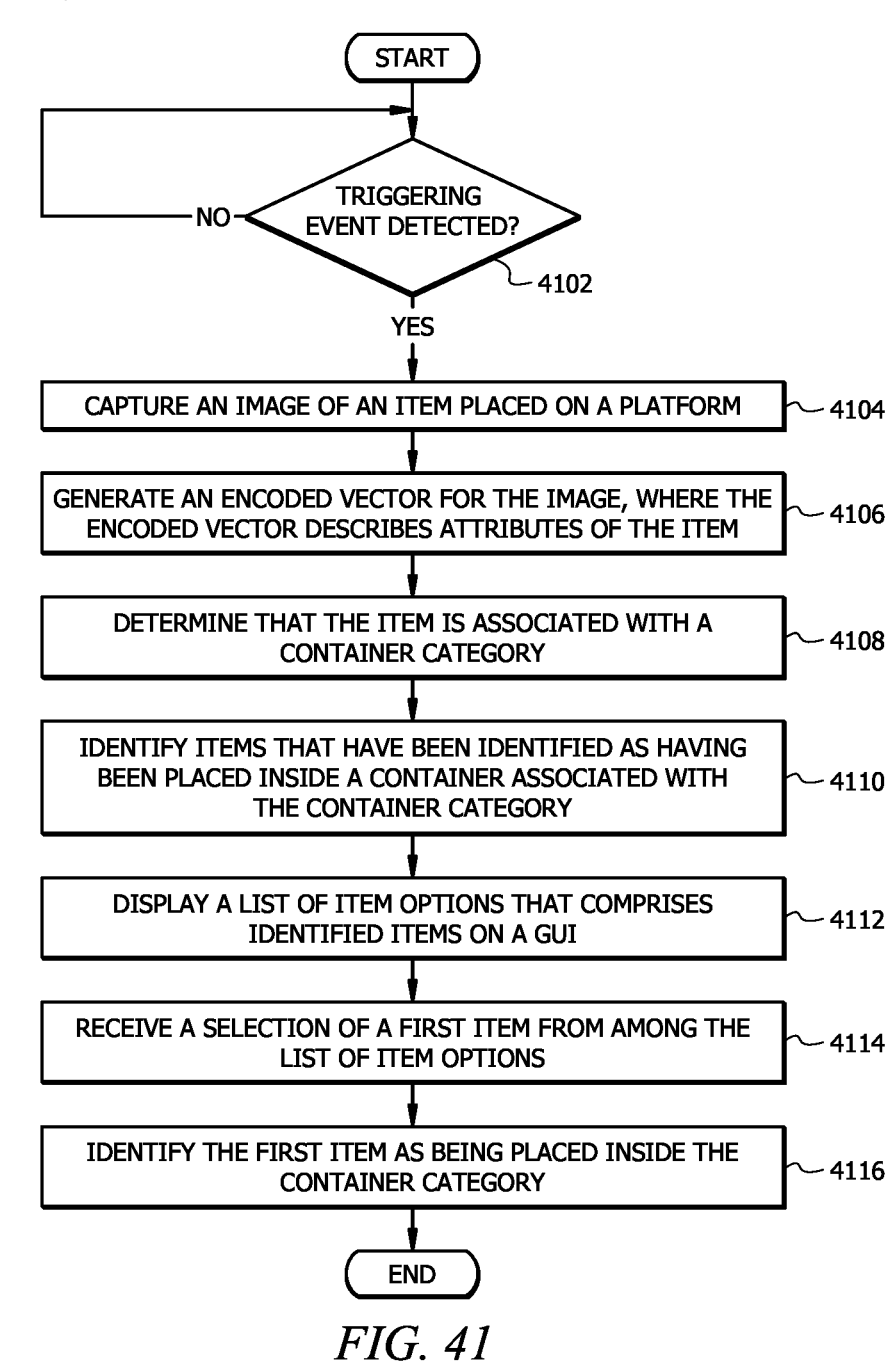
FIG. 41 illustrates an example flow chart of a method for item identification using container-based classification.

FIG. 41 illustrates an example flow chart of a method 4100 for item identification using container-based classification according to some embodiments. Modifications, additions, or omissions may be made to method 4100. Method 4100 may include more, fewer, or other operations. For example, operations may be performed in parallel or in any suitable order. While at times discussed as the system 4000, item tracking device 104, item tracking engine 114, imaging device 102, or components of any of thereof performing operations, any suitable system or components of the system may perform one or more operations of the method 4100. For example, one or more operations of method 4100 may be implemented, at least in part, in the form of software instructions 4002 of FIG. 40, stored on tangible non-transitory computer-readable media (e.g., memory 116 of FIG. 40) that when run by one or more processors (e.g., processors 602 of FIG. 40) may cause the one or more processors to perform operations 4102-4116.

At operation 4102, the item tracking engine 114 determines whether a triggering event is detected. For example, the item tracking engine 114 may detect a triggering event when a user places an item 204 on the platform 202, similar to that described in FIGS. 1-29. If it is determined that a triggering event is detected, method 4100 proceeds to operation 4104. Otherwise, method 4100 remains at operation 4104 until a triggering event is detected.

At operation 4104, the item tracking engine 114 captures an image 122, 124 of the item 204a placed on the platform 202, for example, by using one or more cameras 108 and/or 3D sensors 110, similar to that described in FIG. 40.

At operation 4106, the item tracking engine 114 generates an encoded vector 1606a for the image 122, 124, where the encoded vector 1606a describes the attributes 1608a of the item 204a. For example, the item tracking engine 114 may generate the encoded vector 1606a by implementing the machine learning model 126 or any suitable method, similar to that described in FIGS. 1-29.

At operation 4108, the item tracking engine 114 determines that the item 204a is associated with a container category 4012a. For example, the item tracking engine 114 may detect the container shown in the image 122, 124 and determine that the container is associated with the container category 4012a, similar to that described in FIG. 40.

At operation 4110, the item tracking engine 114 identifies items 204a-c that have been identified as having been placed inside the container associated with the container category 4012a. In other words, the item tracking engine 114 identifies items 204a-c that are associated with (e.g., belong to the class of) the determined container category 4012a based on the classification 4020 of container category 4012a.

At operation 4112, the item tracking engine 114 displays a list of item options 4014 that comprises identified items 204a-c on the GUI 4006, for example, on the section 4016b of the GUI 4006.

At operation 4114, the item tracking engine 114 receives a selection of the first item 204a from among the list of item options 4014. For example, the item tracking engine 114 may receive the selection of the first item 204a when the user selects the item 204*a* on the GUI 4006. At operation 4116, the item tracking engine 114 identifies the first item 204*a* as being placed inside the container category 4012*a*. The item tracking engine 114 may also add the item 204*a* to the virtual shopping cart associated with the user, similar to that described in FIGS. 1-29.

Selecting an Item from a Plurality of Identified Items Based on a Similarity Value In general, certain embodiments of the present disclosure describe improved techniques for identifying an item placed on a platform of an imaging device. In response to detecting a placement of an item on the platform, a plurality of item identifiers are selected for the item from an encoded vector library, based on a plurality of images of the item. Each item identifier selected from the encoded vector library based on a corresponding image of the item is associated with a similarity value that is indicative of a degree of confidence that the item identifier correctly identifies the item depicted in the image. A particular item identifier is selected from the plurality of item identifiers based on the similarity values associated with the plurality of item identifiers. For example, all item identifiers that are associated with a similarity value that is less than a threshold are discarded. Among the remaining item identifiers, two item identifiers are selected that are associated with the highest and the next highest similarity values. When the difference between the highest similarity value and the next highest similarity value exceeds another threshold, the item identifier associated with the highest similarity value is assigned to the item.

Figure 42:
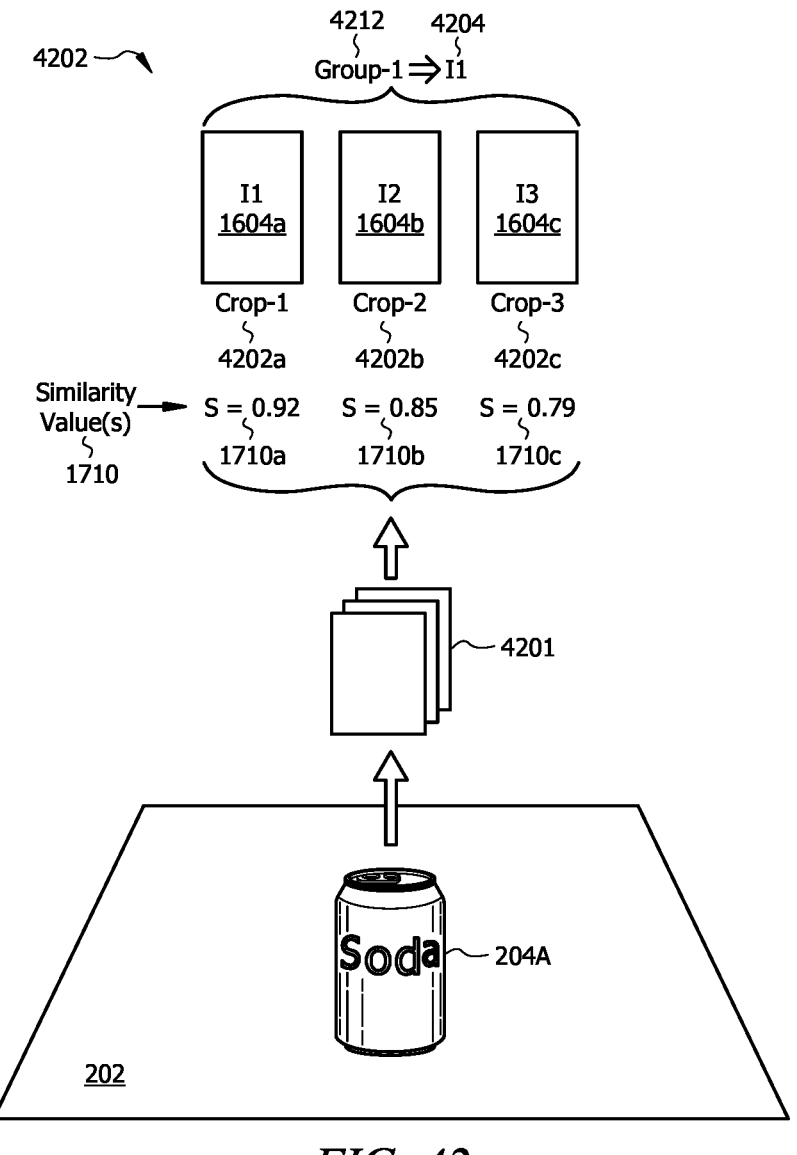
FIG. 42 illustrates an example view of an item placed on the platform in relation to selecting an item identifier of the item from a plurality of item identifiers identified for the item, in accordance with one or more embodiments of the present disclosure.

As described above, as part of identifying an item 204 that is placed on the platform 202 of the imaging device 102, item tracking device 104 generates a plurality of cropped images of the item 204, identifies an item identifier 1604 for each cropped image, and selects a particular item identifier 1604 from the item identifiers 1604 identified for the cropped images. As also described above, in one embodiment, item tracking device 104 may apply a majority voting rule to select the particular item identifier 1604 from the item identifiers 1604 identifies for the cropped images. The majority voting rule defines that when a same item identifier 1604 has been identified for a majority of cropped images of an unidentified item, the same item identifier 1604 is to be selected as the item identifier associated with the unidentified item. For example, assuming that item identifier I2 was identified for two of three cropped images of the item, item tracking device 104 selects I2 as the item identifier 1604 associated with the unidentified item. However, the majority voting rule may not always successfully identify a correct item identifier of the unidentified item. For example, no majority may exist among the item identifiers 1604 identified for the cropped images of the item. In such a case, the majority voting rule does not apply and the item tracking device 104 typically asks the user to identify the item. For example, FIG. 42 illustrates an example view of an item 204A placed on the platform 202. As shown, item tracking device 104 captures a plurality of images 4201 of the item 204A and then generates a plurality of cropped images 4202 of the item 204A by editing the images 4201. An item identifier 1604 is identified based on each cropped image 4202. As shown, item identifier 1604*a* (shown as I1) is identified based on cropped image 4202*a*, item identifier 1604*b* (shown as I2) is identified based on cropped image 4202*b*, and item identifier 1604*c* (shown as I3) is identified based on cropped image 4202*b*. Since a different item identifier 1604 is identified based on each of the three cropped images 4202, no majority exists among the item identifiers 1604 identified for the cropped images 4202 of the item 204A. Hence, the majority voting rule does not apply and the item tracking device 104 may need to ask the user to identify the item 204A In some cases, even when the majority voting rule applies and is used to identify an item identifier 1604 associated with the item 204 based on the cropped images 4202, the identified item identifier 1604 may not be a correct match to the item 204, in which case the item tracking device 104 may need to ask the user to identify the item. This results in a sub-optimal user experience.

Certain embodiments of the present disclosure discuss improved techniques for identifying an item 204 placed on the platform 202 with higher accuracy while avoiding false identifications of items 204. As described below, these improved techniques include selecting a particular item identifier 1604 from a plurality of item identifiers 1604 identified for an unidentified item, based on numerical similarity values associated with each item identifier 1604. For example, as shown in FIG. 42, each cropped image 4202 is associated with a similarity value (S) 1710 that is indicative of a degree of confidence that the corresponding item identifier 1604 correctly identifies the item depicted in the cropped image 4202. Instead of relying on the majority voting rule described above, item tracking device 104 selects one of the item identifiers (e.g., 1604*a-c*) associated with the cropped images 4202 based on the respective similarity values (S) 1710 associated with the item identifiers 1604. This allows the item tracking device to achieve a higher accuracy in identifying an item 204 placed on the platform 202. These aspects will now be described in more detail with reference to FIG. 42 and FIG. 43.

The system and method described in certain embodiments of the present disclosure provide a practical application of intelligently selecting a particular item identifier for an unidentified item from a plurality of item identifiers identified for the item. As described with reference to FIGS. 42 and 43, in response to detecting a triggering event corresponding to a placement of a first item 204 on the platform 202 of the imaging device 102, item tracking device 104 captures a plurality of images 4201 of the first item 204A, generates a plurality of cropped images 4202 of the first item 204A based on the images 4201, and identifies a plurality of item identifier 1604 for the first item 204A based on the plurality of cropped images 4202. Each item identifier 1604 that was selected based on a respective cropped image 4202 is associated with a similarity value (S) 1710 that is indicative of a degree of confidence that the item identifier 1604 correctly identifies the item depicted in the cropped image 4202. In response to detecting that a same item identifier 1604 was not identified for a majority of the cropped images 4202, item tracking device 104 selects two item identifiers 1604 that are associated with the highest and the next highest similarity values 1710. When the difference between the highest similarity value and the next highest similarity value exceeds a threshold, the item tracking device 104 assigns the item identifier 1604 associated with the highest similarity value 1710 to the first item 204A. This allows the item tracking device 104 to achieve a higher accuracy in identifying an item 204 placed on the platform 202, and thus, saves computing resources (e.g., processing and memory resources associated with the item tracking device 104) that would otherwise be used to re-identify an item that was identified incorrectly. This, for example, improves the processing efficiency associated with the processor 602 (shown in FIG. 6) of the item tracking device 104. Thus, the disclosed system and method generally improve the technology associated with automatic detection of items 204.

Figure 43:
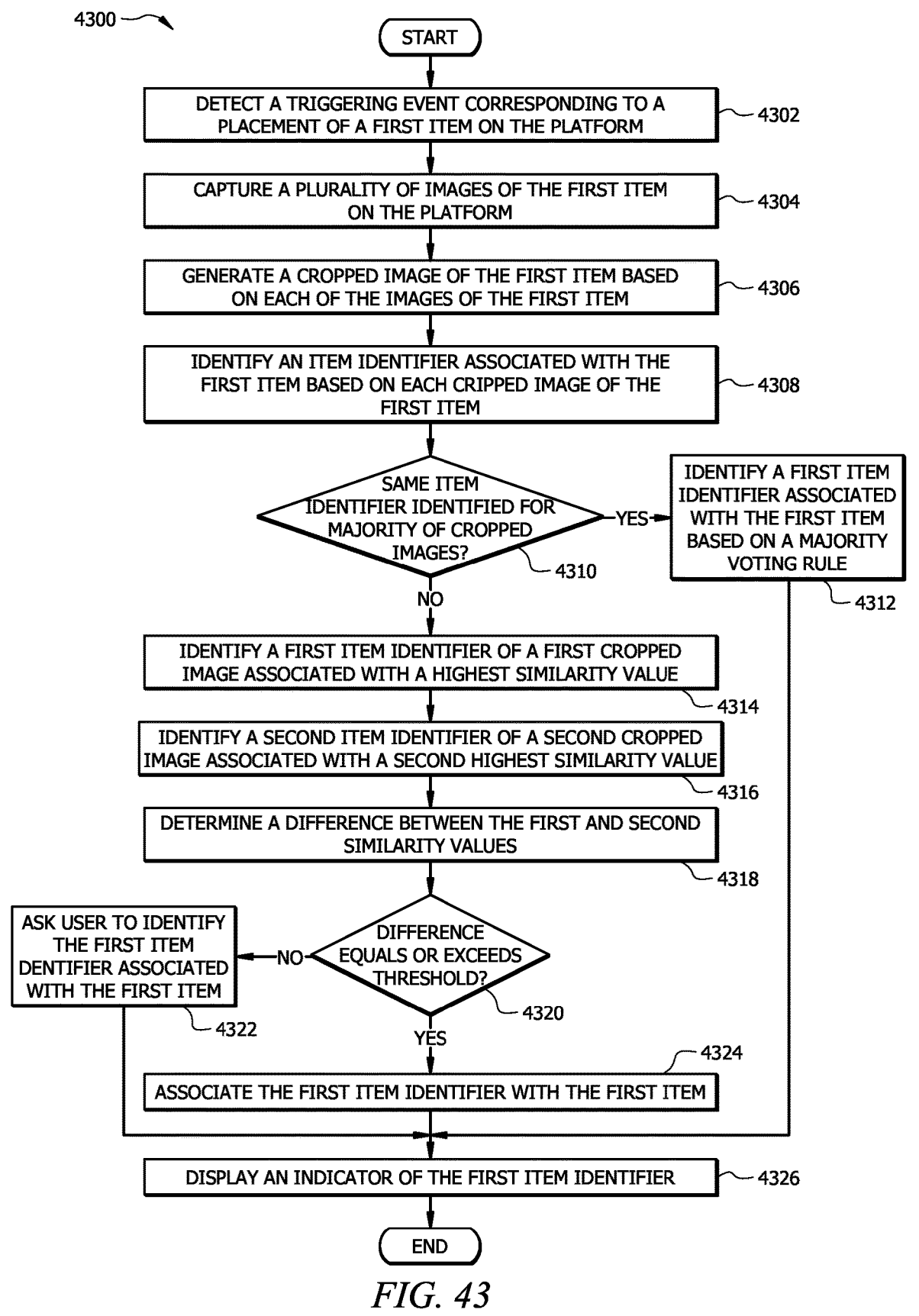
FIG. 43 illustrates a flowchart of an example method for selecting an item identifier of an item from a plurality of item identifiers identified for the item, in accordance with one or more embodiments of the present disclosure.

It may be noted that the systems and components illustrated and described in the discussions of FIGS. 1-29 may be used and implemented to perform operations of the systems and methods described in FIGS. 42 and 43. Additionally, systems and components illustrated and described with reference to any figure of this disclosure may be used and implemented to perform operations of the systems and methods described in FIGS. 42 and 43.

FIG. 43 illustrates a flowchart of an example method 4300 for selecting an item identifier 1604 of an item 204 from a plurality of item identifiers identified for the item 204, based on numerical similarity values associated with the plurality of item identifiers, in accordance with one or more embodiments of the present disclosure. Method 4300 may be performed by item tracking device 104 as shown in FIG. 1. For example, one or more operations of method 4300 may be implemented, at least in part, in the form of software instructions (e.g., item tracking instructions 606 shown in FIG. 6), stored on tangible non-transitory computer-readable medium (e.g., memory 116 shown in FIGS. 1 and 6) that when run by one or more processors (e.g., processors 602 shown in FIG. 6) may cause the one or more processors to perform operations 4302-4326. It may be noted that operations 4302-4326 are described primarily with reference to FIG. 42 and additionally with certain references to FIGS. 1, 2A, 16, and 17.

At operation 4302, item tracking device 104 detects a triggering event corresponding to a placement of a first item 204A (shown in FIG. 42) on the platform 202. In a particular embodiment, the triggering event may correspond to a user placing the first item 204A on the platform 202.

As described above, the item tracking device 104 may perform auto-exclusion for the imaging device 102 using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 to capture reference images 122 and reference depth images 124, respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 of the platform 202 based on differences in depth values between subsequent depth images 124 and the reference depth image 124 and/or differences in the pixel values between subsequent images 122 and the reference image 122.

In one embodiment, to detect the triggering event, the item tracking device 104 may use a process similar to process 700 that is described with reference to FIG. 7 and/or a process similar to method 3200 that is described with reference to FIGS. 32A and 32B for detecting a triggering event, such as, for example, an event that corresponds with a user's hand being detected above the platform 202 and placing an item 204 on the platform 202. For example, the item tracking device 104 may check for differences between a reference depth image 124 and a subsequent depth image 124 to detect the presence of an object above the platform 202. For example, based on comparing the reference depth image 124 with a plurality of subsequent depth images 124, item tracking device 104 may determine that a user's hand holding the first item 204A entered the platform 202, placed the first item 204A on the platform 202, and exited the platform 202. In response to determining that the first item

204A has been placed on the platform 202, the item tracking device 104 determines that the triggering event has occurred and proceeds to identify the first item 204A that has been placed on the platform 202.

At operation 4304, in response to detecting the triggering event, item tracking device 104 captures a plurality of images 4201 of the first item 204A placed on the platform 202 using two or more cameras (e.g., 108A-D) of a plurality of cameras 108. For example, the item tracking device 104 may capture images 4201 with an overhead view, a perspective view, and/or a side view of the first item 204A on the platform 202. In one embodiment, each of the images 4201 is captured by a different camera 108.

At operation 4306, item tracking device 104 generates a cropped image 4202 for each of the images 4201 by editing the image 4201 to isolate at least a portion of the first item 204A, wherein the cropped images 4202 correspond to the first item 204A depicted in the respective images 4201. In other words, item tracking device 104 generates one cropped image 4202 of the first item 204A based on each image 4201 of the first item 204A captured by a respective camera 108. As shown in FIG. 42, item tracking device 104 generates three cropped images 4202a, 4202b and 4202c of the first item 204A from respective images 4201 of the first item 204A.

As described above, in one embodiment, the item tracking device 104 may generate a cropped image 4202 of the first item 204A based on the features of the first item 204A that are present in an image 4201 (e.g., one of the images 4201). The item tracking device 104 may first identify a region-of-interest (e.g., a bounding box) 1002 (as shown in FIG. 10A) for the first item 204A based on the detected features of the first item 204A that are present in an image 4201 and then may crop the image 4201 based on the identified region-of-interest 1002. The region-of-interest 1002 comprises a plurality of pixels that correspond with the first item 204A in the captured image 4201 of the first item 204A on the platform 202. The item tracking device 104 may employ one or more image processing techniques to identify a region-of-interest 1002 for the first item 204A within the image 4201 based on the features and physical attributes of the first item 204A. After identifying a region-of-interest 1002 for the first item 204A, the item tracking device 104 crops the image 4201 by extracting the pixels within the region-of-interest 1002 that correspond to the first item 204A in the image 4201. By cropping the image 4201, the item tracking device 104 generates another image (e.g., cropped image 4202) that comprises the extracted pixels within the region-of-interest 1002 for the first item 204A from the original image 4201. The item tracking device 104 may repeat this process for all of the captured images 4201 of the first item 204A on the platform 202. The result of this process is a set of cropped images 4202 (e.g., 4202a, 4202b, and 4202c) corresponding to the first item 204A that is placed on the platform 202. In some embodiments, the item tracking device 104 may use a process similar to process 900 described with reference to FIG. 9 to generate the cropped images 4202 of the first item 204A.

In one embodiment, item tracking device 104 may be configured to assign a group ID 4212 (shown as Group-1) to the group of cropped images 4202 generated for the first item 204A. It may be noted that item tracking device 104 may be configured to assign a unique group ID to each group of cropped images generated for each respective item 204 placed on the platform 202.

At operation 4308, item tracking device 104 identifies an item identifier 1604 associated with the first item 204A based on each cropped image 4202 of the first item 204A.

The item tracking device 104 generates an encoded vector 1702 (shown in FIG. 17) for each cropped image 4202 of the first item 204A. An encoded vector 1702 comprises an array of numerical values 1708. Each numerical value 1708 in the encoded vector 1702 corresponds with and describes an attribute (e.g., item type, size, shape, color, etc.) of the first item 204A. An encoded vector 1702 may be any suitable length. For example, the encoded vector 1702 may have a size of 256×1, 512×1, 1024×1 or 2048×1 or any other suitable length. The item tracking device 104 generates an encoded vector 1702 for the first item 204A by inputting each of the cropped images 4202 into a machine learning model (e.g., machine learning model 126). The machine learning model 126 is configured to output an encoded vector 1702 for an item 204 based on the features or physical attributes of an item 204 that are present in an image (e.g., image 4201) of the item 204. Examples of physical attributes include, but are not limited to, an item type, a size, shape, color, or any other suitable type of attribute of the item 204. After inputting a cropped image 4202 of the first item 204A into the machine learning model 126, the item tracking device 104 receives an encoded vector 1702 for the first item 204A. The item tracking device 104 repeats this process to obtain an encoded vector 1702 for each cropped image 4202 of the first item 204A on the platform 202.

The item tracking device 104 identifies the first item 204A from the encoded vector library 128 based on the corresponding encoded vector 1702 generated for the first item 204A. Here, the item tracking device 104 uses the encoded vector 1702 for the first item 204A to identify the closest matching encoded vector 1606 in the encoded vector library 128. Referring to FIG. 16, an example encoded vector library 128 includes a plurality of entries 1602. Each entry 1602 corresponds with a different item 204 that can be identified by the item tracking device 104. Each entry 1602 may comprise an encoded vector 1606 that is linked with an item identifier 1604 and a plurality of feature descriptors 1608. An encoded vector 1606 comprises an array of numerical values. Each numerical value corresponds with and describes an attribute (e.g., item type, size, shape, color, etc.) of an item 204. An encoded vector 1606 may be any suitable length. For example, an encoded vector 1606 may have a size of 1×256, 1×512, 1×1024, 1×2048 or any other suitable length.

In one embodiment, the item tracking device 104 identifies the closest matching encoded vector 1606 in the encoded vector library 128 by generating a similarity vector 1704 (shown in FIG. 17) between the encoded vector 1702 generated for the unidentified first item 204A and the encoded vectors 1606 in the encoded vector library 128. The similarity vector 1704 comprises an array of numerical similarity values 1710 where each numerical similarity value 1710 indicates how similar the values in the encoded vector 1702 for the first item 204A are to a particular encoded vector 1606 in the encoded vector library 128. In one embodiment, the item tracking device 104 may generate the similarity vector 1704 by using a process similar to the process described in FIG. 17. In this example, the item tracking device 104 uses matrix multiplication between the encoded vector 1702 for the first item 204A and the encoded vectors 1606 in the encoded vector library 128. For example, matrix multiplication of the encoded vector 1702 (e.g., 2048×1) and a particular entry 1602 (e.g., 1×2048) of the encoded vector library 128 yields a single numerical value (e.g., similarity value 1710) that is between 0 and 1. Each numerical similarity value 1710 in the similarity vector 1704 corresponds with an entry 1602 in the encoded vector library 128. For example, the first numerical value 1710 in the similarity vector 1704 indicates how similar the values in the encoded vector 1702 are to the values in the encoded vector 1606 in the first entry 1602 of the encoded vector library 128, the second numerical value 1710 in the similarity vector 1704 indicates how similar the values in the encoded vector 1702 are to the values in the encoded vector 1606 in the second entry 1602 of the encoded vector library 128, and so on.

After generating the similarity vector 1704, the item tracking device 104 can identify which entry 1602, in the encoded vector library 128, most closely matches the encoded vector 1702 for the first item 204A. In one embodiment, the entry 1602 that is associated with the highest numerical similarity value 1710 in the similarity vector 1704 is the entry 1602 that most closely matches the encoded vector 1702 for the first item 204A. After identifying the entry 1602 from the encoded vector library 128 that most closely matches the encoded vector 1702 for the first item 204A, the item tracking device 104 may then identify the item identifier 1604 from the encoded vector library 128 that is associated with the identified entry 1602. Through this process, the item tracking device 104 is able to determine which item 204 from the encoded vector library 128 corresponds with the unidentified first item 204A based on its encoded vector 1702. The item tracking device 104 then outputs the identified item identifier 1604 for the identified item 204 from the encoded vector library 128. The item tracking device 104 repeats this process for each encoded vector 1702 generated for each cropped image 4202 (e.g., 4202a, 4202b and 4202c) of the first item 204A. This process may yield a set of item identifiers 1604 (shown as 1604a (I1), 1604b (I2) and 1604c (I3) in FIG. 42) corresponding to the first item 204A, wherein the set of item identifiers 1604 corresponding to the first item 204A may include a plurality of item identifiers 1604 corresponding to the plurality of cropped images 4202 of the first item 204A. In other words, item tracking device 104 identifies an item identifier 1604 for each cropped image 4202 of the first item 204A.

At operation 4310, item tracking device 104 determines whether a same item identifier 1604 was identified for a majority of the cropped images 4202.

Item tracking device 104 may be configured to select one of the plurality of item identifiers 1604a-c (e.g., I1, I2, I3) identified for the first item 204A based on the respective plurality of cropped images 4202 of the first item 204A. For example, item tracking device 104 may select the item identifier 4204 associated with the first item 204A based the plurality of item identifiers 1604a-c identified (e.g., I1, I2, I3) for the first item 204A based on the respective plurality of cropped images 4202 of the first item 204A. For example, as shown in FIG. 42, item tracking device 104 selects I1 as the item identifier 4204 associated with the first item 204a.

In one embodiment, in response to determining that a same item identifier 1604 was identified for a majority of the cropped images 4202, method 4300 proceeds to operation 4312 where the item tracking device selects one of the item identifiers 1604a-c (e.g., I1, I2, I3) based on a majority voting rule. As described above, the majority voting rule defines that when a same item identifier 1604 has been identified for a majority of cropped images (e.g., cropped images 4202a-c) of an unidentified item (e.g., first item 204A), the same item identifier 1604 is to be selected. For example, assuming that item identifier I2 was identified for two of the three cropped images 4202 (not depicted in FIG. 42), item tracking device 104 selects I2 as the item identifier 4204 associated with the first item 204A.

On the other hand, in response to determining that a same item identifier 1604 was not identified for a majority of the cropped images 4202, method 4300 proceeds to operation 4314. As described above, when no majority exists among the item identifiers 1604 of the cropped images 4202, the majority voting rule described above cannot be applied. In other words, when a same item identifier 1604 was not identified for a majority of the cropped images 4202 of the unidentified first item 204A, the majority voting rule does not apply. In such a case, item tracking device 104 uses an alternative method described below to select the first item identifier 4204a from the item identifiers 1604a-c. For example, as described below in more detail, to select the first item identifier 4204 from the item identifiers 1610a-c identified for the cropped images 4202a-c respectively, item tracking device 104 may be configured to use numerical similarity values 1710 that were used to identify each item identifier 1610a-c from the encoded vector library 128.

As described above with reference to operation 4308, for each particular cropped image 4202, item tracking device 104 identifies an item identifier 1604 from the encoded vector library 128 that corresponds to the highest numerical similarity value 1710 in the similarity vector 1704 generated for the particular cropped image 4202. In other words, each item identifier 1604a-c identified for each respective cropped image 4202a-c is associated with a respective highest similarity value 1710 based on which the item identifier 1604a-c was determined from the encoded vector library 128. For example, as shown in FIG. 42, item identifier 1604a (shown as I1) identified for cropped image 4202a is associated with similarity value (S) 1710a, item identifier 1604b (shown as I2) identified for cropped image 4202b is associated with similarity value 1710b, and item identifier 1604c (shown as I3) identified for cropped image 4202c is associated with similarity value 1710c. Each of the similarity values (S) 1710a-c is the highest similarity value from a similarity vector 1704 generated for the respective cropped image 4202a-c. FIG. 42 shows example numerical similarity values 1710a-c associated with each item identifier 1604a-c. For example, item identifier 1604a (shown as I1) is associated with S=0.92, item identifier 1604b (shown as I2) is associated with S=0.85, and item identifier 1604c (shown as I3) is associated with S=0.79. Each similarity value (S) 1710 is indicative of a degree of confidence that the corresponding item identifier 1604 correctly identifies the item depicted in an associated copped image 4202. A higher similarity value 1710 is indicative of a higher degree of confidence. For example, item identifier 1604a is associated with the highest similarity value S=0.92 indicating a highest degree of confidence that item identifier 1604a (I1) correctly identifies the item depicted in cropped image 4202a. On the other hand, item identifiers 1604b and 1604c are associated with lower similarity values of S=0.85 and S=0.79 respectively, thus indicating lower degrees of confidence that the item identifiers 1604b and 1604c correctly identify the items depicted respective cropped images 4202b and 4202c.

At operation 4314, in response to determining that a same item identifier 1604 was not identified for a majority of the cropped images 4202, item tracking device 104 identifies a first item identifier 1604a that was identified for a first cropped image 4202a based on a highest similarity value 1710 among a plurality of similarity values 1710a-c used to identify item identifiers 1604a-c for all the cropped images 4202a-c. For example, item identifier 1604a (I1) is associated with the highest numerical similarity value S=0.92 among the similarity values 1710a-c. Thus, item identifier selects item identifier 1604a (I1) as part of operation 4314.

At operation 4316, item tracking device 104 identifies a second item identifier 1604b that was identified for a second cropped image 4202b based on a second highest similarity value 1710b among the plurality of similarity values 1710a-c used to identify the item identifiers 1604a-c for all the cropped images 4202a-c. For example, item identifier 1604b (I2) is associated with the second/next highest numerical similarity value S=0.85 among the similarity values 1710a-c. Thus, item identifier selects item identifier 1604b (I2) as part of operation 4316.

In other words, as part of operations 4314 and 4316, item tracking device 104 selects the two highest numerical similarity values 1710 (e.g., 1710a and 1710b) among the similarity values 1710a-c.

At operation 4318, item tracking device 104 determines a difference between the highest similarity value 1710a and the next highest similarity value 1710b. For example, item identifier 1604 calculates the difference (d) as d=[S=0.92]−(S=0.85)], which is d=0.07.

At operation 4320, item tracking device 104 determines whether the difference (d) between the highest similarity value 1710a and the next highest similarity value 1710b equals or exceeds a threshold ($d_T$). In other words, item identifier 1604 determines whether the highest similarity value 1710a exceeds the next highest similarity value 1710a by at least a minimum pre-configured amount. In response to determining that the difference (d) between the highest similarity value 1710a and the next highest similarity value 1710b does not equal or exceed the threshold, method 4300 proceeds to operation 4322 where item tracking device 104 asks the user to identify the first item 204A. For example, item tracking device 104 displays the item identifiers 1604 (e.g., 1604a-c) corresponding to one or more cropped images 4202 of the first item 204A on a user interface device and asks the user to select one of the displayed item identifiers 1604. For example, item tracking device 104 displays the item identifiers I1, I2 and I3 on a display of the user interface device and prompts the user to select the correct item identifier 1604 for the first item 204A. For example, item tracking device 104 may receive a user selection of I1 from the user interface device, and in response, determine that I1 is the first item identifier 4204 associated with the first item 204A.

On the other hand, in response to determining that the difference (d) between the highest similarity value 1710a and the next highest similarity value 1710b equals or exceeds the threshold, method 4300 proceeds to operation 4324 where item tracking device 104 associates the item identifier 1604a (e.g., I1 corresponding to the highest similarity value of S=0.92) with the first item 204a placed on the platform. In other words, item tracking device 104 determines that item identifier 1604aa (I1) is the first item identifier 4204 associated with the first item 204A placed on the platform. For example, when the threshold difference $d_T$=0.02, item tracking device determines that the difference (d=0.07) between the highest similarity value 1710a and the next highest similarity value 1710b exceeds $d_T$=0.02, and in response, associates the first item identifier 1604a (e.g., I1 corresponding to the highest similarity value of S=0.92) with the first item 204a placed on the platform.

In one embodiment, once the first item identifier 4204 has been identified, item tracking device 104 may map the first item identifier 4204 to the first group ID 4212 (shown as Group-1).

At operation, 4326, item tracking device 104 display an indicator of the first item identifier 1604a on a user interface device. In one embodiment, item tracking device 104 displays, on the user interface device, an indication of the first group identifier 4212 next to an indication of the first item identifier 4204. For example, the first item identifier 424 (I1) may include the name and a description of the first item 204A, such as XYZ soda—12 oz can. In this case, item tracking device may display "Item 1—XYZ soda—12 oz can", wherein "Item 1" is an indication of the group ID 4212 and "XYZ soda—12 oz can" is an indication of the first item identifier 4204.

In one or more embodiments, after generating a similarity vector 1704 for each cropped image 4202 as part of operation 4314, item tracking device 104 determines whether the highest similarity value 1710 from the similarity vector 1704 equals or exceed a threshold ($S_T$). In response to determining that the highest similarity value 1710 from the similarity vector 1704 generated for a particular cropped image 4202 is below the threshold, item tracking device 104 discards the particular cropped image 4202 and does not consider the particular cropped image 4202 for identifying the first item 204A. Essentially, item tracking device 104 discards all cropped images 4202 of the item 204A and/or corresponding item identifiers 1604 that are associated with similarity values less than the threshold. For example, when the threshold similarity value $S_T$=0.84, item tracking device discards cropped image 4202c that is associated with S=0.79 which is less that the $S_T$. Item tracking device 104 selects the first item identifier 4204 from the item identifiers 1604 identified for the remaining cropped images 4202 that are associated with similarity values 1710 that equal or exceed the threshold ($S_T$). For example, after discarding cropped image 4202c, item tracking device 104 selects the first item identifier 4204 from item identifier 1604a (I1) and 1604b (I2) associated with respective cropped images 4202a and 4202b. For example, item identifier 1604 selects the first item identifier 4204 from item identifier 1604a (I1) and 1604b (I2) based on the majority voting rule as part of operation 4312 or based on associated similarity values 1710 as part of operations 4314-4324. Thus, by discarding all cropped images 4202 that are associated with similarity values 1710 lower than the threshold ($S_T$), item tracking device 104 eliminates all cropped images from consideration that are associated with a low degree of confidence. This improves the overall accuracy associated with identifying the item 204A.

In one embodiment, in response to determining at operation 4314 that no cropped images 4202 and corresponding item identifiers 1604 that were identified for the respective cropped images 4202 are associated with similarity values 1710 that equal or exceed the threshold similarity ($S_T$), item tracking device 104 asks the user to identify the first item 204A. For example, item tracking device 104 displays the item identifiers 1604 (e.g., 1604a-c) corresponding to one or more cropped images 4202 of the first item 204A on a user interface device and asks the user to select one of the displayed item identifiers 1604.

Selecting an Item from a Plurality of Identified Items by Filtering Out Back Images of the Items In general, certain embodiments of the present disclosure describe improved techniques for identifying an item placed on a platform of an imaging device. In response to detecting a triggering event corresponding to a placement of an item on a platform of an imaging device, a plurality of images of the item are captured. Each image of the item is tagged as a front image or a back image of the item. In this context, a front image of an item refers to an image of the item that includes sufficient item information to reliably identify the item. On the other hand, a back image of an item is an image of the item that includes insufficient item information to reliably identify the item. All images of the item that are tagged as back images are discarded and an item identifier is identified for the item based only on those images that are tagged as front images.

As described above with reference to FIGS. 42 and 43, as part of identifying an item 204A that is placed on the platform 202 of the imaging device 102 (shown in FIG. 2), item tracking device 104 captures a plurality of images 4201 (shown in FIG. 42) of the item 204A, generates a plurality of cropped images 4202 of the item 204A based on the images 4201, identifies an item identifier 1604 for each cropped image 4202, and selects a particular item identifier 1604 from the item identifiers 1604 identified for the cropped images 4202. However, in some cases, an image of the item 204A captured by a particular camera 108 (shown in FIG. 2) may not include information that can be used to reliably identify the item 204A. For example, a portion of an item 204A facing a particular camera 108 may not include unique identifiable information relating to the item 204A. Assuming that a can of soda is placed on the platform 202, a back of the soda can that contains nutritional information may face at least one camera 108 of the imaging device 102. The nutritional information on the soda can may be common across several flavors of soda cans sold by a particular brand of soda. Thus, an item identifier 1604 identified based on a back image of the soda can most likely may not correctly identify the particular soda can, thus bringing down the overall identification accuracy of items 204 placed on the platform 202. In addition, processing an image of an item 204 that does not include unique identifiable features of the item 204 wastes processing resources and time. For example, in a store setting, where items 204 placed on the platform 202 need to be identified for purchase by a user, time taken to identify the items 204 is an important factor in providing an optimal user experience. Thus, in addition to improving accuracy of identifying items 204, saving processing resources and time when identifying items 204 is also important to improve overall user experience.

Certain embodiments of the present disclosure describe techniques that further improve the accuracy of identification of items 204 placed on the platform 202 as well as improve processing speed and time associated with the identification of the items 204.

Figure 44:
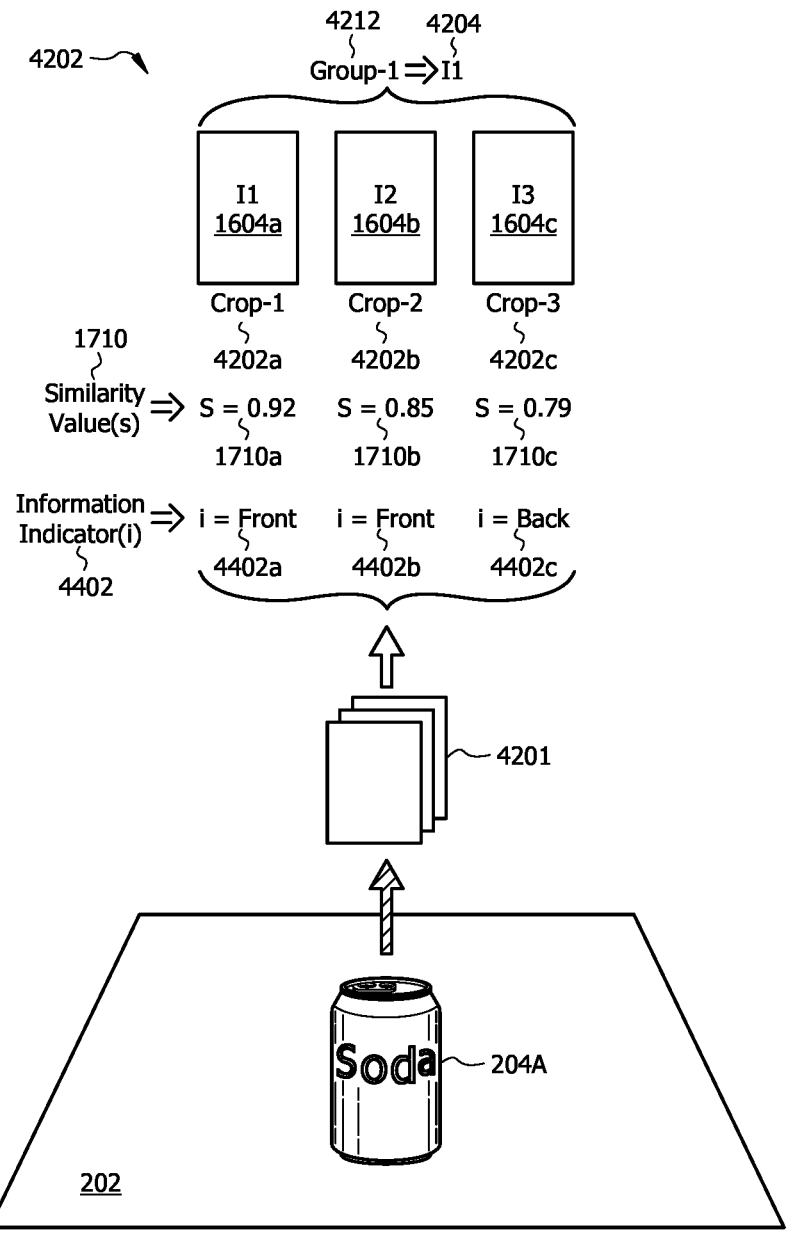
FIG. 44 illustrates an example view of the item of FIG. 42 placed on the platform, in accordance with one or more embodiments of the present disclosure.

For example, FIG. 44 illustrates an example view of the item 204A of FIG. 42 placed on the platform 202, in accordance with one or more embodiments of the present disclosure. It may be noted that the same elements from FIG. 42 that are also shown in FIG. 44 are identified by the same reference numerals. As shown, item tracking device 104 captures a plurality of images 4201 of the item 204A and then generates a plurality of cropped images 4202 of the item 204A by editing the images 4201. An item identifier 1604 (e.g., 1604a-c) is identified based on each cropped image 4202. Finally, one of the item identifiers 1604a-c is selected and associated with the item 204A placed on the platform 202. As shown in FIG. 44, each cropped image 4202 of the item 204A is tagged with an information indicator (i) 4402 that indicates whether the portion of the first item 204A depicted in the cropped image 4202 includes information that can be reliably used to identify the item 204A. For example, each cropped image 4202 is tagged as "i=Front" or "i=Back". "i=Front" indicates that the portion of the item 204A depicted in a cropped image 4202 includes a front image of the item 204A. On the other hand "i=Back" indicates that the portion of the item 204A depicted in a cropped image 4202 includes a back image of the item 204A. In the context of embodiments of the present disclosure, a front image of an item refers to any portion of the item 204A that includes unique identifiable information that can be used to reliably identify the item 204A. On the other hand, a back image of an item refers to any portion of the item 204A that does not include unique identifiable information that can be used to reliably identify the item 204A. As further described below, item tracking device 104 discards all cropped images 4202 of the item 204A that are tagged as back images (i=Back) and selects an item identifier 1604 based only on those cropped images 4202 that are tagged as front images (e.g., i=Front) Eliminating all images of the item 204A that do not contain unique identifiable information that can be used to reliably identify the item 204A, before identifying the item 204A, improves the accuracy of identification as the item 204A is identified based only on images that include unique identifiable information of the item 204A. Further, eliminating back images of the item 204A from consideration means that the item tracking device 104 needs to process lesser images to identify the item 204A, thus saving processing resources and time that would otherwise be used to process all cropped images 4202 of the item 204A. This improves the processing efficiency associated with the item tracking device 104 and improves the overall user experience. These aspects will now be described in more detail with reference to FIGS. 44-46.

The system and method described in certain embodiments of the present disclosure provide a practical application of intelligently identifying an item based on a plurality of images of the item. As described with reference to FIGS. 44, 45 and 46, in response to detecting a triggering event corresponding to a placement of a first item 204A on the platform 202 of the imaging device 102, item tracking device 104 captures a plurality of images 4201 of the first item 204A and generates a plurality of cropped images 4202 of the first item 204A based on the images 4201. Item tracking device 104 tags each cropped image 4202 as a front image of the first item 204A or a back image of the item 204B. Subsequently, item tracking device 104 discards some, but potentially all, cropped images 4202 of the first item 204A that are tagged as a back image of the first item 204A and identifies an item identifier 1604 for the first item 204A based primarily, if not only, on those cropped images 4202 that are tagged as front images of the item. Eliminating some or all back images of the item 204A that do not contain unique identifiable information that can be used to reliably identify the item 204A, before identifying the item 204A, improves the accuracy of identification as the item 204A is identified based primarily, if not only, on front images that include unique identifiable information of the item 204A. This saves computing resources (e.g., processing and memory resources associated with the item tracking device 104) that would otherwise be used to re-identify an item that was identified incorrectly. Further, eliminating some or all back images of the item 204A from consideration means that the item tracking device 104 needs to process fewer images to identify the item 204A, thus saving processing resources and time that would otherwise be used to process all cropped images 4202 of the item 204A. This improves the processing efficiency associated with the processor 602 (shown in FIG. 6) of item tracking device 104 and improves the overall user experience. Thus, the disclosed system and method generally improve the technology associated with automatic detection of items 204. It may be noted that the systems and components illustrated and described in the discussions of FIGS. 1-29 may be used and implemented to perform operations of the systems and methods described in FIGS. 44, 45 and 46. Additionally, systems and components illustrated and described with reference to any figure of this disclosure may be used and implemented to perform operations of the systems and methods described in FIGS. 44, and 46.

Figure 45:
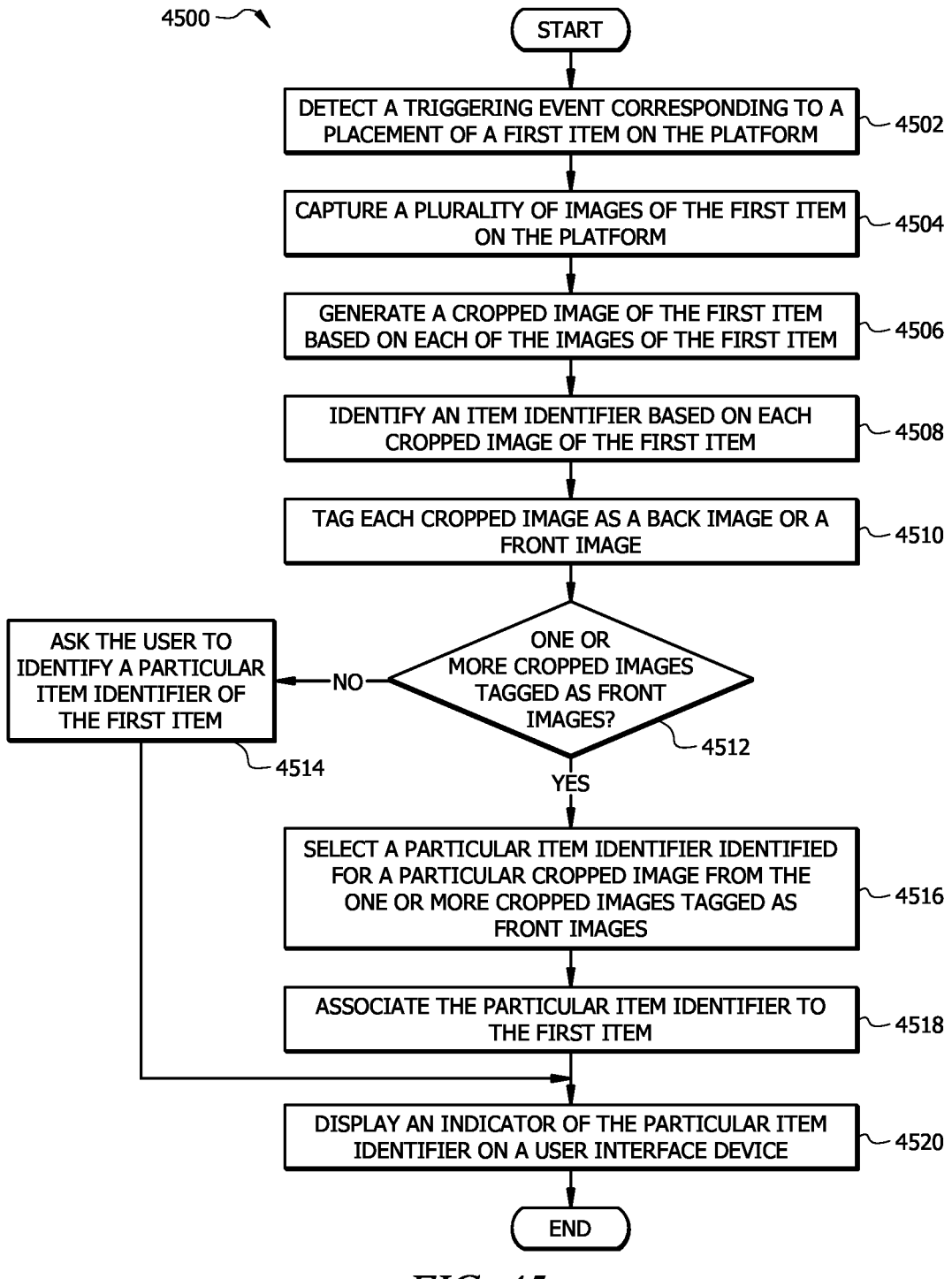
FIG. 45 illustrates a flowchart of an example method for selecting an item identifier of an item from a plurality of item identifiers identified for the item, after discarding back images of the item, in accordance with one or more embodiments of the present disclosure.

FIG. 45 illustrates a flowchart of an example method 4500 for selecting an item identifier 1604 of an item 204A from a plurality of item identifiers 1604 identified for the item 204A, after discarding back images of the item 204A, in accordance with one or more embodiments of the present disclosure. Method 4500 may be performed by item tracking device 104 as shown in FIG. 1. For example, one or more operations of method 4500 may be implemented, at least in part, in the form of software instructions (e.g., item tracking instructions 606 shown in FIG. 6), stored on tangible non-transitory computer-readable medium (e.g., memory 116 shown in FIGS. 1 and 6) that when run by one or more processors (e.g., processors 602 shown in FIG. 6) may cause the one or more processors to perform operations 4502-4520. It may be noted that operations 4502-4520 are described primarily with reference to FIGS. 44 and 46, and additionally with certain references to FIGS. 1, 2A, 16, and 17.

At operation 4502, item tracking device 104 detects a triggering event corresponding to a placement of a first item 204A (shown in FIG. 45) on the platform 202. In a particular embodiment, the triggering event may correspond to a user placing the first item 204A on the platform 202.

As described above, the item tracking device 104 may perform auto-exclusion for the imaging device 102 (shown in FIG. 2) using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 (shown in FIG. 2) to capture reference images 122 and reference depth images 124 (shown in FIG. 4), respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 (shown in FIG. 2) of the platform 202 based on differences in depth values between subsequent depth images 124 and the reference depth image 124 and/or differences in the pixel values between subsequent images 122 and the reference image 122.

In one embodiment, to detect the triggering event, the item tracking device 104 may use a process similar to process 700 that is described with reference to FIG. 7 and/or a process similar to method 3200 that is described with reference to FIGS. 32A and 32B for detecting a triggering event, such as, for example, an event that corresponds with a user's hand being detected above the platform 202 and placing an item 204 on the platform 202. For example, the item tracking device 104 may check for differences between a reference depth image 3302 (shown in FIG. 33) and a subsequent depth image 3304 to detect the presence of an object above the platform 202. For example, based on comparing the reference depth image 3302 with a plurality of subsequent depth images 3304, item tracking device 104 may determine that a user's hand 3306 holding the first item 204A entered the platform 202, placed the first item 204A on the platform 202, and exited the platform 202. In response to determining that the first item 204A has been placed on the platform 202, the item tracking device 104 determines that the triggering event has occurred and proceeds to identify the first item 204A that has been placed on the platform 202.

At operation 4504, in response to detecting the triggering event, item tracking device 104 captures a plurality of images 4201 (shown in FIG. 45) of the first item 204A placed on the platform 202 using two or more cameras (e.g., 108A-D shown in FIG. 2) of a plurality of cameras 108. For example, the item tracking device 104 may capture images 4201 with an overhead view, a perspective view, and/or a side view of the first item 204A on the platform 202. In one embodiment, each of the images 4201 is captured by a different camera 108.

At operation 4506, item tracking device 104 generates a cropped image 4202 for each of the images 4201 by editing the image 4201 to isolate at least a portion of the first item 204A, wherein the cropped images 4202 correspond to the first item 204A depicted in the respective images 4201. In other words, item tracking device 104 generates one cropped image 4202 of the first item 204A based on each image 4201 of the first item 204A captured by a respective camera 108. As shown in FIG. 42, item tracking device 104 generates three cropped images 4202a, 4202b and 4202c of the first item 204A from respective images 4201 of the first item 204A.

The process of generating the cropped images 4202 is described above with reference to operation 4306 of FIG. 43 and will not be described here.

In one embodiment, item tracking device 104 may be configured to assign a group ID 4212 (shown as Group-1) to the group of cropped images 4202 generated for the first item 204A. It may be noted that item tracking device 104 may be configured to assign a unique group ID to each group of cropped images generated for each respective item 204 placed on the platform 202.

At operation 4508, item tracking device 104 identifies an item identifier 1604 based on each cropped image 4202 of the first item 204A.

As described above with reference to operation 4308 of FIG. 43, item tracking device 104 generates an encoded vector 1702 (shown in FIG. 17) relating to the unidentified first item 204A depicted in each cropped image 4202 of the first item 204A and identifies an item identifier 1604 from the encoded vector library 128 (shown in FIG. 16) based on the encoded vector 1702. Here, the item tracking device 104 compares the encoded vector 1702 to each encoded vector 1606 of the encoded vector library 128 and identifies the closest matching encoded vector 1606 in the encoded vector library 128 based on the comparison. In one embodiment, the item tracking device 104 identifies the closest matching encoded vector 1606 in the encoded vector library 128 by generating a similarity vector 1704 (shown in FIG. 17) between the encoded vector 1702 generated for the unidentified first item 204A depicted in the cropped image 4202 and the encoded vectors 1606 in the encoded vector library 128. The similarity vector 1704 comprises an array of numerical similarity values 1710 where each numerical similarity value 1710 indicates how similar the values in the encoded vector 1702 for the first item 204A are to a particular encoded vector 1606 in the encoded vector library 128. In one embodiment, the item tracking device 104 may generate the similarity vector 1704 by using a process similar to the process described in FIG. 17. Each numerical similarity value 1710 in the similarity vector 1704 corresponds with an entry 1602 in the encoded vector library 128.

After generating the similarity vector 1704, the item tracking device 104 can identify which entry 1602, in the encoded vector library 128, most closely matches the encoded vector 1702 for the first item 204A. In one embodiment, the entry 1602 that is associated with the highest numerical similarity value 1710 in the similarity vector 1704 is the entry 1602 that most closely matches the encoded vector 1702 for the first item 204A. After identifying the entry 1602 from the encoded vector library 128 that most closely matches the encoded vector 1702 for the first item 204A, the item tracking device 104 may then identify the item identifier 1604 from the encoded vector library 128 that is associated with the identified entry 1602. Through this process, the item tracking device 104 is able to determine which item 204 from the encoded vector library 128 corresponds with the unidentified first item 204A depicted in the cropped image 4202 based on its encoded vector 1702. The item tracking device 104 then outputs the identified item identifier 1604 for the identified item 204 from the encoded vector library 128. The item tracking device 104 repeats this process for each encoded vector 1702 generated for each cropped image 4202 (e.g., 4202a, 4202b and 4202c) of the first item 204A. This process may yield a set of item identifiers 1604 (shown as 1604a (I1), 1604b (I2) and 1604c (I3) in FIG. 44) corresponding to the first item 204A, wherein the set of item identifiers 1604 corresponding to the first item 204A may include a plurality of item identifiers 1604 corresponding to the plurality of cropped images 4202 of the first item 204A. In other words, item tracking device 104 identifies an item identifier 1604 for each cropped image 4202 of the first item 204A.

It may be noted that a more detailed description of generating an item identifier 1604 for each of the cropped images 4202 is given above with reference to operation 4308 of FIG. 43 and will not be described here in the same level of detail.

At operation 4510, item tracking device 104 tags each cropped image 4202 with an information indicator (i) 4402. The information indicator (i) 4402 tagged to a cropped image 4202 may take two values, namely "i=Front" which indicates that the cropped image 4202 is a front image of the unidentified first item 204A or "i=Back" which indicates that the cropped image 4202 is a back image of the unidentified first item 204A. A front image of the first item 204A corresponds to an image of a portion of the first item 204A which includes identifiable information (e.g., text, color, logos, patterns, pictures, images etc.) which is unique to the first item 204A and/or otherwise may be used to identify the first item 204A. A back image of the first item 204A corresponds to an image 122 of a portion of the first item 204 which does not include identifiable information that can be used to identify the first item 204A.

Figure 46:
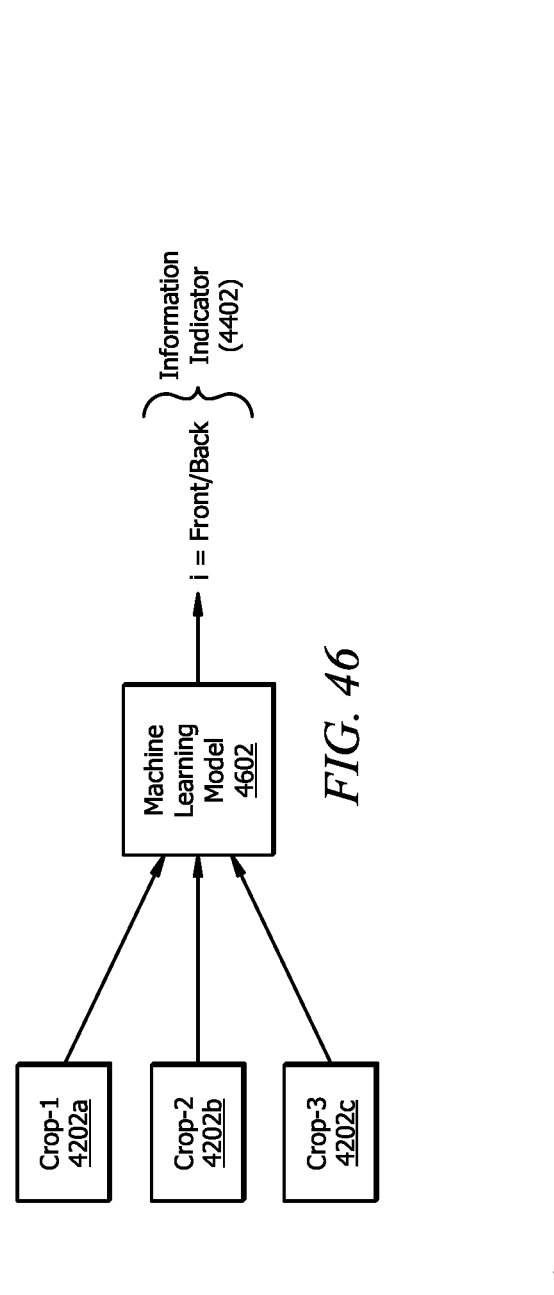
FIG. 46 illustrates an example machine learning model that is configured to determine whether an image of an item is a front image or a back image of the item based on one or more features of the item depicted in the image, in accordance with one or more embodiments of the present disclosure.

In one or more embodiments, to determine whether a particular cropped image 4202 of the first item 204A is to be tagged as a front image (e.g., i=Front) or a back image (i=Back) of the first item 204A, item tracking device 104 may input each cropped image 4202a-c of the first item 204A into a machine learning model which is configured to determine whether a cropped image 4202 of the first item 204A is a front image of the first item 204A or a back image 122 of the first item 204A. FIG. 46 illustrates an example machine learning model 4602 that is configured to determine whether an image (e.g., cropped image 4202) of an item 204 (e.g., first item 204A) is a front image or a back image of the item 204 based on one or more features (e.g., text, color, logos, patterns, pictures, images etc.) of the item 204 depicted in the image, in accordance with one or more embodiments of the present disclosure. As shown in FIG. 46, item tracking device 104 may input each cropped image 4202a-c of the first item 204A to the machine learning model 4602. The machine learning model 4602 may be trained using a data set including known front images and back images of the first item 204A. For example, the machine learning model 4602 may be trained to identify known features (e.g., text, color, logos, patterns, pictures, images etc.) of the first item 204A that indicate whether an image (e.g., cropped image 4202) of the first item 204A is a front image or a back image of the first item 204A. Thus, the trained machine learning model 4602 may be configured to identify an image (e.g., cropped image 4202) of the first item 204A as a front image or a back image of the first item 204A.

As shown in FIG. 46, for each cropped image 4202 of the first item 204A that is input to the machine learning model 4602, the machine learning model 4602 outputs a value of the information indicator 4402 as i=Front or i=Back. For each cropped image 4202 of the first item 204A that is input to the machine learning model 4602, item tracking device 104 may be configured to obtain the corresponding output (e.g., i=Front or i=Back) and according tag the cropped image 4202. As shown in FIG. 44, cropped image 4202a is tagged as i=Front, cropped image 4202b is tagged as i=Front, and cropped image 4202c is tagged as i=Back. In one embodiment, the machine learning model 4602 may be stored by the item tracking device 104 in memory 116 (shown in FIG. 1).

At operation 4512, once each cropped image 4202 is tagged with a respective information indicator (i) 4402, item tracking device 104 determines whether one or more of the cropped images 4202 are tagged as i=Front. In other words, item tracking device 104 determines whether one or more of the cropped images 4202 are front images of the first item 204A. In response to determining that none of the cropped images 4202 are tagged i=Front, method 4500 proceeds to operation 4514 where the item tracking device 104 asks the user to identify the first item 204A placed on the platform 202. For example, item tracking device 104 displays the item identifiers 1604 (e.g., 1604a-c) corresponding to one or more cropped images 4202 of the first item 204A on a user interface device and asks the user to select one of the displayed item identifiers 1604. For example, item tracking device 104 displays the item identifiers I1, I2 and I3 on a display of the user interface device and prompts the user to select the correct item identifier 1604 for the first item 204A. For example, item tracking device 104 may receive a user selection of I1 from the user interface device, and in response, determine that I1 is the first item identifier 4204 associated with the first item 204A.

In alternative embodiments, in response to determining that none of the cropped images 4202 are tagged i=Front, item tracking device 104 device displays an instruction on the user interface device to rotate and/or flip the first item 204A on the platform 202. Essentially, the item tracking device 104 instructs the user to change the orientation of the first item 204A which may cause one or more cameras 108 of the imaging device 102 to view a portion (e.g., front) of the first item 204A that contains identifiable features of the first item 204A which be used to identify the first item 204A. Once the item tracking device 104 detects that the first item

204A has been rotated and/or flipped on the platform 202, item tracking device 104 may be configured to re-initiate the method 4500 from operation 4504 to identify the first item 204A.

On the other hand, in response to determining that one or more of the cropped images 4202 are tagged i=Front, method 4500 proceeds to operation 4516 where item tracking device 104 determines a first item identifier 4204 of the first item 204A by selecting a particular item identifier 1604 from one or more item identifiers (e.g., one or more of 1604a-c) identified for the respective one or more cropped images (e.g., one or more of 4202a-c) that are tagged as i=Front (e.g. front images of the first item 204A). In other words, item tracking device 104 discards all cropped images 4202 that are tagged as i=Back and selects an item identifier 1604 from the item identifiers 1604 corresponding to only those cropped images 4202 that are tagged as i=Front. For example, referring to FIG. 44, item tracking device 104 discards cropped image 4202c that is tagged as i=Back and selects the first item identifier 4204 from item identifiers 1604a (shown as I1) and 1604b (shown as I2) corresponding to cropped images 4202a and 4202b respectively that are tagged as i=Front. This allows the item tracking device 104 to speed up the identification of the first item 204A as a smaller number of cropped images 4202 (e.g., only those cropped images tagged as i=Front) need to be processed. Further, eliminating all cropped images 4202 of the first item 204A that are tagged i=Back and thus do not contain unique identifiable information that can be used to reliably identify the item 204A, before identifying the item 204A, improves the accuracy of identification as the item 204A is identified based only on cropped images 4202 that include unique identifiable information of the first item 204A.

In one or more embodiments, after eliminating all cropped images 4202 of the first item 204A that are tagged i=Back, item tracking device 104 may determine the first item identifier 4204 of the first item 204A based only on those cropped images 4202 that are tagged as i=Front by using a method similar to the method disclosed in operations 4310-4322 of FIG. 43. For example, item tracking device 104 selects the first item identifier 4204 from item identifiers 1604a (shown as I1) and 1604b (shown as I2) corresponding to cropped images 4202a and 4202b respectively that are tagged as i=Front.

In one embodiment, in response to determining that a same item identifier 1604 was identified for a majority of the cropped images 4202 that are tagged as i=Front, item tracking device 104 selects one of the item identifiers 1604 (e.g., 1604a, I1 and 1604b, I2) based on a majority voting rule. As described above, the majority voting rule defines that when a same item identifier 1604 is identified for a majority of cropped images (e.g., cropped images 4202a-b tagged as i=Front) of an unidentified item (e.g., first item 204A), the same item identifier 1604 is to be selected. For example, assuming that item identifier I1 was identified for both cropped images 4202a and 4202b, item tracking device 104 selects I1 as the first item identifier 4204 associated with the first item 204A. It may be noted that while FIG. 44 does not depict both cropped images 4202a and 4202b identified as I1, this embodiment makes this assumption. Additionally, it may be noted that since only two cropped images 4202a-b are tagged i=Front, both cropped images 4202a and 4202b must be identified by the same item identifier 1604 to satisfy the majority voting rule. While the example of FIG. 44 shows only two cropped images (e.g., 4202a and 4202b)

tagged as i=Front, a person having ordinary skill in the art may appreciate that more than two cropped images 4202 may be tagged as i=Front.

In one embodiment, after eliminating all cropped images 4202 of the first item 204A that are tagged i=Back, if only a single cropped image 4202 remains that is tagged as i=Front, item tracking device 104 selects the item identifier 1604 associated with this single cropped image 4202 as the first item identifier 4204 of the first item 204A. For example, assuming (while not depicted in FIG. 44) that only cropped image 4202*a* is tagged as i=Front and cropped images 4202*b* and 4202*c* are tagged i=Back, item tracking device 104 selects item identifier 1604*a* (I1) associated with cropped image 4202*a* as the first item identifier 4204 of the first item 204A.

In response to determining that a same item identifier 1604 was not identified for a majority of the cropped images 4202 that are tagged i=Front, item tracking device 104 may determine the first item identifier 4204 of the first item 204A based on a method similar to the method disclosed in operations 4314-4322 of FIG. 43. In one embodiment, when no majority exists among the item identifiers 1604 of the cropped images 4202 that are tagged as i=Front, the majority voting rule described above cannot be applied. In other words, when a same item identifier 1604 was not identified for a majority of the cropped images 4202 of the unidentified first item 204A, the majority voting rule does not apply. For example, as shown in FIG. 44, cropped image 4202*a* is identified by item identifier 1604*a* (I1) and cropped image 4202*b* is identified by item identifier 1604*b* (I2). Thus, no majority exists among the item identifiers 1604*a* and 1604*b* of the respective images 4202*a* and 4202*b* that are tagged as i=Front. Accordingly, the majority rule described above does not apply to the example of FIG. 44. In such a case, item tracking device 104 uses an alternative method described below to select the first item identifier 4204*a* from the item identifiers 1604*a-b*. For example, as described below in more detail, to select the first item identifier 4204 from the item identifiers 1610*a-b* identified for the cropped images 4202*a-b* respectively, item tracking device 104 may be configured to use numerical similarity values 1710 that were used to identify (e.g., in operation 4508) each item identifier 1610*a-b* from the encoded vector library 128.

As described above with reference to operation 4508, for each particular cropped image 4202, item tracking device 104 identifies an item identifier 1604 from the encoded vector library 128 that corresponds to the highest numerical similarity value 1710 in the similarity vector 1704 generated for the particular cropped image 4202. In other words, each item identifier 1604*a-c* identified for each respective cropped image 4202*a-c* is associated with a respective highest similarity value 1710 based on which the item identifier 1604*a-c* was determined from the encoded vector library 128. For example, as shown in FIG. 44, item identifier 1604*a* (shown as I1) identified for cropped image 4202*a* is associated with similarity value (S) 1710*a*, item identifier 1604*b* (shown as I2) identified for cropped image 4202*b* is associated with similarity value 1710*b*, and item identifier 1604*c* (shown as I3) identified for cropped image 4202*c* is associated with similarity value 1710*c*. Each of the similarity values (S) 1710*a-c* is the highest similarity value from a similarity vector 1704 generated for the respective cropped image 4202*a-c*. FIG. 44 shows example numerical similarity values 1710*a-c* associated with each item identifier 1604*a-c*. For example, item identifier 1604*a* (shown as I1) is associated with S=0.92, item identifier 1604*b* (shown as I2) is associated with S=0.85, and item identifier 1604*c*

(shown as I3) is associated with S=0.79. Each similarity value (S) 1710 is indicative of a degree of confidence that the corresponding item identifier 1604 correctly identifies the item depicted in an associated copped image 4202. A higher similarity value 1710 is indicative of a higher degree of confidence. For example, item identifier 1604*a* is associated with the highest similarity value S=0.92 indicating a highest degree of confidence that item identifier 1604*a* (I1) correctly identifies the item depicted in cropped image 4202*a*. On the other hand, item identifiers 1604*b* and 1604*c* are associated with lower similarity values of S=0.85 and S=0.79 respectively, thus indicating lower degrees of confidence that the item identifiers 1604*b* and 1604*c* correctly identify the items depicted respective cropped images 4202*b* and 4202*c*.

In response to determining that a same item identifier 1604 was not identified for a majority of the cropped images 4202 (e.g., both cropped images 4202*a* and 4202*b* tagged i=Front), item tracking device 104 may be configured to determine the first item identifier 4204 for the first item 204A by comparing the highest similarity value 1710 and the next highest similarity value 1710). For example, among the cropped images 4202*a* and 4202*b* that are tagged i=Front, item tracking device 104 identifies a first item identifier 1604*a* that was identified for a first cropped image 4202*a* based on a highest similarity value 1710 among the similarity values 1710*a-b* used to identify item identifiers 1604*a-b*. For example, item identifier 1604*a* (I1) is associated with the highest numerical similarity value S=0.92 among the similarity values 1710*a-b*. Thus, item identifier selects item identifier 1604*a* (I1). Next, item tracking device 104 identifies a second item identifier 1604*b* that was identified for a second cropped image 4202*b* based on a second/next highest similarity value 1710*b* among the similarity values 1710*a-b* used to identify the item identifiers 1604*a-b* for the cropped images 4202*a-b*. For example, item identifier 1604*b* (I2) is associated with the second/next highest numerical similarity value S=0.85 among the similarity values 1710*a-b*. Thus, item identifier selects item identifier 1604*b* (I2). In other words, item tracking device 104 selects the two highest numerical similarity values 1710 (e.g., 1710*a* and 1710*b*) among the similarity values 1710. In the example of FIG. 44, since only two cropped images 4202*a-b* are tagged i=Front, item tracking device 104 selects the corresponding two similarity values 1710*a* and 1710*b* as the highest and next highest similarity values. However, it may be noted that, while the example of FIG. 44 shows only two cropped images (e.g., 4202*a* and 4202*b*) tagged as i=Front, a person having ordinary skill in the art may appreciate that more than two cropped images 4202 may be tagged as i=Front.

Item tracking device 104 determines a difference between the highest similarity value 1710*a* and the next highest similarity value 1710*b*. For example, item identifier 1604 calculates the difference (d) as d=[S=0.92— (S=0.85)], which is d=0.07.

Item tracking device 104 determines whether the difference (d) between the highest similarity value 1710*a* and the next highest similarity value 1710*b* equals or exceeds a threshold ($d_T$). In other words, item identifier 1604 determines whether the highest similarity value 1710*a* exceeds the next highest similarity value 1710*a* by at least a minimum pre-configured amount. In response to determining that the difference (d) between the highest similarity value 1710*a* and the next highest similarity value 1710*b* does not equal or exceed the threshold, item tracking device 104 asks the user to identify the first item 204A. For example, item tracking device 104 displays the item identifiers 1604a and 1604b on a user interface device and asks the user to select one of the displayed item identifiers 1604. For example, item tracking device 104 displays the item identifiers I1 and I2 on a display of the user interface device and prompts the user to select the correct item identifier 1604 for the first item 204A. For example, item tracking device 104 may receive a user selection of I1 from the user interface device, and in response, determine that I1 is the first item identifier 4204 associated with the first item 204A.

On the other hand, in response to determining that the difference (d) between the highest similarity value 1710a and the next highest similarity value 1710b equals or exceeds the threshold, item tracking device 104 associates the item identifier 1604a (e.g., I1 corresponding to the highest similarity value of S=0.92) with the first item 204a placed on the platform. In other words, item tracking device 104 determines that item identifier 1604a (I1) is the first item identifier 4204 associated with the first item 204A placed on the platform. For example, when the threshold difference $d_T$=0.02, item tracking device determines that the difference (d=0.07) between the highest similarity value 1710a and the next highest similarity value 1710b exceeds $d_T$=0.02, and in response, associates the item identifier 1604a (e.g., I1 corresponding to the highest similarity value of S=0.92) with the first item 204a placed on the platform.

In one embodiment, once the item identifier 1604a has been identified, item tracking device 104 may map the first item identifier 4204 to the first group ID 4212 (shown as Group-1).

In one or more embodiments, after generating a similarity vector 1704 for each cropped image 4202 as part of operation 4314, item tracking device 104 determines whether the highest similarity value 1710 from the similarity vector 1704 equals or exceed a threshold ($S_T$). In response to determining that the highest similarity value 1710 from the similarity vector 1704 generated for a particular cropped image 4202 is below the threshold, item tracking device 104 discards the particular cropped image 4202 and does not consider the particular cropped image 4202 for identifying the first item 204A. Essentially, item tracking device 104 discards all cropped images 4202 of the item 204A and/or corresponding item identifiers 1604 that are associated with similarity values less than the threshold ($S_T$). In the example of FIG. 44, since cropped image 4202c is already removed from consideration as it is tagged i=Back, item tracking device 104 discards all cropped images 4202 tagged i=Front that are associated with similarity values less than the threshold ($S_T$).

Item tracking device 104 selects the first item identifier 4204 from the item identifiers 1604 identified for the remaining cropped images 4202 (tagged i=Front) that are associated with similarity values 1710 that equal or exceed the threshold ($S_T$). For example, when the threshold similarity value $S_T$=0.84, item tracking device 104 selects the first item identifier 4204 from the item identifiers 1604a (I1) and 1604b (I2) that are associated with S=0.92 and S=0.85 respectively. For example, item identifier 1604 selects the first item identifier 4204 from item identifier 1604a (I1) and 1604b (I2) based on the majority voting rule or based on associated similarity values 1710, as described above. Thus, by discarding all cropped images 4202 that are associated with similarity values 1710 lower than the threshold ($S_T$), item tracking device 104 eliminates all cropped images from consideration that are associated with a low degree of confidence. This improves the overall accuracy associated with identifying the item 204A. It may be noted that, in the example of FIG. 44, no cropped images 4202 tagged i=Front are associated with a similarity value 1710 that is less than the threshold ($S_T$), and thus, no cropped images 4202 tagged i=Front are dropped based on the threshold ($S_T$).

At operation 4518, item tracking device 104 associates the first item identifier 4204 to the first item.

At operation 4520, item tracking device 104, item tracking device 104 displays an indicator of the first item identifier 4204 on a user interface device. In one embodiment, item tracking device 104 displays, on the user interface device, an indication of the first group identifier 4212 next to an indication of the first item identifier 4204.

Search Space Reduction for Identifying an Item

In general, certain embodiments of the present disclosure describe improved techniques for identifying an item placed on a platform of an imaging device. In response to detecting a placement of an item on a platform of an imaging device, a plurality of images of the item are captured. An encoded vector is generated for each image of the item based on attributes of the item depicted in the image. An encoded vector library lists a plurality of encoded vectors of known items. Each encoded vector from the library is tagged as corresponding to a front image of an item or a back image of an item. Each encoded vector generated for the item is compared to only those encoded vectors from the library that are tagged as front images of items. An item identifier is identified for each image of the item based on the comparison. A particular item identifier identified for a particular image is then selected and associated with the item.

Certain embodiments of the present disclosure describe techniques that further improve the accuracy of identification of items 204 placed on the platform 202 as well as improve processing speed and time associated with the identification of the items 204.

Figure 47A:
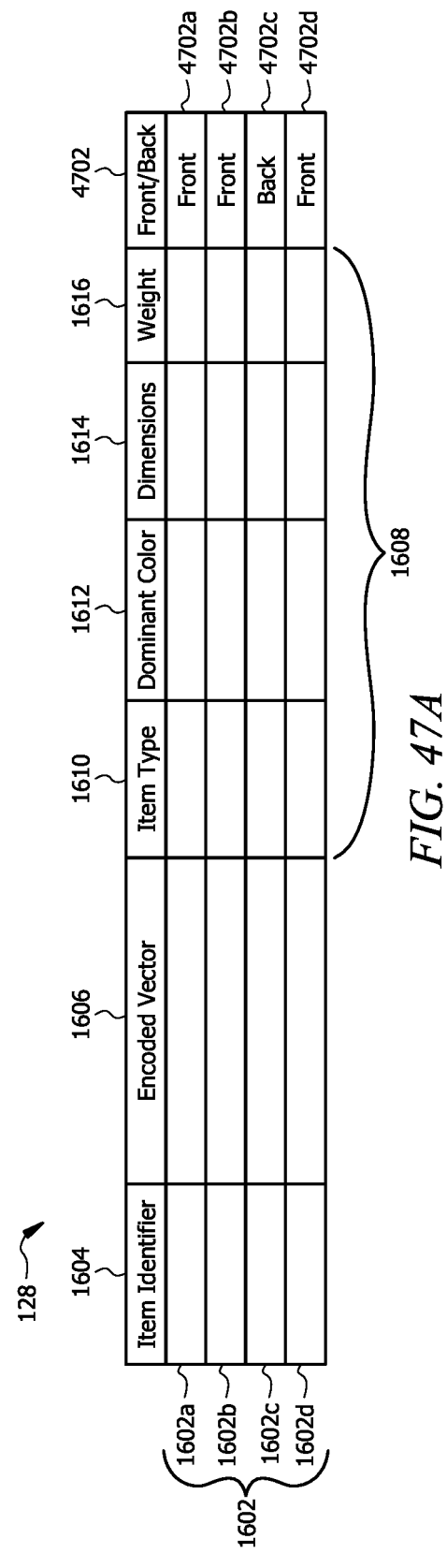
FIG. 47A illustrates an example encoded vector library with each entry tagged as a front image or a back image of an item, in accordance with one or more embodiments of the present disclosure.

FIG. 47A illustrates an example encoded vector library 128 with each entry 1602 tagged as a front image or a back image of an item, in accordance with one or more embodiments of the present disclosure. As described above with reference to FIG. 16, the encoded vector library 128 includes a plurality of entries 1602. Each entry 1602 corresponds with a different item 204 (e.g., first item 204A shown in FIG. 42) that can be identified by the item tracking device 104 (shown in FIG. 1). Each entry 1602 may comprise an encoded vector 1606 that is linked with an item identifier 1604 and a plurality of feature descriptors 1608. An encoded vector 1606 comprises an array of numerical values. Each numerical value corresponds with and describes an attribute (e.g., item type, size, shape, color, etc.) of an item 204. An encoded vector 1606 may be any suitable length. For example, an encoded vector 1606 may have a size of 1×256, 1×512, 1×1024, 1×2048 or any other suitable length.

As shown in FIG. 47A, example encoded vector library 128 additionally includes a front/back tag 4702 corresponding to each entry 1602. In one embodiment, each entry 1602 corresponds to a particular image (e.g., cropped image) of a known item 204, wherein the feature descriptors 1608 associated with the entry 1602 describe the known item 204 as depicted in the particular image of the known item 204. Essentially, a front/back tag 4702 associated with an entry 1602 identifies whether the image (e.g., cropped image) of a known item 204 corresponding to the entry 1602 is a front image or a back image of the known item 204. As shown in FIG. 47A, entry 1602a is tagged as "front" tag 4702a, entry 1602b is tagged as "front" tag 4702b, entry 1602c is tagged as "Back" tag 4702c, and entry 1602d is tagged as "front" tag 4702d. Assuming that entry 1602a represents an image (e.g., cropped image) of a first item 204, the "Front" tag 4702*a* indicates that the image is a front image of the first item 204. Similarly, assuming that entry 1602*c* represents an image (e.g., cropped image) of a second item 204, the "Back" tag 4702*c* indicates that the image is a back image of the second item 204. It may be noted that a front image of an item 204 (e.g., front tag 4702) corresponds to an image of a portion of the item 204 which includes identifiable information (e.g., text, color, logos, patterns, pictures, images etc.) which is unique to the item 204 and/or otherwise may be used to identify the item 204. A back image of an item 204 corresponds to an image of a portion of the item which does not include identifiable information that can be used to identify the item 204.

In one embodiment, item tracking device 104 may use the machine learning model 4602 of FIG. 46 to determine a Front/Back tag 4702 for each entry 1602 of the encoded vector library 128. As described above with reference to FIG. 46, machine learning model 4602 is configured to determine whether an image (e.g., cropped image) of an item 204 is a front image or a back image of the item 204 based on one or more features (e.g., text, color, logos, patterns, pictures, images etc.) of the item 204 depicted in the image. To determine a Front/Back tag 4702 for each entry 1602, item tracking device 104 may input an image (e.g., cropped image) associated with the entry 1602 into the machine learning model 4602 of FIG. 46. The machine learning model 4602 may be trained using a data set including known front images and back images of items 204 included in the encoded vector library 128. For example, the machine learning model 4602 may be trained to identify known features (e.g., text, color, logos, patterns, pictures, images etc.) of an item that indicate whether an image (e.g., cropped image) of the item is a front image or a back image of the item. Thus, the trained machine learning model 4602 may be configured to identify an image (e.g., cropped image) of an item from the encoded vector library 128 as a front image or a back image of the item. For each image of an item from the encoded vector library 128 that is input to the machine learning model 4602, the machine learning model 4602 outputs a Front/Back tag 4702 indicating whether the image is a front image or a back image of the item. Item tracking device 104 input an image associated with each entry 1602 in the machine learning model 4602 and tag the entry with a front/Back tag 4702 based on the output of the machine learning model 4602.

As described above with reference to FIGS. 42 and 43, as part of identifying an item 204A that is placed on the platform 202 of the imaging device 102 (shown in FIG. 2), item tracking device 104 captures a plurality of images 4201 (shown in FIG. 42) of the item 204A, generates a plurality of cropped images 4202 of the item 204A based on the images 4201, and identifies an item identifier 1604 for each cropped image 4202 by comparing an encoded vector 1702 (shown in FIG. 17) generated for the cropped image 4202 with each encoded vector 1606 of each entry 1602 in the encoded vector library 128. The item tracking device 104 then selects a particular item identifier 1604 from the item identifiers 1604 identified for the cropped images 4202.

Several encoded vectors 1606/entries 1602 in the encoded vector library 128 may represent a single item 204, wherein each encoded vector 1606/entry 1602 associated with the item 204 may represent a particular known image (e.g., cropped image) of the item 204. Thus, one or more entries 1602/encoded vectors 1606 associated with a particular item 204 may represent back images of the item 204. As described above, a back image of an item 204 corresponds to an image of a portion of the item 204 which does not include identifiable information that can be used to identify the item 204. Thus, comparing an encoded vector 1702 generated for a cropped image 4202 (shown in FIG. 42) of an unidentified item 204A with encoded vectors 1606 (from encoded library 128) that are associated with back images of corresponding items 204 may likely not identify a correct item identifier 1604 of the unidentified item 204A and waste processing resources and time.

Figure 47B:
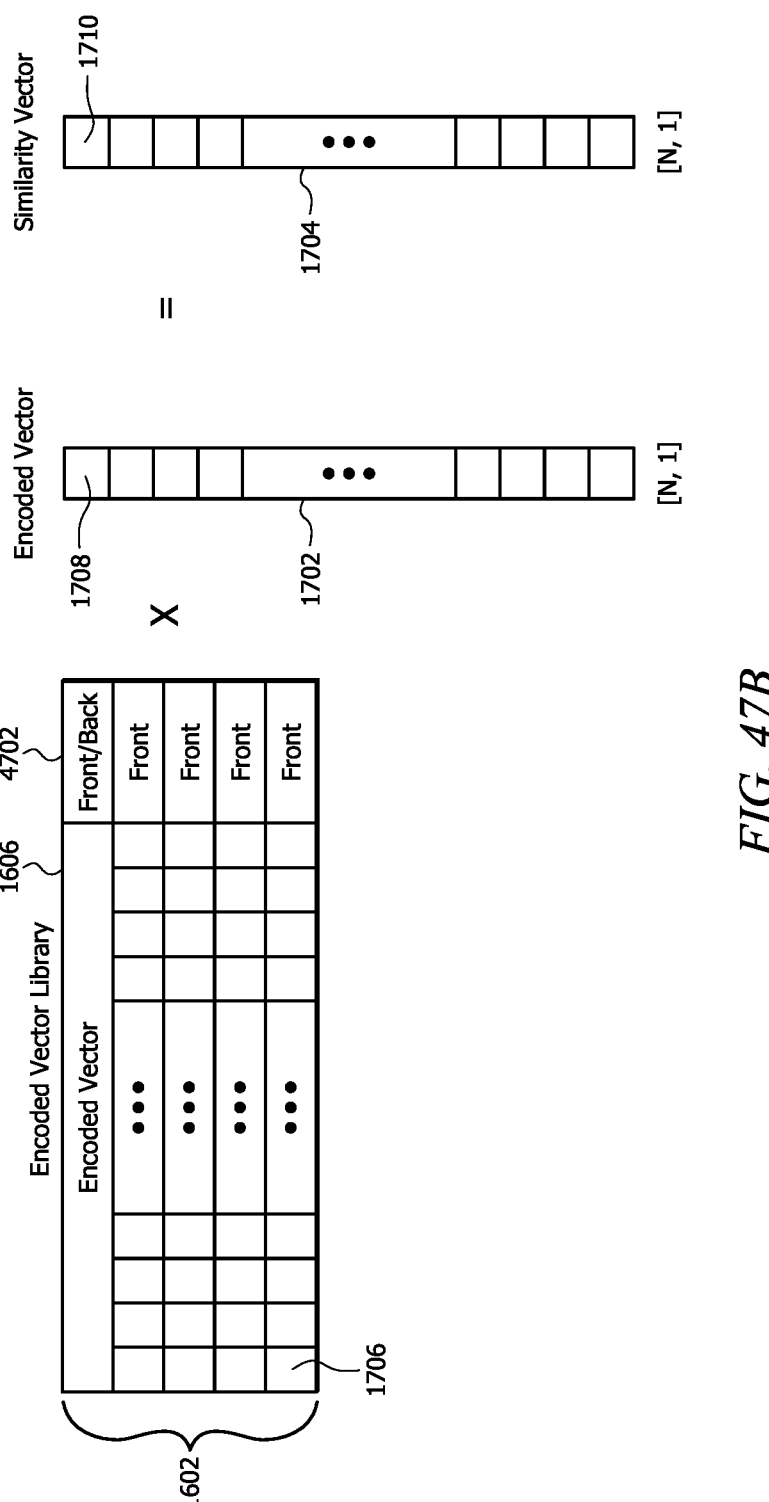
FIG. 47B illustrates an example comparison of an encoded vector generated based on a cropped image to encoded vectors in an encoded vector library, in accordance with one or more embodiments of the present disclosure.

As described below with reference to FIGS. 47A, 47B and 48, when identifying the item 204A (shown in FIG. 42) placed on the platform 202, item tracking device 104 compares the encoded vector 1702 (shown in FIG. 47B) corresponding to each cropped image 4202 with only those encoded vectors 1606 of the encoded vector library 128 that are tagged as front images (e.g., "Front" tag 4702*a*, 4702*b*, and 4702*d*). This improves the overall accuracy of identifying items 204A placed on the platform 202 and further saves processing resources that would overwise be used to compare an encoded vector 1702 with all encoded vectors 1606 in the encoded vector library 128 regardless of whether they represent front images or back images of items. For example, as shown in FIG. 47B, encoded vector 1702 that may correspond to a cropped image 4202 of the unidentified item 204A is compared only with those encoded vectors 1606 of entries 1602 that are associated with a "Front" tag 4702. These aspects will now be described in more detail with reference to FIGS. 42, 47A, 47B and 48.

The system and method described in certain embodiments of the present disclosure provide a practical application of intelligently identifying an item based on a plurality of images of the item. As described with reference to FIGS. 47A, 47B and 48, in response to detecting a placement of a first item 204A on the platform 202, item tracking device 104 captures a plurality of images 4201 (shown in FIG. 42) of the item 204A, generates a plurality of cropped images 4202 of the item 204A based on the images 4201, and identifies an item identifier 1604 for each cropped image 4202 by comparing an encoded vector 1702 (shown in FIG. 17) generated for the cropped image 4202 with primarily, if not only, those encoded vectors 1606 from the encoded vector library 128 that are associated with a "Front" tag 4702. This improves the overall accuracy of identifying items 204 placed on the platform 202 as the items 204 are identified based primarily, if not only, on those encoded vectors 1606 from the encoded vector library 128 that are associated with unique identifiable information relating to known items. This saves computing resources (e.g., processing and memory resources associated with the item tracking device 104) that would otherwise be used to re-identify an item that was identified incorrectly. Additionally, comparing encoded vectors 1702 generated based on images of an unidentified item 204 with generally only a portion of the encoded vectors 1606 from the encoded vector library 128 that are associated with a "Front" tag 4702 saves computing resources that would overwise be used to compare an encoded vector 1702 with all encoded vectors 1606 in the encoded vector library 128 regardless of whether they represent front images or back images of items. This improves the processing efficiency associated with the processor 602 (shown in FIG. 6) of item tracking device 104 and improves the overall user experience. Thus, the disclosed system and method generally improve the technology associated with automatic detection of items 204.

It may be noted that the systems and components illustrated and described in the discussions of FIGS. 1-29 may be used and implemented to perform operations of the systems and methods described in FIGS. 47A, 47B and 48. Additionally, systems and components illustrated and described with reference to any figure of this disclosure may be used and implemented to perform operations of the systems and methods described in FIGS. 47A, 47B and 48.

Figure 48B:
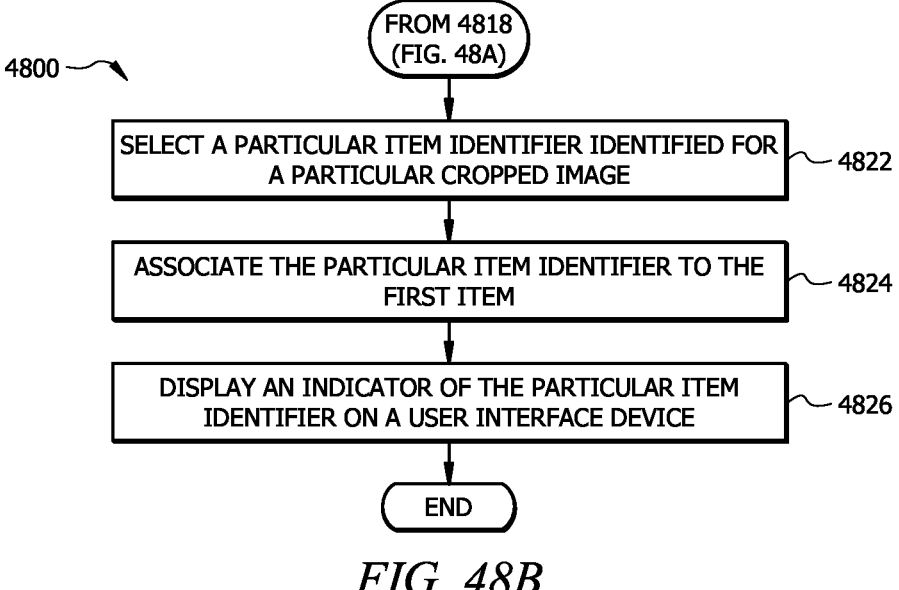

FIGS. 48A and 48B illustrate a flow chart of an example method 4800 for identifying an item, in accordance with one or more embodiments of the present disclosure. Method 4800 may be performed by item tracking device 104 as shown in FIG. 1. For example, one or more operations of method 4800 may be implemented, at least in part, in the form of software instructions (e.g., item tracking instructions 606 shown in FIG. 6), stored on tangible non-transitory computer-readable medium (e.g., memory 116 shown in FIGS. 1 and 6) that when run by one or more processors (e.g., processors 602 shown in FIG. 6) may cause the one or more processors to perform operations 4802-4826. It may be noted the method 4800 is described with reference to FIGS. 42, 47A, 47B and 48. It may be noted that operations 4802-4826 are described primarily with reference to FIGS. 47A-B and additionally with certain references to FIGS. 1, 2A, 16, and 17.

Referring to FIG. 48A, at operation 4802, item tracking device 104 detects a triggering event corresponding to a placement of a first item 204A (shown in FIG. 42) on the platform 202. In a particular embodiment, the triggering event may correspond to a user placing the first item 204A on the platform 202.

As described above, the item tracking device 104 may perform auto-exclusion for the imaging device 102 using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 (shown in FIG. 2) to capture reference images 122 and reference depth images 124 (shown in FIG. 4), respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 (shown in FIG. 2) of the platform 202 based on differences in depth values between subsequent depth images 124 and the reference depth image 124 and/or differences in the pixel values between subsequent images 122 and the reference image 122.

In one embodiment, to detect the triggering event, the item tracking device 104 may use a process similar to process 700 that is described with reference to FIG. 7 and/or a process similar to method 3200 that is described with reference to FIGS. 32A and 32B for detecting a triggering event, such as, for example, an event that corresponds with a user's hand being detected above the platform 202 and placing an item 204 on the platform 202. For example, the item tracking device 104 may check for differences between a reference depth image 124 and a subsequent depth image 124 to detect the presence of an object above the platform 202. For example, based on comparing the reference depth image 124 with a plurality of subsequent depth images 124, item tracking device 104 may determine that a user's hand holding the first item 204A entered the platform 202, placed the first item 204A on the platform 202, and exited the platform 202. In response to determining that the first item 204A has been placed on the platform 202, the item tracking device 104 determines that the triggering event has occurred and proceeds to identify the first item 204A that has been placed on the platform 202.

At operation 4804, in response to detecting the triggering event, item tracking device 104 captures a plurality of images 4201 of the first item 204A placed on the platform 202 using two or more cameras (e.g., 108A-D) of a plurality of cameras 108. For example, the item tracking device 104 may capture images 4201 with an overhead view, a perspective view, and/or a side view of the first item 204A on the platform 202. In one embodiment, each of the images 4201 is captured by a different camera 108.

At operation 4806, item tracking device 104 generates a cropped image 4202 for each of the images 4201 by editing the image 4201 to isolate at least a portion of the first item 204A, wherein the cropped images 4202 correspond to the first item 204A depicted in the respective images 4201. In other words, item tracking device 104 generates one cropped image 4202 of the first item 204A based on each image 4201 of the first item 204A captured by a respective camera 108. As shown in FIG. 42, item tracking device 104 generates three cropped images 4202a, 4202b and 4202c of the first item 204A from respective images 4201 of the first item 204A.

In one embodiment, the item tracking device 104 may generate a cropped image 4202 of the first item 204A based on the features of the first item 204A that are present in an image 4201 (e.g., one of the images 4201). The item tracking device 104 may first identify a region-of-interest (e.g., a bounding box) 1002 (as shown in FIG. 10A) for the first item 204A based on the detected features of the first item 204A that are present in an image 4201 and then may crop the image 4201 based on the identified region-of-interest 1002. The region-of-interest 1002 comprises a plurality of pixels that correspond with the first item 204A in the captured image 4201 of the first item 204A on the platform 202. The item tracking device 104 may employ one or more image processing techniques to identify a region-of-interest 1002 for the first item 204A within the image 4201 based on the features and physical attributes of the first item 204A. After identifying a region-of-interest 1002 for the first item 204A, the item tracking device 104 crops the image 4201 by extracting the pixels within the region-of-interest 1002 that correspond to the first item 204A in the image 4201. By cropping the image 4201, the item tracking device 104 generates another image (e.g., cropped image 4202) that comprises the extracted pixels within the region-of-interest 1002 for the first item 204A from the original image 4201. The item tracking device 104 may repeat this process for all of the captured images 4201 of the first item 204A on the platform 202. The result of this process is a set of cropped images 4202 (e.g., 4202a, 4202b, and 4202c) corresponding to the first item 204A that is placed on the platform 202. In some embodiments, the item tracking device 104 may use a process similar to process 900 described with reference to FIG. 9 to generate the cropped images 4202 of the first item 204A.

Referring back to FIG. 42, in one embodiment, item tracking device 104 may be configured to assign a group ID 4212 (shown as Group-1) to the group of cropped images 4202 generated for the first item 204A. It may be noted that item tracking device 104 may be configured to assign a unique group ID to each group of cropped images generated for each respective item 204 placed on the platform 202.

After generating a plurality of cropped images 4202 based on the plurality of images 4201, item tracking device 104 may be configured to identify an item identifier 1604 associated with the first item 204A based on each of the cropped images 4202 of the first item 204A. The identification of an item identifier 1604 for each cropped image 4202 is described below with reference to operations 4808-4820.

At operation 4808, item tracking device 104 selects a cropped image 4202 (e.g., 4202a).

At operation 4810, the item tracking device 104 generates a first encoded vector (e.g., encoded vector 1702 shown in FIG. 17, 47B) for the selected cropped image 4202 (e.g., 4202a) of the first item 204A. An encoded vector 1702 comprises an array of numerical values 1708. Each numerical value 1708 in the encoded vector 1702 corresponds with and describes an attribute (e.g., item type, size, shape, color, etc.) of the first item 204A. An encoded vector 1702 may be any suitable length. For example, the encoded vector 1702 may have a size of 256×1, 512×1, 1024×1 or 2048×1 or any other suitable length. The item tracking device 104 generates an encoded vector 1702 for the first item 204A by inputting each of the cropped images 4202 into a machine learning model (e.g., machine learning model 126 shown in FIG. 1). The machine learning model 126 is configured to output an encoded vector 1702 for an item 204 based on the features or physical attributes of an item 204 that are present in an image (e.g., image 4201) of the item 204. Examples of physical attributes include, but are not limited to, an item type, a size, shape, color, or any other suitable type of attribute of the item 204. After inputting a cropped image 4202 of the first item 204A into the machine learning model 126, the item tracking device 104 receives an encoded vector 1702 for the first item 204A.

At operation 4812, item tracking device 104 compares the first encoded vector (e.g., encoded vector 1702) to the encoded vectors 1606 in the encoded vector library 128 tagged as a front image.

The item tracking device 104 identifies the first item 204A from the encoded vector library 128 based on the corresponding encoded vector 1702 generated for the first item 204A. Here, the item tracking device 104 uses the encoded vector 1702 for the first item 204A to identify the closest matching encoded vector 1606 in the encoded vector library 128. As described above with reference to FIG. 47A, an example encoded vector library 128 includes a plurality of entries 1602. Each entry 1602 corresponds with a different item 204 that can be identified by the item tracking device 104. Each entry 1602 may comprise an encoded vector 1606 that is linked with an item identifier 1604 and a plurality of feature descriptors 1608. An encoded vector 1606 comprises an array of numerical values 1706 (shown in FIG. 47B). Each numerical value corresponds with and describes an attribute (e.g., item type, size, shape, color, etc.) of an item 204. An encoded vector 1606 may be any suitable length. For example, an encoded vector 1606 may have a size of 1×256, 1×512, 1×1024, 1×2048 or any other suitable length. In one embodiment, the item tracking device 104 compares the encoded vector 1702 with each encoded vector 1606 of each entry 1602 that is tagged as a front image and, based on this comparison, identifies the closest matching encoded vector 1606 in the encoded vector library 128. As described above, encoded vector library 128 includes a front/back tag 4702 corresponding to each entry 1602, wherein a front/back tag 4702 associated with an entry 1602 identifies whether the image (e.g., cropped image) of a known item 204 corresponding to the entry 1602 is a front image or a back image of the known item 204. As shown in FIG. 47B, item tracking device 104 compares the encoded vector 1702 only with those encoded vectors 1606 of entries 1602 that are tagged as "Front". In other words, item tracking device

104 compares the encoded vector 1702 only with those encoded vectors 1606 of entries 1602 that are tagged as front images of items represented by those encoded vectors 1606. This improves the overall accuracy of identifying the item 204A placed on the platform 202 and further saves processing resources that would overwise be used to compare the encoded vector 1702 with all encoded vectors 1606 in the encoded vector library 128 regardless of whether they represent front images or back images of items.

At operation 4814, based on the comparison in operation 4812, item tracking device 104 selects, a second encoded vector (e.g., a matching encoded vector 1606) from the encoded vector library 128 that most closely matches with the first encoded vector (e.g., encode vector 1702).

In one embodiment, the item tracking device 104 identifies the closest matching encoded vector 1606 in the encoded vector library 128 that is tagged as a front image by generating a similarity vector 1704 (shown in FIG. 47B) between the encoded vector 1702 generated for the unidentified first item 204A and the encoded vectors 1606 in the encoded vector library 128 that are tagged as front images of items. The similarity vector 1704 comprises an array of numerical similarity values 1710 where each numerical similarity value 1710 indicates how similar the values in the encoded vector 1702 for the first item 204A are to a particular encoded vector 1606 in the encoded vector library 128. In one embodiment, the item tracking device 104 may generate the similarity vector 1704 by using a process similar to the process described in FIG. 17.

In this example, as shown in FIG. 47B, the item tracking device 104 uses matrix multiplication between the encoded vector 1702 for the first item 204A and the encoded vectors 1606 in the encoded vector library 128. For example, matrix multiplication of the encoded vector 1702 (e.g., 2048×1) and a particular entry 1602 (e.g., 1×2048) of the encoded vector library 128 yields a single numerical value (e.g., similarity value 1710) that is between 0 and 1. Each numerical similarity value 1710 in the similarity vector 1704 corresponds with an entry 1602 in the encoded vector library 128. For example, the first numerical value 1710 in the similarity vector 1704 indicates how similar the values in the encoded vector 1702 are to the values in the encoded vector 1606 in the first entry 1602 of the encoded vector library 128, the second numerical value 1710 in the similarity vector 1704 indicates how similar the values in the encoded vector 1702 are to the values in the encoded vector 1606 in the second entry 1602 of the encoded vector library 128, and so on.

After generating the similarity vector 1704, the item tracking device 104 can identify which encoded vector 1606, in the encoded vector library 128, most closely matches the encoded vector 1702 for the first item 204A. In one embodiment, the encoded vector 1606 that is associated with the highest numerical similarity value 1710 in the similarity vector 1704 is the encoded vector 1606 that most closely matches the encoded vector 1702 for the first item 204A. This encoded vector 1606 that most closely matches the encoded vector 1702 for the first item 204A is the second encoded vector of operation 4814.

At operation 4816, after identifying the encode vector 1606 (e.g., second encoded vector) of an entry 1602 from the encoded vector library 128 that most closely matches the encoded vector 1702 for the first item 204A, the item tracking device 104 identifies the item identifier 1604 from the encoded vector library 128 that is associated with the identified entry 1602. Through this process, the item tracking device 104 is able to determine which item 204 from the encoded vector library 128 corresponds with the unidentified first item 204A based on its encoded vector 1702. The item tracking device 104 then outputs the identified item identifier 1604 for the identified item 204 from the encoded vector library 128. For example, item tracking device 104 identifies an item identifier 1604a (I1) for cropped image 4202a.

The item tracking device 104 may be configured to repeat the process described with reference to operations 4810-4816 for each cropped image 4202 (e.g., 4202a, 4202b and 4202c) of the first item 204A. For example, at operation 4818, item tracking device 104 checks whether all cropped images 4202 have been processed. In other words, item tracking device 104 determines whether an item identifier 1604 of the first item 204A has been generated based on each of the cropped images 4202. In response to determining that all cropped images 4202 have not been processed, method 4800 proceeds to operation 4820 where the item tracking device 104 selects a next cropped image 4202 (e.g., a remaining/unprocessed cropped image 4202) for processing. Item tracking device 104 then performs operations 4810-4816 to identify an item identifier 1604 based on the selected cropped image 4202. Item tracking device 104 repeats operations 4810-4816 until an item identifier 1604 has been identified for all cropped images 4202.

For example, referring to FIG. 42, this process may yield a set of item identifiers 1604 (shown as 1604a (I1), 1604b (I2) and 1604c (I3) in FIG. 42) corresponding to the first item 204A, wherein the set of item identifiers 1604 corresponding to the first item 204A may include a plurality of item identifiers 1604 corresponding to the plurality of cropped images 4202 of the first item 204A. In other words, item tracking device 104 identifies an item identifier 1604 for each cropped image 4202 of the first item 204A.

In response to determining that all cropped images 4202 have been processed and an item identifier 1604 has been identified for all cropped images 4202, method 4800 proceeds to operation 4822 in FIG. 48B.

Referring to FIG. 48B, at operation 4822, item tracking device 104 selects a particular item identifier (e.g., first item identifier 4204) that was identified for a particular cropped image 4202.

Once an item identifier 1604 has been identified for each cropped image 4202, item tracking device 104 may be configured to select a particular item identifier from the item identifiers 1604 (e.g., 1604a (I1), 1604b (I2) and 1604c (I3)) for association with the first item 204A. For example, item tracking device 104 selects the item identifier 1604a as the first item identifier 4204 associated with the first item 204A. The process for selecting an item identifier 1604 (e.g., first item identifier 4204) from a plurality of item identifiers 1604 (e.g., 1604a-c) identified for plurality of cropped images 4202 (e.g., cropped images 4202a-c) is described above, for example, with reference to FIG. 43 and will not be repeated here. In one embodiment, once the first item identifier 4204 has been identified, item tracking device 104 may map the first item identifier 4204 to the first group ID 4212 (shown as Group-1).

At operation 4824, item tracking device 104 associates the particular item identifier (e.g., first item identifier 4204) to the first item 204A.

At operation 4826, item tracking device displays an indicator of the first item identifier 1604a on a user interface device. In one embodiment, item tracking device 104 displays, on the user interface device, an indication of the first group identifier 4212 next to an indication of the first item identifier 4204. For example, the first item identifier 424 (I1) may include the name and a description of the first item 204A, such as XYZ soda—12 oz can. In this case, item tracking device may display "Item 1—XYZ soda—12 oz can", wherein "Item 1" is an indication of the group ID 4212 and "XYZ soda—12 oz can" is an indication of the first item identifier 4204.

Identifying an Item Based on an Amount of Image Information in an Image of the Item In general, certain embodiments of the present disclosure describe improved techniques for identifying an item placed on a platform of an imaging device. In response to detecting that an item has been placed on a platform of an imaging device, a plurality of images of the item are captured. All images of the item that do not include at least a threshold amount of image information associated with the item are discarded and the item is identified based only on the remaining images of the item that include at least a minimum amount (e.g., threshold amount) of image information related to the item.

Figure 49:
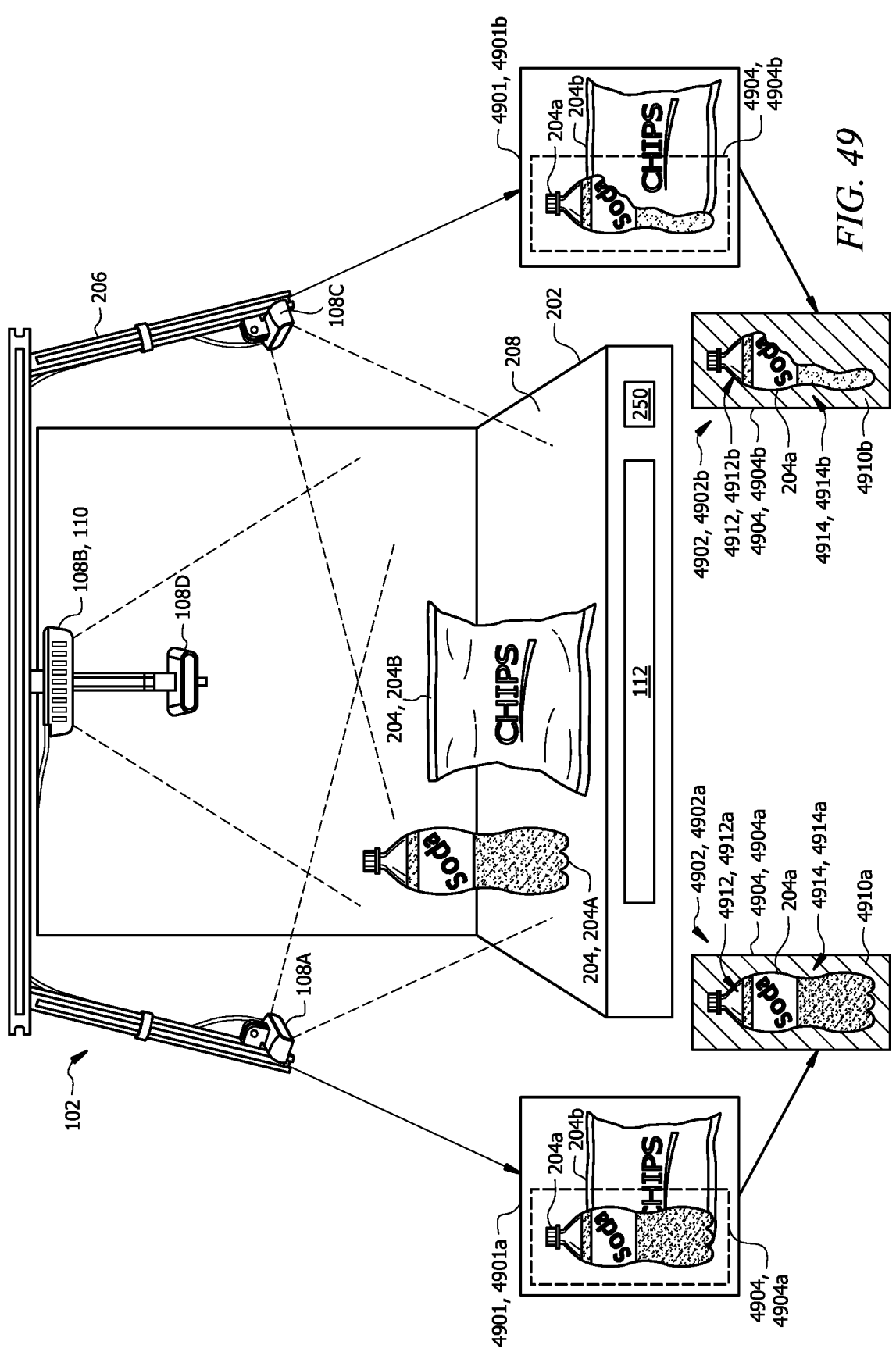
FIG. 49 illustrates the imaging device of FIG. 2 with a first item and a second item placed on the surface of the platform, in accordance with one or more embodiments of the present disclosure.

In some cases, a view of a particular item 204, placed on the platform 202, as seen by a particular camera 108 (e.g., shown in FIG. 2) of the imaging device 102 may be obstructed (e.g., partially obstructed) by one or more other items 204 placed on the platform 202. For example, FIG. 49 illustrates the imaging device 102 of FIG. 2 with a first item 204A (e.g., a bottle of soda) and a second item 204B (e.g., a bag of chips) placed on the surface 208 of the platform 202, in accordance with one or more embodiments of the present disclosure. As shown in FIG. 48, there are no obstructions between the first item 204a (bottle of soda) and the cameras 108A and 108D which have a perspective view of the platform 202. Thus, an image 122 captured by either of the cameras 108A and 108D captures a complete image of the first item 204A. For example, cropped image 4902a of the first item 204A is captured by camera 108A and includes a complete depiction of the first item 204A (e.g., a full image of the bottle of soda). On the other hand, the view of the first item 204A as viewed using camera 108C, which also has a perspective view of the platform, is partially obstructed by the second item 204B (the bag of chips). For example, cropped image 4902b shows a partial image of the first item 204A as captured by camera 108C. Cropped image 4902b only depicts the portion of the first item 204A that is visible from the perspective of the camera 108C. The remaining portion of the first item 204A (the bottle of soda) that is not depicted in the cropped image 4902b is blocked by the second item 204B (the bag of chips).

A partial image of an item 204 may cause the item 204 to be incorrectly identified. For example, the lack of sufficient image information relating to the first item 204A in the partial image of the first item 204A may cause the item tracking device 104 to incorrectly match the cropped image 4902b with a particular entry 1602 of the encoded vector library 128 (shown in FIG. 17), and thus, identifying an item identifier 1604 (shown in FIG. 17) that is not a correct match to the first item 204A.

Embodiments of the present disclosure discuss techniques to further improve the accuracy of identifying an item 204 placed on the platform 202. As described below in more detail, item tracking device 104 discards all images (e.g., cropped images) of an unidentified item 204 that do not include at least a threshold amount of image information associated with the item 204. In other words, item tracking device 104 identifies an item 204 that is placed on the platform 202 based only on those images (e.g., cropped images) of the item 204 that include at least a minimum amount (e.g., threshold amount) of image information related to the item 204. This improves the overall accuracy associated with identifying items 204 placed on the platform 202.

As described above, as part of identifying an item 204 that is placed on the platform 202 of the imaging device 102, item tracking device 104 generates a plurality of cropped images of the item 204, identifies an item identifier 1604 for each cropped image, and selects a particular item identifier 1604 from the item identifiers 1604 identified for the cropped images. For each cropped image of the unidentified item 204, the item tracking device 104 determines a ratio between a portion of the cropped image occupied by the item 204 and the total area of the cropped image. When this ratio is below a threshold, item tracking device 104 discards the cropped image. Thus, item tracking device 104 discards all cropped images in which the unidentified item does not occupy at least a minimum threshold area of the cropped image. Thus, item tracking device 104 identifies an item based only on those cropped images that include sufficient image information to reliably identify the item.

The system and method described in certain embodiments of the present disclosure provide a practical application of intelligently identifying an item based on a plurality of images of the item. As described with reference to FIGS. 49, 50A and in response to detecting a triggering event corresponding to a placement of a first item 204A on the platform 202 of the imaging device 102, item tracking device 104 captures a plurality of images 4901 of the first item 204A and generates a plurality of cropped images 4902 of the first item 204A based on the images 4901. For each cropped image 4902 of the unidentified first item 204A, the item tracking device 104 determines whether the cropped image 4902 includes at least a minimum threshold image information associated with the first item 204A. Item tracking device 104 discards at least some, but potentially all cropped images 4902 in which the unidentified first item 204A does not occupy at least a minimum threshold area and identifies the first item 204A based on the remaining cropped images 4902. Thus, item tracking device 104 identifies an item based primarily, if not only, on those cropped images that include sufficient image information to reliably identify the item. This improves the overall accuracy associated with identifying items 204 placed on the platform 202. This saves computing resources (e.g., processing and memory resources associated with the item tracking device 104) that would otherwise be used to re-identify an item that was identified incorrectly. Additionally, discarding images of an item 204 that does not include sufficient image information associated with the item 204 means that the item tracking device 104 needs to process fewer images to identify the item 204, thus saving processing resources and time that would otherwise be used to process all cropped images 4902 of the item 204. This improves the processing efficiency associated with the processor 602 (shown in FIG. 6) of item tracking device 104. Thus, the disclosed system and method generally improve the technology associated with automatic detection of items 204.

These aspects will now be described in more detail with reference to FIGS. 49 and 50B.

Figure 50A:
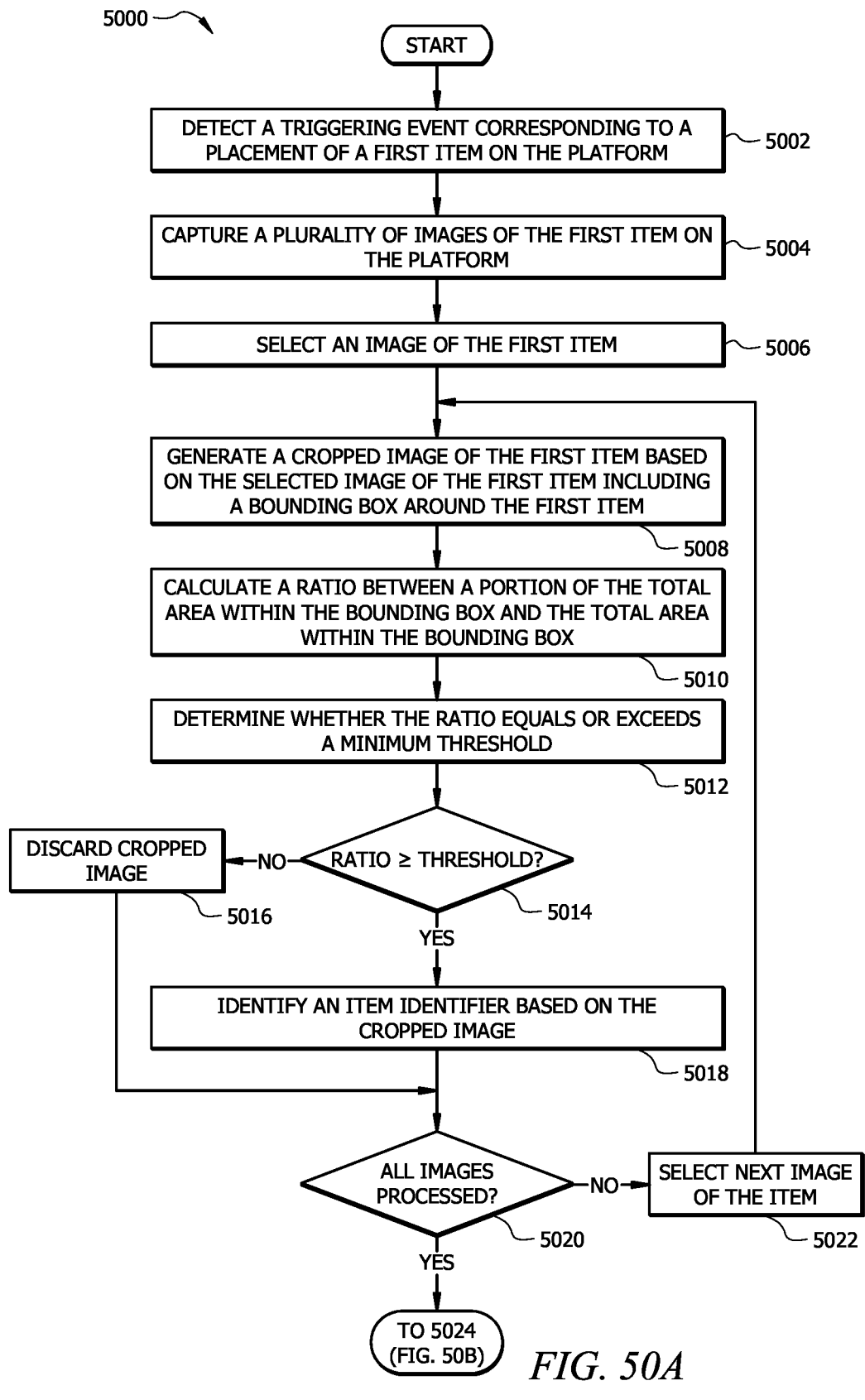
FIGS. 50A and 50B illustrate a flow chart of an example method for identifying an item based on images of the item having sufficient image information, in accordance with one or more embodiments of the present disclosure.
Figure 50B:
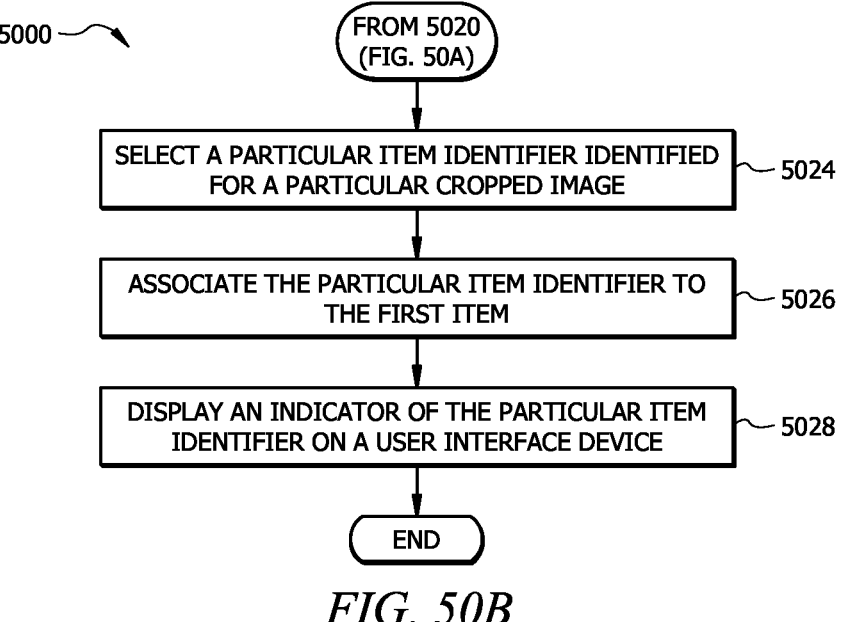

It may be noted that the systems and components illustrated and described in the discussions of FIGS. 1-29 may be used and implemented to perform operations of the systems and methods described in FIGS. 49, 50A and 50B. Additionally, systems and components illustrated and described with reference to any figure of this disclosure may be used and implemented to perform operations of the systems and methods described in FIGS. 49, 50A and 50B.

FIGS. 50A and 50B illustrate a flow chart of an example method 5000 for identifying an item based on images of the item having sufficient image information, in accordance with one or more embodiments of the present disclosure. Method 5000 may be performed by item tracking device 104 as shown in FIG. 1. For example, one or more operations of method 5000 may be implemented, at least in part, in the form of software instructions (e.g., item tracking instructions 606 shown in FIG. 6), stored on tangible non-transitory computer-readable medium (e.g., memory 116 shown in FIGS. 1 and 6) that when run by one or more processors (e.g., processors 602 shown in FIG. 6) may cause the one or more processors to perform operations 5002-5028. It may be noted that operations 5002-5028 are described primarily with reference to FIG. 49 and additionally with certain references to FIGS. 1, 2A, 16, and 17.

It may be noted that while the following disclosure refers to the cropped images 4902a and 4902b when describing embodiments of the present disclosure, a person having ordinary skill in the art may appreciate that these embodiments apply to regular images 122 (e.g., complete or partial images) of the items 204 (e.g., 204A and 204B).

At operation 5002, item tracking device 104 detects a triggering event corresponding to placement of a first item 204A (shown in FIG. 49 as a bottle of soda) on the platform 202. In a particular embodiment, the triggering event may correspond to a user placing the first item 204A on the platform 202. The following description assumes that a second item 204B (shown in FIG. 49 as a bag of chips) is already placed on the platform 202 (e.g., as part of a previous interaction) before the triggering event related to the placement of the first item 204A on the platform 202 is detected.

As described above, the item tracking device 104 may perform auto-exclusion for the imaging device 102 using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 to capture reference images and reference depth images 124, respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 of the platform 202 based on differences in depth values between subsequent depth images 124 and the reference depth image 124 and/or differences in the pixel values between subsequent images 122 and the reference image 122.

In one embodiment, to detect the triggering event, the item tracking device 104 may use a process similar to process 700 that is described with reference to FIG. 7 and/or a process similar to method 3200 that is described with reference to FIGS. 32A and 32B for detecting a triggering event, such as, for example, an event that corresponds with a user's hand being detected above the platform 202 and placing an item 204 on the platform 202. For example, the item tracking device 104 may check for differences between a reference depth image 124 and a subsequent depth image 124 to detect the presence of an object above the platform 202. For example, based on comparing the reference depth image 124 with a plurality of subsequent depth images 124, item tracking device 104 may determine that a user's hand holding the first item 204A entered the platform 202, placed the first item 204A on the platform 202, and exited the platform 202. In response to determining that the first item 204A has been placed on the platform 202, the item tracking device 104 determines that the triggering event has occurred and proceeds to identify the first item 204A that has been placed on the platform 202.

At operation 5004, item tracking device 104 in response to detecting the triggering event, item tracking device 104 captures a plurality of images 4901 (shown in FIG. 49) of the first item 204A placed on the platform 202 using two or more cameras (e.g., 108A-D) of a plurality of cameras 108. For example, the item tracking device 104 may capture images 4901 with an overhead view, a perspective view, and/or a side view of the first item 204A on the platform 202. In one embodiment, each of the images 4901 is captured by a different camera 108. For example, as shown in FIG. 49, image 4901*a* is captured by camera 108A and image 4901*b* is captured by camera 108C.

After generating a plurality of images 4901 of the first item 204A, item tracking device 104 may be configured to perform operations 5008-5018 for each of the images 4901 to determine whether the image 4901 includes sufficient image information relating to the first item 204A for reliably identifying the first item 204A, and to determine an item identifier 1604 (e.g., shown in FIG. 42) for the first item 204A in response to determining that the image 4901 includes sufficient image information relating to the first item 204A.

At operation 5006, item tracking device 104 selects an image 4901 (e.g., 4901*a*, 4901*b*) of the first item 204A.

At operation 5008, item tracking device 104 generates a cropped image 4902 (shown in FIG. 49) for the selected image 4901 by editing the image 4901 to isolate at least a portion of the first item 204A. For example, when the selected image 4901 is the image 4901*a*, item tracking device 104 generates a cropped image 4902*a* based on the image 4901*a*. In another example, when the selected image 4901 is image 4901*b*, item tracking device 104 generates a cropped image 4902*b* based on the image 4901*b*. As shown in FIG. 49 each of the images 4901*a* and 4901*b* depicts the first item 204*a* as well as the second item 204B. For example, image 4901*a* captured by camera 108A depicts a complete image of the first item 204A (shown as a bottle of soda) and a partial image of the second item 204B (shown as a bag of chips), wherein the bottle of soda partially blocks the view of the bag of chips as viewed by the camera 108A. Image 4901B captured by camera 108C depicts a complete image of the second item 204B (bag of chips) and a partial image of the first item 204A (bottle of soda), wherein the bag of chips partially blocks the view of the bottle of soda as viewed by the camera 108C. Item tracking device 104 may be configured to generate a cropped image 4902*a* or 4902*b* by editing the respective image 4901*a* or 4901*b* to isolate (e.g., separate) the first item 204A or a portion of the first item 204A depicted in the respective image 4901*a* or 4901*b*. In other words, generating a cropped image 4902 of the first item 204A includes removing the second item 204B or portion thereof from a respective image 4901 and isolate the depiction of the first item 204A from the image 4901. For example, as shown in FIG. 49, cropped image 4902*a* depicts the complete image of first item 204A isolated from the image 4901*a*. Similarly, cropped image 4902*b* depicts the partial image of the first item 204A isolated from the image 4901*b*.

In one embodiment, the item tracking device 104 may generate a cropped image 4902 of the first item 204A based on the features of the first item 204A that are present in an image 4901 (e.g., one of the images 4901). The item tracking device 104 may first identify a region-of-interest (e.g., a bounding box 4904 as shown in FIG. 49) for the first item 204A in an image 4901 based on the detected features of the first item 204A that are present in an image 4901 and then may crop the image 4901 based on the identified bounding box 4904. The bounding box 4904 includes an enclosed shape around the first item 204A depicted in the respective image 4901, wherein the first item 204A occupies a portion 4912 (e.g., 4912*a*, 4912*b*) of a total area 4910 (e.g., 4910*a*, 4910*b*) contained within the bounding box 4904. For example, item tracking device 104 identifies a bounding box 4904*a* for the first item 204A depicted in image 4901*a* and identifies a bounding box 4904*b* for the first item 204A depicted in image 4901*b*. It may be noted that while the shape of the bounding boxes 4904*a* and 4904*b* is shown as a rectangular shape, a person having ordinary skill in the art may appreciate that a bounding box 4904 may take any shape that encloses the first item 204A as depicted in a respective image 4901.

The bounding box 4904 comprises a plurality of pixels that correspond with the first item 204A in the captured image 4901 of the first item 204A on the platform 202. The item tracking device 104 may employ one or more image processing techniques to identify a bounding box 4904 for the first item 204A within the image 4901 based on the features and physical attributes of the first item 204A. After identifying a bounding box 4904 for the first item 204A, the item tracking device 104 crops the image 4901 by extracting the pixels within the bounding box 4904 that correspond to the first item 204A in the image 4901. By cropping the image 4901, the item tracking device 104 generates another image (e.g., cropped image 4902) that comprises the extracted pixels within the bounding box 4904 for the first item 204A from the original image 4901. For example, as shown in FIG. 49, cropped image 4902*a* includes a complete image of the first item 204A within bounding box 4904*a*. Similarly, cropped image 4902*b* includes a partial image of the first item 204B within a bounding box 4904*b*.

In some embodiments, the item tracking device 104 may use a process similar to process 900 described with reference to FIG. 9 to generate the cropped images 4902 of the first item 204A. A detailed description of generating a copped image is presented above with reference to FIG. 9 and will not be repeated here.

At operation 5010, item tracking device 104 determines/calculates a ratio between the portion 4912 of the total area 4910 within the bounding box 4904 occupied by the first item 204A and the total area 4910 within the bounding box 4904. For example, when the selected image is 4901*a*, item tracking device 104 calculates a ratio between the portion 4912*a* of the total area 4910*a* within the bounding box 4904*a* (associated with cropped image 4902*a*) occupied by the first item 204A and the total area 4910*a* within the bounding box 4904*a*. Similarly, when the selected image is 4901*b*, item tracking device 104 calculates a ratio between the portion 4912*b* of the total area 4910*b* within the bounding box 4904*b* (associated with cropped image 4902*a*) occupied by the first item 204A and the total area 4910*b* within the bounding box 4904*b*. This ratio indicates an amount (e.g., percentage) of the total area 4910 of the respective bounding box 4904 that is occupied by the first item 204A. Essentially, the ratio indicates an amount of image information relating to the first item 204A contained in the bounding box 4904 corresponding to a cropped image 4902.

In one embodiment, assuming that the total area 4910 of a bounding box 4904 associated with a particular cropped image 4902 includes a total number of pixels, item tracking device 104 calculates the ratio between the portion 4912 of the total area 4910 occupied by the first item 204A and the total area 4910 by dividing a sum of all pixels corresponding to the portion 4912 of the bounding box 4904 by the total number of pixels (e.g., sum of all pixels) corresponding to the total area 4910 of the bounding box 4904. To identify the pixels in the portion 4912 occupied by the first item 204A within the bounding box 4904, item tracking device 104 fills a remining portion 4914 (e.g., 4914*a* in cropped image 4902*a*, 4914*b* in cropped image 4902*b*) of the bounding box 4904 that is not occupied by the first item 204A with pixels of a particular pre-selected color that is different from one or more colors included in the portion 4912 occupied by the first item 204A depicted in the respective cropped image 4902. For example, assuming that each pixel is made up of different amounts/combination of three component colors red, green and blue (RGB), each pixel of the particular pre-selected color is associated with a unique combination of numerical values assigned to component colors red, green and blue (RGB) of the pixel. In one embodiment, the particular pre-selected color associated with each pixel in the portion 4914 of the bounding box 4904 that is not occupied by the first item 204A is a particular shade of white color generated by assigning the unique combination of numerical values including (255, 255, 255) to the components (RGB) of each pixel. Once all pixels in the portion 4914 of the bounding box 4904 that are not occupied by the first item 204A is assigned the pre-selected color (e.g., RGB=(255, 255, 255)), item tracking device 104 identifies the pixels in the portion 4912 occupied by the first item 204A by identifying and counting all pixels within bounding box that are not associated with the unique combination of RGB values (e.g., RGB=(255, 255, 255)).

At operation 5012, item tracking device 104 determines whether the ratio between the portion 4912 of the total area 4910 within the bounding box 4904 occupied by the first item 204A and the total area 4910 within the bounding box 4904 equals or exceeds a minimum threshold area occupied by the first item 204A in the bounding box 4904. Essentially, item tracking device 104 determines whether a cropped image 4902 contains sufficient image information relating to the first item 204A in the respective bounding box 4904 to reliably identify the first item 204A, wherein the minimum threshold area is indicative of a minimum image information that may be needed to reliably identify the first item 204A. For example, the minimum threshold may be set to 60% of the total area of the bounding box 4904.

At operation 5014, in response to determining that the ratio is less than the threshold area, method 5000 moves to operation 5016 where item tracking device 104 discards the corresponding cropped image 4902. As described above, the ratio indicates an amount of the total area 4910 of the respective bounding box 4904 that is occupied by the first item 204A, and thus, indicates an amount of image information relating to the first item 204A contained in the bounding box 4904 corresponding to a cropped image 4902. When the ratio is less than the threshold area, it means that the corresponding cropped image 4902 for which the ratio is calculated does not have sufficient image information relating to the first item 204A to reliably identify the first item 204A. Thus, in order to avoid erroneous identification of the first item 204A, item tracking device 104 discards the cropped image 4902 when the ration calculated at operation 5010 is less than the threshold. In other words, item tracking device 104 removes from consideration a cropped image 4902 that lacks sufficient image information relating to the first item 204A to reliably identify the first item 204A. For example, the ratio calculated for cropped image 4902*b*, which depicts a partial image of the first item 204A, may be less than the threshold area, indicating that cropped image 4902*b* lacks sufficient image information relating to the first item 204A to reliably identify the first item 204A. Thus, in this example, item tracking device 104 may discard cropped image 4902*b*.

At operation 5014, in response to determining that the ratio equals or exceeds the threshold area, method 5000 moves to operation 5018 where item tracking device 104 identifies an item identifier 1604 (e.g., shown in FIG. 42) for the first item 204A based on the corresponding cropped image 4902 for which the ratio was calculated. When the ratio equals or exceeds the threshold area, it means that the corresponding cropped image 4902 for which the ratio is calculated contains sufficient image information relating to the first item 204A to reliably identify the first item 204A. For example, the ratio calculated for cropped image 4902*a*, which depicts a complete image of the first item 204A, may equal or exceed the threshold area, indicating that cropped image 4902*a* includes sufficient image information relating to the first item 204A to reliably identify the first item 204A. Thus, in this example, item tracking device 104 identifies an item identifier 1604 of the first item 2044A based on the cropped image 4902*a*.

Item tracking device 104 may identify an item identifier 1604 based on a cropped image 4902 using a process similar to method 4300 described above with reference to FIGS. 42 and 43, method 4500 described above with reference to FIGS. 44 and 45, method 4800 described with reference to FIGS. 47A, 47B, 48A and 48B, or a combination thereof. Accordingly, these aspects will not be repeated here.

Item tracking device may be configured to repeat the operations 5008-5018 for each image 4901 (e.g., including 4901*a*, 4901*b*) of the first item 204A. For example, at operation 5020, item tracking device 104 checks whether all images 4901 have been processed. In other words, item tracking device 104 determines whether operations 5008-5018 have been performed for each image 4901. In response to determining that all images 4901 have not been processed, method 5000 proceeds to operation 5022 where the item tracking device 104 selects a next image 4901 (e.g., a remaining/unprocessed image 4901) for processing. Item tracking device 104 then performs operations 5008-5018 for the selected image 4901. Item tracking device 104 repeats operations 5008-5018 until all images 4901 have been processed.

This process may yield a set of item identifiers 1604 identified based on a set of cropped images 4902 (e.g., including 4902*a*) that include sufficient image information (e.g., ratio≥Threshold) relating to the first item 204A to reliably identify the first item 204A.

In response to determining that all images 4901 have been processed and an item identifier 1604 has been identified for all cropped images 4902 that include sufficient image information relating to the first item 204A, method 5000 proceeds to operation 5024 in FIG. 50B.

Referring to FIG. 50B, item tracking device 104 selects a particular item identifier (e.g., first item identifier 4204 shown in FIG. 42) that was identified for a particular cropped image 4902. Item tracking device 104 may select the particular item identifier from the item identifiers 1604 identified for one or more cropped images 4902 using a process similar to method 4300 described above with reference to FIGS. 42 and 43, method 4500 described above with reference to FIGS. 44 and 45, method 4800 described with reference to FIGS. 47A, 47B, 48A and 48B, or a combination thereof. Accordingly, these aspects will not be repeated here.

At operation 5026, item tracking device 104 associates the particular item identifier to the first item 204A.

At operation 5028, item tracking device 104 displays an indicator of the particular item identifier on a user interface device.

Identifying an Item Based on an Interaction History Associated with a User

In general, certain embodiments of the present disclosure describe improved techniques for identifying an item placed on a platform of an imaging device. A second unidentified item that is placed on the platform is identified based on an association of the second item with an identified first item placed on the platform, wherein the association between the first item and the second item is based on a transaction history associated with a user who placed the first and second items on the platform. For example, the user may have placed the first item and the second item on the platform as part of one or more previous transactions. Based on the previous transactions, an association between the first item and the second item may be recorded as part of the user's transaction history. In a subsequent transaction, when the user places the first item and the second item on the platform, and the first item has been successfully identified, the second item is identified based on the recorded association with the first item.

As described above, when the item tracking device 104 is unable to identify an item 204 placed on the platform, the item tracking device 104 asks the user to identify the item 204. For example, item tracking device 104 displays a plurality of item identifiers 1604 identified for the item 204 on a user interface device and prompts the user to select one of the displayed item identifiers 1604. Asking the user to identify an item 204 placed on the platform interrupts the seamless process of identifying items 204 placed on the platform 202 and results in a subpar user experience.

Embodiments of the present disclosure describe improved techniques for identifying an item 204 placed on a platform 202 of an imaging device 102. As described below in accordance with certain embodiments of the present disclosure, the item tracking device 104 monitors a plurality of transactions performed by a particular user over a given time period and records repetitive behavior associated with the user. For example, the user may buy a cup of coffee and a donut every morning. In another example, the user may buy a bottle of soda along with a bag of chips at least three times every week. Such repetitive behavior is recorded by the item tracking device 104 as part of a transaction history associated with the user. The recorded transaction history associated with the user may then be used by the item tracking device 104 to identify an item 204 placed by the user on the platform 202 as part of a subsequent transaction. For example, when the user places a bottle of soda along with a bag of chips on the platform 202 as part of a subsequent transaction and the item tracking device 104 successfully identifies the bottle of soda but is unable to identify the second item, the second item may be identified as the bag of chips based on the transaction history of the user. This technique avoids the item tracking device 104 from asking the user to identify the unidentified second item, and thus improves the overall user experience of the user.

Figure 51:
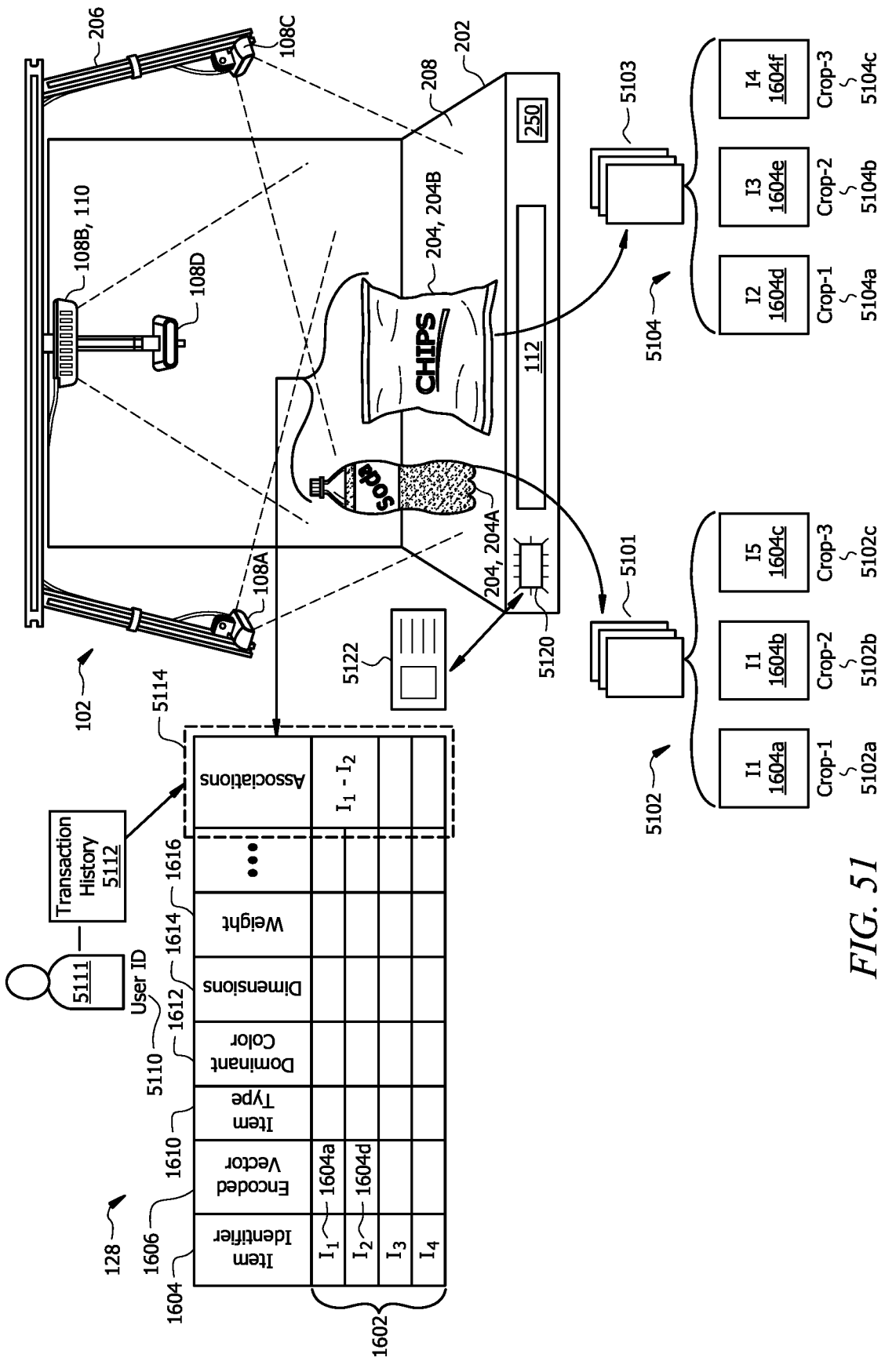
FIG. 51 illustrates an example imaging device of FIG. 2 with items placed on the platform for identification based on user transaction history, in accordance with one or more embodiments of the present disclosure.

FIG. 51 illustrates an example imaging device 102 of FIG. 2 with items 204 placed on the platform 202 for identification based on user transaction history, in accordance with one or more embodiments of the present disclosure.

As shown in FIG. 51, a first item 204A (a bottle of soda) and second item 204B (a bag of chips) is placed on the platform 202 of the imaging device 102 as part of an example purchase transaction initiated by a user 5111. The placement of the first item 204A and the second item 204B may correspond to a user 5111 placing the first item 204A on the platform 202 as part of a first interaction associated with a transaction (e.g., purchase transaction at a store) and the user 5111 placing the second item 204B as part of a second interaction also associated with the same transaction. As shown, a transaction history 5112 associated with a user ID 5110 assigned to the user 5111 includes an association 5114 between an item identifier 1604$a$ (shown as I1) associated with the first item 204A and an item identifier 1604$d$ (shown as I2) associated with the second item 204B. In one embodiment, the item tracking device 104 may be configured to record (e.g., in memory 116 shown in FIG. 1) the transaction history 5112 associated with the user 5111 based on monitoring a plurality of transactions performed by the user 5111 over a pre-configured time period (e.g., a week, a month, a year etc.) preceding the current transaction. For example, based on monitoring transactions performed by the user 5111 over the pre-configured time period, item tracking device 104 may identify a plurality of transactions in which the user 5111 purchased a particular bottle of soda associated with item identifier 1604$a$ (I1) along with a particular bag of chips associated with item identifier 1604$d$ (I2). The item tracking device 104 may store (e.g., as part of the encoded vector library 128) this user behavior identified over multiple transactions as an association 5114 between the item identifier 1604$a$ (I1) associated with the bottle of soda and the item identifier 1604$d$ (I2) associated with the bag of chips.

Referring to FIG. 51, when the user 5111 places the same bottle of soda shown as the first item 204A and the same bag of chips shown as the second item 204B as part of a subsequent transaction, the item tracking device 104 attempts to identify both items 204 using a method similar to method 4300 described above with reference to FIGS. 42 and 43, method 4500 described above with reference to FIGS. 44 and 45, method 4800 described with reference to FIGS. 47A, 47B, 48A and 48B, method 5000 described with reference to FIGS. 49, 50A and 50*b*, or a combination thereof. When the item tracking device 104 successfully identifies the first item 204A as a bottle of soda associated with item identifier 1604$a$ (I1) but is unable to identify the second item 204B (the bag of chips), instead of asking the user 5111 to identify the unidentified second item 204B, the item tracking device 104 identifies the second item 204B as the bag of chips associated with item identifier 1604$d$ (I2) based on the association 5114 between the item identifiers 1604$a$ (I1) and 1604$d$ (I2) stored as part of the transaction history 5112 of the user 5111.

In one embodiment, as part of each transaction performed by the user 5111, before starting to place items 204 on the platform 202 or at any time during the transaction, the user 5111 may scan a transaction device 5122 associated with the user 5111 using a scanning device 5120 provided at the imaging device 102. The transaction device 5122 may be associated with a unique user ID 5110 assigned to the user 5111. In one example, the transaction device 5122 may include a rewards card issued to the user 5111 by a store at which the imaging device 102 is deployed to help users purchase items 204 sold at the store. In one embodiment, when the transaction device 5122 is scanned using the scanning device 5120, the item tracking device 104 detects that the transaction device 5122 has been scanned, extracts the information included in the transaction device 5122 and determines an identity (e.g., user ID 5110) associated with the transaction device 5122 based on the extracted information. The item tracking device 104 associates the identified user ID 5110 from the scanned transaction device 5122 with the transaction being performed by the user 5111. This allows the item tracking device 104 to associate a transaction with the particular user 5111 and identify a repetitive behavior of the user 5111. In response to identifying a particular repetitive behavior of the user 5111 based on monitoring a plurality of transactions performed by the user 5111, item tracking device 104 may store this repetitive behavior as part of transaction history 5112. The item tracking device 104 may map the transaction history 5112 of the user 5111 with the user ID 5110 assigned to the user 5111. This allows the item tracking device 104 to retrieve the transaction history 5112 of the user 5111 based on the user ID 5110 of the user 5111, when the user 5111 scans the transaction device 5122 during a subsequent transaction.

These aspects will now be described in more detail with reference to FIGS. 51 52A and 52B.

The system and method described in certain embodiments of the present disclosure provide a practical application of intelligently identifying an item based on a transaction history associated with a user. As described with reference to FIGS. 51, 52A and 52B, based on monitoring transactions performed by the user 5111 over a pre-configured time period, item tracking device 104 identifies an association 5114 between a first item 204A and a second item 204B. The item tracking device 104 stores (e.g., as part of the encoded vector library 128) this user behavior identified over multiple transactions as an association 5114 between the item identifier 1604a (I1) associated with the first item 204A and the item identifier 1604d (I2) associated with the second item 204B. In a subsequent transaction conducted by the same user 5111, when the item tracking device 104 successfully identifies the first item 204A associated with item identifier 1604a (I1) but is unable to identify the second item 204B, the item tracking device 104 identifies the second item 204B as associated with item identifier 1604d (I2) based on the association 5114 between the item identifiers 1604a (I1) and 1604d (I2) stored as part of the transaction history 5112 of the user 5111. This technique improves the overall accuracy associated with identifying items 204 and saves computing resources (e.g., processing and memory resources associated with the item tracking device 104) that would otherwise be used to re-identify an item that was identified incorrectly. This improves the processing efficiency associated with the processor 602 (shown in FIG. 6) of item tracking device 104. Thus, the disclosed system and method generally improve the technology associated with automatic detection of items 204.

Figure 52A:
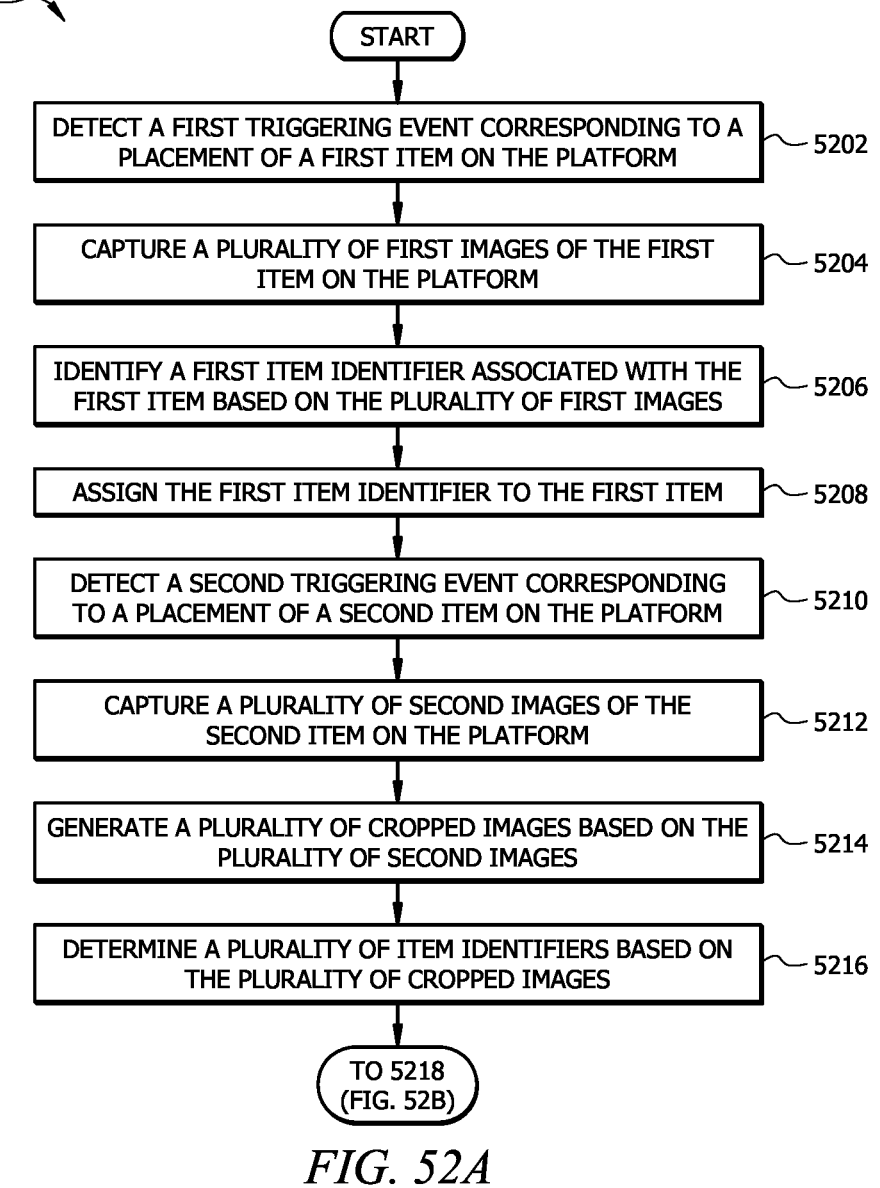
FIGS. 52A and 52B illustrate a flow chart of an example method for identifying an item based on a transaction history associated with a user, in accordance with one or more embodiments of the present disclosure.
Figure 52B:
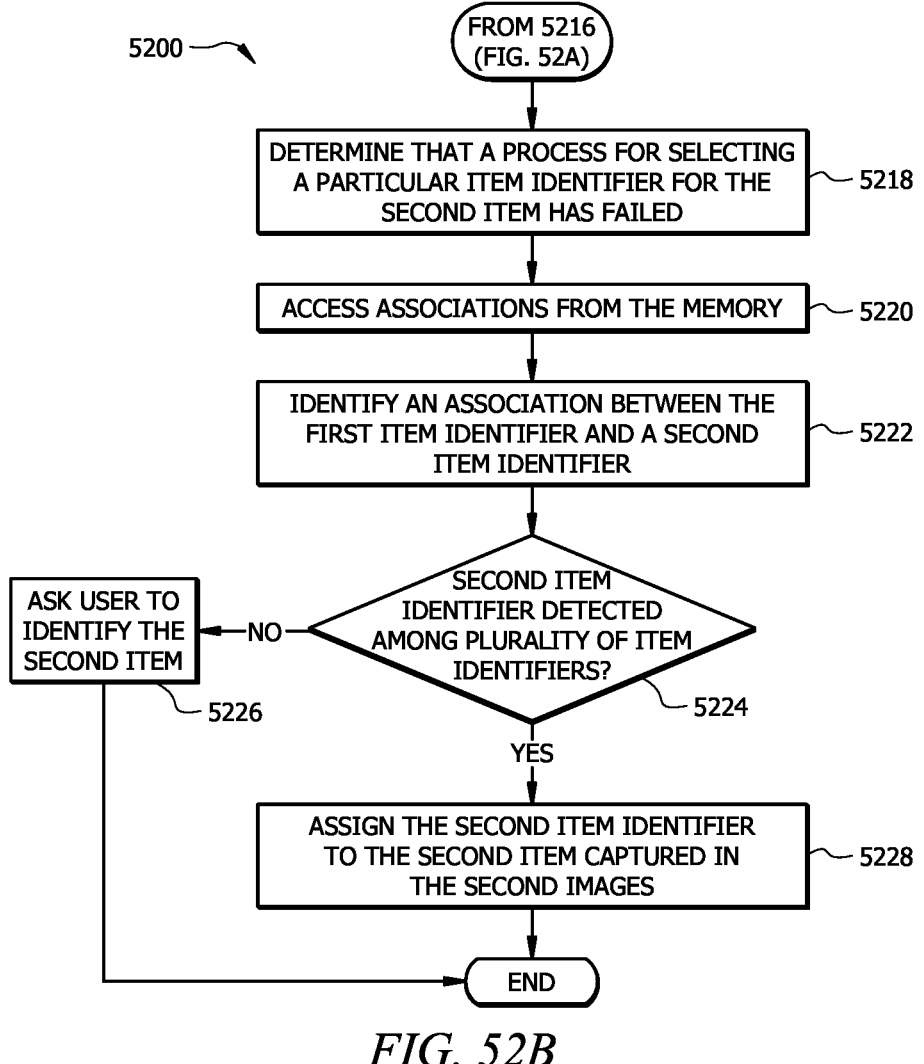

It may be noted that the systems and components illustrated and described in the discussions of FIGS. 1-29 may be used and implemented to perform operations of the systems and methods described in FIGS. 51, 52A and 52B. Additionally, systems and components illustrated and described with reference to any figure of this disclosure may be used and implemented to perform operations of the systems and methods described in FIGS. 51, 52A and 52B.

FIGS. 52A and 52B illustrate a flow chart of an example method 5200 for identifying an item based on a transaction history associated with a user, in accordance with one or more embodiments of the present disclosure. Method 5200 may be performed by item tracking device 104 as shown in FIG. 1. For example, one or more operations of method 5200 may be implemented, at least in part, in the form of software instructions (e.g., item tracking instructions 606 shown in FIG. 6), stored on tangible non-transitory computer-readable medium (e.g., memory 116 shown in FIGS. 1 and 6) that when run by one or more processors (e.g., processors 602 shown in FIG. 6) may cause the one or more processors to perform operations 5202-5228. It may be noted that operations 5202-5228 are described primarily with reference to FIG. 51 and additionally with certain references to FIGS. 1, 2A, 16, and 17.

Referring to FIG. 52A, at operation 5202, item tracking device 104 detects a first triggering event corresponding to placement of a first item 204A (shown in FIG. 51 as a bottle of soda) on the platform 202. In a particular embodiment, the first triggering event may correspond to a user 5111 placing the first item 204A on the platform 202.

As described above, the item tracking device 104 may perform auto-exclusion for the imaging device 102 using a process similar to the process described in operation 302 of FIG. 3. For example, during an initial calibration period, the platform 202 may not have any items 204 placed on the platform 202. During this period of time, the item tracking device 104 may use one or more cameras 108 and/or 3D sensors 110 to capture reference images and reference depth images 124, respectively, of the platform 202 without any items 204 placed on the platform 202. The item tracking device 104 can then use the captured images 122 and depth images 124 as reference images to detect when an item 204 is placed on the platform 202. At a later time, the item tracking device 104 can detect that an item 204 has been placed on the surface 208 of the platform 202 based on differences in depth values between subsequent depth images 124 and the reference depth image 124 and/or differences in the pixel values between subsequent images 122 and the reference image 122.

In one embodiment, to detect the first triggering event, the item tracking device 104 may use a process similar to process 700 that is described with reference to FIG. 7 and/or a process similar to method 3200 that is described with reference to FIGS. 32A and 32B for detecting a triggering event, such as, for example, an event that corresponds with a user's hand being detected above the platform 202 and placing an item 204 on the platform 202. For example, the item tracking device 104 may check for differences between a reference depth image 124 and a subsequent depth image 124 to detect the presence of an object above the platform 202. For example, based on comparing the reference depth image 124 with a plurality of subsequent depth images 124, item tracking device 104 may determine that a user's hand holding the first item 204A entered the platform 202, placed the first item 204A on the platform 202, and exited the platform 202. In response to determining that the first item 204A has been placed on the platform 202, the item tracking device 104 determines that the first triggering event has occurred and proceeds to identify the first item 204A that has been placed on the platform 202.

The first triggering event may correspond to the placement of the first item 204A on the platform 202 as part of a first interaction associated with a transaction initiated by the user 5111. For example, when checking out items 204 for purchase at a store, the user 5111 may initiate the transaction at the imaging device 102 by placing items 204 (e.g., 204A and 204B) one by one on the platform 202. Placement of each item 204 on the platform is a distinct interaction associated with the same transaction. In one embodiment, before starting to place items 204 on the platform 202 or at any time during the transaction, the user 5111 may scan a transaction device 5122 associated with the user 5111 using a scanning device 5120 provided at the imaging device 102. The transaction device 5122 may be associated with a unique user ID 5110 assigned to the user 5111. In one example, the transaction device 5122 may include a rewards card issued to the user 5111 by a store at which the imaging device 102 is deployed to help users purchase items 204 sold at the store. In one embodiment, when the transaction device 5122 is scanned using the scanning device 5120, the item tracking device 104 detects that the transaction device 5122 has been scanned, extracts the information included in the transaction device 5122 and determines an identity (e.g., user ID 5110) associated with the transaction device 5122 based on the extracted information. The item tracking device 104 associates the identified user ID 5110 from the scanned transaction device 5122 with the transaction being performed by the user 5111.

In one embodiment, when the transaction device 5122 is scanned using the scanning device 5120 before any items 204 are placed on the platform 202, the scanning of the transaction device 5122 using the scanning device 5120 initiates a new transaction (e.g., for purchase of items 204) at the imaging device 102. In alternative embodiments, placement of the first item 204A on the platform 202 may initiate a new transaction at the imaging device 102.

At operation 5204, in response to detecting the first triggering event corresponding to the placement of the first item 204A on the platform 202, item tracking device 104 captures a plurality of images 5101 (shown in FIG. 51) of the first item 204A placed on the platform 202 using two or more cameras (e.g., 108A-D) of a plurality of cameras 108. For example, the item tracking device 104 may capture images 5101 with an overhead view, a perspective view, and/or a side view of the first item 204A on the platform 202. In one embodiment, each of the images 5101 is captured by a different camera 108.

At operation 5206, item tracking device 104 identifies a first item identifier 1604 (e.g., item identifier 1604a (I1)) associated with the first item 204A based on the plurality of images 5101 of the first item 204A. For example, item tracking device 104 identifies the first item 204A as a bottle of soda associated with the first item identifier 1604a (I1).

Item tracking device 104 may identify the first item identifier 1604a (I1) associated with the first item 204A using a method similar to method 4300 described above with reference to FIGS. 42 and 43, method 4500 described above with reference to FIGS. 44 and 45, method 4800 described with reference to FIGS. 47A, 47B, 48A and 48B, method 5000 described with reference to FIGS. 49, 50A and 50b, or a combination thereof.

For example, item tracking device 104 generates a cropped image 5102 for each of the images 5101 by editing the image 5101 to isolate at least a portion of the first item 204A, wherein the cropped images 5102 correspond to the first item 204A depicted in the respective images 5101. In other words, item tracking device 104 generates one cropped image 5102 of the first item 204A based on each image 5101 of the first item 204A captured by a respective camera 108. As shown in FIG. 51, item tracking device 104 generates three cropped images 5102a, 5102b and 5102c of the first item 204A from respective images 5101 of the first item 204A. In some embodiments, the item tracking device 104 may use a process similar to process 900 described with reference to FIG. 9 to generate the cropped images 5102 of the first item 204A.

Item tracking device 104 identifies an item identifier 1604 based on each cropped image 5102 of the first item 204A. For example, as described above with reference to operation 4308 of FIG. 43, item tracking device 104 generates an encoded vector 1702 (shown in FIG. 17) relating to the unidentified first item 204A depicted in each cropped image 5102 of the first item 204A and identifies an item identifier 1604 from the encoded vector library 128 (shown in FIG. 16) based on the encoded vector 1702. Here, the item tracking device 104 compares the encoded vector 1702 to each encoded vector 1606 of the encoded vector library 128 and identifies the closest matching encoded vector 1606 in the encoded vector library 128 based on the comparison. In one embodiment, the item tracking device 104 identifies the closest matching encoded vector 1606 in the encoded vector library 128 by generating a similarity vector 1704 (shown in FIG. 17) between the encoded vector 1702 generated for the unidentified first item 204A depicted in the cropped image 5102 and the encoded vectors 1606 in the encoded vector library 128. The similarity vector 1704 comprises an array of numerical similarity values 1710 where each numerical similarity value 1710 indicates how similar the values in the encoded vector 1702 for the first item 204A are to a particular encoded vector 1606 in the encoded vector library 128. In one embodiment, the item tracking device 104 may generate the similarity vector 1704 by using a process similar to the process described in FIG. 17. Each numerical similarity value 1710 in the similarity vector 1704 corresponds with an entry 1602 in the encoded vector library 128.

After generating the similarity vector 1704, the item tracking device 104 can identify which entry 1602, in the encoded vector library 128, most closely matches the encoded vector 1702 for the first item 204A. In one embodiment, the entry 1602 that is associated with the highest numerical similarity value 1710 in the similarity vector 1704 is the entry 1602 that most closely matches the encoded vector 1702 for the first item 204A. After identifying the entry 1602 from the encoded vector library 128 that most closely matches the encoded vector 1702 for the first item 204A, the item tracking device 104 may then identify the item identifier 1604 from the encoded vector library 128 that is associated with the identified entry 1602. Through this process, the item tracking device 104 is able to determine which item 204 from the encoded vector library 128 corresponds with the unidentified first item 204A depicted in the cropped image 5102 based on its encoded vector 1702. The item tracking device 104 then outputs the identified item identifier 1604 for the identified item 204 from the encoded vector library 128. The item tracking device 104 repeats this process for each encoded vector 1702 generated for each cropped image 5102 (e.g., 5102a, 5102b and 5102c) of the first item 204A. This process may yield a set of item identifiers 1604 (shown as 1604a (I1), 1604b (I1) and 1604c (I5) in FIG. 51) corresponding to the first item 204A, wherein the set of item identifiers 1604 corresponding to the first item 204A may include a plurality of item identifiers 1604 corresponding to the plurality of cropped images 5102 of the first item 204A. In other words, item tracking device 104 identifies an item identifier 1604 for each cropped image 5102 of the first item 204A.

It may be noted that a more detailed description of generating an item identifier 1604 for each of the cropped images 4202 is given above with reference to operation 4308 of FIG. 43 and will not be described here in the same level of detail.

Once an item identifier 1604 has been identified for each cropped image 5102, item tracking device 104 may be configured to select a particular item identifier from the item identifiers 1604 (e.g., 1604a (I1), 1604b (I1) and 1604c (I5)) for association with the first item 204A. For example, item tracking device 104 selects the first item identifier 1604 (e.g., item identifier 1604a (I1)) associated with the first item 204A. In other words, item tracking device 104 identifies the first item 204A as a bottle of soda associated with the first item identifier 1604a (I1). The process for selecting an item identifier 1604 (e.g., first item identifier 1604a) from a plurality of item identifiers 1604 (e.g., 1604a-c) identified for plurality of cropped images 5102 (e.g., cropped images 5102a-c) is given above, for example, with reference to FIGS. 43, 45, 48A, 48B, 50A and 50B and will not be described here in the same level of detail.

At operation 5208, item tracking device 104 assigns the identified first item identifier 1604a (I1) to the first item 204A. In one embodiment, the item tracking device 104 displays an indicator of the first item identifier 1604a (I1) on a user interface device associated with the imaging device 102.

At operation 5210, item tracking device 104 detects a second triggering event corresponding to placement of a second item 204B (shown in FIG. 51 as a bag of chips) on the platform 202. In a particular embodiment, the second triggering event may correspond to the user 5111 placing the second item 204B on the platform 202.

Item tracking device 104 may detect the second triggering event using a process similar to the method discussed above with reference to operation 5202 for detecting the first triggering event. For example, the item tracking device 104 may check for differences between a reference depth image 124 and a subsequent depth image 124 to detect the presence of an object above the platform 202. Based on comparing the reference depth image 124 with a plurality of subsequent depth images 124, item tracking device 104 may determine that a user's hand holding the second item 204B entered the platform 202, placed the second item 204B on the platform 202, and exited the platform 202. In response to determining that the second item 204B has been placed on the platform 202, the item tracking device 104 determines that the second triggering event has occurred and proceeds to identify the second item 204B that has been placed on the platform 202.

The second triggering event may correspond to the placement of the second item 204B on the platform 202 as part of a second interaction that is associated with the same transaction initiated by the user 5111 in which the user 5111 previously placed the first item 204A on the platform as part of a first interaction.

At operation 5212, in response to detecting the second triggering event corresponding to the placement of the second item 204B on the platform 202, item tracking device 104 captures a plurality of images 5103 (shown in FIG. 51) of the second item 204B placed on the platform 202 using two or more cameras (e.g., 108A-D) of a plurality of cameras 108. For example, the item tracking device 104 may capture images 5103 with an overhead view, a perspective view, and/or a side view of the second item 204B on the platform 202. In one embodiment, each of the images 5103 is captured by a different camera 108.

At operation 5214, item tracking device 104 generates a plurality of cropped images 5104, wherein each cropped image 5104 is associated with a corresponding image 5103 and is generated by editing the corresponding image 5103 to isolate at least a portion of the second item 204B.

For example, item tracking device 104 generates a cropped image 5104 for each of the images 5103 by editing the image 5103 to isolate at least a portion of the second item

204B, wherein the cropped images 5104 correspond to the second item 204B depicted in the respective images 5103. In other words, item tracking device 104 generates one cropped image 5104 of the second item 204B based on each image 5103 of the second item 204B captured by a respective camera 108. As shown in FIG. 51, item tracking device 104 generates three cropped images 5104a, 5104b and 5104c of the second item 204B from respective images 5103 of the second item 204B. In some embodiments, the item tracking device 104 may use a process similar to process 900 described with reference to FIG. 9 to generate the cropped images 5104 of the second item 204B.

At operation 5216, item tracking device 104 determines a plurality of item identifiers 1604 (e.g., 1604d, 1604e, 1604f) based on the plurality of cropped images 5104, wherein each item identifier 1604 is determined based on one or more attributes of the second item 204B depicted in one of the cropped images 5104.

Item tracking device 104 identifies an item identifier 1604 based on each cropped image 5104 of the second item 204B by using a process similar to the method described above with reference to operation 5206 in which a plurality of cropped images 5102 are generated based on images 5101 of the first item 204A. The item tracking device 104 repeats this process for each cropped image 5104 (e.g., 5104a, 5104b and 5104c) of the second item 204B. This process may yield a set of item identifiers 1604 (shown as 1604d (I2), 1604e (I3) and 1604f (I4) in FIG. 51) corresponding to the second item 204B, wherein the set of item identifiers 1604 corresponding to the second item 204B may include a plurality of item identifiers 1604 corresponding to the plurality of cropped images 5104 of the second item 204B. In other words, item tracking device 104 identifies an item identifier 1604 for each cropped image 5104 of the second item 204B.

It may be noted that a more detailed description of generating an item identifier 1604 for each of the cropped images 4202 is given above with reference to operation 4308 of FIG. 43 and will not be described here in the same level of detail.

Referring to FIG. 52B, at operation 5218, item tracking device 104 determines that a process for selecting a particular item identifier for the second item 204B from the plurality of item identifiers 1604 (e.g., 1604d, 1604e and 16040 has failed. For example, once an item identifier 1604 has been identified for each cropped image 5104 of the second item 204B, item tracking device 104 may be configured to select a particular item identifier 1604 from the item identifiers 1604 (e.g., 1604d (I2), 1604e (I3) and 1604f (I4)) for association with the second item 204B. Item identifier may be configured to select a particular item identifier 1604 for the second item 204B from the plurality of item identifiers 1604d-f by using a process similar to one or more methods described above with reference to FIGS. 43, 45, 48A, 48B, 50A and 50B.

In one embodiment, item tracking device 104 may fail to successfully identify the second item 204B based on methods discussed above. For example, item tracking device 104 may fail to select a particular item identifier 1604 for the second item 204B from the plurality of item identifiers 1604d-f by using a process similar to one or more methods described above with reference to FIGS. 43, 45, 48A, 48B, 50A and 50B.

At operation 5220, in response to determining that a process for selecting a particular item identifier for the second item 204B from the plurality of item identifiers 1604 (e.g., 1604d, 1604e and 16040 has failed, item tracking device 104 accesses (e.g., from the memory 116) the asso- ciations 5114 stored as part of the transaction history 5112 of the user 5110.

As described above, before starting to place items 204 on the platform 202 or at any time during the transaction, the user 5111 scans the transaction device 5122 associated with the user 5111 using a scanning device 5120 provided at the imaging device 102. When the transaction device 5122 is scanned using the scanning device 5120, the item tracking device 104 detects that the transaction device 5122 has been scanned, extracts the information included in the transaction device 5122 and determines an identity (e.g., user ID 5110 assigned to the user 5111) associated with the transaction device 5122 based on the extracted information. Once the user ID 5110 associated with the transaction is identified, the item tracking device 104 accesses (e.g., from the memory 116) the transaction history 5112 mapped to the user ID 5110 and identifies any associations 5114 that are recorded as part of the transaction history 5112 of the user 5111.

At operation 5222, item tracking device 104 determines that the transaction history 5112 associated with the user ID 5110 of the user 5111 includes an association between the first item identifier 1604a (shown as I1) that was identified in operation 5206 for the first item 204A and a second item identifier 1604d (shown as I2).

At operation 5224, item tracking device 104 determines whether the second item identifier 1604d is at least one of the plurality of item identifiers 1604 identified based on the cropped images 5104 of the second item 204B.

In response to determining that none of the plurality of item identifiers 1604 identified based on the cropped images 5104 of the second item 204B is the second item identifier 1604d, method 5200 proceeds to operation 5226 where the item tracking device 104 asks the user 5111 to identify the second item 204B. For example, item tracking device 104 displays the item identifiers 1604 (e.g., 1604d, 1604e, and 16040 corresponding to one or more cropped images 5104 of the second item 204B on a user interface device and asks the user to select one of the displayed item identifiers 1604. item tracking device 104 may receive a user selection of an item identifier 1604 from the user interface device, and in response, associate the selected item identifier 1604 with the second item 204B.

On the other hand, in response to determining that the second item identifier 1604d is at least one of the plurality of item identifiers 1604 identified based on the cropped images 5104 of the second item identifier 204A, method 5200 proceeds to operation 5228 where the item tracking device 104 assigns the second item identifier 1604d to the second item 204B. For example, as shown in FIG. 51, the second item identifier 1604d is identified for cropped image 5104a. Thus, item tracking device 104 assigns the second item identifier 1604d to the second item 204B.

In one embodiment, the transaction history 5112 may be configured to store a number of transactions in which the user 5111 purchased the first item 204A along with the second item 204B, and further store a time period within which those transactions were performed. Item tracking device 104 may be configured to determine, based on transaction history 5112, whether the user 5111 purchased the first item 204A along with the second item 204B for at least a threshold number of transactions in a pre-configured time period preceding the current transaction shown in FIG. 51. The item tracking device 104 assigns the second item identifier 1604d to the second item 204B only in response to determining that the user 5111 purchased the first item 204A along with the second item 204B for at least the threshold number of transactions in the pre-configured time period preceding the current transaction.

In one embodiment, item tracking device 104 displays an indicator of the first item identifier 1604a and the second item identifier 1604d on a user interface device.

Example System for Item Identification Using Item Height

In general, certain embodiments of the present disclosure describe techniques for item identification using item's height. In cases where there is a large number of items in the encoded vector library that are subject to evaluation to filter out items that do not have one or more attributes in common with the item in question, the operation to evaluate each item and filter out items is computationally complex and exten- sive. This leads to consuming a lot of processing and memory resources to evaluate each item. The disclosed system is configured to reduce the search space in the item identification process by filtering out items that do not have heights within a threshold range of the height of the item in question. The disclosed system reduces the search space in the item identification process by filtering out items that do not have heights within a threshold range of the height of the item in question that is desired to be identified. By narrow- ing down the search set and filtering out irrelevant items, the search time to identify the item is reduced and the amount of processing and memory resources required to identify the item is also reduced. Therefore, the disclosed system pro- vides the practical application of search space reduction, time search reduction, and increasing the allocation of processing and memory resources that would otherwise be spent on evaluating irrelevant items in a larger search space from the encoded vector library. Furthermore, the disclosed system provides an additional practical application for improving the item identification techniques, and therefore, item tracking techniques. Accordingly, this represents an improvement to the efficiency, throughput, and productivity of computer systems implemented to perform the described operations.

Figure 53:
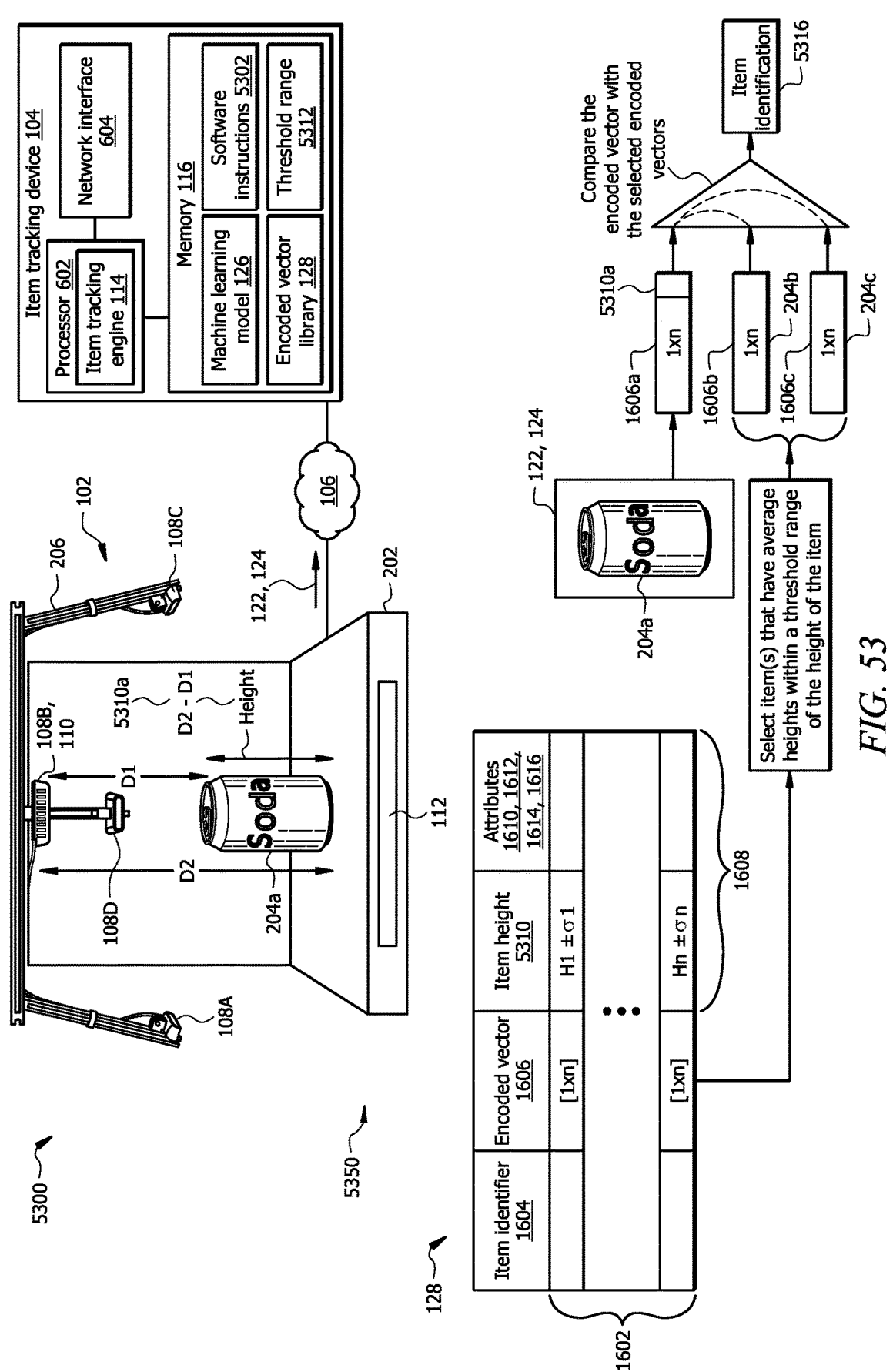
FIG. 53 illustrates an embodiment of a system configured for space search reduction in identifying items from images via item height.

FIG. 53 illustrates an embodiment of a system 5300 that is configured to identify an item 204 based at least on a height of the item 204 in addition to its other attributes 1608. FIG. 53 further illustrates an example operational flow 5350 of the system 5300 for item identification based at least on a height of the item 204. In some embodiments, the system 5300 includes the item tracking device 104 communica- tively coupled with the imaging device 102 via a network 106. In the example of FIG. 53, the configuration of imaging device 102 described in FIG. 2A is used. However, the configuration of imaging device 102 described in FIG. 2B or any other configuration of the imaging device 102 may be used in the system 5300. In the example configuration of imaging device 102 in FIG. 53, the imaging device 102 includes cameras 108a-d, 3D sensor 110, the structure 206, weight sensor 112, and platform 202. In some configurations of the imaging device 102, any number of cameras 108, 3D sensors 110, and weight sensors 112 may be implemented, similar to that described in FIGS. 1, 2A, and 2B. The system 5300 may be configured as shown in FIG. 53 or in any other configuration. The systems and components illustrated and described in the discussions of FIGS. 1-29 may be used and implemented to perform operations of the systems and methods described in FIGS. 53-54. Additionally, systems and components illustrated and described with reference to any figure of this disclosure may be used and implemented to perform operations of the systems and methods described in FIGS. 53-54.

In general, the system 5300 improves the accuracy of item identification and tracking operations. In cases where there is a large number of items in the encoded vector library 128 are subject to evaluation to filter out items that do not have one or more attributes 1608 in common with an item 204, the operation to evaluate each item 204 and filter out items is computationally complex and extensive. This leads to consuming a lot of processing and memory resources to evaluate each item 204. The system 5300 is configured to reduce the search space in the item identification process by filtering out items 204 that do not have heights within a threshold range 5514 of the height 5310 of the item 204 in question that is required to be identified.

By narrowing down the search set and filtering out irrelevant items 204, the search time is reduced and the amount of processing and memory resources required to identify the item 204 is also reduced. Therefore, the system 5300 provides the practical application of search space reduction, time search reduction, and increasing the allocation of processing and memory resources that would otherwise be spent on evaluating irrelevant items in a larger search space from the encoded vector library 128. Furthermore, the system 5300 provides an additional practical application for improving the item identification techniques, and therefore, item tracking techniques.

System Components

Aspects of the item tracking device 104 are described in FIGS. 1-29, and additional aspects are described below. The item tracking device 104 may include the processor 602 in signal communication with the network interface 604 and memory 116. The memory 116 stores software instructions 5302 that when executed by the processor 602 cause the processor 602 to execute the item tracking engine 114 to perform one or more operations of the item tracking device 104 described herein. Memory 116 is configured to store software instructions 5302, encoded vector library 128, machine learning model 126, threshold range 5312, and/or any other data or instructions. The software instructions 5302 may comprise any suitable set of instructions, logic, rules, or code operable to execute the processor 602 and item tracking engine 114 and perform the functions described herein. Machine learning model 126 is described with respect to FIGS. 1-6. Other elements are described further below in conjunction with the operational flow 5350 of the system 5300.

Operational Flow for Item Identification Based on Item Height

The operational flow 5350 of the system 5300 may begin when each entry 1602 in the encoded vector library 128 is associated or tagged with a respective height 5310. In some embodiments, the height 5310 of an item in an entry 1602 of the encoded vector library 128 may include an average height ($\overline{H}$) and a standard deviation ($\sigma$) from the respective average height or from a mean height value. For example, the height 5310 for the first entry 1602 of the encoded vector library 128 may be represented by $\overline{H}_1 \pm \sigma_1$, where $\overline{H}_1$ is an average height of the item represented by the first entry 1602 and $\sigma_1$ is a standard deviation from the $\overline{H}_1$. Similarly, the height 5310 for the n-th entry 1602 of the encoded vector library 128 may be represented by $\overline{H}_n \pm \sigma_n$, where $\overline{H}_n$ is an average height of the item represented by the n-th entry 1602 and $\sigma_n$ is a standard deviation from the $\overline{H}_n$. Each encoded vector 1606 may be associated with one or more attributes 1608. The one or more attributes 1608 may include item type 1610, dominant color(s) 1612, dimensions 1614, and weight 1616, similar to that described in FIG. 16.

Determining the Height of an Item

In some embodiments, the item tracking engine 114 may determine the height 5310 of each item 204 by determining a first distance D1 between the camera 108b and the top surface area of the item 204 on the platform 202, determining a second distance D2 between the camera 108b and the platform 202, and determining D1-D2. To this end, when item 204 is placed on the platform 202, the camera 108b (e.g., top-view camera) may capture an image 122 of the item 204 and send the image 122 to the item tracking device 104. Similarly, the 3D sensor 110 (top-view 3D camera) may capture a depth image 124 of the item 204 and send the image 124 to the item tracking device 104.

The item tracking device 104 (e.g., via the item tracking engine 114) may feed the image 122, 124 to the machine learning model 126 for processing. In the case of the depth image 124 where pixels of the depth image 124 correspond to the point cloud, where a color of a point in the point cloud indicates a distance of the point from the camera 108. The points in the point cloud may indicate the surfaces of objects in the depth image 124. Thus, in the case of depth image 124, the item tracking engine 114 and/or the camera 108 may determine the distances D1 and D2 using the point cloud data.

In case of a color (RGB) image 122 where the pixels in the color image 122 indicate the actual color of object surfaces shown in the image 122, the camera 108 may be configured to determine and provide the distances D1 and D2 from the camera 108 to the item tracking device 104, by internal processing circuitries and code embedded in the processing circuitries. Thus, in the case of color image 122, the item tracking engine 114 and/or the camera 108 may determine the distances D1 and D2 using any distance measuring software instruction code stored in the camera 108 and/or the item tracking device 104. For example, the camera 108 may transmit the distance information about D1 and D2 along the image 122 to the item tracking engine 114. In another example, the camera 108 may transmit the image 122 to the item tracking engine 114 and the item tracking engine 114 may determine the D1 and D2 using a distance measuring software instruction code included in the software instructions 5302.

In certain embodiments, the item tracking engine 114 may determine the average height 5310 of an item 204 based on a plurality of height values associated with the item 204. In this process, the item tracking engine 114 may capture a plurality of images 122, 124 of the item 204 when it is placed in different locations on the platform 202. For example, for a given item 204, a user may place the item 204 in different locations on the platform 202 and each time the item 204 is placed in a different location, cameras 108/3D sensors 110 capture images 122, 124 of the item 204. Therefore, each of the plurality of images 122, 124 shows the item 204 placed on a different part of the platform 202 from a different angle.

In some embodiments, a first height of the item 204 when it is placed at a first part of the platform 202 may be different from a second height of the item 204 when it is placed at a second part of the platform 202 due to intrinsic parameters, settings of cameras 108/3D sensor 110, error margins in the height determination, uneven surface or bumps on the surface of the platform 202, or other reasons. Therefore, the item tracking engine 114 may determine a plurality of heights for the item 204 when it is placed on different parts of the platform 202. Each height value of the item 204 may be determined based on a respective D1 distance between the top camera 108b/top 3D sensor 110 and the top surface area (e.g., top fifty cloud points on the top surface) of the item 204 in a depth image 124 and D2 distance between the top camera 108b/top 3D sensor 110 and the platform 202.

The item tracking engine 114 may determine the average height 5310 of the item 204 by computing an average of the plurality of heights. The item tracking engine 114 may also determine the standard deviation of the plurality of heights and include it in the height 5310 range of the item 204. In this manner, each entry 1602 of the encoded vector library 128 may be populated with a respective height 5310 that includes the respective average height and the respective standard deviation.

The average height 5310 of an item 204 may be different from an average height 5310 of another item 204, and similarly, the standard deviation from an average height of an item 204 may be different from a standard deviation associated with a height of another item 204. Each entry 1602 of the encoded vector library 128 may be associated with attributes 1608, such as brand, dominant color(s), flavor, dimensions, and weight, similar to that described in FIGS. 15-18. The item tracking engine 114 may filter the search set based on each of these and other attributes 1608 during the item identification process, similar to that described in FIG. 15-18. In certain embodiments, the item height 5110 may be used as an item identifier instead of or in addition to the item identifier 1604.

In certain embodiments, multiple heights 5310 may be determined for an item 204a, where each height 5310 may correspond to cases when the item 204a is placed upright, sideways, and laying down, among other positions. For example, in the case of a soda can as the item 204a, the soda may be placed upright, or sideways. In another example, in cases of a bag of chips, the bag of chips may be placed upright, sideways, or laying down. The item tracking engine 114 is configured to account for each of cases where the item 204a may be placed in different ways on the platform 202. For example, if the item tracking engine 114 determines that an item 204 is placed upright, it may use a first average height 5310 and respective standard deviation that are determined for the case when the item 204 was placed upright, and if the item tracking engine 114 determines that an item 204 was placed on the platform 202 sideways, it may use a second average height 5310 and respective standard deviation that are determined for the case when the item 204 was placed on the platform 202 sideways. Similarly, if the item tracking engine 114 determines that an item 204 was placed on the platform 202 laid down, it may use a third average height 5310 and respective standard deviation that are determined for the case when the item 204 was placed on the platform 202 laid down. Therefore, in some embodiments, each item 204 in the encoded vector library 128 may be associated with multiple heights 5310 and respective standard deviations.

Detecting that an Item is Placed on the Platform

The operation of item identification may begin when the item tracking engine 114 detects a triggering event. The item tracking engine 114 may detect a triggering event that may correspond to placement of the item 204a on the platform 202, e.g., when the user places the item 204 on the platform 202. In response to detecting the triggering event, the item tracking engine 114 may capture one or more images 122, 124 of the item 204a using the cameras 108 and 3D sensors 110. For example, the cameras 108 and 3D sensors 110 may capture the images 122, 124 and transmit the images 122, 124 to the item tracking device 104, similar to that described in FIGS. 1-6. The image 122, 124 may show a top view of the item 204a. The camera 108 capturing the image 122 may be a top-view camera placed above the platform 202. The 3D sensor 110 capturing the depth image 124 may be a top-view 3D sensor placed above the platform 202.

The item tracking engine 114 may feed the image 122, 124 to the machine learning model 126 to generate an encoded vector 1606a for the item 204a, similar to that described in FIGS. 1-22. In this process, the machine learning model 126 may extract a set of physical features/ attributes 1608 of the item 204a from the image 122, 124 by an image processing neural network. The encoded vector 1606a may be a vector or matrix that includes numerical values that represent or describe the attributes 1608a of the item 204a. The encoded vector 1606a may have any suitable dimension, such as 1×n, where 1 is the number of rows and n is the number of elements in the encoded vector 1606a, and $n$ can be any number greater than one.

The item tracking engine 114 may determine the height 5310a associated with the item 204a by determining a first distance D1 between the top-view camera 108b/3D sensor 110 and the top surface of the item 204a, determining a second distance D2 between the top-view camera 108/3D sensor 110 and the platform 202, and determining the different between D1 and D2. For example, in the case of depth image 124, the item tracking engine 114 and/or the 3D sensor 110 may determine the D1 and D2 distances based on the pixel colors of points in the point cloud indicated in the depth image 124.

The item tracking engine 114 may identify item(s) 204 in the encoded vector library 128 that are associated with average heights 5310 that are within a threshold range 5312 from the determined height 5310a of the item 204a. In some embodiments, the threshold range 5312 may correspond to a standard deviation from an average height 5310a of the item 204a. In some embodiments, the threshold range 5312 may vary depending on the item 204a type. For example, if the type of the item 204a (e.g., item type 1610) is a cup, the threshold range 5312 may be a first range±2 centimeters (cm), if the item type 1610 of the item 204a is a bottle, the threshold range 5312 may be a second range±4 cm, and for other item types 1610, other threshold range 5312 may be used. These various threshold ranges 5312 may be determined based on historical standard deviations for each respective item type 1610 based on a plurality of heights determined from different images 122, 124 when a respective item 204 is placed at a different location on the platform 202, similar to that described above.

The item tracking engine 114 may select the items 204 that each has an average height 5310 within the threshold range 5312 of the height 5310a of the item 204a and fetch the encoded vectors 1606 associated with the selected items 204. The fetched encoded vectors 1606 are represented by encoded vectors 1606b-c.

The item tracking engine 114 may then compare the encoded vector 1606a with each of fetched encoded vectors 1606b-c associated with the selected items 204. For example, in this process, the item tracking engine 114 may determine a similarity between the encoded vector 1606a and each of the fetched encoded vectors 1606b-c. In an example of encoded vector 1606b, to determine a similarity between the encoded vector 1606a and the encoded vector 1606b, the item tracking engine 114 may determine a Euclidean distance between the encoded vector 1606a and the encoded vector 1606b. If the Euclidean distance between the encoded vector 1606a and the encoded vector 1606b is less than a threshold distance (e.g., less than 0.1, 0.2 cm, etc.), the item tracking engine 114 may determine that the encoded vector 1606a corresponds to the encoded vector 1606b. The item tracking engine 114 may perform a similar operation in comparison between the encoded vector 1606a and other fetched encoded vectors 1606b-c. If the item tracking engine 114 determines that the encoded vector 1606a corresponds to the encoded vector 1606b, the item tracking engine 114 may determine that the item 204a corresponds to the item 204b which is represented by the encoded vector 1606b. Likewise, if the item tracking engine 114 determines that the encoded vector 1606a corresponds to the encoded vector 1606c, the item tracking engine 114 may determine that the item 204a corresponds to the item 204c that is represented by the encoded vector 1606c. In other examples, the item tracking engine 114 may use any other type of distance calculations between the encoded vector 1606a and the encoded vector 1606b. In this manner, the item tracking engine 114 may reduce the search space based on item height 5310 and determine the identity of the item 204a at the item identification operation 5316.

In some embodiments, to determine whether the encoded vector 1606a corresponds to the encoded vector 1606b, the item tracking engine 114 may perform the following operations. For example, the item tracking engine 114 may identify a set of attributes 1608a as indicated in the encoded vector 1606a associated with the item 204a, identify a set of attributes 1608b as indicated in the encoded vector 1606b associated with the item 204b, compare each attribute 1608a of the set of attributes 1608a with a counterpart attribute 1608b of the set of attributes 1608b. For example, in this process, the item tracking engine 114 may compare the determined brand of item 204a with a brand of the item 204b, compare the dominant color(s) of the item 204a with the dominant color(s) of the item 204b, compare the flavor of the item 204a (e.g., orange-flavored, diet, etc.) with a flavor of the item 204b, and the like. If the item tracking engine 114 determines that more than a threshold percentage (e.g., more than 80%, 85%, etc.) of attributes 1608a correspond to counterpart attributes 1608b, the item tracking engine 114 may determine that the encoded vector 1606a corresponds to the encoded vector 1606b and item 204a corresponds to item 204b.

In response to determining the identity of the item 204a, the item tracking engine 114 may add the item 204a to the virtual shopping cart associated with the user, similar to that described in FIGS. 1-29.

Example Method for Item Identification Using Item Height

Figure 54:
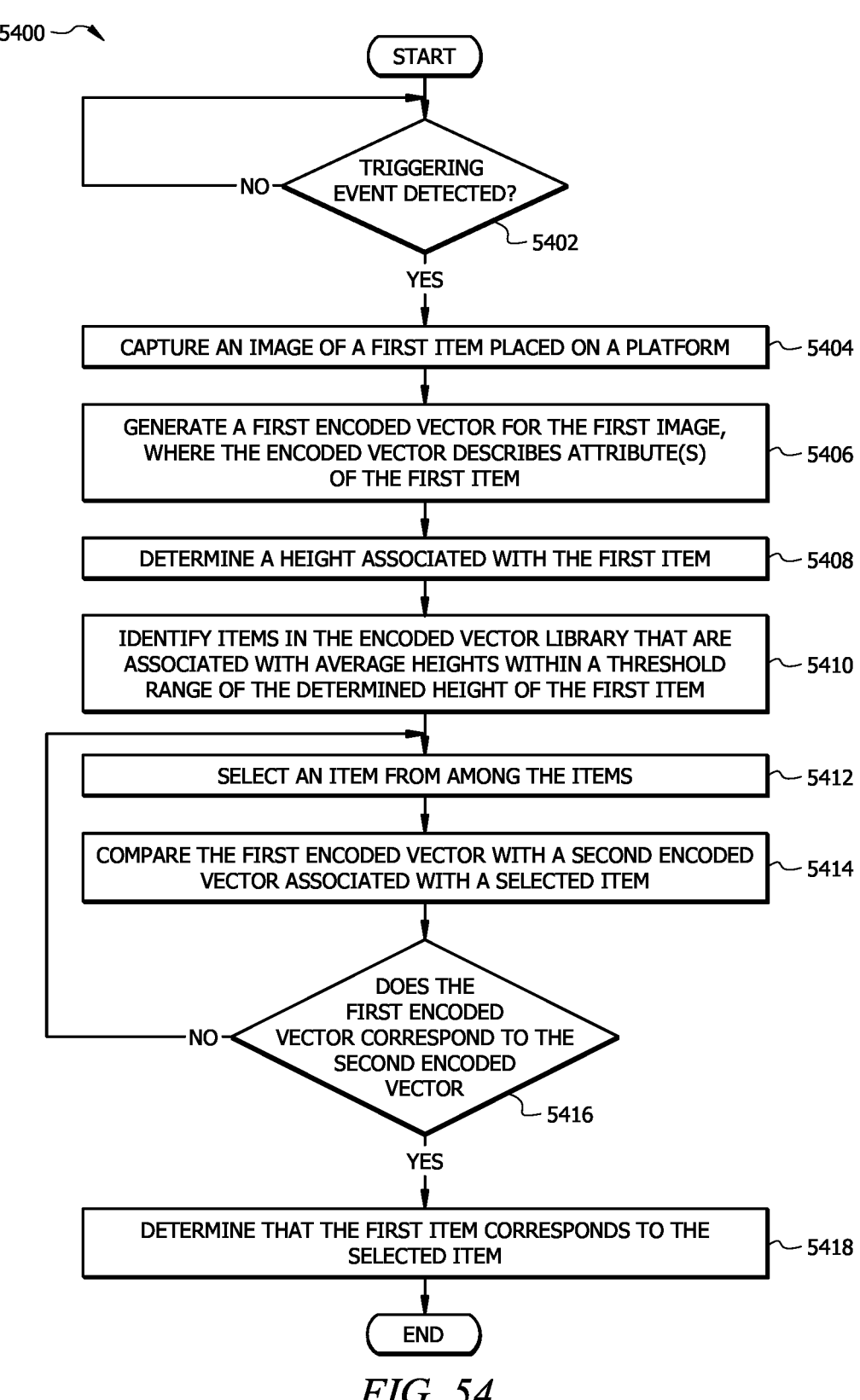
FIG. 54 illustrates an example flow chart of a method for space search reduction in identifying items from images via item height.

FIG. 54 illustrates an example flow chart of a method 5400 for item identification using item height according to some embodiments. Modifications, additions, or omissions may be made to method 5400. Method 5400 may include more, fewer, or other operations. For example, operations may be performed in parallel or in any suitable order. While at times discussed as the system 5300, item tracking device 104, item tracking engine 114, imaging device 102, or components of any of thereof performing operations, any suitable system or components of the system may perform one or more operations of the method 5400. For example, one or more operations of method 5400 may be implemented, at least in part, in the form of software instructions 5302 of FIG. 53, stored on tangible non-transitory computer-readable media (e.g., memory 116 of FIG. 53) that when run by one or more processors (e.g., processors 602 of FIG. 53) may cause the one or more processors to perform operations 5402-5418.

At operation 5402, the item tracking engine 114 determines whether a triggering event is detected. For example, the item tracking engine 114 may detect a triggering event when a user places a first item 204a on the platform 202, similar to that described in FIGS. 1-29. If it is determined that a triggering event is detected, method 5400 proceeds to operation 5404. Otherwise, method 5400 remains at operation 5402 until a triggering event is detected.

At operation 5404, the item tracking engine 114 captures an image 122, 124 of the item 204a placed on the platform 202, for example, by using one or more cameras 108 and one or more 3D sensors 110, similar to that described in FIGS. 1-5 and 53.

At operation 5406, the item tracking engine 114 generates an encoded vector 1606a for the image 122, 124, where the encoded vector 1606a describes the attributes 1608a of the item 204a. For example, the item tracking engine 114 may generate the encoded vector 1606a by implementing the machine learning model 126 or any suitable method, similar to that described in FIGS. 1-29.

At operation 5408, the item tracking engine 114 determines a height 5310a associated with the item 204a. For example, the item tracking engine 114 determines a difference between a D1 distance between a camera 108/3D sensor 110 and a top surface of the item 204a and D2 distance between the camera 108/3D sensor 110 and the platform 202, similar to that described in FIG. 53.

At operation 5410, the item tracking engine 114 identifies a set of items 204a-c in the encoded vector library 128 that are associated with average height 5310 within a threshold range 5312 of the determined height 5310a of the item 204a, similar to that described in FIG. 53.

At operation 5412, the item tracking engine 114 selects an item from among the set of items 204a-c. The item tracking engine 114 may iteratively select an item 204a-c until no item is left for evaluation.

At operation 5414, the item tracking engine 114 compares the first encoded vector 1606a with a second encoded vector 1606b associated with the selected item 204b. For example, the item tracking engine 114 may determine a Euclidean distance between the first encoded vector 1606a and the second encoded vector 1606b.

At operation 5416, the item tracking engine 114 determines whether the first encoded vector 1606a corresponds to the second encoded vector 1606b. For example, the item tracking engine 114 may determine that the first encoded vector 1606a corresponds to the second encoded vector 1606b if the Euclidean distance between them is less than a threshold value. If it is determined that the first encoded vector 1606a corresponds to the second encoded vector 1606b, method 5400 proceeds to operation 5418. Otherwise, method 5400 returns to operation 5412.

At operation 5418, the item tracking engine 114 determines that the first item 204a corresponds to the selected item 204b. In response, the item tracking engine 114 may add the first item 204a to the virtual shopping cart associated with the user.

Example System for Confirming the Identity of the Item Based on Item Height

In general, certain embodiments of the present disclosure describe techniques for confirming the identity of the item based on the item height. For example, the disclosed system is configured to use the height of the item to confirm the identity of the item. For example, after other attributes, such as the brand, flavor, and size attributes of the item are used to infer the identity of the item, the disclosed system may determine the confidence score associated with the identity of the item. If the confidence score is less than a threshold percentage, the system may use the height of the item to determine and confirm the identity of the item. Therefore, the disclosed system provides the practical application of improving the accuracy in the item identification techniques by leveraging the height of the item. This, in turn, reduces the search time and the computational complexity in item identification process, and processing and memory resource needed for the item identification process that would otherwise be spent in evaluating irrelevant items. Furthermore, the disclosed system increases the accuracy in the item identification and tracking techniques by using the height of the item to narrow down the search space. Accordingly, this represents an improvement to the efficiency, throughput, and productivity of computer systems implemented to perform the described operations.

Figure 55:
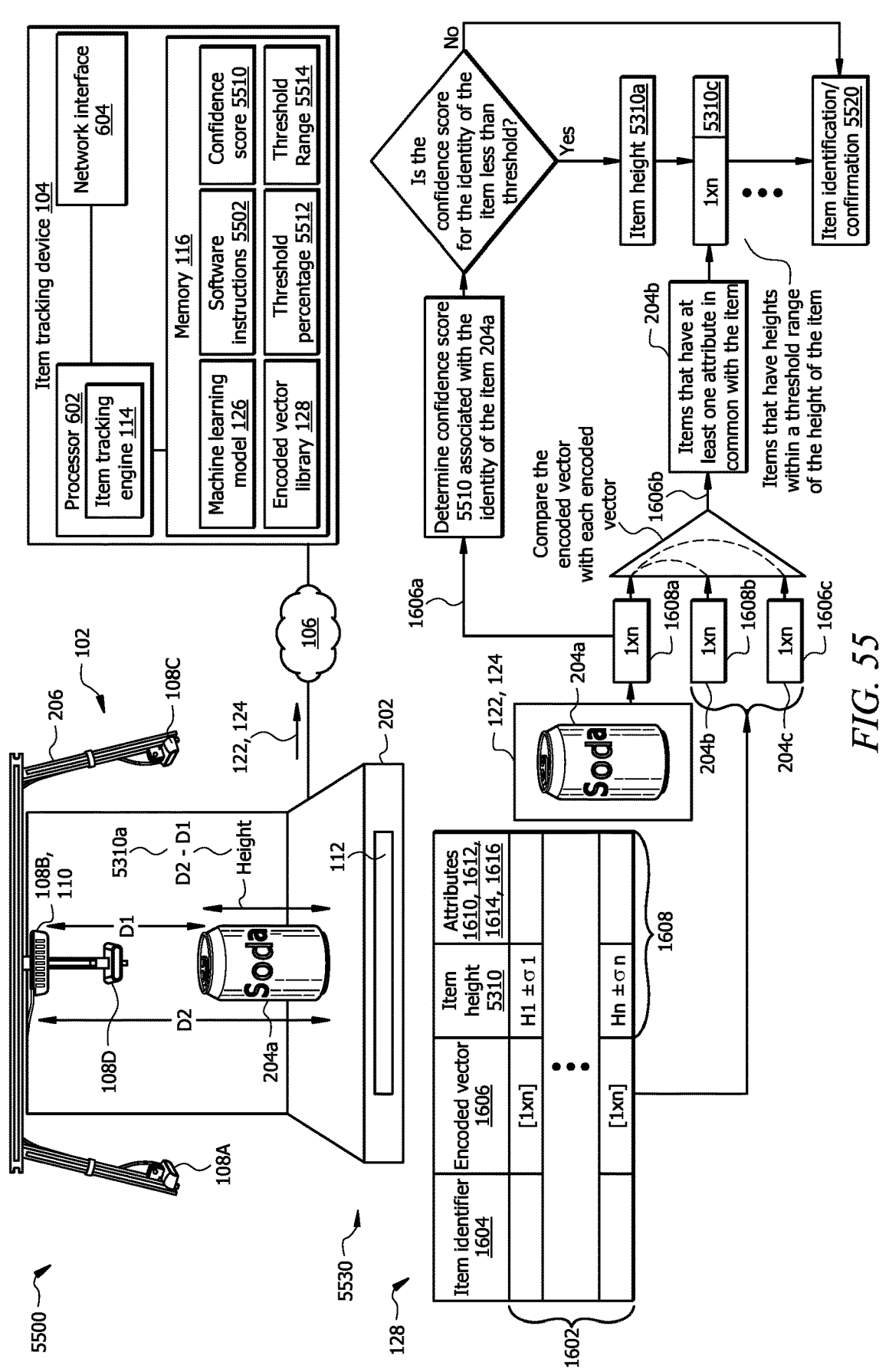
FIG. 55 illustrates an embodiment of a system configured for confirming the identity of an item based on item height.

FIG. 55 illustrates an embodiment of a system 5500 that is configured to confirm the identity of the item 204 (that is placed on the platform 202) based on the item height. FIG. 55 further illustrates an example operational flow 5530 of the system 5500 for confirming the identity of the item 204 based on the height of the item 204. In some embodiments, the system 5500 includes the item tracking device 104 communicatively coupled with the imaging device 102, via a network 106. In the example of FIG. 55, the configuration of imaging device 102 described in FIG. 2A is used. However, the configuration of imaging device 102 described in FIG. 2B or any other configuration of the imaging device 102 may be used in the system 5500. In the example configuration of imaging device 102 in FIG. 55, the imaging device 102 includes cameras 108*a-d,* 3D sensor 110, the structure 206, weight sensor 112, and platform 202. In some configurations of the imaging device 102, any number of cameras 108, 3D sensors 110, and weight sensors 112 may be implemented, similar to that described in FIGS. 1, 2A, and 2B. The system 5500 may be configured as shown in FIG. 55 or in any other configuration. The systems and components illustrated and described in the discussion of FIGS. 1-29 may be used and implemented to perform operations of the systems and methods described in FIGS. 55-56. Additionally, systems and components illustrated and described with reference to any figure of this disclosure may be used and implemented to perform operations of the systems and methods described in FIGS. 55-56.

In general, the system 5500 improves the accuracy of item identification and tracking operations. In an example scenario, assume that attributes of the item 204 are used to narrow down the search set to a subset of items that may resemble or correspond to the item 204 in question. However, a confidence score 5510 in identifying the identity of the item 204 using the attributes of the item may be low or less than a desired value. For example, in case of using the flavor attribute of the item 204 to filter items, the flavor of the item 102 is usually indicated on a cover or container of the item 204. The machine learning model 126 processes an image 122, 124 of the item 204 to detect the flavor information displayed on the cover or container of the item 204. However, the flavor information (e.g., shown in text) may be small in size on the container of the item 204. Therefore, it is challenging to detect the flavor information from an image 122, 124. Similarly, various sizes of the item 204 may appear the same or similar to each other in images 122, 124 of the item 204. For example, the image 122, 124 of the item 204 may be cropped to show the item 204 and remove side and background areas. Because the image 122, 124 of the item 204 is cropped, it may be difficult to differentiate between the size variations of the item 204, such as 8 ounce (oz), 16 oz, etc. Furthermore, similar to detecting the flavor information, detecting the size information of the item 204 as indicated on the cover or container of the item may be challenging due to the small size of the size information. Therefore, in the examples of using flavor and size attributes to identify the item 204, the confidence score 5510 in determining the identity of the item 204 may be low, e.g., less than a threshold.

The present disclosure provides a solution to this and other technical problems that are currently arising in the realm of item identification and tracking technology. For example, the disclosed system 5500 is configured to use the height of the item to confirm the identity of the item. For example, after the brand, flavor, and size attributes of the item are used to infer the identity of the item, the disclosed system may determine the confidence score associated with the identity of the item. If the confidence score is less than a threshold percentage, the system may use the height of the item to determine and confirm the identity of the item. Therefore, the disclosed system provides the practical application of improving the item identification techniques by leveraging the height of the item.

System Components

Aspects of the item tracking device 104 are described in FIGS. 1-29, and additional aspects are described below. The item tracking device 104 may include the processor 602 in signal communication with the network interface 604 and memory 116. The memory 116 stores software instructions 5502 that when executed by the processor 602 cause the processor 602 to execute the item tracking engine 114 to perform one or more operations of the item tracking device 104 described herein.

Memory 116 also stores machine learning model 126, encoded vector library 128, confidence score 5510, threshold percentage 5512, threshold range 5514, and/or any other data or instructions. The software instructions 5502 may comprise any suitable set of instructions, logic, rules, or code operable to execute the processor 602 and item tracking engine 114 and perform the functions described herein. Machine learning model 126 is described with respect to FIGS. 1-6. Other elements are described further below in conjunction with the operational flow 5530 of the system 5500.

Operational Flow for Confirming the Identity of the Item Based on Item Height

The operational flow 5530 of the system 5500 may begin when each entry 1602 in the encoded vector library 128 is associated or tagged with a respective average height 5310 and a standard deviation from the respective average height 5310, similar to that described in FIG. 53. The item tracking engine 114 may determine the height 5310 of an item 204 by computing the difference between D2 and D1, where D1 is the distance between the camera 108*b*/3D sensor 110 and the top surface area of the item 204 on the platform 202, and D2 is the distance between the camera 108*b*/3D sensor 110 and the platform 202, similar to that described in FIG. 53.

In certain embodiments, the item tracking engine 114 may determine the average height 5310 of an item 204 and the standard deviation from the average height 5310 based on a plurality of height values associated with the item 204 when the item 204 is placed on different locations on the platform 202, similar to that described in FIG. 53.

Detecting that an Item is Placed on the Platform

The operation of item identification may begin when the item tracking engine 114 detects a triggering event. The item tracking engine 114 may detect a triggering event that may correspond to the placement of the item 204 on the platform 202, e.g., when the user places the item 204 on the platform 202. In response to detecting the triggering event, the item tracking engine 114 may capture one or more images 122, 124 of the item 204*a* using the cameras 108 and 3D sensors 110, similar to that described in FIGS. 1-6. For example, the cameras 108 and 3D sensors 110 may capture the images 122, 124 and transmit the images 122, 124 to the item tracking device 104, similar to that described in FIGS. 1-6. The image 122, 124 may show a top view of the item 204a (among others). The camera 108 capturing the image 122 may be a top-view camera placed above the platform 202. The 3D sensor 110 capturing the depth image 124 may be a top-view 3D sensor placed on above the platform 202.

The item tracking engine 114 may feed the image 122, 124 to the machine learning model 126 to generate an encoded vector 1606a for the item 204a, similar to that described in FIG. 53. For example, the encoded vector 1606a comprises an array of numerical values. Each numerical value corresponds with and describes an attribute (e.g. item type, size, shape, color, etc.) of the item 204a. The encoded vector 1606a may be any suitable length. For example, The encoded vector 1606a may have a size of 1×n, where n may be 256, 512, 1024, or any other suitable value. The item tracking engine 114 may then compare the encoded vector 1606a with each of the encoded vectors 1606 from the encoded vector library 128. In this process, for example, the item tracking engine 114 may determine a respective Euclidean distance between the encoded vector 1606a and each of the encoded vectors 1606 to determine the similarity between the encoded vector 1606a and a respective encoded vector 1606 from encoded vector library 128. In other examples, the item tracking engine 114 may use any other type of distance calculations between the encoded vector 1606a and each of the encoded vector 1606. In the example where Euclidean distance calculation method is used, the item tracking engine 114 may use the Euclidean distance between the encoded vector 1606a and each respective encoded vector from among the encoded vector 1606 to identify a set of items 204 from the encoded vector library 128 that have at least one attribute 1608 in common with the item 204a.

In this process, for example, with respect to a second item 204b from among the set of items 204 from the encoded vector library 128, the item tracking engine 114 may determine the Euclidean distance between the encoded vector 1606a and the encoded vector 1606b. If the determined Euclidean distance is less than a threshold distance (e.g., 0.1 centimeter (cm), 0.2 (cm), etc.), the item tracking engine 114 may determine that the encoded vector 1606a is similar to encoded vector 1606b and item 204a has at least one attribute 1608 in common with the item 204b.

For example, with respect to a second item 204b from among the set of items 204 from the encoded vector library 128, the item tracking engine 114 may feed the image 122, 124 showing the item 204a to the machine learning model 126 to extract a first set of attributes 1608a from the image 122, 124. The first set of attributes 1608a may include brand, flavor, dimension, dominant color(s), and other attributes of the item 204a. The item tracking engine 114 may identify or fetch a second set of attributes 1608b belonging to the item 204b as indicated in the entry 1602 associated with the second item 204b in the encoded vector library 128.

The item tracking engine 114 may compare each attribute 1608a with a counterpart attribute 1608b to determine whether at least one attribute 1608a corresponds to the counterpart attribute 1608b. The item tracking engine 114 may perform a similar operation for the rest of items 204 (such as item 204c) included in the encoded vector library 128 to determine whether the item 204a has at least one attribute 1608 in common with any of the items 204 in the encoded vector library 128. For example, the item tracking engine 114 may compare encoded vector 1606a with the encoded vector 1606c associated with the item 204c to determine the Euclidean distance between the encoded vector 1606a and the encoded vector 1606c. In this manner, the item tracking engine 114 identifies a set of items 204b-c from the encoded vector library 128 that have at least one attribute 1608a in common with the first item 204a.

In certain embodiments, the at least one attribute 1608 includes the brand attribute. In such embodiments, the brand attribute may be used as a first level of item filtering because the accuracy of the machine learning model 126 in determining the brand attribute 1608a is historically more than a threshold percentage (e.g., more than 80%, 85%, etc.). Thus, in such embodiments, the item tracking engine 114 may identify a set of items 204b-c from the encoded vector library 128 that have at least the brand attribute 1608a in common with the first item 204a. Now that the at least one attribute 1608a of the item 204a is determined, the item tracking engine 114 may determine the identity of the item 204a based on the at least one attribute 1608a and other attributes 1608a of the item 204a.

The item tracking engine 114 may determine a confidence score 5510 associated with the identity of the item 204a based on the at least one attribute 1608a and other attributes 1608a of the item 204a. The confidence score 5510 may indicate the accuracy of the identity of the item 204a. In some embodiments, the confidence score 5510 may indicate the probability that the identity of the item 204a is correct. The confidence score 5510 may be an output of the machine learning model 126. For example, the machine learning model 126 attempts to determine the identity of the item 204a by comparing the attributes 1608a of the item 204a with attributes 1608 of other items 204 as stored in the encoded vector library 128. For example, during item identification and filtering out items 204 that are not similar to the item 204a, the machine learning model 126 may identify one or more items 204 that closely resemble the item 204a (i.e., have a set of attributes 1608a in common with the item 204a).

The machine learning model 126 may determine the probability that the item 204a corresponds to each respective item 204 based on the number of common attributes 1608a between the item 204a and the respective item 204. If the determined probabilities are less than a threshold percentage, it may be an indication that, using the determined attributes 1606a, the identity of the item 204a cannot be determined confidently with a confidence score 5510 more than a threshold percentage. The confidence score 5510 may gradually decrease as the probabilities indicating that the item 204a corresponds to any of the respective items 204 decrease.

The item tracking engine 114 may determine whether the confidence score 5510 is less than a threshold percentage 5512. The threshold percentage 5512 may be 80%, 85%, etc. The item tracking engine 114 may determine that the confidence score 5510 is less than the threshold percentage 5512 if it is not certain what is the identity of the item 204a based on the at least one attribute 1608a and other determined attributes 1608a of the item 204a. For example, the item tracking engine 114 may determine that the item 204a is a soda. However, it may not be certain with high accuracy what is the flavor or size of the soda. In this example, the item tracking engine 114 may determine that the confidence score 5510 associated with the identity of the item 204a is less than the threshold percentage 5512.

In some embodiments, determining that the confidence score 5510 of the identity of the item 204a based on the attributes 1608a is less than the threshold percentage 5512 includes identifying the set of attributes 1608*a* of the item 204*a*, as indicated in the encoded vector 1606*a*, and for each item 204 from among the set of items 204 (that have at least one attribute 1608*a* in common with the item 204*a*), performing the following operations. For example, for each item 204 that has the at least one attribute 1608*a* in common with the item 204*a*, item tracking engine 114 may identify a second set of attributes 1608 associated with the item 204, as indicated in the encoded vector 1606 of the item 204 and compare each attribute 1608*a* with a counterpart attribute 1608. If it is determined that less than the set of attributes 1608*a* correspond to the counterpart attributes 1608 for each item 204, it may be an indication that the confidence score 5510 in identifying the identity of the item 204*a* based on the attributes 1608*a* is less than the threshold percentage 5512.

In some embodiments, if it is determined that the confidence score 5510 is more than the threshold percentage 5512, the item tracking engine 114 may determine the identity of the item 204*a* based on the attributes 1608*a* in the item identification and confirmation process 5520.

Using the Height of the Item to Confirm the Identity of the Item

In response to determining that the confidence score 5510 associated with the identity of the item 204*a* is less than the threshold percentage 5512, the item tracking engine 114 may use the height 5310 of the item 204*a* to narrow down the search set from among the items 204*a-b* that have the at least one attribute 1608*a* in common with the item 204*a*, to a subset of those items 204 that have average heights 5310 within the threshold range 5514 from the height 5310*a* of the item 204*a*. To this end, the item tracking engine 114 determines the height 5310*a* of the item 204*a* from the image 122, 124, similar to that described in FIG. 53. For example, the item tracking engine 114 may determine the distance D1 between the top-view camera 108/top-view 3D sensor 110 and the top surface of the item 204*a*, the second distance D2 between the top-view camera 108/top-view 3D sensor 110 and the platform 202, and the different between D1 and D2.

The item tracking engine 114 may then identify which item(s) 204 from among the set of items 204*b-c* that have the at least one attribute 1608*a* in common with the item 204*a* are associated with average heights 5310 that is within the threshold range 5514 from the height 5310*a* of the item 204*a*. The threshold range 5514 may correspond to the threshold range 5312 described in FIG. 53. For example, the item tracking engine 114 may evaluate each entry 1602 of item 204 that is determined to have the at least one attribute 1608*a* in common with the item 204*a*, fetch the average height 5310 associated with the respective entry 1602 of the respective item 204, and compare the fetched average height 5310 of the respective item 204 with the determined height 5310*a* of the item 204*a*.

The item tracking engine 114 may compare the encoded vector 1606*a* with each encoded vector 1606 associated with the reduced set of items 204 that are associated with average heights 5310 within the threshold range 5514 of the determined height 5310*a* of the item 204*a*. For example, assume that it is determined that the item 204*c* is associated with an average height 5310*c* that is within the threshold range 5514 of the height 5310*a* of the item 204*a*, i.e., the item 204*c* is among the items 204 that are associated with average heights 5310 within the threshold range 5514 of the determined height 5310*a* of the item 204*a*. In this example, the item tracking engine 114 may compare the encoded vector 5510*a* with the encoded vector 1606*c*, similar to that described above with respect to comparing the encoded vector 1606*a* with the encoded vector 1606*b*. For example, the item tracking engine 114 may determine the Euclidean distance between the encoded vector 1606*a* and the encoded vector 1606*c*. If the determined Euclidean distance is less than a threshold distance (e.g., 0.1 cm, 0.2 cm, etc.), it may be determined that the encoded vector 1606*a* corresponds to the encoded vector 1606*c*.

In some embodiments, to determine whether the encoded vector 1606*a* corresponds to the encoded vector 1606*c*, the item tracking engine 114 may perform the following operations. Determining whether the encoded vector 1606*a* corresponds to the encoded vector 1606*c* may include determining whether the item 204*a* matches the item 1606*c*, or in other words, determining if the item 204*a* is the item 1606*c*. For example, the item tracking engine 114 may identify a set of attributes 1608*a* as indicated in the encoded vector 1606*a* associated with the item 204*a*, identify a set of attributes 1608*c* as indicated in the encoded vector 1606*c* associated with the item 204*b*, compare each attribute 1608*a* of the set of attributes 1608*a* with a counterpart attribute 1608*c* of the set of attributes 1608*c*. For example, in this process, the item tracking engine 114 may compare the determined brand of item 204*a* with a brand of the item 204*c*, compare the dominant color(s) of the item 204*a* with dominant color(s) of the item 204*c*, compare flavor of the item 204*a* (e.g., orange-flavored, diet, etc.) with a flavor of the item 204*c*, and the like.

If the item tracking engine 114 determines that more than a threshold percentage (e.g., more than 80%, 85%, etc.) of attributes 1608*a* correspond to counterpart attributes 1608*c*, the item tracking engine 114 may determine that the encoded vector 1606*a* corresponds to the encoded vector 1606*c* and item 204*a* corresponds to item 204*c*. For example, if at least 8 out of 10 attributes 1608*a* correspond to counterpart attributes 1608*c*, the item tracking engine 114 may determine that the encoded vector 1606*a* corresponds to the encoded vector 1606*c* and item 204*a* corresponds to item 204*c*. In one example, assuming that there are four attributes 1608, if the item tracking engine 114 determines that color attribute 1608*a* corresponds to or matches the color attribute 1608*c*, brand attribute 1608*a* corresponds to or matches the brand attribute 1608*a*, and size attribute 1608*a* corresponds to or matches the size attribute 1608*c*, the item tracking engine 114 may determine that the encoded vector 1606*a* corresponds to the encoded vector 1606*c*. In response, the item tracking engine 114 may determine that the item 204*a* corresponds to the item 204*c*. The item tracking engine 114 may add the item 204*a* to the virtual shopping cart associated with the user.

Example Method for Confirming the Identity of the Item Based on Item Height

FIG. 56 illustrates an example flow chart of a method 5600 for confirming the identity of an item 204 based on item height 5310 according to some embodiments. Modifications, additions, or omissions may be made to method 5600. Method 5600 may include more, fewer, or other operations. For example, operations may be performed in parallel or in any suitable order. While at times, it is discussed that the system 5500, item tracking device 104, item tracking engine 114, imaging device 102, or components of any of thereof perform certain operations, any suitable system or components may perform one or more operations of the method 5600. For example, one or more operations of method 5600 may be implemented, at least in part, in the form of software instructions 5502 of FIG. 55, stored on tangible non-transitory computer-readable medium (e.g., memory 116 of FIG. 55) that when run by one or more processors (e.g., processors 602 of FIG. 55) may cause the one or more processors to perform operations 5602-5630.

At operation 5602, the item tracking engine 114 determines whether a triggering event is detected. For example, the item tracking engine 114 may detect a triggering event when a user places a first item 204a on the platform 202, similar to that described in FIGS. 1-29. For example, the triggering event may correspond to a placement of an item 204a on the platform 202. If it is determined that a triggering event is detected, method 5600 proceeds to operation 5604. Otherwise, method 5600 remains at operation 5602 until a triggering event is detected.

At operation 5604, the item tracking engine 114 captures an image 122, 124 of the item 204a placed on the platform 202, for example, by using one or more cameras 108 and one or more 3D sensors 110, similar to that described in FIGS. 1-5 and 53-55.

At operation 5606, the item tracking engine 114 generates an encoded vector 1606a for the image 122, 124, where the encoded vector 1606a describes the attributes 1608a of the item 204a. For example, the item tracking engine 114 may generate the encoded vector 1606a by implementing the machine learning model 126, similar to that described in FIGS. 1-29.

At operation 5608, the item tracking engine 114 identifies a set of items 204b-c in the encoded vector library 128 that have at least one attribute 1608 in common with the first item 204a. For example, the item tracking engine 114 may identify items 204b-c that have the same brand as the item 204a.

At operation 5610, the item tracking engine 114 determines the identity of the first item 204a based on the attributes 1608a of the item 204a. For example, in this process, the item tracking engine 114 may assign a higher weight to the at least one attribute 1608a compared to the rest of the attributes 1608a to indicate that the at least one attribute 1608a provides more accurate information about the identity of the item 204a. In one example, the at least one attribute 1608a may be among the attributes 1608a indicated in the encoded vector 1606a.

At operation 5612, the item tracking engine 114 determines a confidence score 5510 associated with the identity of the item 204a, via the machine learning model 126, similar to that described in FIG. 55. At operation 5614, the item tracking engine 114 determines whether the confidence score 5510 is less than the threshold percentage 5512. If it is determined that the confidence score 5510 is less than the threshold percentage 5512, method 5600 proceeds to operation 5618. Otherwise, method 5600 proceeds to operation 5616.

At operation 5616, the item tracking engine 114 confirms the identity of the item 204a based on the determined attributes 1608a of the item 204a. In the example of method 5600, the height of the item 204a may not have been considered among the attributes 1608a of the item 204a until this stage.

At operation 5618, the item tracking engine 114 determines a height 5310a of the item 204a. For example, the item tracking engine 114 determines a difference between a D1 distance between a camera 108/3D sensor 110 and a top surface of the item 204a and D2 distance between the camera 108/3D sensor 110 and the platform 202, similar to that described in FIGS. 53 and 55.

At operation 5620, the item tracking engine 114 identifies one or more items 204 from among the set of items 204b-c that are associated with average height 5310 within a threshold range 5514 of the height 5310a of the first item 204a, similar to that described in FIG. 55. For example, the item tracking engine 114 may identify items 204 that have average heights 5310 within ±2 cm range of the height 5310a of the first item 204a.

At operation 5622, the item tracking engine 114 selects an item from among the one or more items 204. The item tracking engine 114 iteratively selects an item 204 until no item 204 is left for evaluation. For example, assume that the item tracking engine 114 selects the item 204c in the first iteration.

At operation 5624, the item tracking engine 114 compares a first encoded vector 1606a associated with the first item 204a with a second encoded vector 1606c associated with the selected item 204c. For example, the item tracking engine 114 may determine a Euclidean distance between the first encoded vector 1606a and the second encoded vector 1606c, similar to that described in FIG. 55.

At operation 5626, the item tracking engine 114 determines whether the first encoded vector 1606a corresponds to the second encoded vector 1606c. For example, if the item tracking engine 114 determines that the Euclidean distance between the first encoded vector 1606a and the second encoded vector 1606c is less than a threshold value, it may be determined that the first encoded vector 1606a corresponds to the second encoded vector 1606c. Otherwise, the item tracking engine 114 may determine that the first encoded vector 1606a does not correspond to the second encoded vector 1606c. If it determined that the first encoded vector 1606a corresponds to the second encoded vector 1606c, the method 5600 proceeds to operation 5630. Otherwise, method 5600 proceeds to operation 5628.

At operation 5628, the item tracking engine 114 determines whether to select another item 204. The item tracking engine 114 determines to select another item 204 if at least one item 204 from among the one or more items 204b-c is left for evaluation. If the item tracking engine 114 determines to select another item 204, method 5600 returns to operation 5622. Otherwise, the method 5600 ends.

At operation 5630, the item tracking engine 114 determines that the first item 204a corresponds to the selected item 204c. The item tracking engine 114 may also add the item 204a to the virtual shopping cart associated with the user.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An object tracking system, comprising:
a plurality of cameras, wherein each camera is configured to capture images of at least a portion of a platform;
a memory configured to store an encoded vector library comprising a plurality of encoded vectors, wherein:
    each encoded vector describes one or more attributes of a respective item; and
    each encoded vector is associated with a respective average height and a standard deviation from the respective average height associated with the respective item; and
one or more processors communicatively coupled to the memory, and configured to:
    detect a triggering event at the platform, wherein the triggering event corresponds to a placement of a first item on the platform;
    in response to detecting the triggering event, capture an image of the first item using a camera from among the plurality of cameras;
    generate a first encoded vector for the image, wherein the first encoded vector describes one or more attributes of the first item;
    determine a height associated with the first item;
    identify one or more items in the encoded vector library that are associated with average heights within a threshold range from the determined height of the first item;
    compare the first encoded vector with a second encoded vector associated with a second item from among the one or more items;
    determine that the first encoded vector corresponds to the second encoded vector; and
    in response to determining that the first encoded vector corresponds to the second encoded vector, determine that the first item corresponds to the second item.

2. The object tracking system of claim 1, wherein the one or more processors are further configured to add the first item to a virtual shopping cart associated with a user.

3. The object tracking system of claim 1, wherein to determine the height associated with the first item, the one or more processors are further configured to:
    determine a first distance between the camera and a surface on top of the first item;
    determine a second distance between the camera and the platform; and
    determine a difference between the first distance and the second distance, wherein the height associated with the first item corresponds to the difference between the first distance and the second distance.

4. The object tracking system of claim 1, wherein for the respective item, the respective average height is determined by:
    capturing a plurality of images of the respective item placed on different parts of the platform, wherein each of the plurality of images shows the respective item placed on a different part of the platform;
    determining a plurality of heights of the respective item, wherein each of the plurality of heights is determined based at least in part upon a respective distance between the camera and a top surface of the respective item; and
    determining an average of the plurality of heights, wherein the average of the plurality of heights corresponds to the respective average height of the respective item.

5. The object tracking system of claim 1, wherein the standard deviation corresponds to the threshold range from the determined height of the first item.

6. The object tracking system of claim 1, wherein to determine that the first encoded vector corresponds to the second encoded vector, the one or more processors are further configured to:
    identify a first set of attributes associated with the first item, wherein the first set of attributes is indicated in the first encoded vector;
    identify a second set of attributes associated with the second item, wherein the second set of attributes is indicated in the second encoded vector;
    compare each attribute from among the first set of attributes with a counterpart attribute from among the second set of attributes; and
    determine that more than a threshold percentage of the first set of attributes correspond to counterpart attributes from among the second set of attributes.

7. The object tracking system of claim 1, wherein to determine that the first encoded vector corresponds to the second encoded vector, the one or more processors are further configured to:
    identify a first set of attributes associated with the first item, wherein the first set of attributes is indicated in the first encoded vector;
    identify a second set of attributes associated with the second item, wherein the second set of attributes is indicated in the second encoded vector;
    compare each attribute from among the first set of attributes with a counterpart attribute from among the second set of attributes; and
    determine that more than a threshold percentage of the first set of attributes correspond to counterpart attributes from among the second set of attributes.

8. A method comprising:
detecting a triggering event at a platform, wherein the triggering event corresponds to a placement of a first item on the platform;
in response to detecting the triggering event, capturing an image of the first item using a camera from among a plurality of cameras wherein each camera is configured to capture images of at least a portion of a platform;
generating a first encoded vector for the image, wherein the first encoded vector describes one or more attributes of the first item;
determining a height associated with the first item;
identifying one or more items in an encoded vector library that are associated with average heights within a threshold range from the determined height of the first item, wherein:
    the encoded vector library comprises a plurality of encoded vectors;
    each encoded vector describes one or more attributes of a respective item; and
    each encoded vector is associated with a respective average height and a standard deviation from the respective average height associated with the respective item;

comparing the first encoded vector with a second encoded vector associated with a second item from among the one or more items;

determining that the first encoded vector corresponds to the second encoded vector; and in response to determining that the first encoded vector corresponds to the second encoded vector, determining that the first item corresponds to the second item.

9. The method of claim 8, further comprising adding the first item to a virtual shopping cart associated with a user.

10. The method of claim 8, wherein determining the height associated with the first item is in response to:

determining a first distance between the camera and a surface on top of the first item;

determining a second distance between the camera and the platform; and determining a difference between the first distance and the second distance, wherein the height associated with the first item corresponds to the difference between the first distance and the second distance.

11. The method of claim 8, wherein for the respective item, the respective average height is determined by:

capturing a plurality of images of the respective item placed on different parts of the platform, wherein each of the plurality of images shows the respective item placed on a different part of the platform;

determining a plurality of heights of the respective item, wherein each of the plurality of heights is determined based at least in part upon a respective distance between the camera and a top surface of the respective item; and determining an average of the plurality of heights, wherein the average of the plurality of heights corresponds to the respective average height of the respective item.

12. The method of claim 8, wherein the standard deviation corresponds to the threshold range from the determined height of the first item.

13. The method of claim 8, wherein determining that the first encoded vector corresponds to the second encoded vector is in response to:

identifying a first set of attributes associated with the first item, wherein the first set of attributes is indicated in the first encoded vector;

identifying a second set of attributes associated with the second item, wherein the second set of attributes is indicated in the second encoded vector;

comparing each attribute from among the first set of attributes with a counterpart attribute from among the second set of attributes; and determining that more than a threshold percentage of the first set of attributes correspond to counterpart attributes from among the second set of attributes.

14. The method of claim 8, wherein:

the image shows a top-view of the first item; and the camera is a top-view camera placed above the platform.

15. A non-transitory computer-readable medium storing instructions that when executed by one or more processors, cause the one or more processors to:

detect a triggering event at a platform, wherein the triggering event corresponds to a placement of a first item on the platform;

in response to detecting the triggering event, capture an image of the first item using a camera from among a plurality of cameras wherein each camera is configured to capture images of at least a portion of a platform;

generate a first encoded vector for the image, wherein the first encoded vector describes one or more attributes of the first item;

determine a height associated with the first item;

identify one or more items in an encoded vector library that are associated with average heights within a threshold range from the determined height of the first item, wherein:

the encoded vector library comprises a plurality of encoded vectors;

each encoded vector describes one or more attributes of a respective item; and each encoded vector is associated with a respective average height and a standard deviation from the respective average height associated with the respective item;

comparing the first encoded vector with a second encoded vector associated with a second item from among the one or more items;

determine that the first encoded vector corresponds to the second encoded vector; and in response to determining that the first encoded vector corresponds to the second encoded vector, determine that the first item corresponds to the second item.

16. The non-transitory computer-readable medium of claim 15, wherein the instructions further cause the one or more processors to add the first item to a virtual shopping cart associated with a user.

17. The non-transitory computer-readable medium of claim 15, wherein to determine the height associated with the first item, the instructions further cause the one or more processors to:

determine a first distance between the camera and a surface on top of the first item;

determine a second distance between the camera and the platform; and determine a difference between the first distance and the second distance, wherein the height associated with the first item corresponds to the difference between the first distance and the second distance.

18. The non-transitory computer-readable medium of claim 15, wherein for the respective item, the respective average height is determined by:

capturing a plurality of images of the respective item placed on different parts of the platform, wherein each of the plurality of images shows the respective item placed on a different part of the platform;

determining a plurality of heights of the respective item, wherein each of the plurality of heights is determined based at least in part upon a respective distance between the camera and a top surface of the respective item; and determining an average of the plurality of heights, wherein the average of the plurality of heights corresponds to the respective average height of the respective item.

19. The non-transitory computer-readable medium of claim 15, wherein the standard deviation corresponds to the threshold range from the determined height of the first item.

20. The non-transitory computer-readable medium of claim 15, wherein to determine that the first encoded vector corresponds to the second encoded vector, the instructions further cause the one or more processors to:

identify a first set of attributes associated with the first item, wherein the first set of attributes is indicated in the first encoded vector;

identify a second set of attributes associated with the second item, wherein the second set of attributes is indicated in the second encoded vector;

compare each attribute from among the first set of attributes with a counterpart attribute from among the second set of attributes; and determine that more than a threshold percentage of the first set of attributes correspond to counterpart attributes from among the second set of attributes.

* * * * *